(12) United States Patent
Stavrianoudakis et al.

(10) Patent No.: US 10,855,005 B2
(45) Date of Patent: Dec. 1, 2020

(54) METHOD AND APPARATUS FOR LOCKING ASSEMBLIES

(71) Applicant: VEKCUS, LLC, Hilmar, CA (US)

(72) Inventors: Jim Steve Stavrianoudakis, Hilmar, CA (US); John Steve Stavrianoudakis, Hilmar, CA (US)

(73) Assignee: Vekcus, LLC, Hilmar, CA (US)

( * ) Notice: Subject to any disclaimer, the term of this patent is extended or adjusted under 35 U.S.C. 154(b) by 1288 days.

(21) Appl. No.: 15/024,661

(22) PCT Filed: Aug. 7, 2014

(86) PCT No.: PCT/US2014/050123
§ 371 (c)(1),
(2) Date: Mar. 24, 2016

(87) PCT Pub. No.: WO2015/047552
PCT Pub. Date: Apr. 2, 2015

(65) Prior Publication Data
US 2016/0240941 A1    Aug. 18, 2016

Related U.S. Application Data

(60) Provisional application No. 61/881,818, filed on Sep. 24, 2013.

(51) Int. Cl.
*H01R 11/26* (2006.01)
*H01R 11/12* (2006.01)
(Continued)

(52) U.S. Cl.
CPC ............ *H01R 11/26* (2013.01); *F16G 11/044* (2013.01); *F16G 11/06* (2013.01); *H01R 11/12* (2013.01);
(Continued)

(58) Field of Classification Search
CPC ... H01R 11/281; H01R 11/282; H01R 11/286; F16G 11/06; F16G 11/101
See application file for complete search history.

(56) References Cited

U.S. PATENT DOCUMENTS 666,744 A    1/1901  Ellis
2,290,900 A  7/1942  Thomas
(Continued)

FOREIGN PATENT DOCUMENTS

CH    489124 A     4/1970
DE    1100121 B1   2/1961
(Continued)

*Primary Examiner* — Daniel J Wiley
(74) *Attorney, Agent, or Firm* — Shay Glenn LLP

(57) ABSTRACT

Locking assemblies are provided for connecting to a stranded element. The locking assemblies include a housing with a receiving bore, locking bore, and aperture. The stranded element enters the housing through the receiving bore. A drive shaft can advance a locking element in the locking bore such that the locking element contacts the stranded element to apply a force to secure the stranded element to the locking assembly. Ends of the stranded element can be pushed by the locking element out of the housing through the aperture. The locking assemblies can be used for mechanical and/or electrical connections. Examples of stranded elements include electrical wires, mechanical stranded cables, rope, and other multi-strand materials.

21 Claims, 136 Drawing Sheets

(51) Int. Cl.
  *F16G 11/04* (2006.01)
  *F16G 11/06* (2006.01)
  *H01R 11/28* (2006.01)
  *H01R 43/20* (2006.01)
(52) U.S. Cl.
  CPC ............ *H01R 11/282* (2013.01); *H01R 43/20* (2013.01); *H01R 11/281* (2013.01)

(56) References Cited

U.S. PATENT DOCUMENTS

| | | |
|---|---|---|
| 2,363,350 A | 11/1944 | Nail |
| 2,429,448 A | 10/1947 | Bakke |
| 3,152,854 A | 10/1964 | Osborn |
| 3,397,382 A * | 8/1968 | Shannon ............ H01R 11/281 439/429 |
| 3,708,611 A | 1/1973 | Dinger |
| 3,709,071 A | 1/1973 | Moransais |
| 3,710,370 A | 1/1973 | Quilici et al. |
| 4,478,479 A | 10/1984 | Cherry et al. |
| 4,493,522 A | 1/1985 | Law |
| 4,541,680 A | 9/1985 | Johnston |
| 4,889,320 A | 12/1989 | Pasbrig |
| 5,000,705 A | 3/1991 | Kinka et al. |
| 6,048,233 A | 4/2000 | Cole |
| 6,058,574 A | 5/2000 | Facey et al. |
| 6,364,720 B1 * | 4/2002 | Liang ................ H01R 11/281 439/462 |
| 6,494,752 B1 * | 12/2002 | Liang ................ H01R 11/281 439/763 |
| 7,798,869 B1 | 9/2010 | Konopacki et al. |
| 2008/0282511 A1 | 11/2008 | Chou et al. |
| 2011/0268417 A1 | 11/2011 | Quesnel |
| 2012/0034025 A1 | 2/2012 | Wahlberg et al. |

FOREIGN PATENT DOCUMENTS

| | | |
|---|---|---|
| DE | 1951448 A1 | 12/1970 |
| FR | 2315175 A1 | 1/1977 |
| FR | 2524595 A1 | 10/1983 |
| GB | 1217911 A | 1/1971 |
| GB | 1505990 A | 4/1978 |
| GB | 2415012 B | 6/2006 |

* cited by examiner

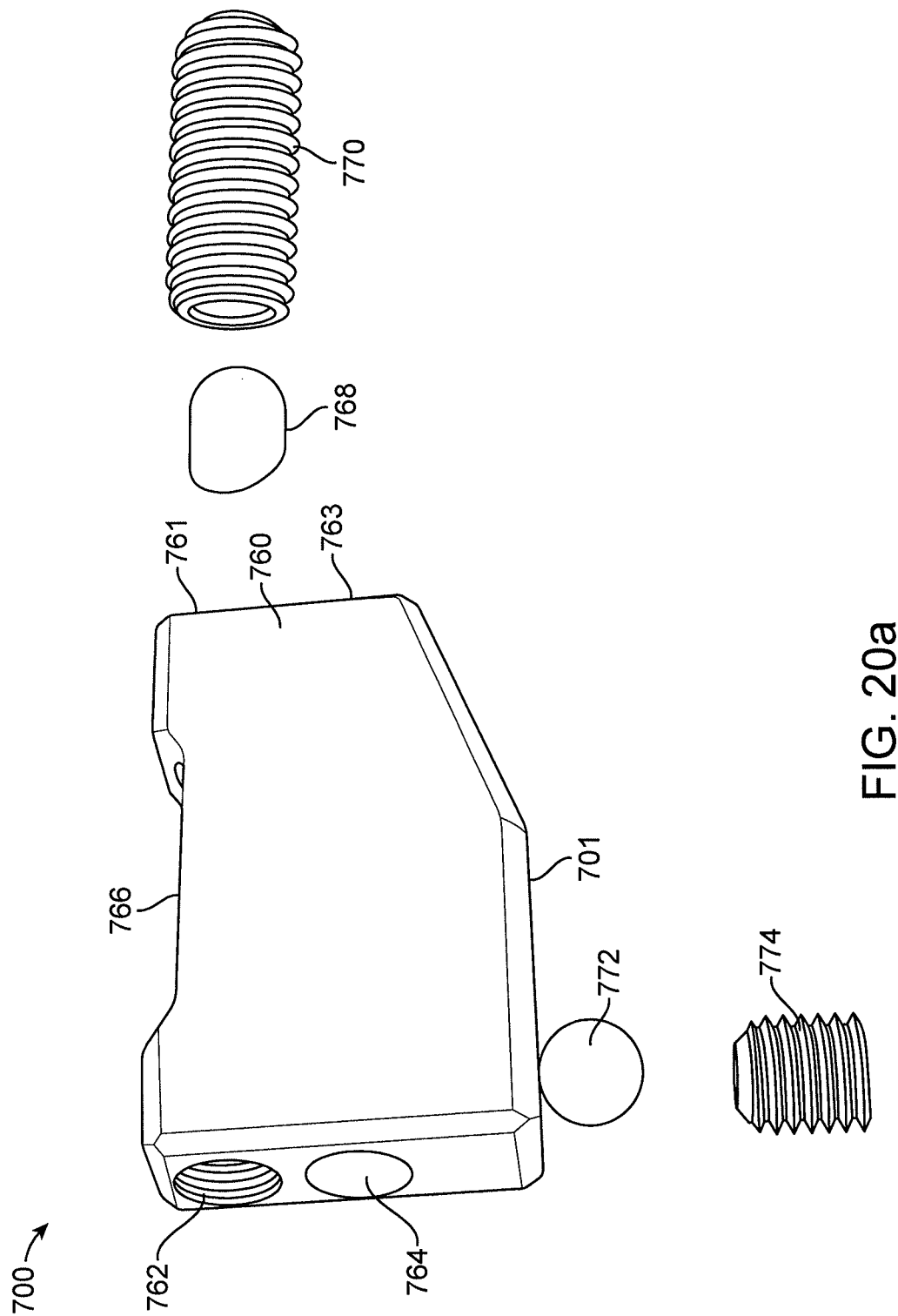

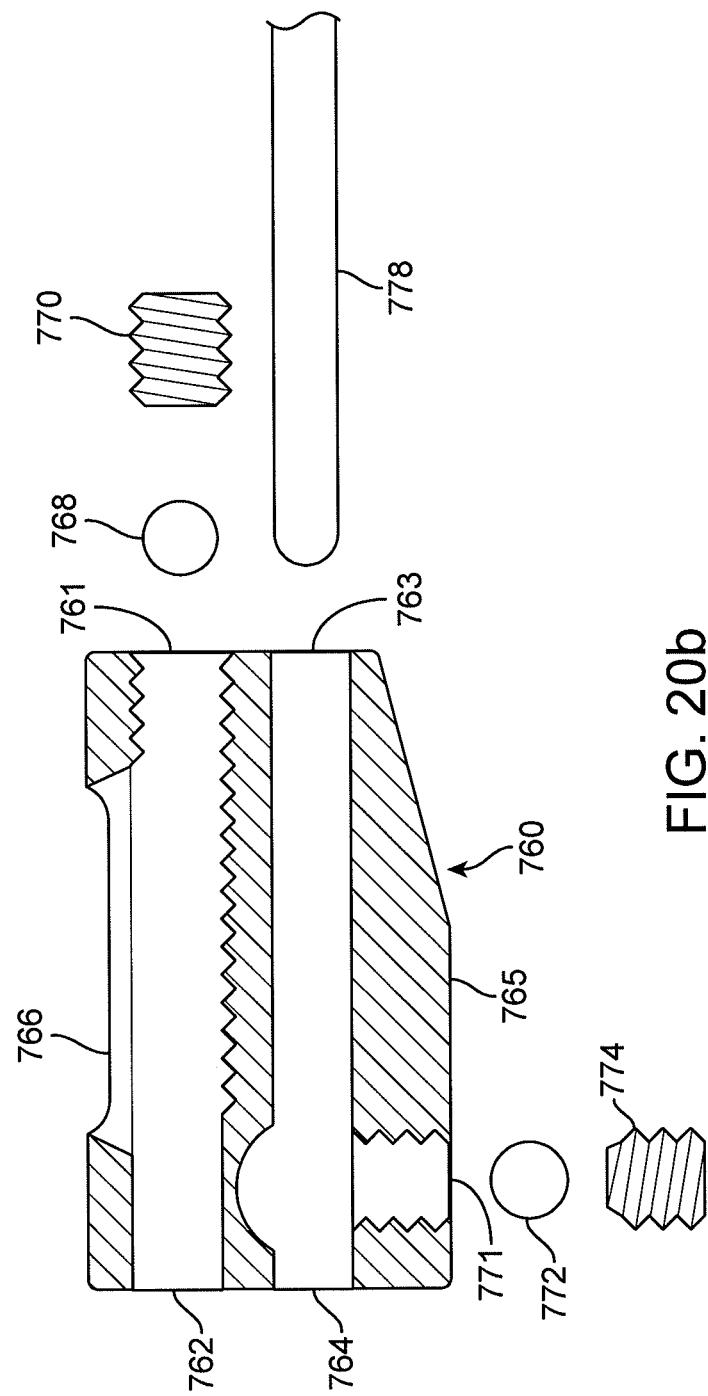

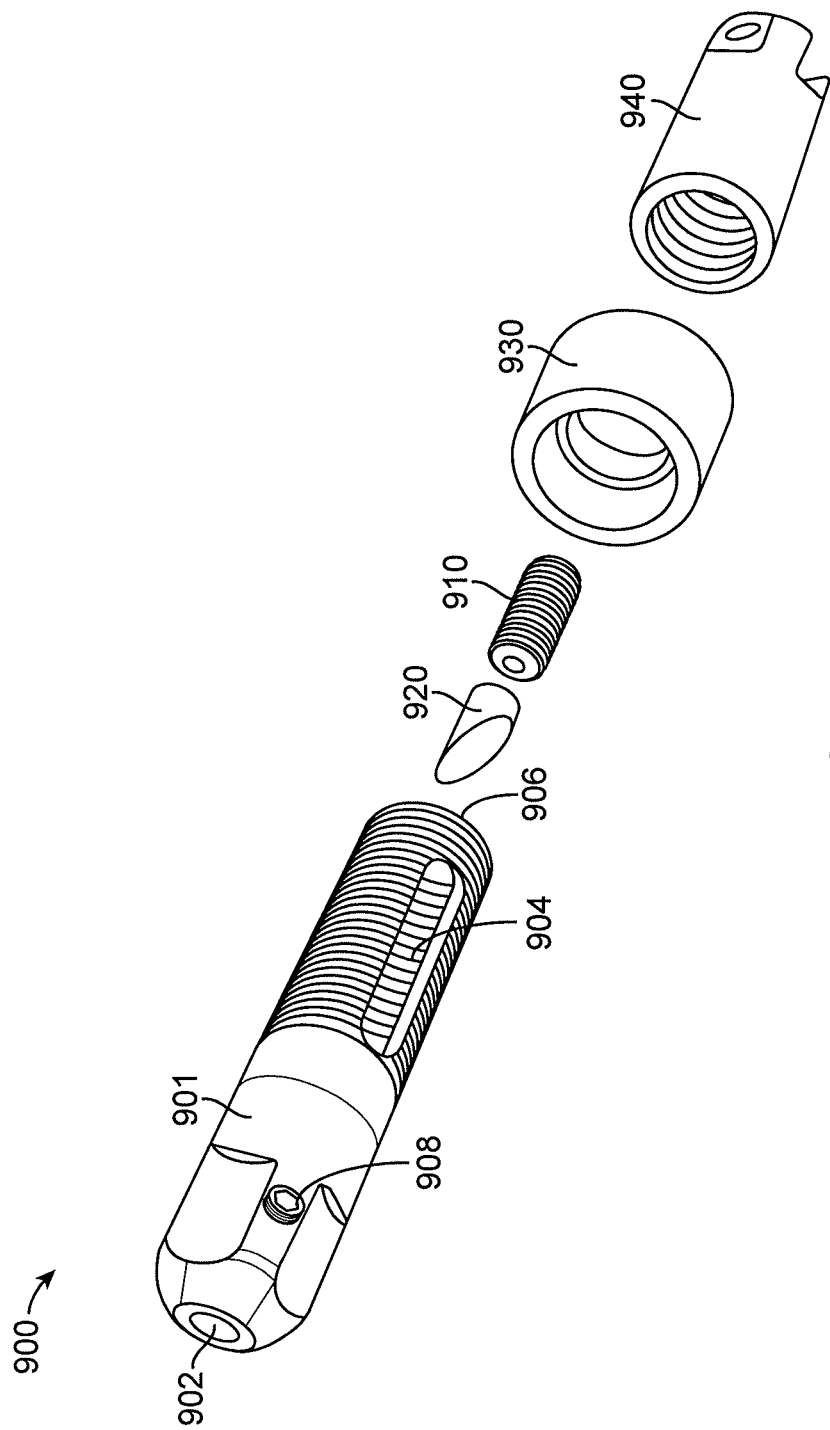

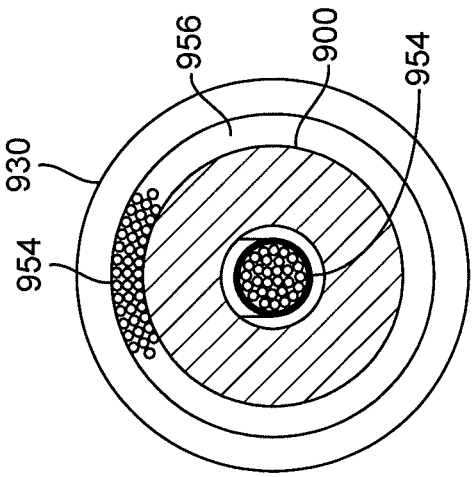
FIG. 26B-B
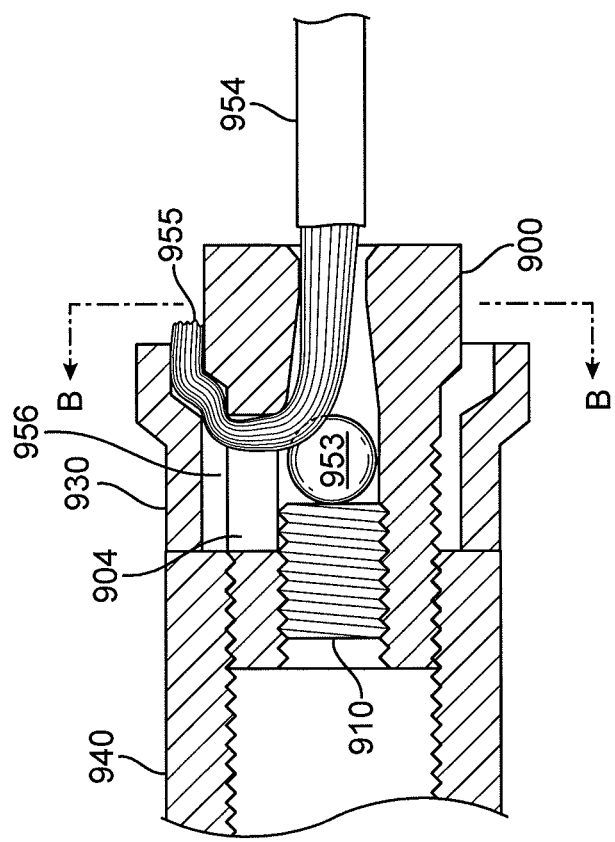
FIG. 26e

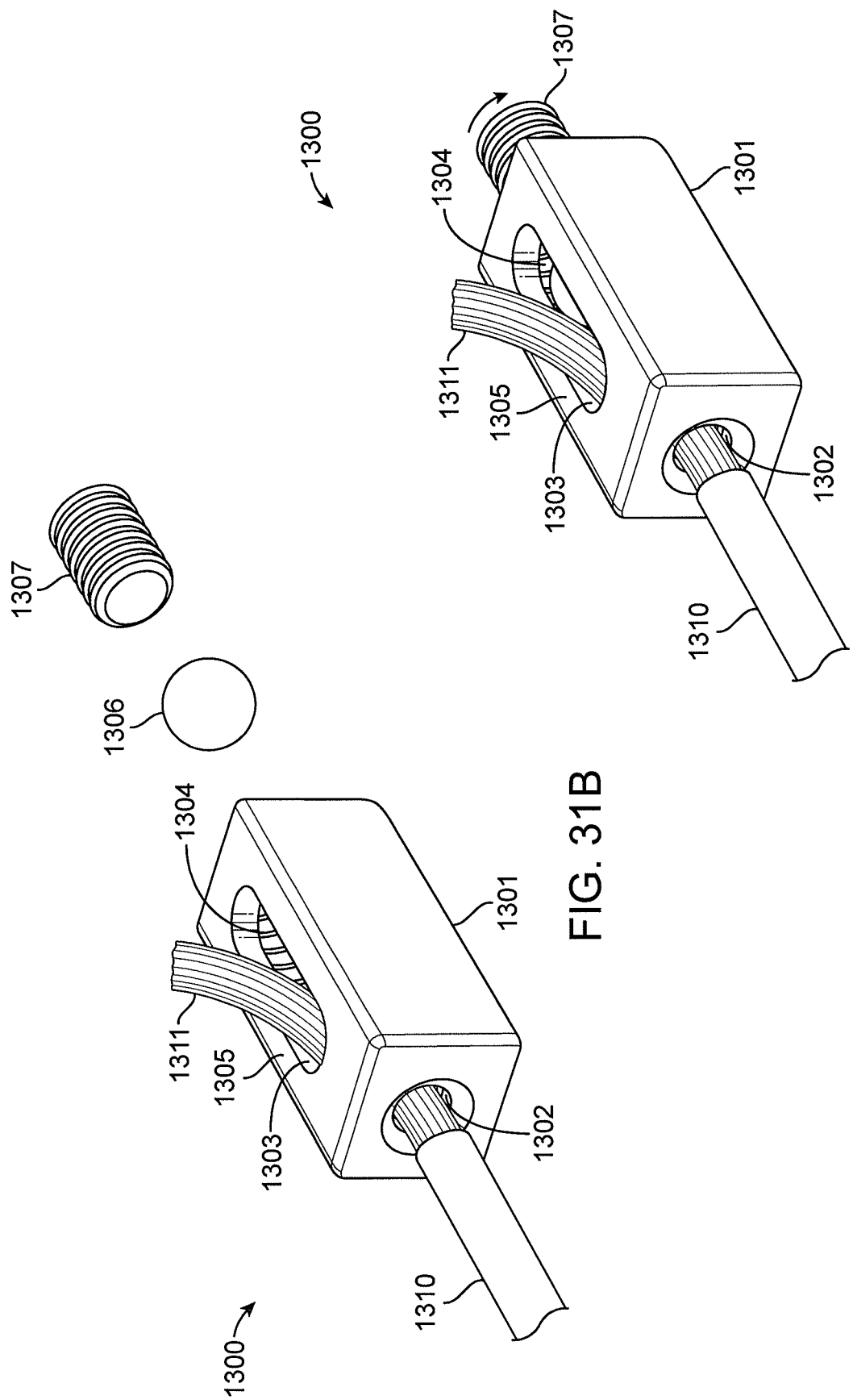

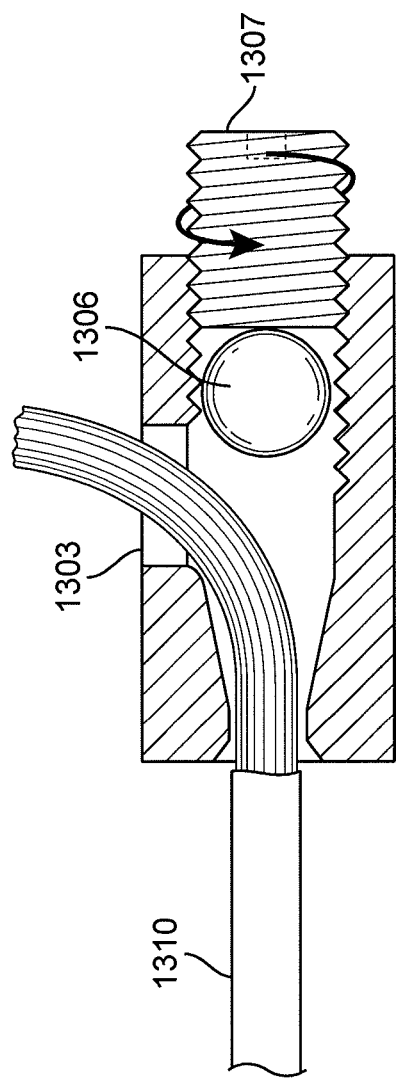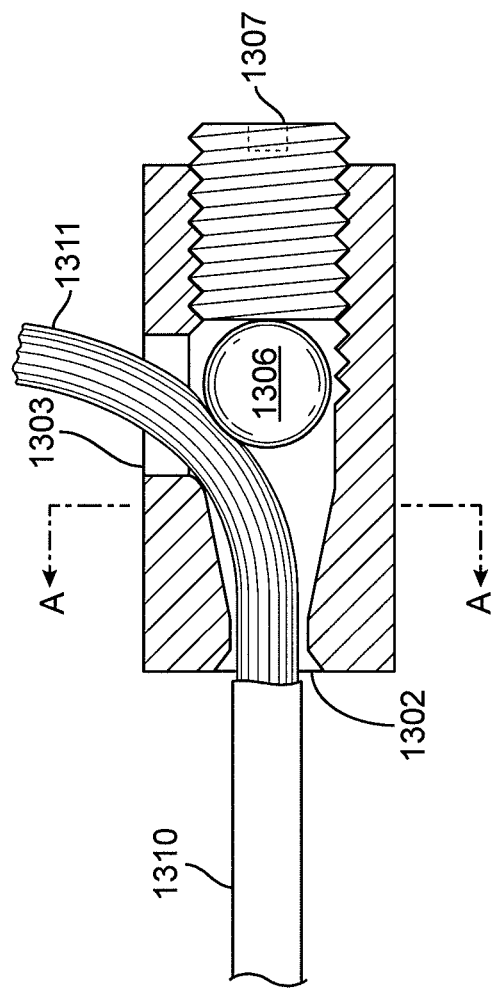
FIG. 32B
FIG. 32C

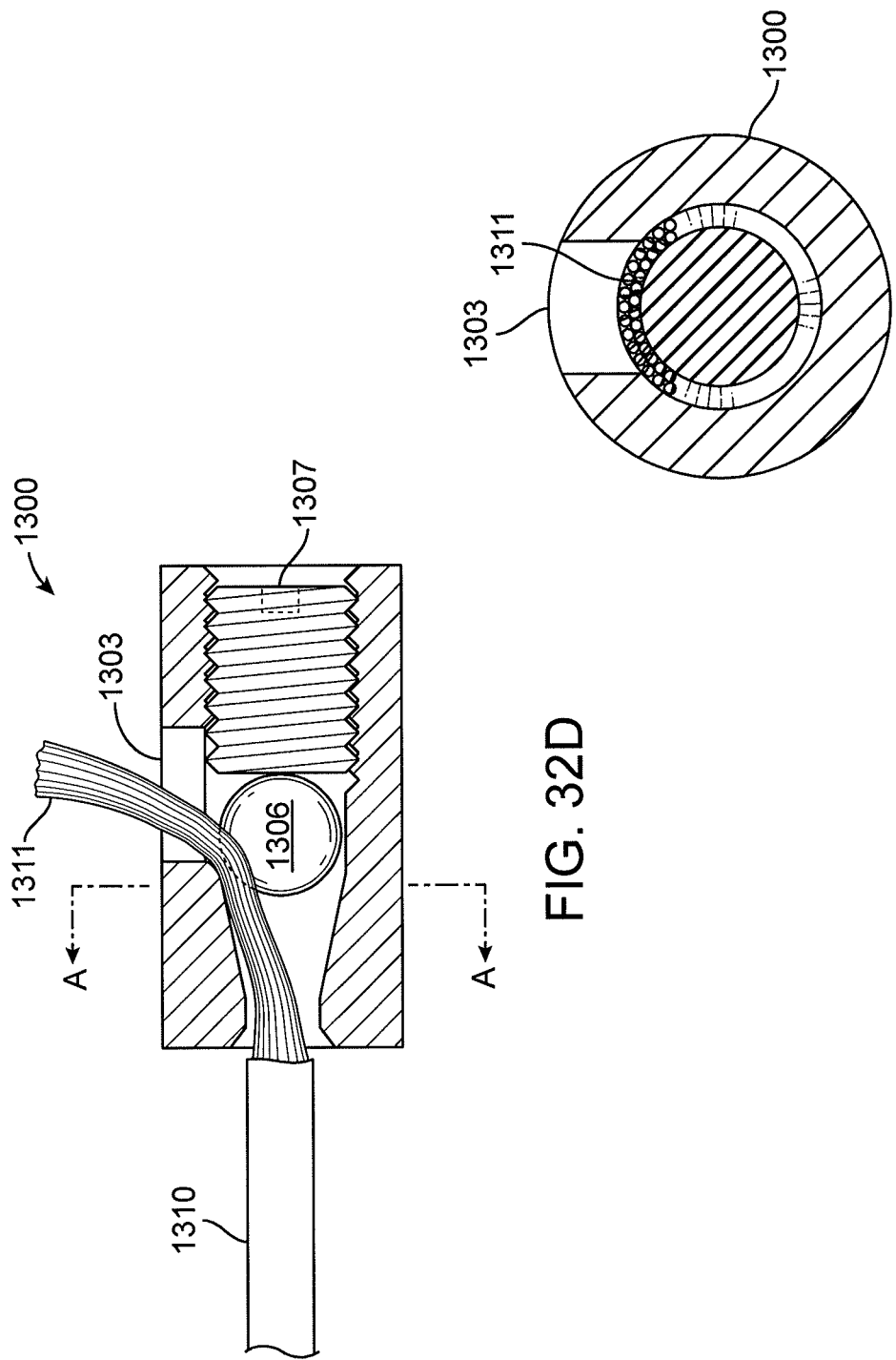

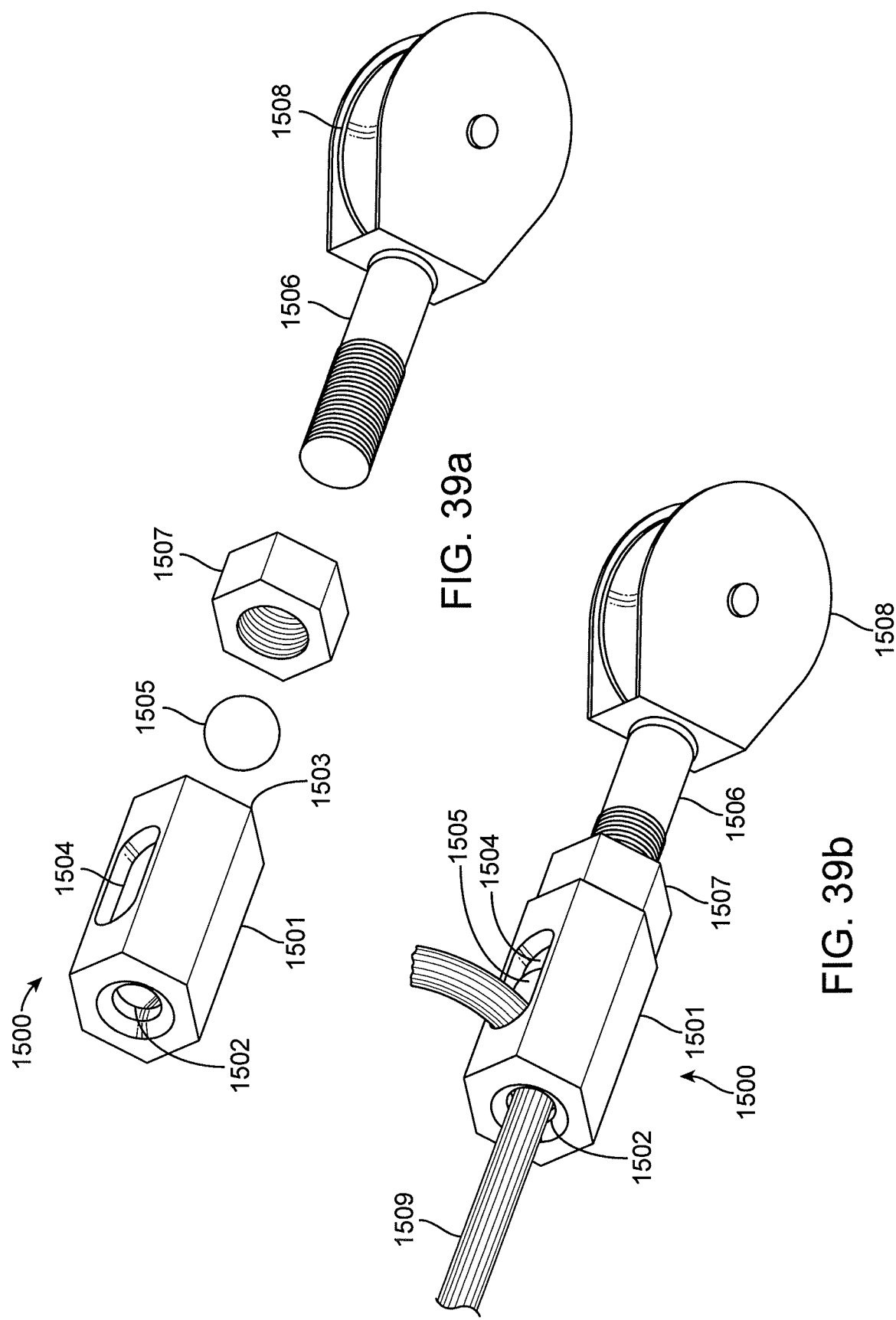

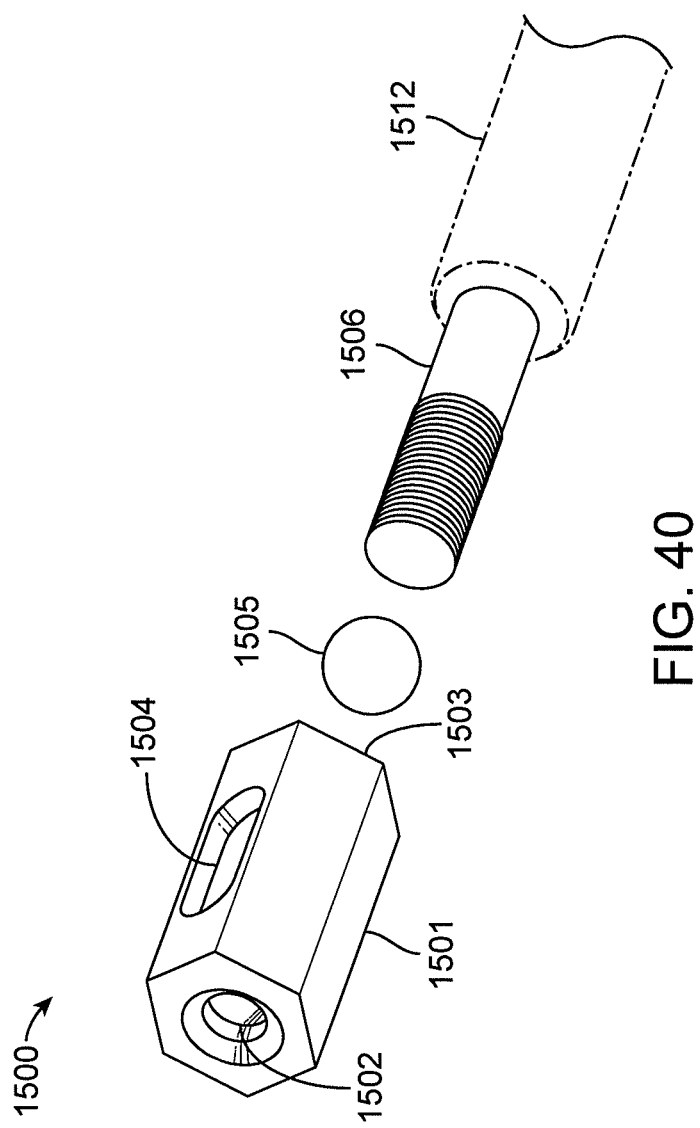

FIG. 45a-a

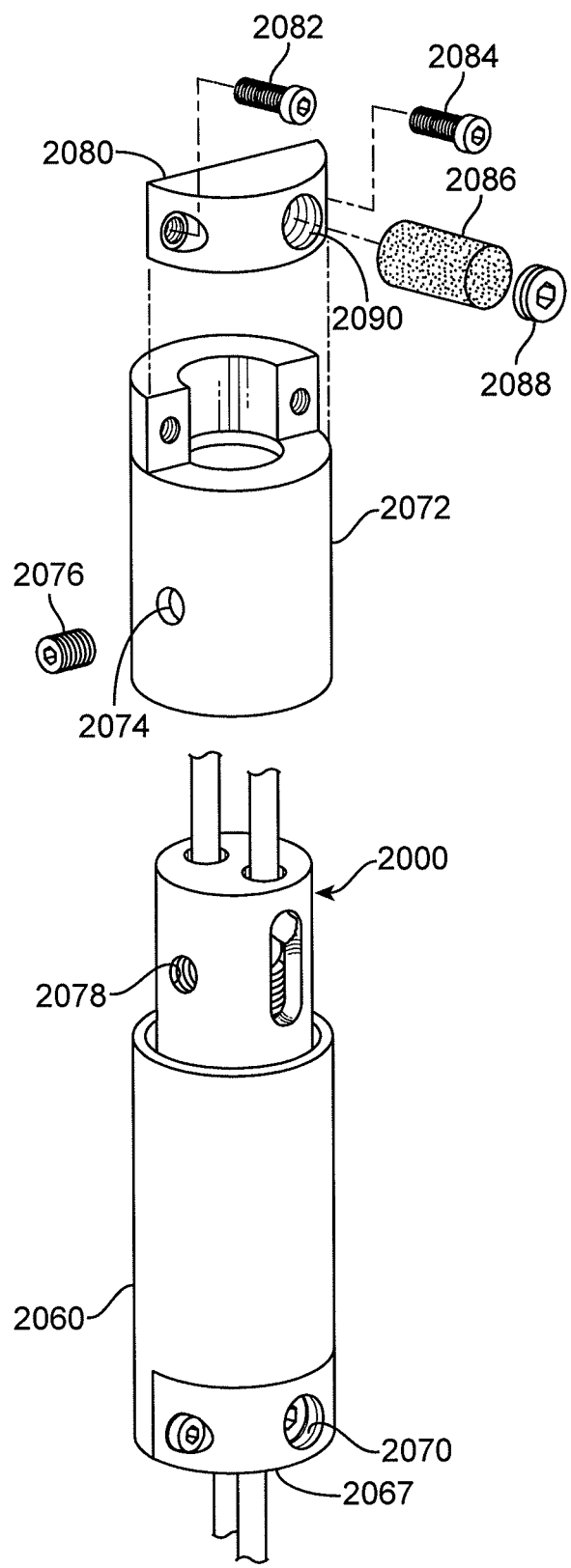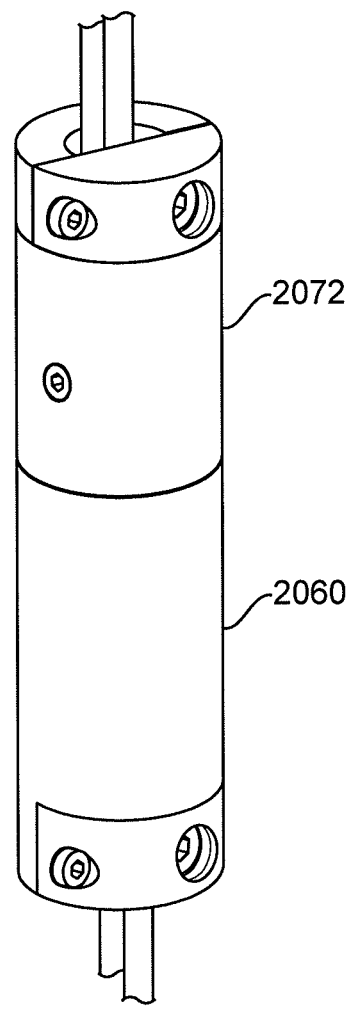
FIG. 47e
FIG. 47f

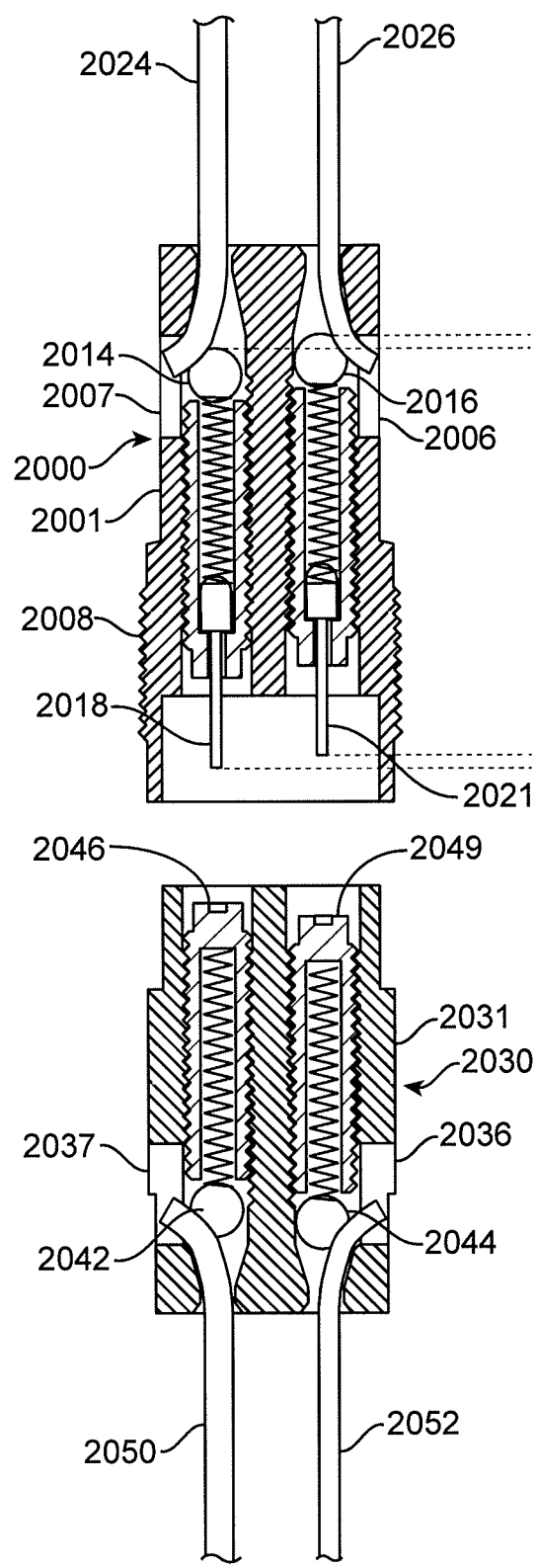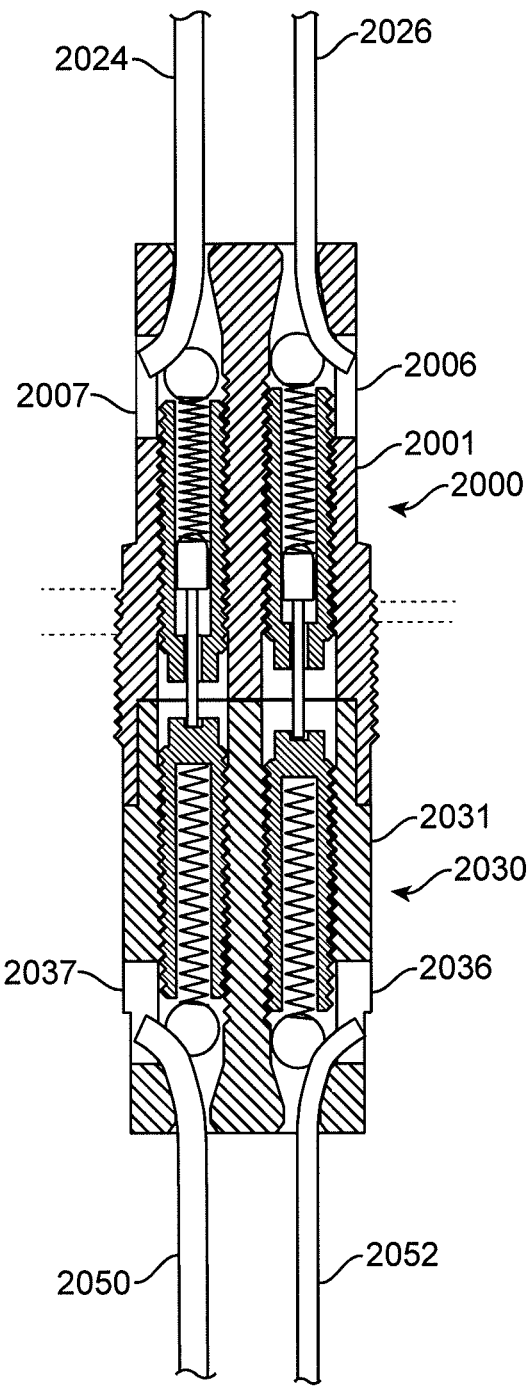
FIG. 48a
FIG. 48b

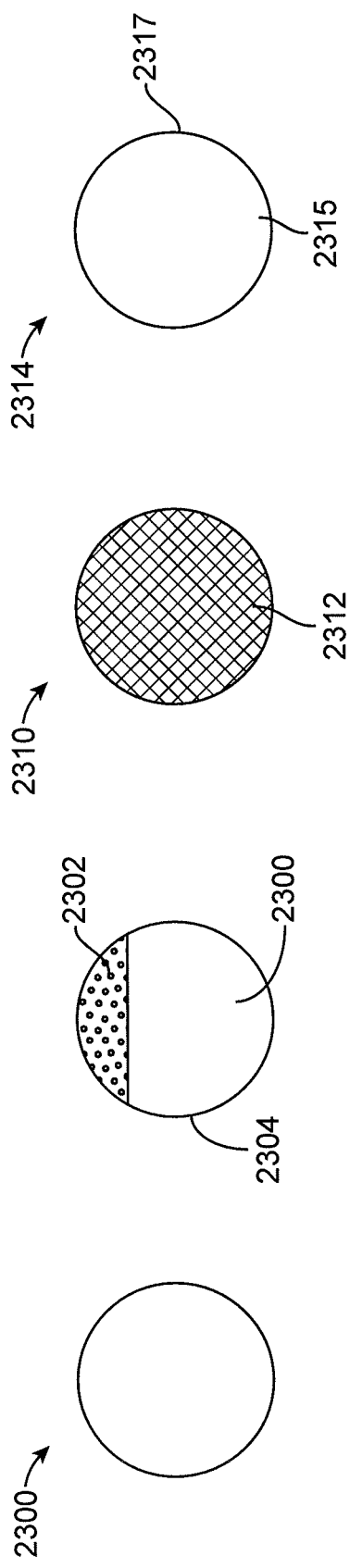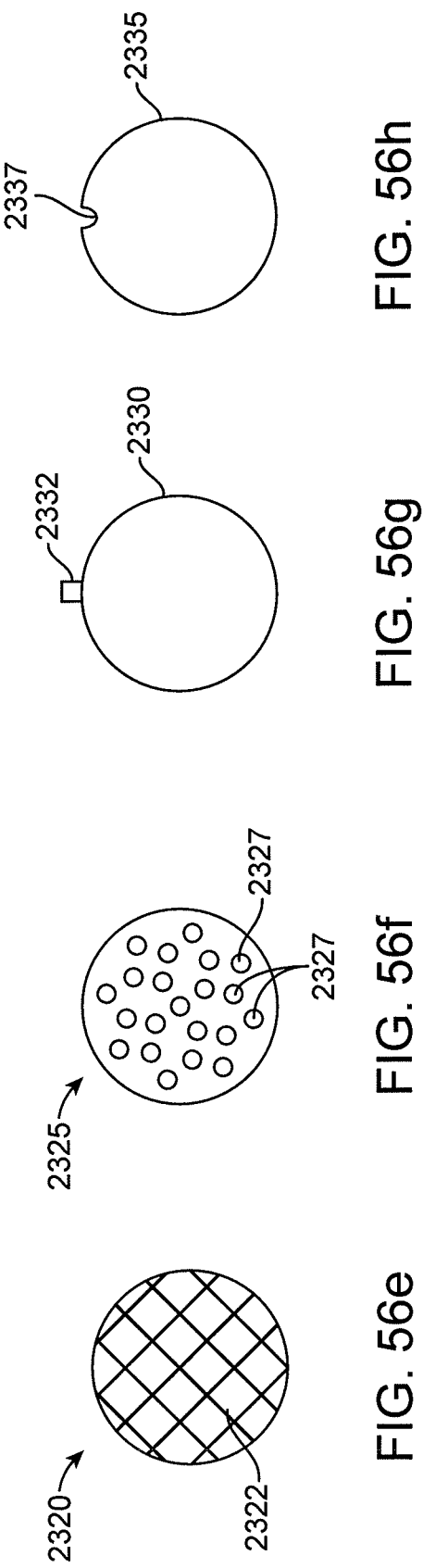

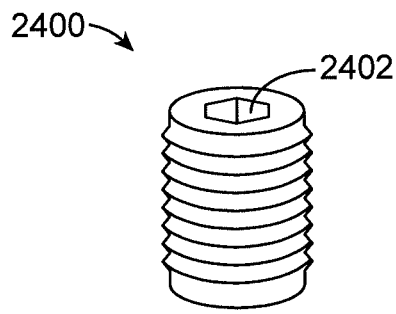
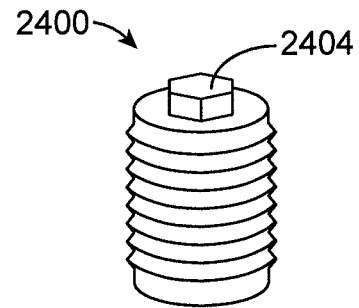
FIG. 57a　　　　　　FIG. 57b
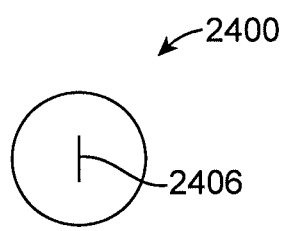
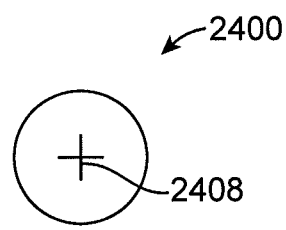
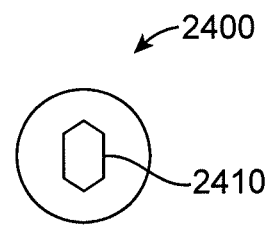
FIG. 57c　　　FIG. 57d　　　FIG. 57e
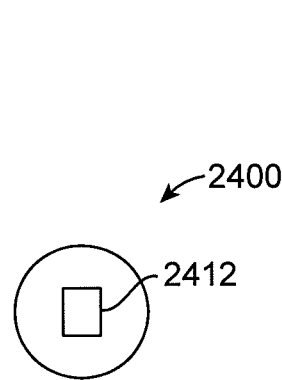
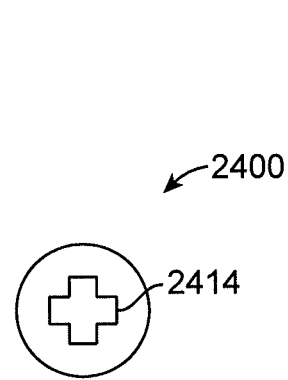
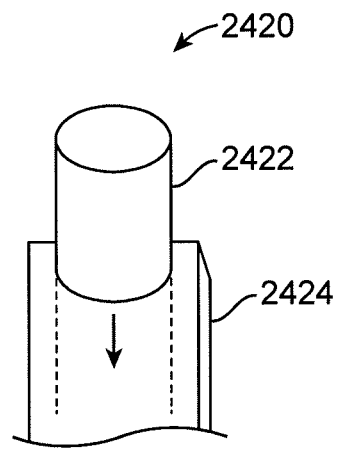
FIG. 57f　　　FIG. 57g　　　FIG. 57h

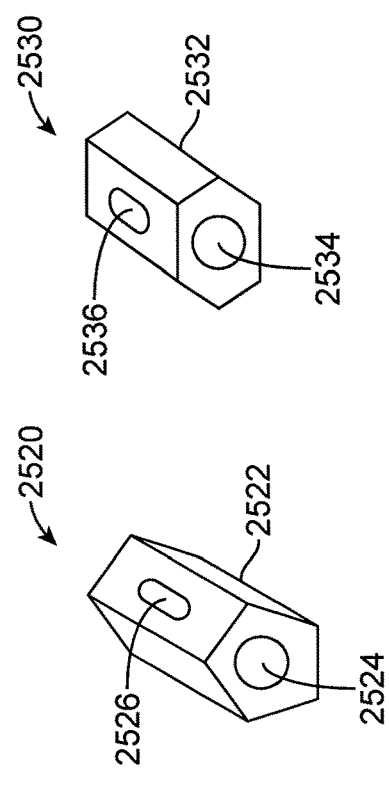
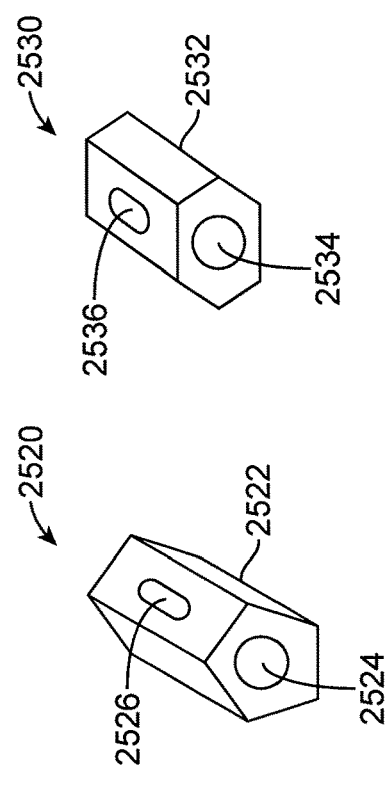
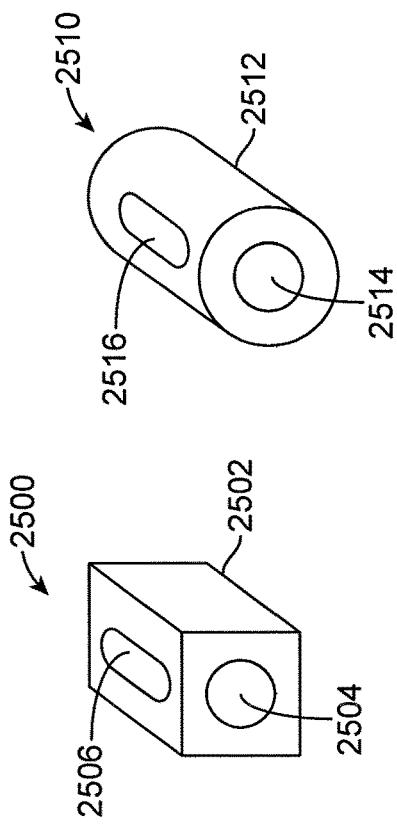
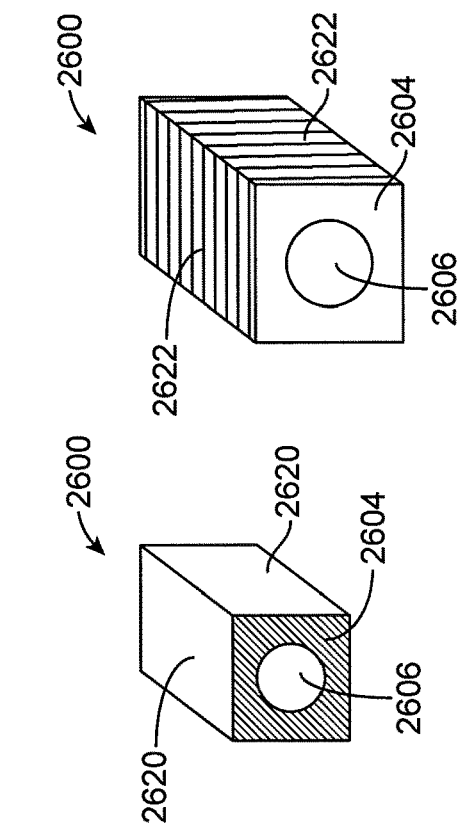
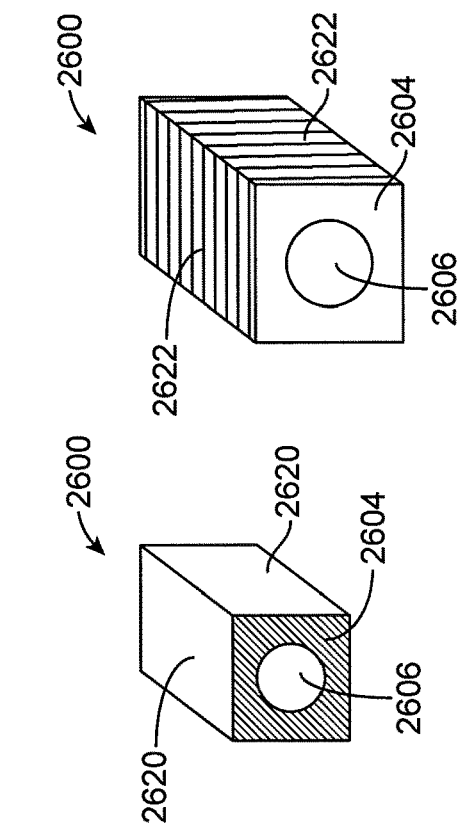
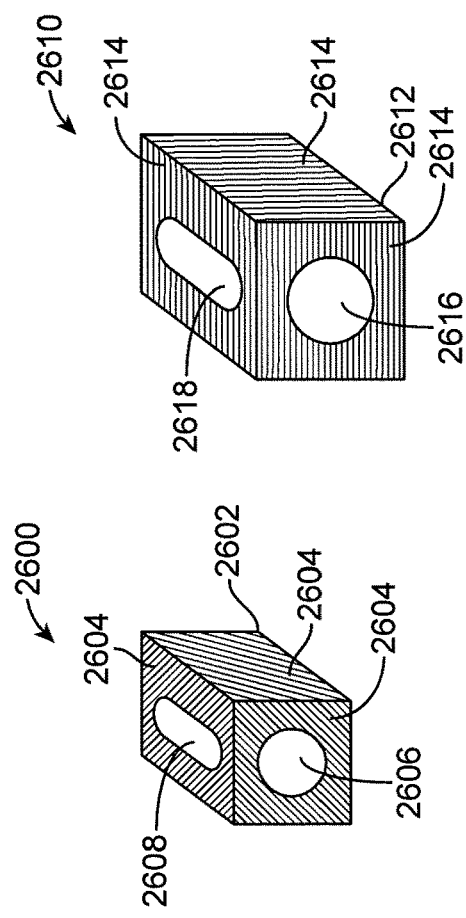
FIG. 58a  FIG. 58b  FIG. 58c  FIG. 58d
FIG. 59a  FIG. 59b
FIG. 60a  FIG. 60b

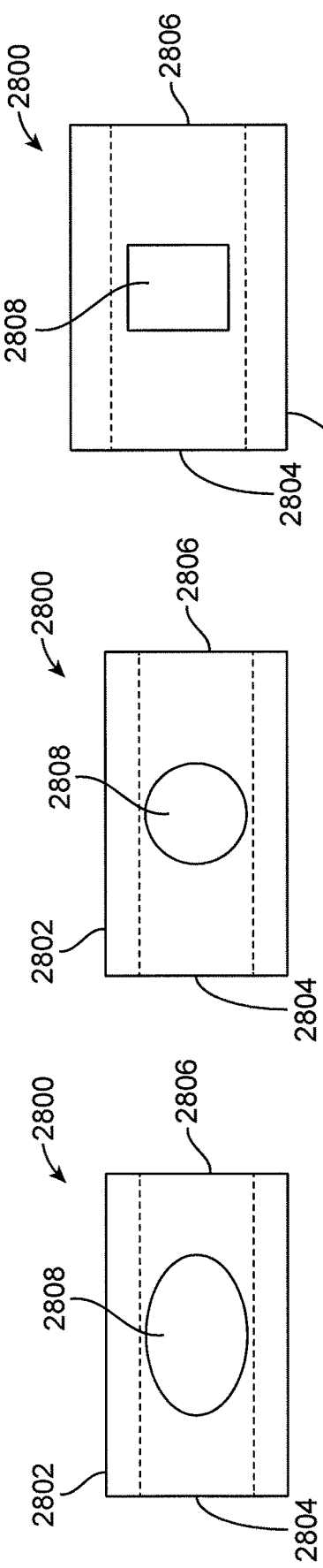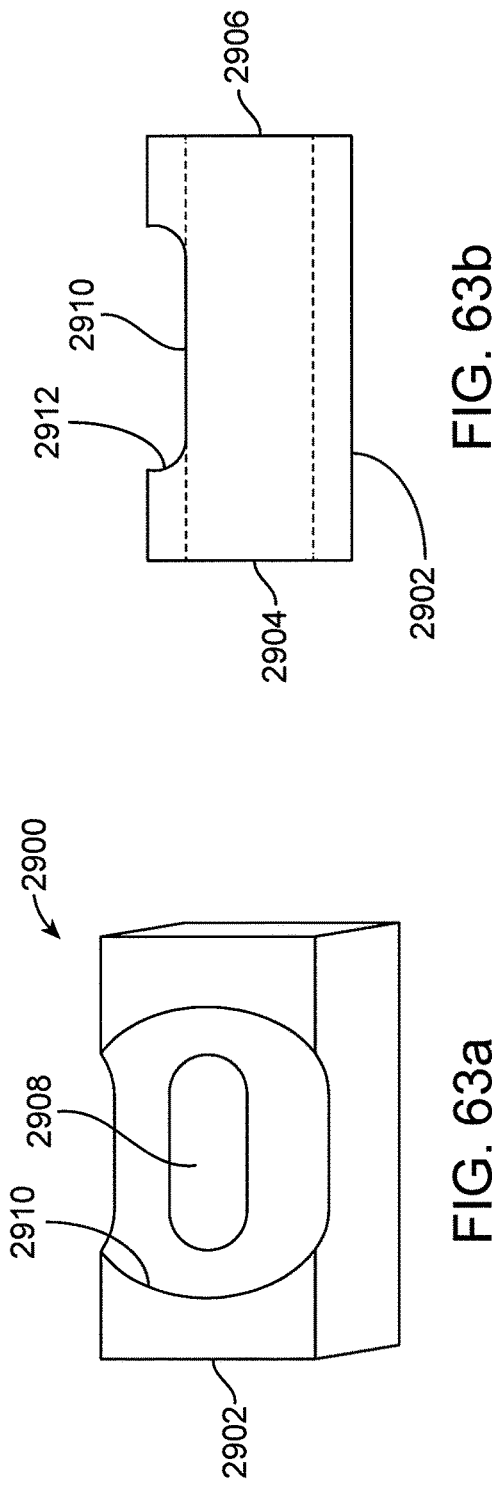

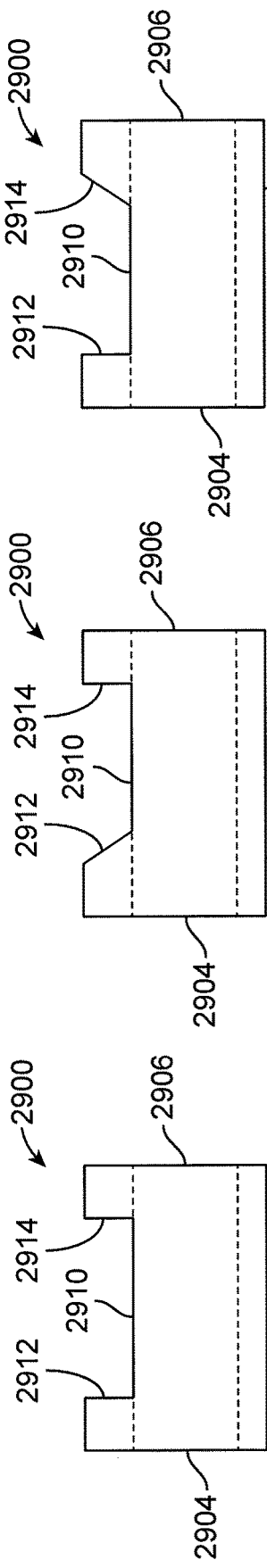
FIG. 64a
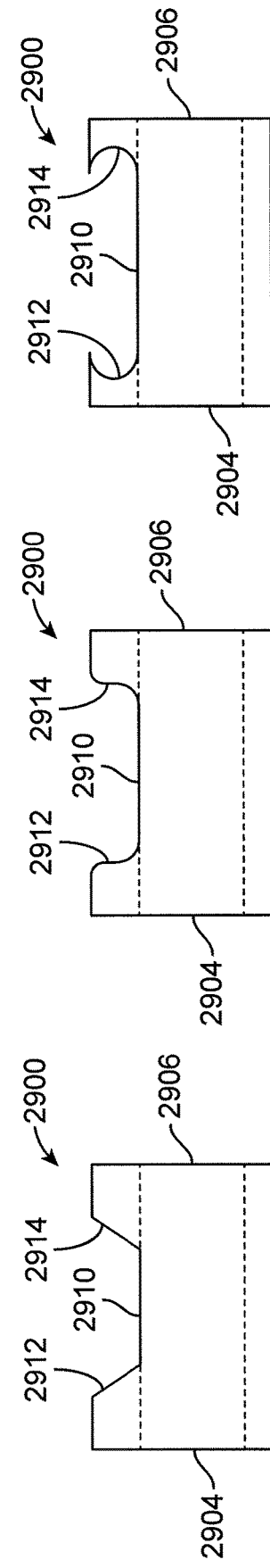
FIG. 64b
FIG. 64c
FIG. 64d
FIG. 64e
FIG. 64f
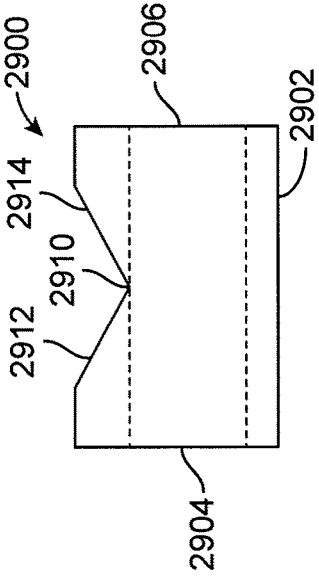
FIG. 64g

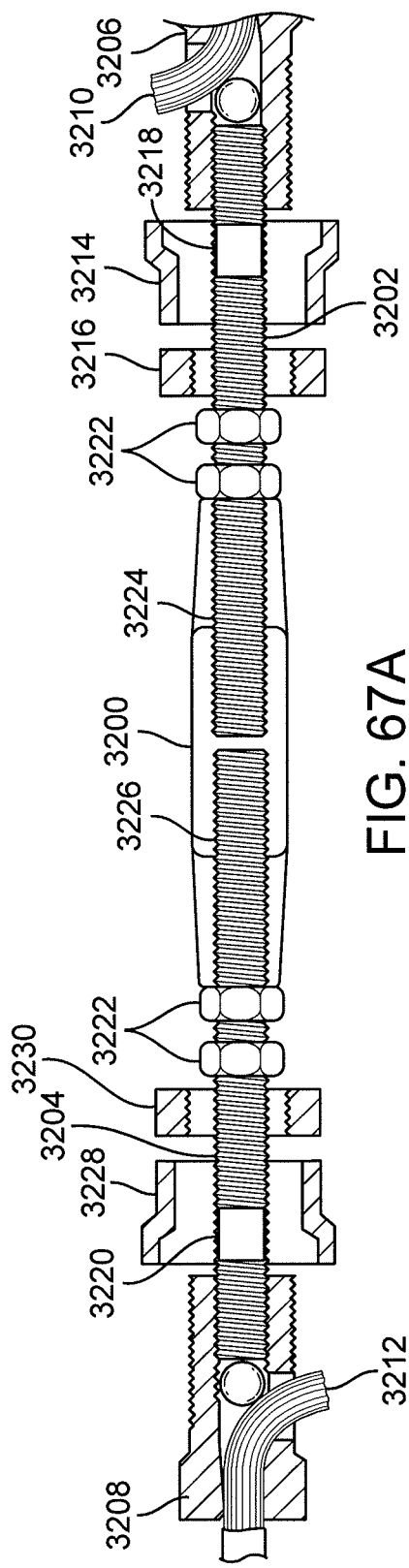
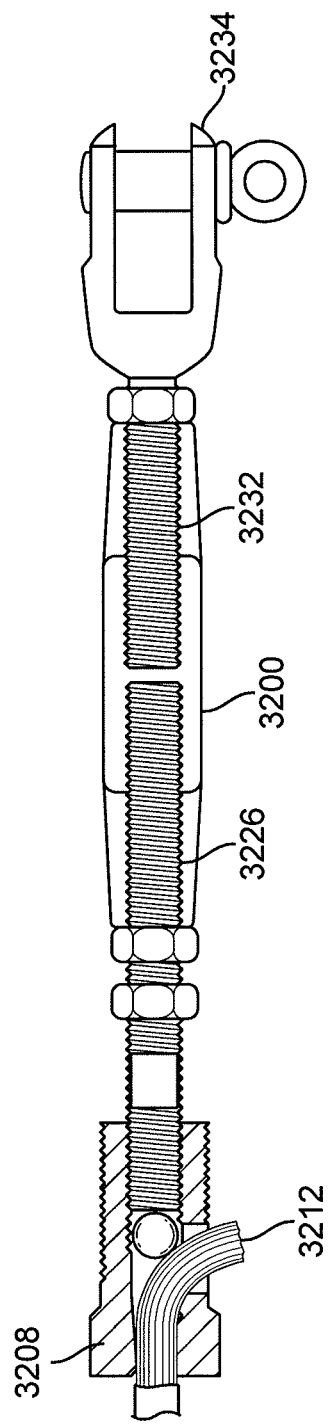
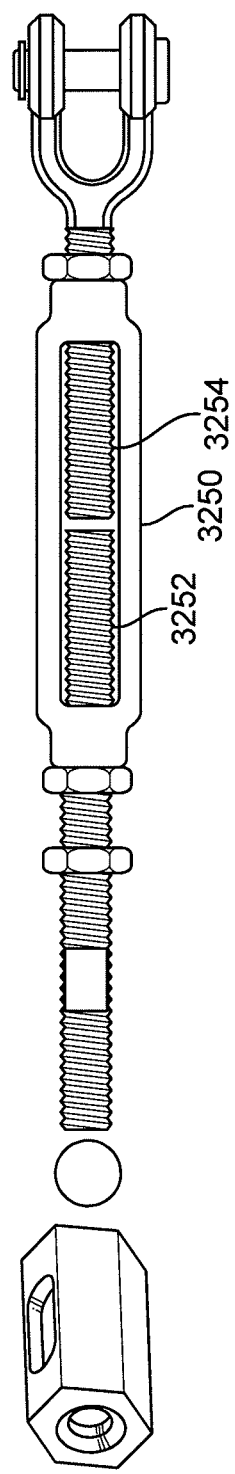
FIG. 67A
FIG. 67B
FIG. 67C

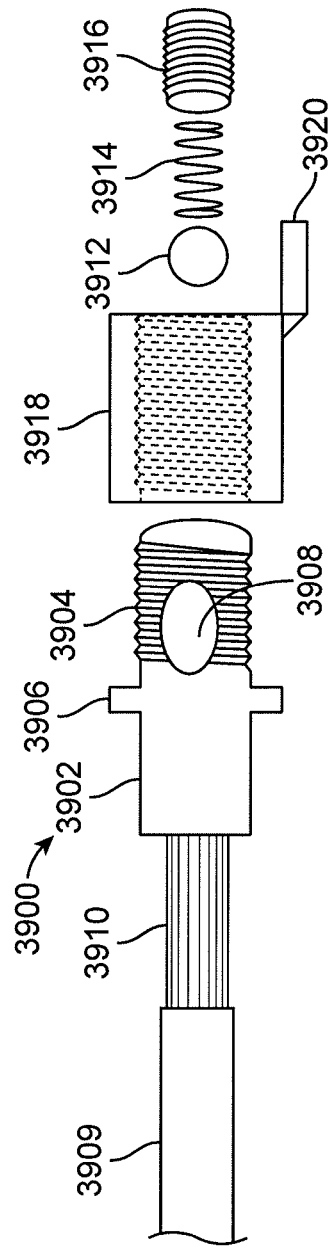
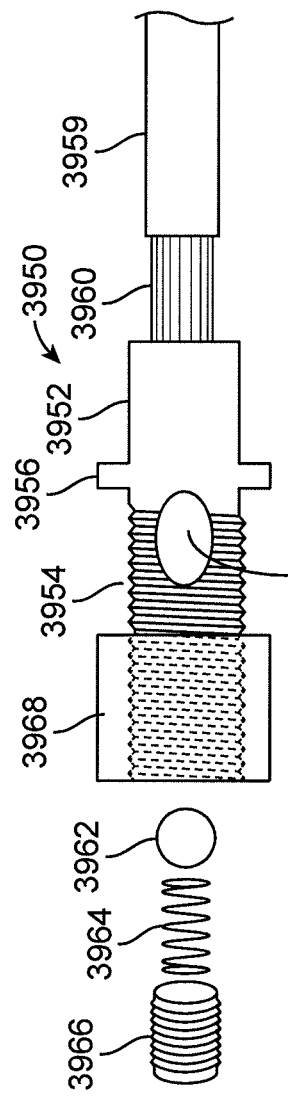
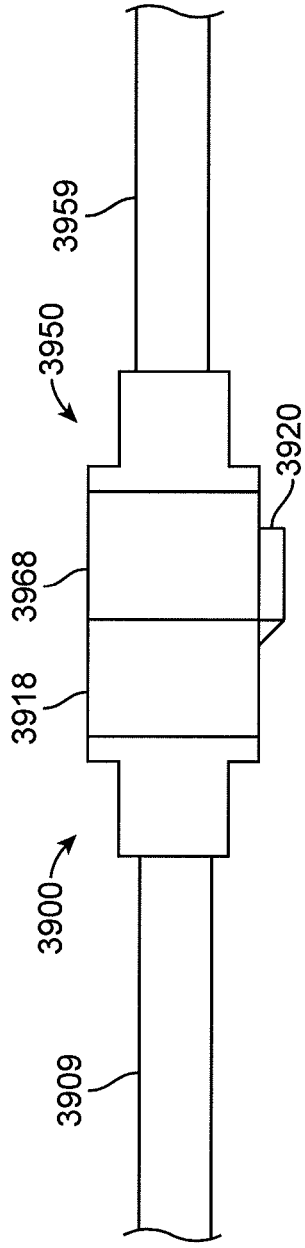
FIG. 73a
FIG. 73b
FIG. 73c

METHOD AND APPARATUS FOR LOCKING ASSEMBLIES

CROSS REFERENCE TO RELATED APPLICATIONS

This application claims the benefit under 35 U.S.C. § 119 of U.S. Provisional Patent Application No. 61/881,818, filed Sep. 24, 2013 which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The subject disclosure generally relates to locking assemblies.

BACKGROUND

By way of background concerning conventional locking and termination mechanisms, it is noted that such mechanisms are often costly and/or require tools that may be unavailable. A winch cable termination, for example, requires purchasing a replacement cable from manufactures, which can be very costly. The equipment needed to perform such replacement is costly as well, and is often unavailable to field workers. Similarly, cable terminations for batteries often require specialized equipment, which makes replacing battery cable terminals in the field impractical. For wire rope terminations, in addition to the need for specialized equipment, which might not be available in the field, the type of rope that can be used with conventional locking assemblies is often undesirably limited. It should be further noted that strong gripping power is sometimes desirable (e.g., with welding and electrical cable terminations), which is often lacking in conventional locking assemblies. Also, with respect to terminations for synthetic ropes and straps, it is noted that such terminations typically have very few options for end fittings, and are often undesirably time consuming by requiring a very difficult splice.

Accordingly, it would be desirable to provide a method and apparatus which overcomes these limitations. To this end, it should be noted that the above-described deficiencies are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY OF THE DISCLOSURE

The present invention relates to locking assembly devices and methods for using the locking assemblies. The locking assemblies are configured to engage with and be secured to a stranded element.

In general, in one embodiment, a locking assembly, including a housing having a receiving portion, a locking portion and an exit portion disposed between the receiving portion and the locking portion, a receiving bore within one side of the housing, the receiving portion adapted to accommodate a multiple strand element, a locking bore within one side of the housing locking portion adapted to accommodate a locking element, an aperture formed in the housing exit portion in communication with the receiving bore or the locking bore, the locking element, and a drive shaft adapted to advance the locking element along the locking bore.

This and other embodiments can include one or more of the following features. The multiple stand element can be a multiple strand wire cable, a multiple strand wire rope, a multiple strand electrical cable, a multiple strand fiber rope, a multiple metal strand strap, or a multiple strand fiber strap.

In one aspect, the housing has a cross section shape that can be circular, elliptical, rectangular, pentagonal, hexagonal, octagonal, or polygonal.

In another aspect the locking assembly can further include a second receiving bore within one side of the housing adapted to accommodate a second multiple strand element, a second locking bore within one side of the housing adapted to accommodate a second locking element, a second aperture formed in the housing exit portion adjacent to the aperture, the second aperture in communication with the second receiving bore or the second locking bore, and a second drive shaft adapted to advance a second locking element along the second locking bore.

In a further aspect, the second locking bore can be formed in the housing receiving portion.

In an alternative aspect, the second locking bore can be formed in the housing locking portion.

In a yet another aspect, the second multiple strand element can be provided through the housing receiving portion.

In still another aspect, the second multiple strand element can be provided through the housing locking portion.

In another aspect, the housing can be adapted and configured as a battery terminal.

In a further aspect, a portion of the housing can include a frame and an aperture positioned relative to the battery post to enable use with a battery terminal puller.

In still another aspect, the drive shaft can be adapted to advance the locking element along the locking bore by rotation within the locking bore.

In another aspect, the drive shaft can be adapted to advance the locking element along the locking bore by axial movement along the locking bore.

In one aspect, the drive shaft can be adapted to advance the locking element along the locking bore by a friction fit within the locking bore.

In yet another aspect, the drive shaft can be adapted to advance the locking element along the locking bore by ratcheting or indexing action within the locking bore.

In still another aspect, after the locking element has engaged with the multiple strand element a portion of the multiple strand element can extend beyond the housing exit portion.

In an alternative aspect, after the locking element has engaged with the multiple strand element a portion of the multiple strand element can extend beyond the housing exit portion and lays against a housing outer surface.

In another aspect, after the locking element has engaged with the multiple strand element a portion of the multiple strand element adjacent to the locking element can be formed to remain within the aperture.

In yet another aspect, the receiving bore and the locking bore can be about the same diameter.

In a further aspect, the receiving bore can have a larger diameter than the locking bore.

In still another aspect, the receiving bore and the locking bore can have a common central longitudinal axis.

In one aspect, the receiving bore or the locking bore can have a common central longitudinal axis with the housing.

In a further aspect, the receiving bore or the locking bore can have a central longitudinal axis above or below the central longitudinal axis of the housing.

In still another aspect, the receiving bore central longitudinal axis can be offset from the locking bore central longitudinal axis.

In one aspect, the receiving bore central longitudinal axis can be vertically offset and generally parallel to the locking bore central longitudinal axis with the aperture only in communication with the locking bore.

In an alternative aspect, the locking assembly can further include a second locking bore in communication with the receiving bore with the second locking bore configured to accept a second locking element and a second drive shaft, a set screw, or a fixation element to secure the multiple strand element within the receiving bore.

In another aspect, the multiple strand element can extend completely through the receiving bore and into a portion of the locking bore adjacent to the aperture.

In still another aspect, there can be a length of the multiple strand element advanced through the receiving bore and maintained outside of the housing after engagement with the locking element.

In an alternative aspect, the length of the multiple strand element can be between 1 inch and 20 inches.

In one aspect, the length of the multiple strand element can be formed into a loop alongside the housing.

In yet another aspect, a portion of the multiple strand element can be coupled to a winch, a motor or a crank.

In a further aspect, the aperture can be sized to prevent passage of the locking element outside of the housing when the locking element is positioned in the aperture.

In another aspect, the receiving bore is within one side of the housing receiving portion and the locking bore is within one side of the locking portion can be on opposite sides of the housing.

In an alternative aspect the receiving bore is within one side of the housing receiving portion and the locking bore is within one side of the locking portion can be on adjacent sides of the housing.

In one aspect the receiving bore or the locking bore can have a section of decreasing diameter between the portion of the bore nearest a housing surface and the aperture.

In yet another aspect, the receiving bore or the locking bore can have a section of decreasing diameter between the portion of the bore nearest a housing surface and the aperture and a section of increasing diameter between the portion of the bore nearest a housing surface and the aperture.

In a further aspect, the receiving bore or the locking bore can have an hourglass shape along the central longitudinal axis.

In one aspect, the locking assembly can further include a stabilizing bore in a wall of the housing in communication with a portion of the receiving bore, a stabilizing locking element sized for movement through the stabilizing bore, and a drive shaft adapted for operation in cooperation with the stabilizing bore to advance the stabilizing locking element along the stabilizing bore.

In still another aspect, the relative position of a multiple strand element within the receiving bore can be fixed relative to the aperture when the locking element is advanced along the stabilizing bore into contact with the multiple strand element.

In a further aspect the locking assembly can further include a locking element release port formed in a wall of the housing and in communication with a portion of the locking bore and positioned to provide access to a locking element in contact with a multiple strand element.

In an alternative aspect, the locking assembly can further include a breakaway element positioned within the locking bore to secure the position of the locking element relative to the locking bore.

In yet another aspect, the locking assembly can further include a breakaway element coupled to the locking element to maintain a position of the locking element within the locking bore in the absence of the drive shaft.

In one aspect, the breakaway element can be selected to give way permitting movement of the locking element within the locking bore when manual force is applied to the drive shaft.

In an alternative aspect, the breakaway element can be selected to give way permitting movement of the locking element within the locking bore only when a force above a pre-set value is applied to the locking element.

In another aspect, the locking element can be a ball or a wedge.

In still another aspect, the locking element can be formed from one or more of steel, soft steel, hard steel, aluminum, brass, or copper.

In an alternative aspect, a portion of the locking element can deform when forced against the multiple stand element.

In a further aspect, the locking element can retain its overall shape when forced against the multiple stand element.

In yet another aspect, the housing can be formed from metal, plastic, steel, treated steel, steel alloys, stainless steel, or carbon steel.

In one aspect, the locking assembly can further include a second locking element disposed adjacent to the locking element within the locking bore.

In an alternative aspect, the locking element and the second locking element can have a similar overall exterior shape.

In a further aspect, the locking element and the second locking element can have a different overall exterior shape.

In yet another aspect, the locking element can be a ball of first diameter and the second locking element can be a ball of a second diameter.

In one aspect, the locking element can be a ball of first diameter and the second locking element can be a ball of a second diameter and the first diameter can be greater than the second diameter.

In still another aspect, the multiple strand element can be locked to the housing such that only the locking element contacts the multiple strand element.

In an alternative aspect, the multiple strand element can be locked to the housing such that only the second locking element contacts the multiple strand element.

In another aspect, the multiple strand element can be locked to the housing such that both the locking element and the second locking element contact the multiple strand element.

In a further aspect, the locking element can be a ball or a wedge with at least one modified surface portion that has been altered to increase engagement with the multiple strand element when urged into contact with a portion of the multiple strand element.

In an alternative aspect, the at least one surface portion textured to increase engagement with the multiple strand element can include a coated portion, an etched portion, a raised portion, a recessed portion, a bead blasted portion, a ground portion, or a chemically treated portion or a polished portion.

In yet another aspect, the locking assembly can further include a sleeve over a portion of the housing sized to cover at least a portion of the aperture and a portion of the multiple strand element disposed within or extending beyond the aperture.

In still another aspect, the locking assembly can further include a sleeve over a portion of the housing sized to completely cover the aperture and the portion of the multiple strand element disposed within or extending beyond the aperture.

In one aspect, the locking assembly can further include a sleeve over a portion of the housing sized to completely cover the aperture and the portion of the multiple strand element disposed within or extending beyond the aperture and a portion of the multiple strand element extending from the receiving bore.

In an alternative aspect, the sleeve can be a polymer tube, an insulator, or one or more windings of an insulting tape.

In a further aspect, the locking assembly can further include a locking ring over a portion of the housing sized to cover at least a portion of the aperture and a portion of the multiple strand element disposed within or extending beyond the aperture.

In another aspect, the locking assembly can further include a locking ring over a portion of the housing sized to completely cover the aperture and the portion of the multiple strand element disposed within or extending beyond the aperture.

In still another aspect, the locking assembly can further include a locking ring over a portion of the housing sized to completely cover the aperture and the portion of the multiple strand element disposed within or extending beyond the aperture and a portion of the multiple strand element extending from the receiving bore.

In one aspect, the locking ring can be adapted and configured for threaded engagement with an outer surface of the housing.

In another aspect, the locking ring can be adapted and configured for sliding engagement with the housing.

In yet another aspect, the locking assembly of the aperture can have a generally curvilinear shape when viewed in profile.

In a further aspect, the locking assembly of the aperture can have a U-shape when viewed in profile.

In an alternative aspect, the locking assembly of the aperture can have a C-shape when viewed in profile.

In yet another aspect, the locking assembly of the aperture can have a V-shape when viewed in profile.

In still another aspect, the locking assembly of the aperture can have a bottom portion, a locking side portion and a receiving side portion having a locking side angle between the bottom portion and the locking portion and a receiving side portion between the bottom portion and the receiving side portion.

In one aspect, the locking assembly can further include a portion of the housing formed into or coupled to a battery terminal connector.

In another aspect, the locking assembly can further include a portion of the housing formed into or coupled to a fuse box connection.

In a further aspect, the locking assembly can further include a portion of the housing formed into or coupled to a utility transmission line.

In an alternative aspect, the locking assembly can further include a portion of the housing formed into or coupled to a heavy duty cable.

In yet another aspect, the locking assembly can further include a portion of the housing formed into or coupled to an electrical welding lead.

In still another aspect, the locking assembly can further include an attachment device on the housing.

In one aspect, the attachment device can be in position during operation of the drive shaft to engage the locking element and the multiple strand element.

In a further aspect, the locking assembly can further include a portion of the housing formed into or coupled to a welding terminal connector, serial battery terminals, a quick connect or disconnect device, distributor cap, an end to end splice, or a turnbuckle.

In still another aspect, a portion of the housing or the multiple strand element or the drive shaft can be configured as a welding cable lug.

In an alternative aspect, the multiple strand element has one portion adapted for connection to a power source and a portion of the housing can be adapted for attachment to a welding component.

In one aspect, the receiving bore can be configured to receive a plurality of multiple strand elements. The locking element can be configured to contact the plurality of multiple strand elements such that the multiple strand elements can be in electrical contact.

In yet another aspect, the locking assembly of the drive shaft can further include a portion adapted and configured for engagement with a tool.

In yet another aspect, the locking assembly of the drive shaft can have an end configured to engage with a hex driver, a flat shape driver, or a cross shape driver.

In still another aspect, the drive shaft can have a portion shaped for complementary engagement with a corresponding shape of a driving tool.

In an alternative aspect, after operation of the drive shaft to engage the locking element and the multiple strand element the drive shaft can be disposed completely within the housing.

In one aspect, after operation of the drive shaft to engage the locking element and the multiple strand element a portion of the drive shaft can extend from the housing.

In an alternative aspect, after operation of the drive shaft to engage the locking element and the multiple strand element a portion of the drive shaft can extend from the housing and the portion of the drive shaft extending from the housing can be adapted and configured for engagement or attachment to another component.

In another aspect, the locking assembly can be the portion of the drive shaft extending from the housing and can further include one or more of threads, vertical grooves, horizontal grooves, slots, raised elements, or recessed portions.

In yet another, after operation of the drive shaft to engage the locking element and the multiple strand element a portion of the drive shaft can extend from the housing and the terminal end of the portion of the drive shaft extending from the housing can be configured as an engagement or attachment element.

In a further aspect, the terminal end of the portion of the drive shaft extending from the housing can be used for operation of the drive shaft to engage the locking element and the multiple strand element.

In still another aspect, the locking assembly can further include a compression element within the locking bore between the drive shaft and the locking element.

In one aspect, the locking assembly can be the drive shaft and can further include a cavity to at least partially house a portion of the compression element. In yet another aspect, the compression element can be a spring.

In still another aspect, the locking assembly can further include a second housing having a second receiving portion, a second locking portion and a second exit portion disposed between the second receiving portion and the second locking portion, a second receiving bore within one side of the second housing receiving portion adapted to accommodate a second multiple strand element, a second locking bore within one side of the second housing locking portion adapted to accommodate a second locking element, a second aperture formed in the second housing exit portion in communication with the second receiving bore or the second locking bore, and the drive shaft is adapted to simultaneously advance the locking element along the locking bore and the second locking element along the second locking bore.

In one aspect, the locking assembly can be the drive shaft and can further include a drive element coupled to or formed in the drive shaft.

In an alternative aspect, the locking assembly can be the drive shaft and can further include counterclockwise threads in the drive shaft on a first side of the drive element and clockwise threads in the drive shaft on the second side of the drive element.

In still another aspect, the locking assembly can be the driving bore and the second driving bore can have threads corresponding to position relative to the first side of the drive element or the second side of the drive element.

In a further aspect, one or more elements of the locking assembly can be the second housing, the second locking portion, the second exit portion, the second receiving portion, the second locking bore, the second receiving bore, the second locking element, and the drive shaft. The second locking element can include one or more limitations described herein.

In one aspect, any of the locking assemblies described herein can further include a locking bore guide adapted and configured to interact with the locking element to maintain an orientation of the locking element as the locking element advances along the locking bore.

In still another aspect, the locking element can include a feature adapted and configured to interact with the locking bore guide.

In a further aspect, a workpiece for supporting a pair of locking assemblies, can include a base with a surface adapted to receive a pair of locking assemblies and; a recessed section of the surface adapted and configured to permit rotation of a drive member on the double ended drive shaft while the pair of locking assemblies are supported by the workpiece.

In general, in one embodiment, a locking assembly includes a housing having a receiving portion, a locking portion and an exit portion disposed between the receiving portion and the locking portion. A plurality of receiving bores within one side of the housing receiving portion are adapted to accommodate one or more strands of a multiple strand element. A plurality of locking bores within one side of the housing locking portion are adapted to accommodate a plurality of locking elements, with at least one locking element in each locking bore of the plurality of locking bores. A plurality of apertures is formed in the housing exit portion in communication with the plurality of receiving bores or the plurality of locking bores. A plurality of drive shafts are adapted to advance the one or more locking elements along each of the plurality of locking bores.

This and other embodiments can include one or more of the following features.

In one aspect, the locking assembly can further include a strand lock bore and strand locking device positioned relative to each of the plurality of receiving bores. The strand locking device can secure the one or more strands in each receiving bore relative to the housing.

In a further aspect, the locking assembly can further include a locking ring adapted to move relative to an outer surface of the housing and over the housing exit portion.

In an alternative aspect, the locking assembly can further include a locking ring adapted for threaded engagement with the housing and position a portion of each of the plurality of the one or more strands between the housing and the locking ring.

In yet another aspect, the locking assembly can further include an attachment end having a portion adapted for engagement with the housing and a portion adapted for coupling to another element.

In one aspect, the locking assembly can be the housing, the receiving portion, the locking portion or the exit portion and can further include one or more housing, receiving portion, locking portion or exit portion limitations from any of the above claims.

In an alternative aspect, the locking assembly can be the plurality of receiving bores within one side of the housing receiving portion or the one or more strands of a multiple strand element and can further include one or more receiving bore or multiple strand element limitations from any of the locking assemblies described herein. a In another aspect, the locking assembly can be the plurality of locking bores within one side of the housing locking portion or the at least one locking element and can further include one or more locking bore or locking element limitations from any of the locking assemblies described herein.

In still another aspect, the locking assembly can be the plurality of apertures formed in the housing exit portion in communication with the plurality of receiving bores or the plurality of locking bores can further include one or more apertures, receiving bores or locking bores limitations from any of the locking assemblies described herein.

In a further aspect, the locking assembly can be the plurality of drive shafts and can further include one or more drive shaft limitations from any of the locking assemblies described herein.

In general, in one embodiment, a method for securing a stranded element to a housing, includes inserting the stranded element into a receiving bore in the housing, and driving a drive shaft into the housing until a portion of the stranded element that has passed into the receiving bore extends beyond the housing.

This and other embodiments can include one or more of the following features.

In one aspect, the method can be the driving step and can further include advancing at least one locking element into contact with the stranded element.

In yet another aspect, the method can further include compressing a spring that is in contact with the at least one locking element.

In a further aspect, the step of advancing can further include advancing two different sized locking elements during the driving step.

In yet another aspect, the method can further include securing the portion of the stranded element to an exterior portion of the housing.

In still another aspect, the method can further include securing the portion of the stranded element such that the portion of the stranded element can be substantially within an interior portion of the housing.

In one aspect, the method can further include securing the portion of the stranded element by advancing a locking ring along the housing.

In a further aspect, after the securing step the portion of the stranded element can be between the locking ring and the housing.

In yet another aspect, after the securing step the portion of the stranded element can be between the locking ring and an interior portion of the housing.

In an alternative aspect, after the driving step the portion of the stranded element can be passed through an exit opening in the housing.

In still another aspect, the method can further include after the driving step, wrapping a portion of the housing and the portion of the stranded element in an insulating material.

In a further aspect, the method can further include after the driving step, positioning a sleeve over a portion of the housing and the portion of the stranded element.

In another aspect, the method can further include extending the insulating material or the sleeve to cover a portion of the stranded element beyond the housing.

In yet another aspect, after the driving step a round locking element or a wedge locking element can be positioned within the housing between the distal end of the drive shaft and the stranded element.

In still another aspect, after the driving step a round locking element or a wedge locking element can be deformed by contact with the stranded element.

In one aspect, the drive shaft can be set screw.

In a further aspect, the stranded element can be an electrical lead.

In an alternative aspect, the method can further include inserting a second stranded element into the receiving bore in the housing prior to driving the drive shaft.

In yet another aspect, the method can further include advancing at least one locking element into contact with the stranded element and the second stranded element.

In one aspect, advancing the at least one locking element into contact with the stranded element and the second stranded element can create an electrical connection between the stranded element and the second stranded element.

In still another aspect, the method can further include attaching a second stranded element to a second locking assembly.

In another aspect, the method can further include attaching the second locking assembly to the housing.

In general, in one embodiment, a method of securing a multiple strand element to a housing includes inserting the multiple strand element through a receiving portion of the housing until a first portion of the multiple strand element is visible within an exit portion of the housing, and driving a locking element through a locking bore in the housing to secure a second portion of the multiple strand element within the housing.

This and other embodiments can include one or more of the following features.

In one aspect, after the inserting step or the driving step the first portion of the multiple strand element can protrude through an exit portion of the housing.

In another aspect, the method can further include securing the first portion of the multiple strand element to an exterior portion of the housing.

In still another aspect, the method can further include securing the first portion of the multiple strand element to be substantially within an interior portion of the housing.

In another aspect, the securing step can be performed by advancing a locking ring along the housing.

In an alternative aspect, after the securing step the first portion of the multiple strand element can be between a locking ring and the housing.

In yet another aspect, the method can further include after the driving step, wrapping a portion of the housing and the first portion of the multiple strand element in an insulating material.

In one aspect, the method can further include after the driving step, positioning a sleeve over a portion of the housing and the first portion of the multiple strand element.

In a further aspect, the method can further include extending the insulating material or the sleeve to cover a portion of the multiple strand element beyond the housing.

In still another aspect, the method can further include attaching an electrical lead to the housing.

In one aspect, the electrical lead can be part of a welding device and further comprising welding with the welding device.

In another aspect, the method can further include placing the electrical lead in a fuse box.

In a further aspect, the method can further include connecting the electrical lead to a battery terminal.

In yet another aspect, the method can further include connecting the electrical lead to a utility line.

In another aspect, the method can further include attaching a mechanical lead to the housing.

In one aspect, the mechanical lead can be connected to a winch and further comprising operating the winch.

In a further aspect, the mechanical lead can be connected to an object and further lifting the object using the mechanical lead and housing.

In another aspect, the method can further include inserting a second multiple strand element through the receiving portion of the housing until a first portion of the second multiple strand element is visible within the exit portion of the housing prior to driving the locking element.

In an alternative aspect, driving the locking element can include securing a second portion of the second multiple strand element within the housing.

In one aspect, driving the locking element can include securing a second portion of the second multiple strand element within the housing creates an electrical connection between the multiple strand element and the second multiple strand element.

In another aspect, the method can further include attaching a second stranded element to a second locking assembly.

In an alternative aspect, the method can further include attaching the second locking assembly to the housing.

In general, in one embodiment, a locking assembly includes a housing having a receiving portion and a locking portion, a receiving bore within one side of the housing, the receiving portion is adapted to accommodate a plurality of stranded elements, a locking bore within one side of the housing locking portion is adapted to accommodate a locking element, a locking element configured to contact the plurality of stranded elements and when in contact with the plurality of stranded elements the locking element is configured to maintain electrical contact between the plurality of the stranded elements, and a drive shaft is adapted to advance the locking element along the locking bore.

This and other embodiments can include one or more of the following features.

In one aspect, the locking assembly can further include an aperture formed in the housing exit portion in communication with the receiving bore or the locking bore.

In a further aspect, the locking element can be a conductive material.

In still another aspect, the locking element can be deformable.

In another aspect, the locking assembly can further include a plurality of stranded elements engaged with the locking assembly such that the stranded elements are in electrical contact.

In an alternative aspect, the housing can be an insulating material.

In general in one embodiment, a method of forming an electrical connection between a plurality of stranded elements, includes advancing a first stranded element into a receiving bore of a housing, advancing a second stranded element into the receiving bore of the housing, advancing a locking element within the housing to contact the first stranded element and second stranded element such that the first stranded element and the second stranded element are in electrical contact and in contact with an interior of the housing.

In one aspect, advancing the locking element can push a portion of the first stranded element and the second stranded element outside of the housing through an aperture in the housing.

In another aspect, the method can further include advancing an insulating cover over the aperture.

In yet another aspect, the locking element can be a conductive material.

In another aspect, the locking element can be a deformable material.

In a further aspect, advancing the locking element can include deforming the locking element against the first and second stranded elements.

In an alternative aspect, the method can further include advancing a cover over an exterior of the housing.

In another aspect, the drive shaft and locking element can be advanced through a locking bore of the housing.

In a further aspect, the receiving bore can oppose the locking bore.

In general in one embodiment an assembly includes a housing having an outer surface configured to engage with a female receptacle in a distributor cap, the housing including an internal bore, a drive shaft, and a locking element, wherein the bore is configured to receive the drive shaft and locking element, wherein the drive shaft is configured to advance the locking element such that the locking element expands a diameter of a portion of the housing.

In another aspect, the locking element is spherical.

In a further aspect, the housing includes a spark plug shape at a proximal end of the housing.

In yet another aspect, the assembly is configured to convert the female receptacle in the distributor cap to a male spark plug connection.

In another aspect, the portion of the housing is at a distal end of the housing.

In an alternate aspect, a distal portion of the housing includes prongs.

In another aspect, the portion of the housing includes a portion of the internal bore with a smaller diameter than the diameter of the internal bore at an opposing end of the housing.

In yet another aspect, the receiving bore includes a threaded portion configured to engage with the drive shaft, wherein the receiving bore includes a smooth section at a distal end with an internal diameter that decreases toward the distal end of the receiving bore.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

Various non-limiting embodiments are further described with reference to the accompanying drawings in which:

FIGS. 20a-20e illustrate additional views of the multi-element locking assembly illustrated in FIG. 16.

FIG. 24 illustrates an exemplary locking assembly having a locking ring in accordance with some embodiments.

FIGS. 26a-26e illustrate various views of a stranded element coupled to the locking assembly illustrated in FIG. 24 in accordance with some embodiments.

FIGS. 31a-31e illustrate various views of a locking assembly in accordance with some embodiments.

FIGS. 32a-32d illustrate views of a locking assembly in accordance with some embodiments.

FIGS. 39a-39b illustrate a locking assembly in accordance with some embodiments.

FIG. 40 illustrates a locking assembly in accordance with some embodiments.

FIGS. 45f-45g illustrate a locking assembly in accordance with some embodiments.

FIGS. 47a-47f illustrate locking assemblies that are configured to connect together in accordance with some embodiments.

FIGS. 48a-48d illustrate cross-sectional views of the locking assemblies of FIGS. 47a-47e.

FIGS. 56a-56h illustrate embodiments of locking elements that can be used with the locking assemblies disclosed herein.

FIGS. 57a-57h illustrate embodiments of drive shafts that can be used with the locking assemblies disclosed herein.

FIGS. 58a-58d, 59a-59b, and 60a-60b illustrate embodiments of locking assembly housings.

FIGS. 62a-62c illustrate top views of locking assemblies in accordance with some embodiments.

FIGS. 63a-63b illustrate an isometric and side profile view of a locking assembly in accordance with some embodiments.

FIGS. 64a-64g illustrate side profile views of locking assemblies in accordance with some embodiments.

FIGS. 67a-67c illustrate cross-sectional views of various turnbuckle designs that can be used with any of the locking assemblies disclosed herein.

FIGS. 73a-73c illustrate various embodiments of locking assemblies.

DETAILED DESCRIPTION

Figure 1:
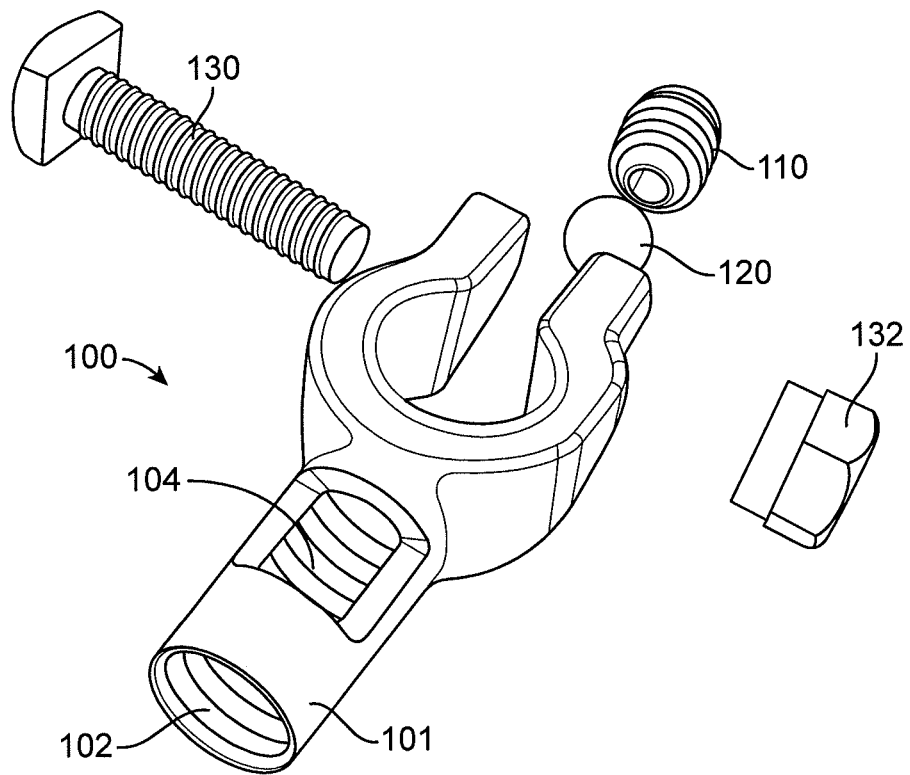
FIG. 1 illustrates a battery terminal locking assembly in accordance with some embodiments.

As discussed in the background, it is desirable to provide a system and method which overcomes the various limitations of conventional termination mechanisms. The embodiments disclosed herein are directed towards overcoming such limitations via methods, devices, and systems for improved locking assemblies. Locking assemblies are disclosed that can facilitate making mechanical and electrical terminations in which the gripping components can be easily tightened with ordinary tools typically available in shop or field environments. In some embodiments the locking assemblies provide improved electrical connections. In some embodiments the locking assemblies provide improved high grip terminations efficiently and without requiring special tools or devices. As a result, the disclosed embodiments provide a desirable versatility to implement locking assemblies that firmly attach any of a plurality of end fitting types onto any of a plurality of elements or leads (e.g., any of various types of cables, stranded elements, wires, straps, ropes, etc.) currently in use in their respective industries.

The locking assemblies disclosed herein typically include a housing with a receiving bore, locking bore, and aperture. The receiving bore can be configured to receive an end of a stranded element, such as a wire, cable, or other element. The aperture can be configured to allow an end of the stranded element to exit the housing. The aperture is sized such that the locking element is held within the locking assembly. The locking bore can be sized to accommodate a drive shaft and a locking element. The locking element can be configured to engage with the stranded element, wire, cable, or other element in the housing. Examples of locking elements disclosed herein include a ball bearing, structures having a spherical surface, a wedge shape, and additional suitable structures. The drive shaft can be configured to advance within the locking bore to push the locking element against the stranded element. Examples of drive shafts disclosed herein can include threaded structures, such as a set screw, and other suitable structures for applying a force to the locking element.

In some embodiments the locking assemblies can avoid twisting and/or tearing of the lead. In some embodiments, locking assemblies are disclosed which implement a locking element and drive shaft. The drive shaft can be configured to push against the locking element. The locking element can be configured to push against a stranded element, lead, wire, or cable with a gripping power that increases as the drive shaft is advanced.

In some embodiments the locking assemblies can include multiple receiving bores and multiple locking bores. Each locking bore can correspond to a receiving bore. A stranded element can be split into multiple sections with each section accommodated in a different receiving bore and secured to the locking assembly via the corresponding locking bore.

In some embodiments the housing of the locking assembly includes a stabilization bore that can be used to hold the stranded element in place within the receiving bore while the drive shaft and locking element are advanced into contact with the stranded element. The stabilization bore can include a drive shaft or a drive shaft and locking element that are advanced against the receiving portion to hold the stranded element in place. The stabilization bore and stabilization drive shaft can prevent the stranded element from sliding and falling out of the receiving bore when advancing the locking element and drive shaft.

In some embodiments an attachment feature can be built into the housing or configured to engage with a portion of the locking assembly. The attachment feature can facilitate attachment to another device as described herein.

In some embodiments multiple locking assemblies can be used to secure severed or broken ends of a mechanical or electrical connection. The locking assemblies can include a quick connect feature or complementary structure to facilitate coupling of the two locking assemblies.

The devices disclosed herein can be used for permanent or temporary repair of a wire, cable, or other element with a broken end or severed section. The devices disclosed herein can also be used to repair a broken wire, cable, or other element to reattach the broken ends with mechanical and/or electrical connections.

The locking assemblies allow for a technician to fix wires, cable, or other elements while in the field without requiring special tools or special connections. This enables the technician to quickly make a temporary or permanent repair thus saving the time required to order and receive special parts.

The time saved by making repairs in the field can be critical for many applications, in particular applications in remote environments, in dangerous locations, such as combat zones, and for restoring electrical power.

The devices disclosed herein can be used in a variety of applications, including for mechanical connections and/or electrical connections. In some embodiments the locking assemblies can be used for a mechanical connection. In some embodiments the locking assemblies can be used for electrical connections. In some embodiments the locking assemblies can be used for connections that involve both mechanical and electrical connections. The applications can be used in consumer applications, commercial applications, industrial applications, military applications, utility applications, home electrical applications, and other suitable applications.

The devices disclosed herein can be used in a variety of mechanical applications. Examples of mechanical applications include metal wires, metal rope, metal cables, and synthetic rope. Examples of applications using wire rope include winches, rigging, overhead rigging, cross-bracing in buildings, guide or guywire support for utilities, fencing, etc. Examples of synthetic cables/rope applications include cables used as winches, marine applications, custom rigging, nylon straps, fencing, etc.

The devices disclosed herein can be used in a variety of different electrical applications as described herein. The devices can be used to connect or splice wire ends such that they are in electrical contact. The devices can also be used to replace or fix an electrical contact. The devices can be used with or include a specialty connection or terminal, such as a circuit breaker component, battery terminal connection, spark plug termination, pin connector, etc. Specialty connectors can be difficult to work with in the field. They can also require special tools or parts that may not be readily available in the field. Embodiments of the locking assemblies disclosed herein can include or be compatible with many types of specialty connectors, which can enable quick and easy repairs in the field.

In some embodiments the termination assemblies can be used with permanent or temporary repairs. In some embodiments the locking assemblies can be used where any high amp load connection is made.

In some embodiments the locking assemblies can be used as part of a welding lead. In some embodiments the locking assemblies can be used with underground electrical panels and wiring. In some embodiments the locking assemblies can be used with solar routing.

In some embodiments the locking assemblies can be used with pin connectors. In some embodiments the locking assemblies can be used with spark plug wire terminations.

In some embodiments the locking assemblies can be used with retrofit applications. In some embodiments the locking assemblies can be used with new construction.

In some embodiments the locking assemblies can be used as part of a wiring panel in a building, such as an electrical panel or circuit breaker. The locking assembly can be configured to engage with the wire and the wiring panel to quickly and safely fix a broken electrical connection. The locking assemblies can be configured for use in new buildings or for retrofitting old electrical panels. The device can be configured for the wiring panels used in residential buildings, commercial buildings, and industrial buildings.

In some embodiments the locking assemblies can be used as part of a battery terminal connection. The battery terminal connection can be used in industrial applications and consumer applications.

In some embodiments the locking assemblies can be used as part of a tool or power connector. The tool or power connector can be used in industrial applications and consumer applications.

In some embodiments the locking assemblies can be used military applications. The locking assemblies can meet military specifications for light duty and heavy duty applications.

In some embodiments the locking assemblies can be used to connect the ends of a broken element or wire. Each end of the broken wire can be engaged with a locking assembly. The locking assemblies can be configured with complementary interlocking structures or configured to engage with an adapter that can facilitate engagement between the two locking assemblies.

In some embodiments the locking assemblies can be used in utility applications. For example, to perform an inline repair on a transmission line. A broken transmission line can be repaired inline using the locking assemblies disclosed herein. A locking assembly can be connected to one end of the broken line with a second locking assembly connected to the other end of the broken line. The two locking assembly can be connected together to repair the transmission line. The inline repair can be temporary or permanent.

In some embodiments the locking assemblies disclosed herein can be used with or can include a quick connect fitting or receptacle. The locking assembly can be connected to an end or a broken end of a wire, cable, or rope with the quick connect fitting. Another end or broken end of a wire, cable, or rope can be connected to a locking assembly including a complementary quick connect fitting. The quick connect fittings can be connected together to connect or reconnect the stranded element, wire, cable, or rope.

Embodiments are also disclosed for implementing high grip connections and terminations via a locking ring mechanism. The locking ring mechanism can be utilized by itself or in addition to the locking element and drive shaft.

Figure 2:
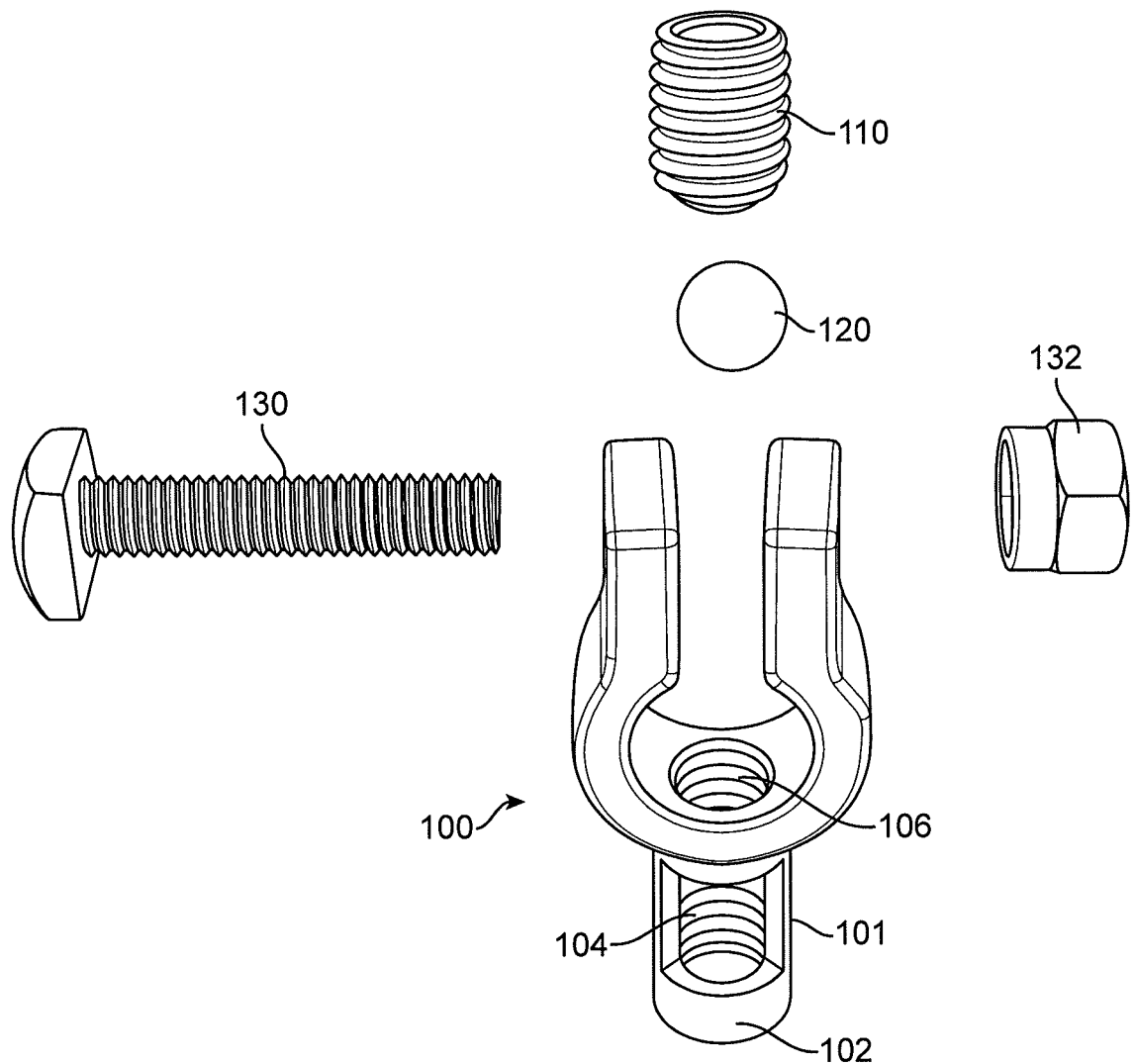
FIG. 2 is a second view of the battery terminal locking assembly illustrated in FIG. 1.

In some embodiments, a battery terminal locking assembly is disclosed. Specifically, for this particular embodiment, it is contemplated that a conventional battery terminal may be reconfigured to encompass the aspects disclosed herein. In FIGS. 1-2, for instance, an exemplary unassembled battery terminal locking assembly is provided. As illustrated, the battery terminal locking assembly 100 can include a housing 101 having a plurality of openings including receiving bore 102, aperture 104, and locking bore 106. Here, it should be appreciated that a conventional battery terminal could have been modified to create the battery terminal locking assembly 100 with the receiving bore 102 and locking bore 106 created by drilling a threaded hole from the back end of a conventional battery terminal through the post connector. The aperture 104 can be included to expose the threaded hole, as shown. The locking assembly can then further include tightening screw 130 and tightening nut 132, which are configured to securely attach battery terminal locking assembly 100 onto a battery post, similar to conventional battery terminals.

Figure 3:
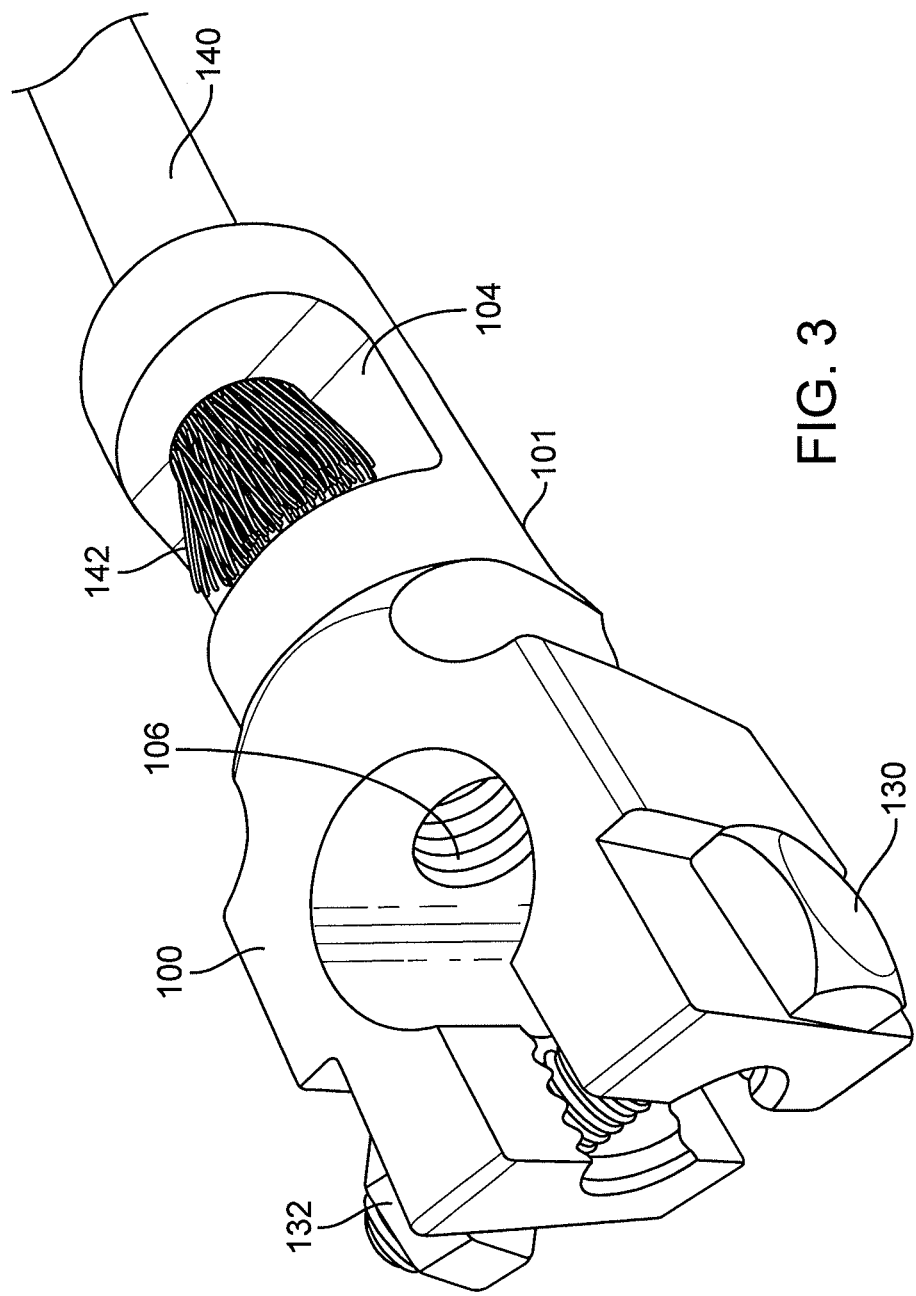
FIG. 3 is an assembled view of the battery terminal locking assembly illustrated in FIG. 1.
Figure 4:
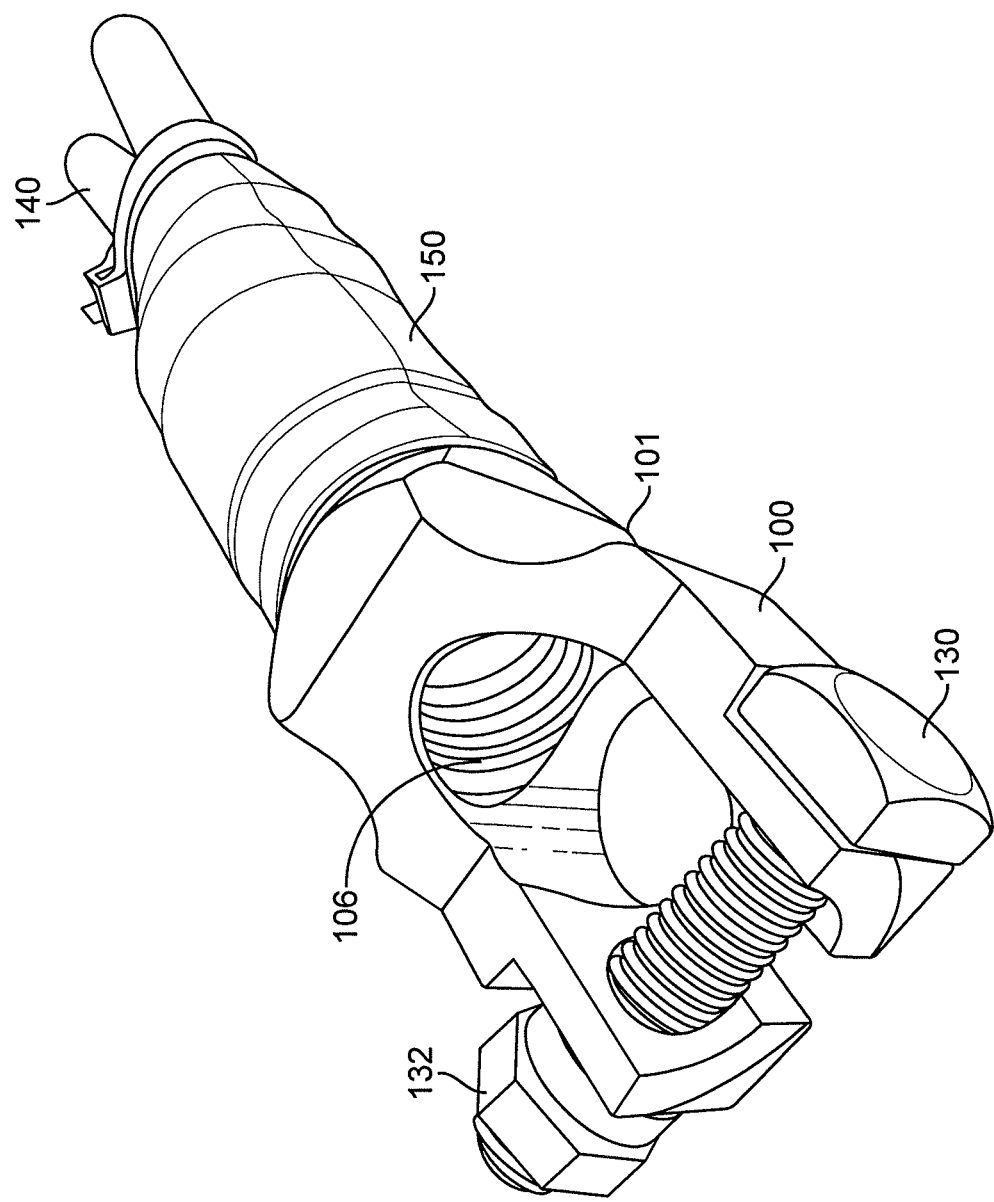
FIG. 4 is an assembled view of the battery terminal locking assembly illustrated in FIG. 1 with a protective covering in accordance with an aspect of the subject specification.

As stated previously, locking assemblies having a locking element and drive shaft are contemplated. Examples of locking elements include a ball bearing or wedge that is configured to push against a multiple stranded element with a force that increases as a drive shaft is advanced. An example of a drive shaft is the illustrated set screw. In FIGS. 1-2, drive shaft 110 and ball bearing 120 are provided as illustrative examples of such embodiments with exemplary assembled views of a battery terminal locking assembly 100 provided in FIGS. 3-4. For this particular example, wire 140 is affixed to battery terminal locking assembly 100 by first inserting wire strands 142 (e.g., copper strands of a copper wire) into receiving bore 102 and out through aperture 104. Locking element 120 is then dropped into locking bore 106, and subsequently pushed onto wire strands 142 by screwing drive shaft 110 into locking bore 106. As drive shaft 110 is tightened, locking element 120 pushes against an underside of the wire strands 142 protruding out of aperture 104. A gripping strength between wire 140 and battery terminal locking assembly 100 increases as the drive shaft 110 is further tightened. A more effective electrical contact between wire strands 140 and battery terminal locking assembly 100 is made, as locking element 120 pushes onto wire strands 142 with increasing force. In electrical connection applications the drive shaft 110 and/or locking element 120 may be selected to have a desired conductivity to further facilitate forming an electrical contact or connection. Once drive shaft 110 is tightened to a desired torque, and before attaching battery terminal locking assembly 100 to a battery post, a covering 150 can be wrapped around aperture 104 (e.g., via a heat shrink tubing) so as to insulate excess wire strands 142, as illustrated in FIG. 4.

Figure 5:
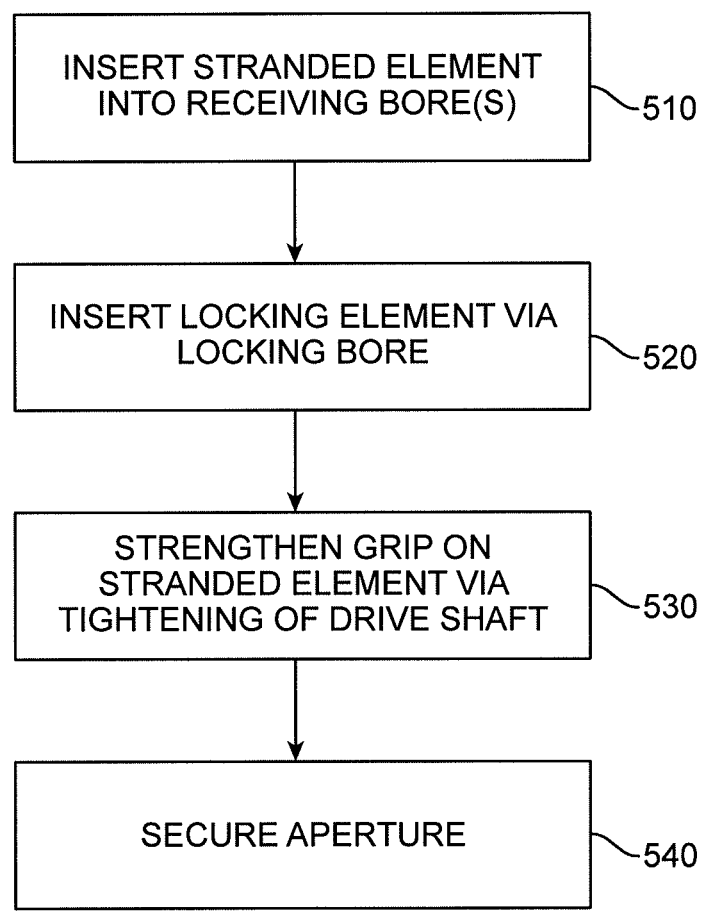
FIG. 5 is a flow diagram of an exemplary methodology for creating a termination according to some embodiments.

It should be appreciated that any of various locking assemblies disclosed herein can be implemented. A flow chart illustrating an exemplary method to facilitate creating any of the locking assemblies disclosed herein is provided in FIG. 5. As illustrated, process 500 includes a series of acts that may be performed by a human or within a computing device (e.g., a computer configured to control an assembly line) according to an aspect of the subject specification. For instance, process 500 may be implemented by employing a processor to execute computer executable instructions stored on a computer readable storage medium to implement the series of acts. In another embodiment, a computer-readable storage medium comprising code for causing at least one computer to implement the acts of process 500 is contemplated.

In an aspect, process 500 begins at act 510 with the insertion of a stranded element, such as a wire or lead through a receiving bore (e.g., receiving bore 102) of a locking assembly (e.g., battery terminal locking assembly 100). The stranded elements or wire can be any of a plurality of types (e.g., any of various types of wires, cables, straps, ropes, etc.). Process 500 then continues at act 520 with the insertion of a locking element (e.g., a ball bearing, wedge, etc.) through a locking bore. For instance, with reference to FIGS. 1-4, locking element 120 is inserted via locking bore 106, which is at the opposite end of receiving bore 102.

After the locking element is inserted, a drive shaft is then tightened at act 530 via the locking bore. Here, as the drive shaft is tightened, the locking element pushes against an underside of the stranded wire causing the stranded wire to protrude out of an aperture (e.g., aperture 104) on the locking assembly between the receiving bore and the locking bore. The gripping strength between the lead and the termination accessory increases as the drive shaft is further tightened.

In a further aspect, it is contemplated that process 500 can optionally include with securing of the aperture at act 540. To this end, it should be appreciated that such securing of the aperture can be implemented in various ways. For instance, if the stranded wire is an electrical wire, act 540 may comprise wrapping the locking assembly at the aperture so as to insulate any protruding wire strands (i.e., similar to covering 150 illustrated in FIG. 1).

In some embodiments the securing of the aperture at act 540 can be implemented via a locking ring component.

Within such embodiment, the locking ring component may be configured to mate with the locking assembly. The locking assembly can be inserted into the locking ring component so that the locking ring is brought towards the stranded element. In an aspect, as the locking ring slides across the aperture, the locking ring folds the excess portion of the lead protruding out from the aperture back towards the insertion opening. The locking ring component thus covers the excess portion of the lead, and also provides additional gripping power by pulling the excess portion of the lead further back (e.g., by screwing the locking ring tighter towards the insertion opening). Further discussion of exemplary locking ring implementations are provided later with reference to FIGS. 24-30.

It should be appreciated that the aforementioned aspects can be implemented according to any of various configurations, as desired, to accommodate any of various scenarios and applications disclosed herein. Below, additional embodiments are provided which implement the disclosed aspects via different configurations.

Figure 6:
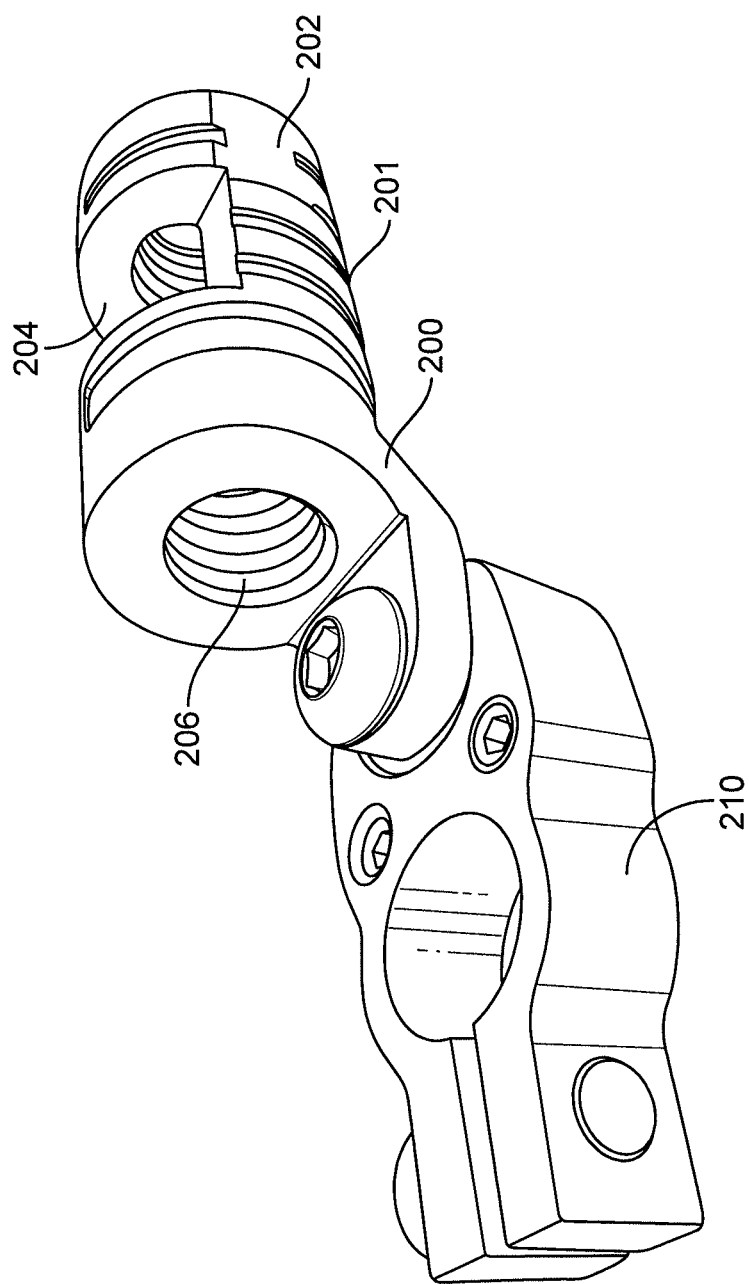
FIG. 6 illustrates a battery terminal locking assembly in accordance with some embodiments.

In some embodiments, rather than purchasing a reconfigured battery terminal (e.g., battery terminal locking assembly 100 illustrated in FIGS. 1-4), a locking assembly is provided that is coupled to a conventional battery terminal. Referring next to FIG. 6, an exemplary battery terminal locking assembly is provided in accordance with some embodiments. As illustrated, a battery terminal locking assembly can be configured as locking assembly 200 having a housing 201 with a receiving bore 202, aperture 204, and locking bore 206. Similar to battery terminal locking assembly 100, an exemplary use of locking assembly 200 includes inserting a stranded element, such as strands of wire or electrical cable through receiving bore 202, and inserting a locking element (e.g., ball bearing or wedge) through locking bore 206. Tightening a drive shaft via locking bore 206 pushes wire strands through aperture 204. Unlike battery terminal locking assembly 100, however, locking assembly 200 is configured to attach to conventional battery terminals such as battery terminal 210. Once attached, locking assembly 200 serves as an electrical conduit that electrically connects the inserted wire/electrical cable to battery terminal 210. For example, the drive shaft, locking element, and/or housing can be electrically conductive.

Figure 7:
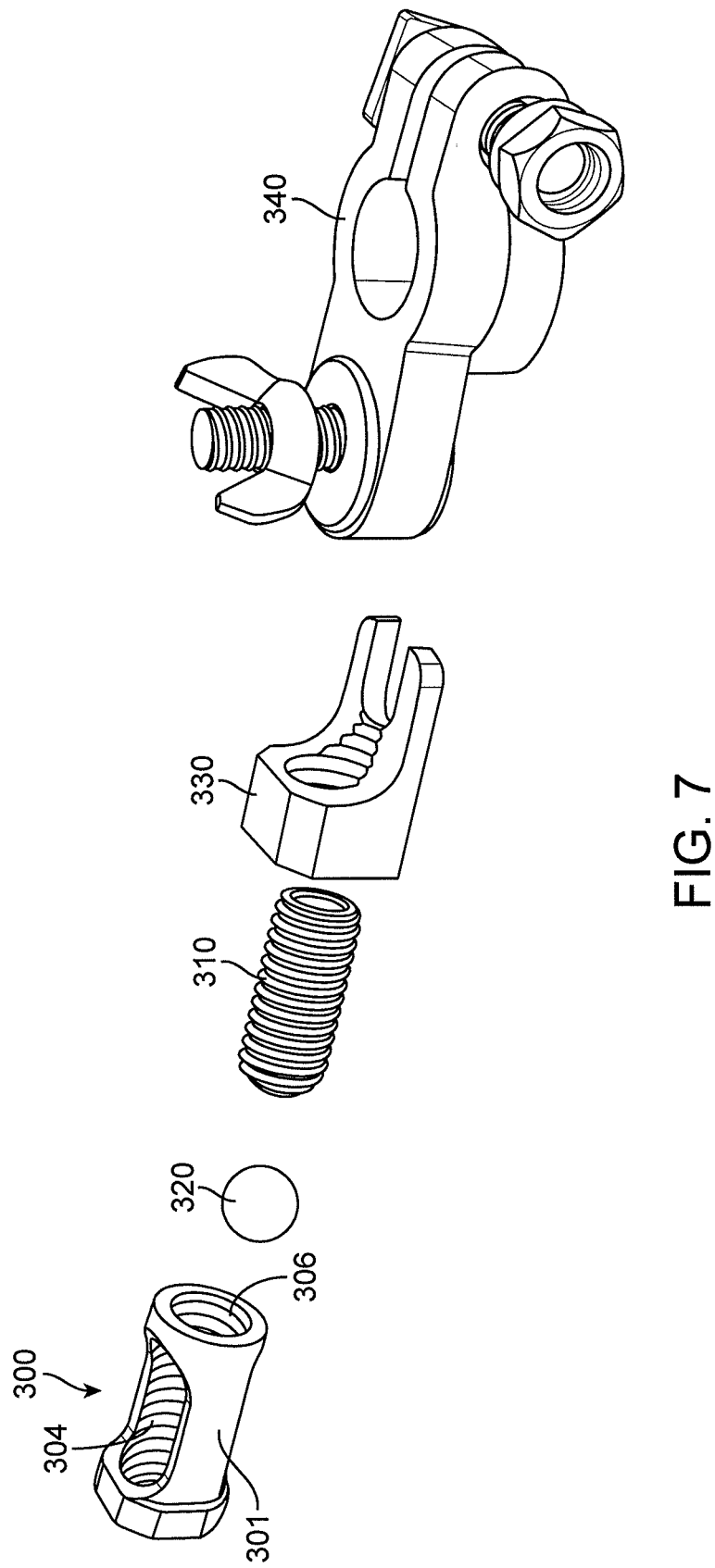
FIG. 7 illustrates a battery terminal locking assembly in accordance with some embodiments.
Figure 8:
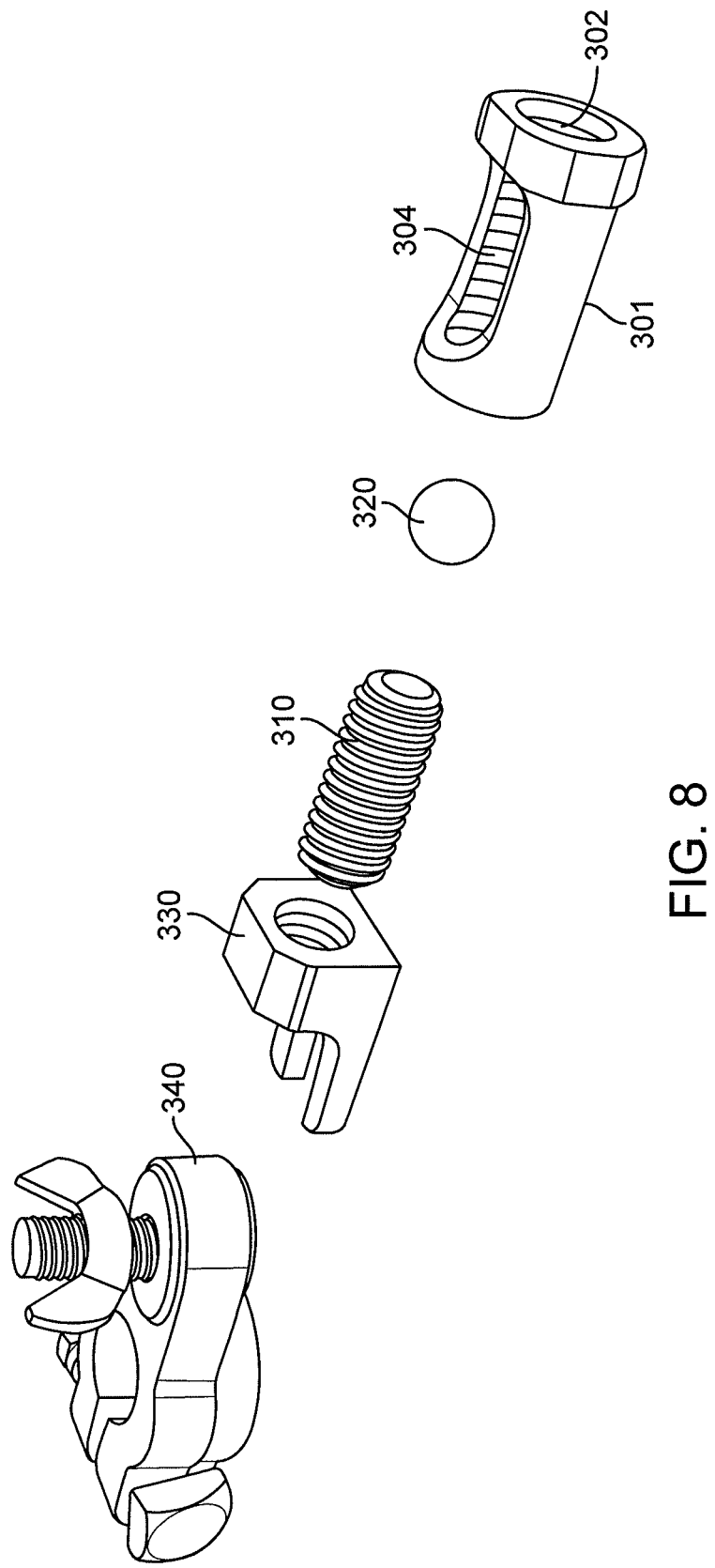
FIG. 8 is a second view of the battery terminal locking assembly illustrated in FIG. 7.

Referring next to FIGS. 7-8, another exemplary battery terminal accessory is provided according to another embodiment. Attachment to a conventional battery terminal is achieved via a separate connector component. For this particular example, attachment connector 330 is provided for use with the locking assembly 300. One end of the attachment connector 330 is configured to attach to a battery terminal 340 and the other end of the attachment connector 330 is configured to accommodate the insertion of drive shaft 310. The locking assembly 300 includes a housing 301 having a receiving bore 302, an aperture 304 and locking bore 306. The stranded element, such as strands of an electrical cable can be inserted through receiving bore 302. The stranded element can be then pushed through aperture 304 by the locking element 320 as the drive shaft 310 is tightened. Here, however, rather than a single attachment component (e.g., attachment 200), a dual-piece assembly is contemplated. The locking assembly 300 can be coupled to battery terminal 340 via attachment connector 330. For this particular example, one end of attachment connector 330 can be tightened onto a screw protruding from battery terminal 340 via a wing nut, whereas another end of attachment connector 330 is configured to mate with an end of drive shaft 310 that is opposite to locking assembly 300.

Figure 13:
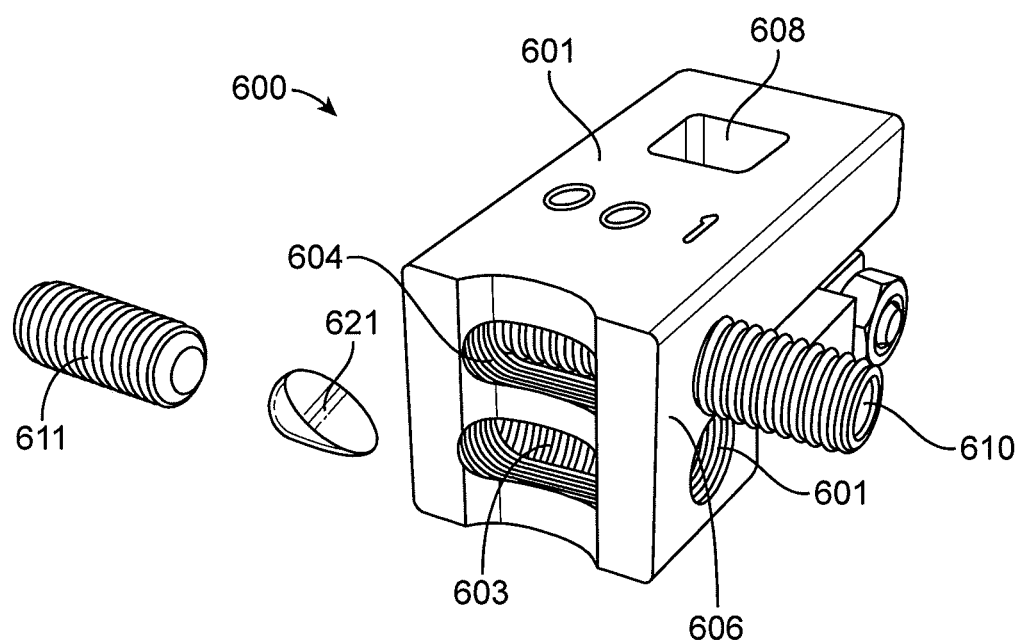
FIG. 13 illustrates an exemplary transverse lead battery terminal locking assembly in accordance with some embodiments.
Figure 14:
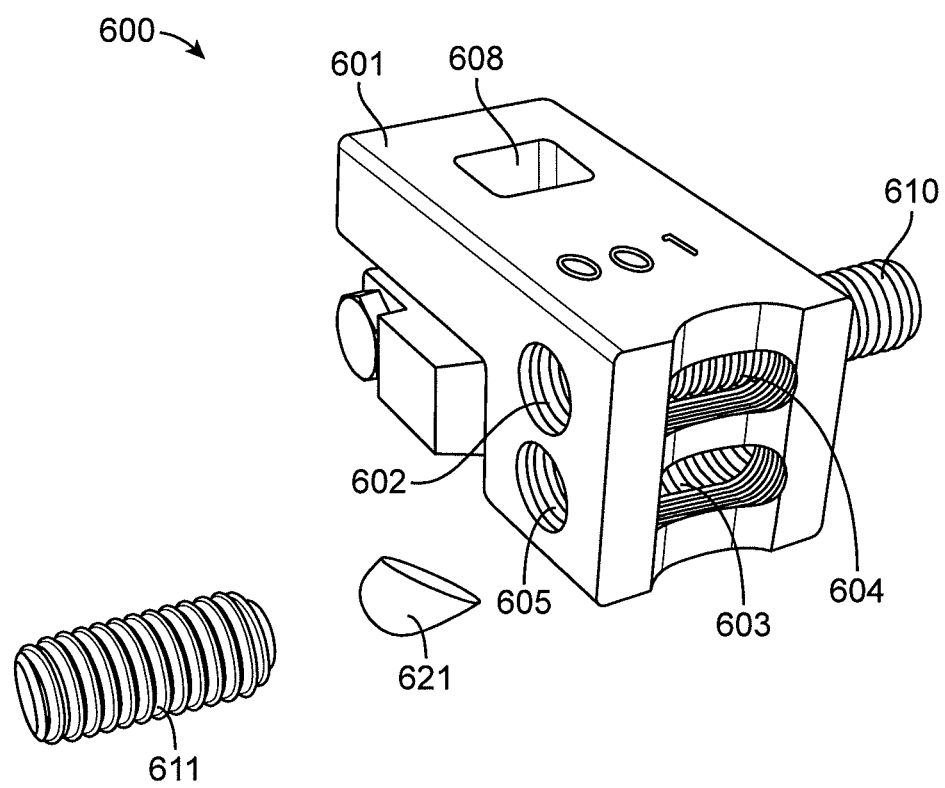
FIG. 14 is a second view of the exemplary transverse lead battery terminal locking assembly illustrated in FIG. 13.
Figure 15:
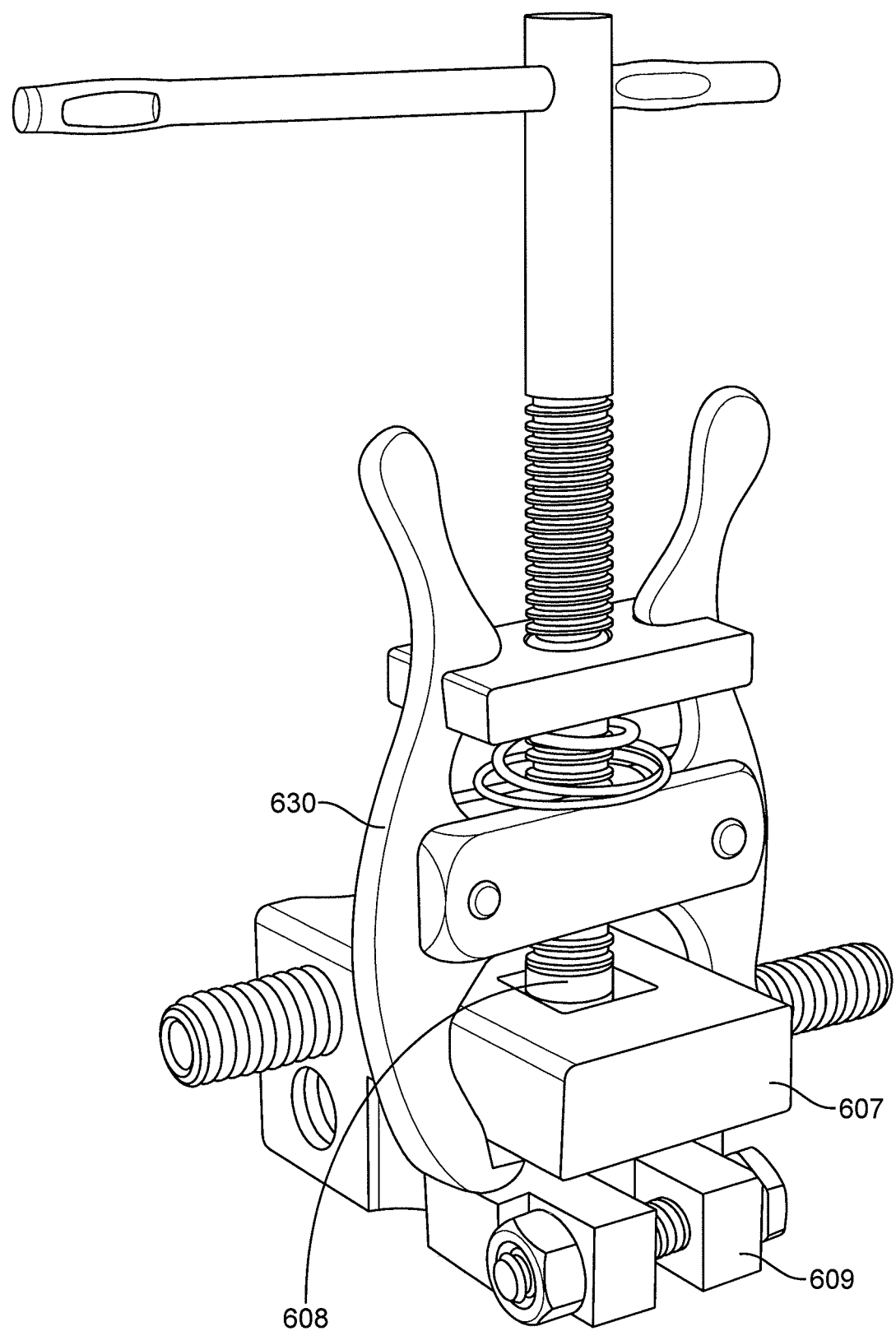
FIG. 15 illustrates a removal tool coupled to the exemplary transverse lead battery locking assembly illustrated in FIG. 13.
Figure 16:
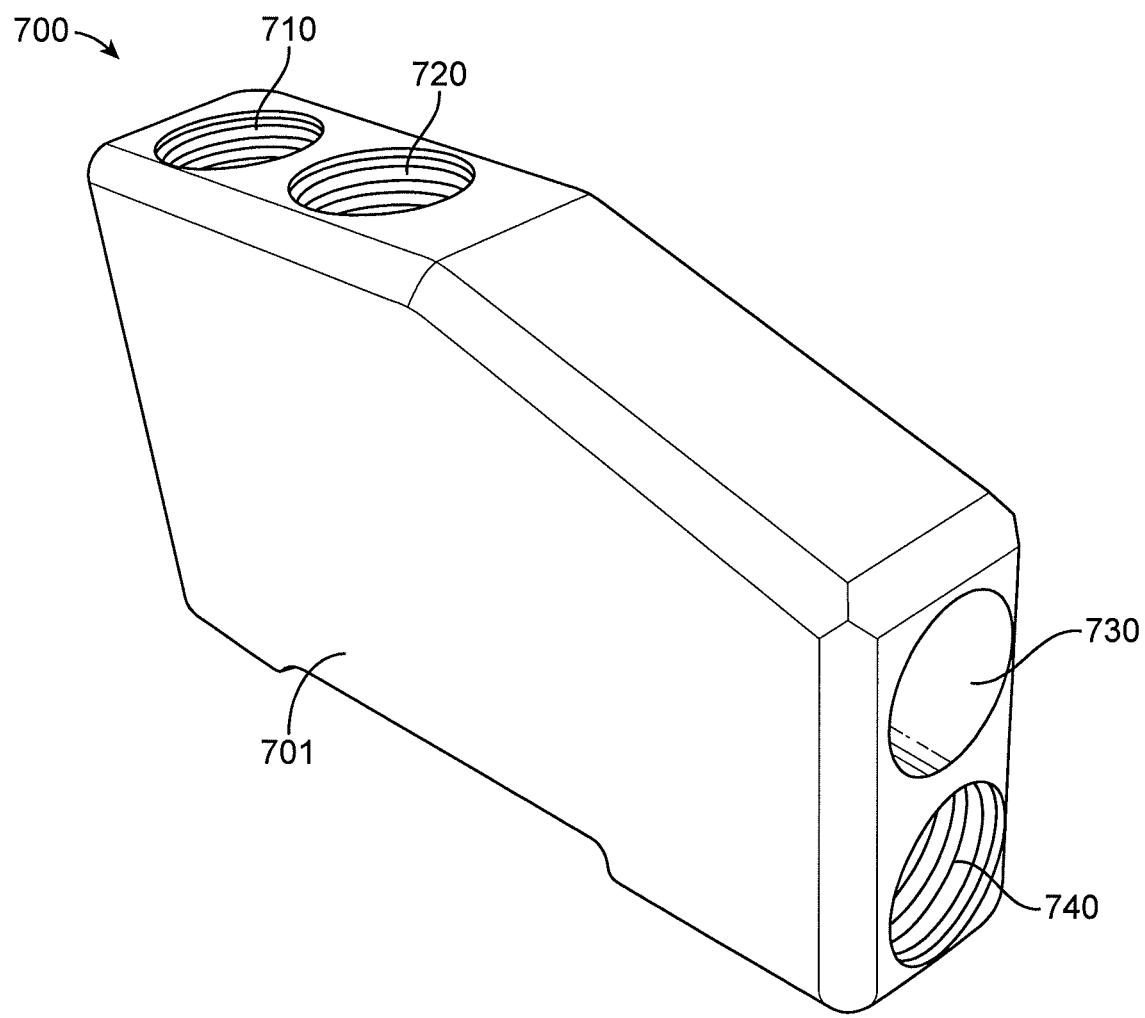
FIG. 16 illustrates an exemplary multi-element locking assembly in accordance with some embodiments.
Figure 17:
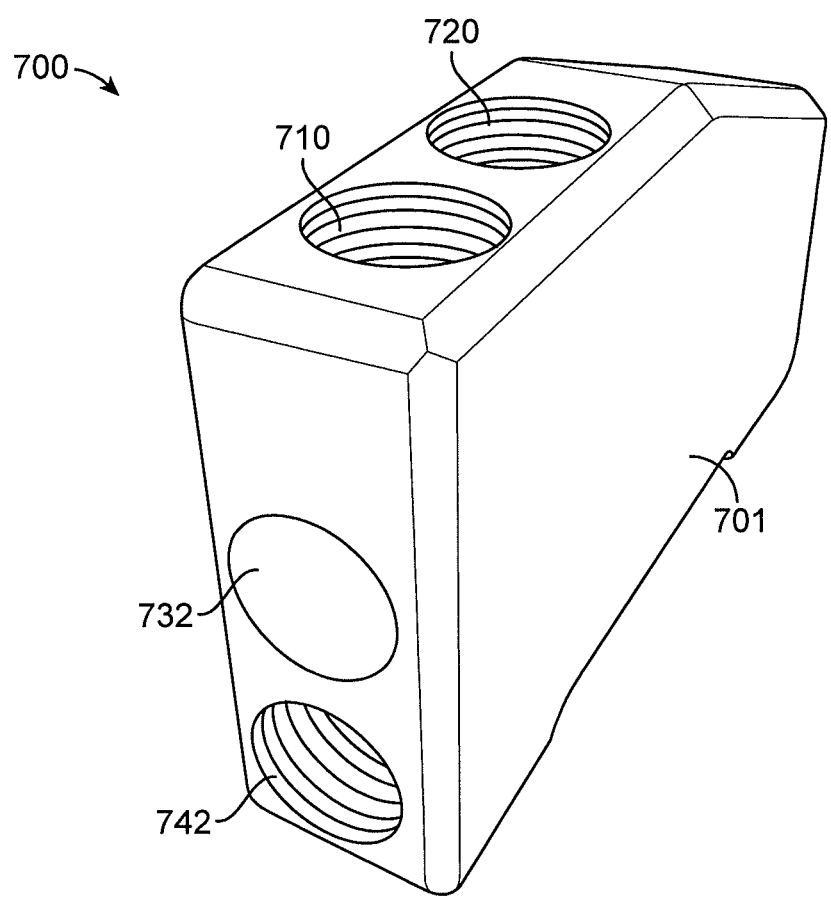
FIG. 17 is a second view of the exemplary multi-element locking assembly illustrated in FIG. 16.
Figure 18:
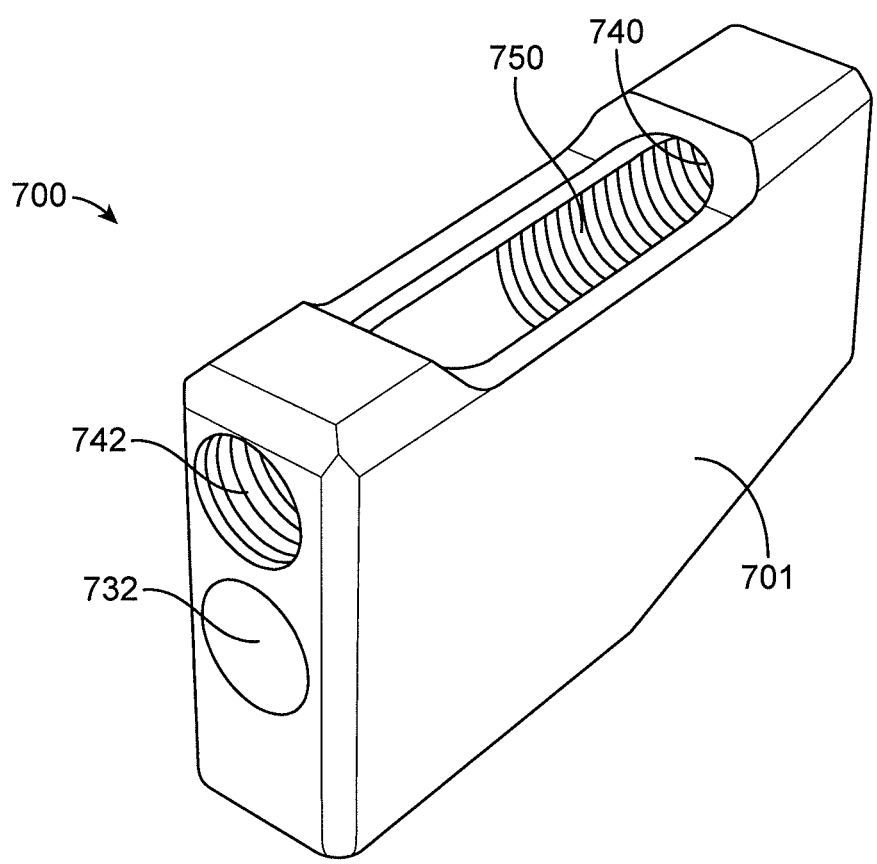
FIG. 18 is a third view of the exemplary multi-element locking assembly illustrated in FIG. 16.
Figure 19A:
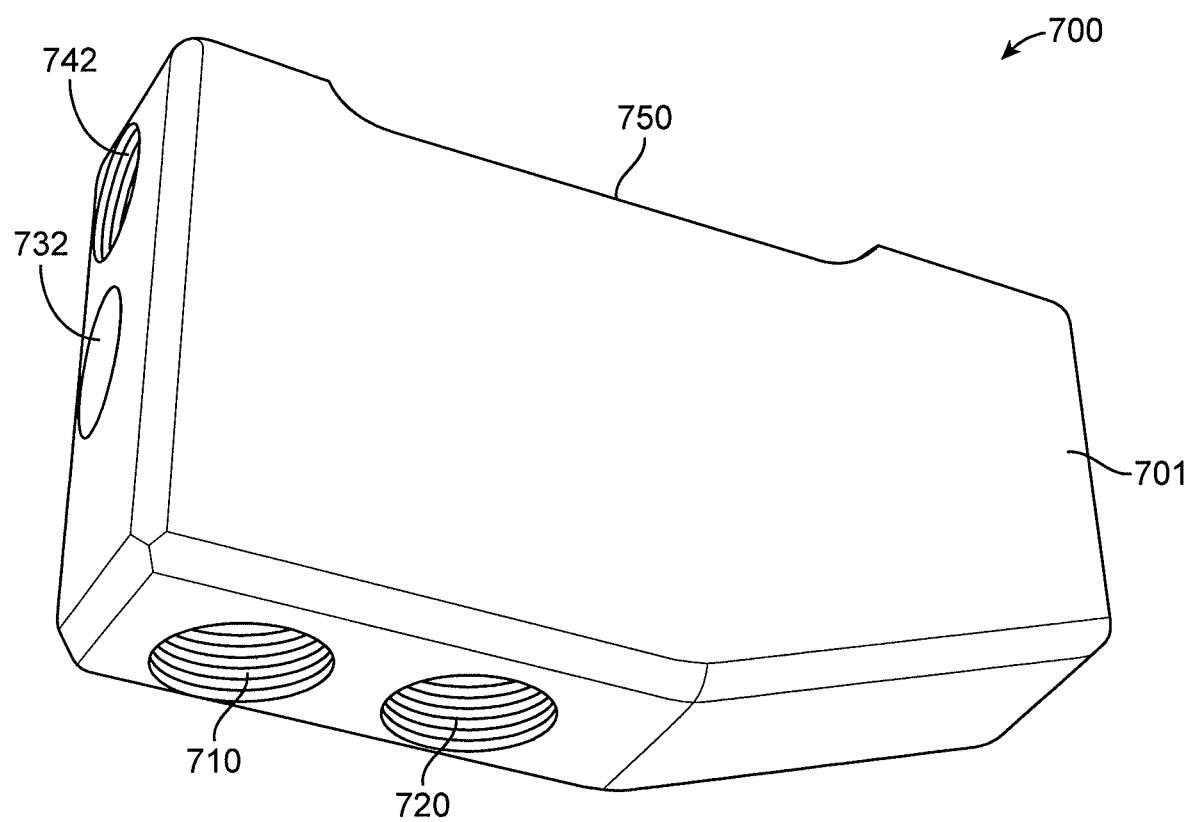
FIGS. 19a-19f is a fourth view of the exemplary multi-element locking assembly illustrated in FIG. 16.
Figure 19B:
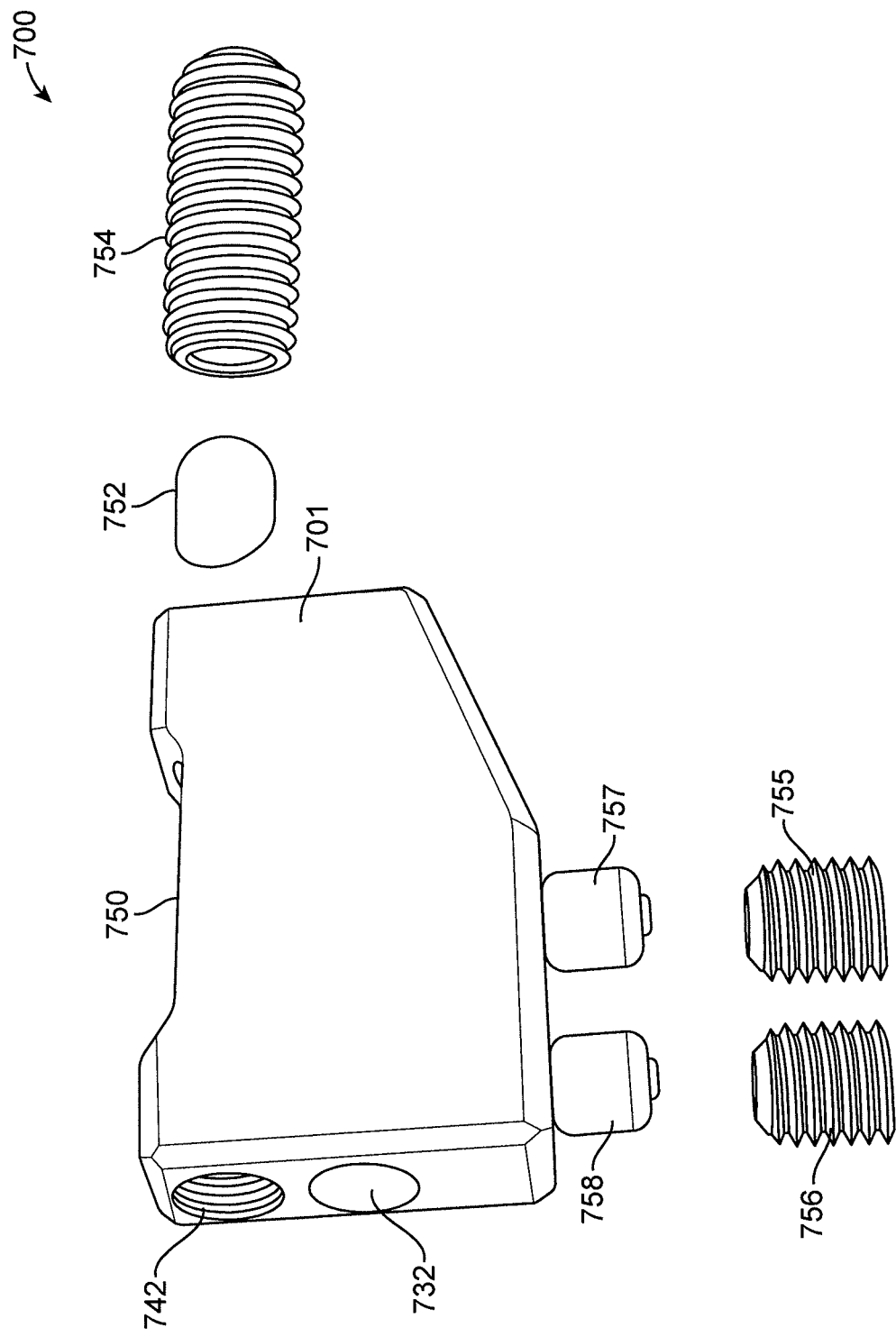
Figure 19C:
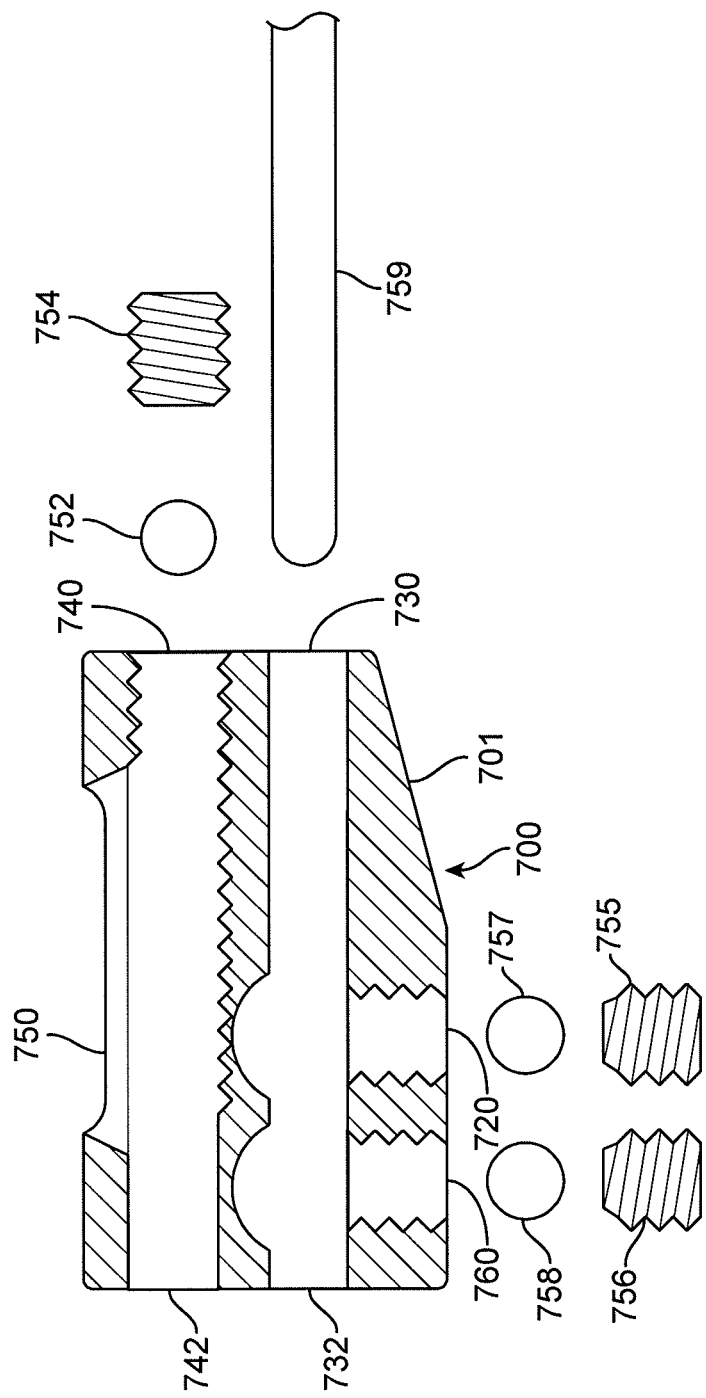
Figure 19D:
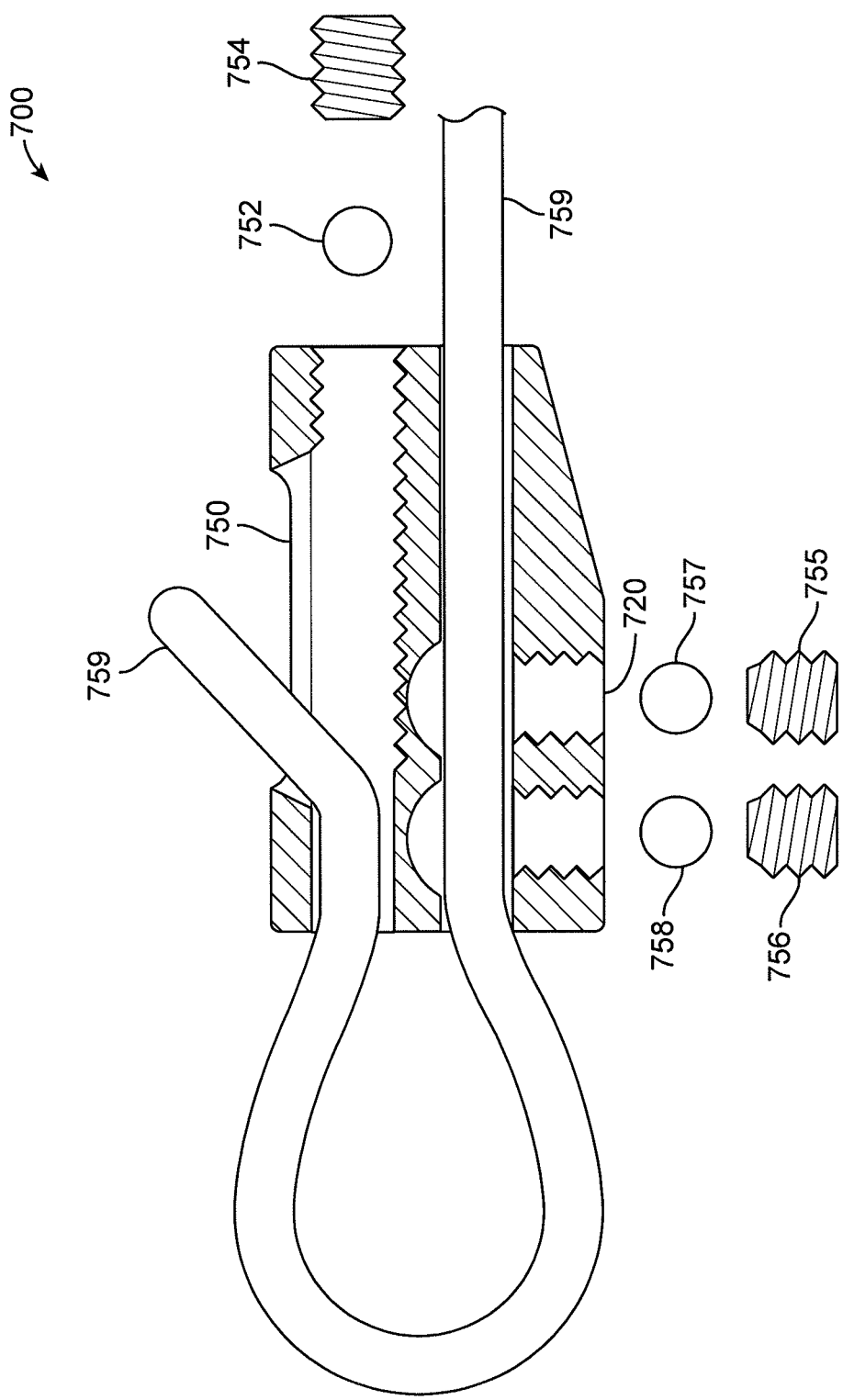
Figure 19E:
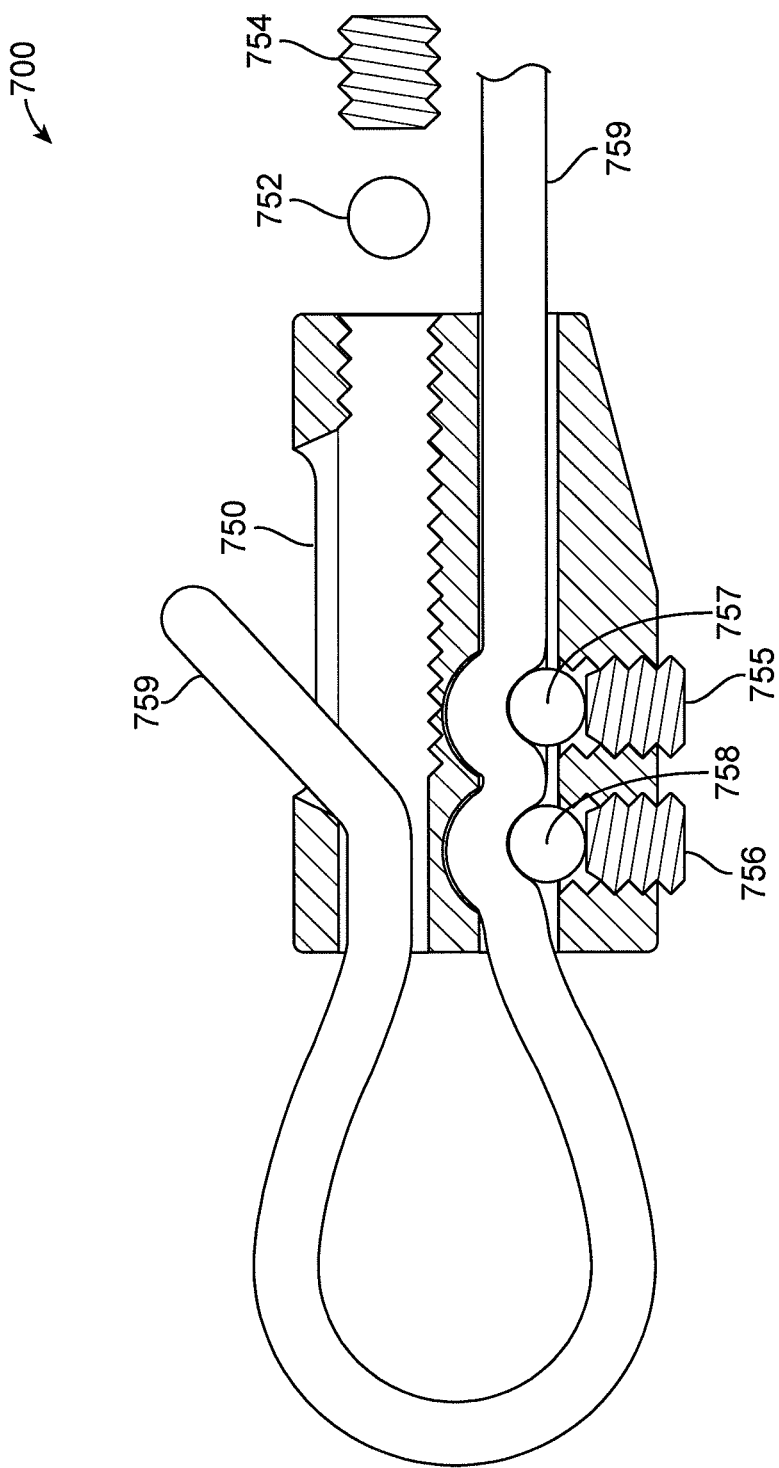
Figure 19F:
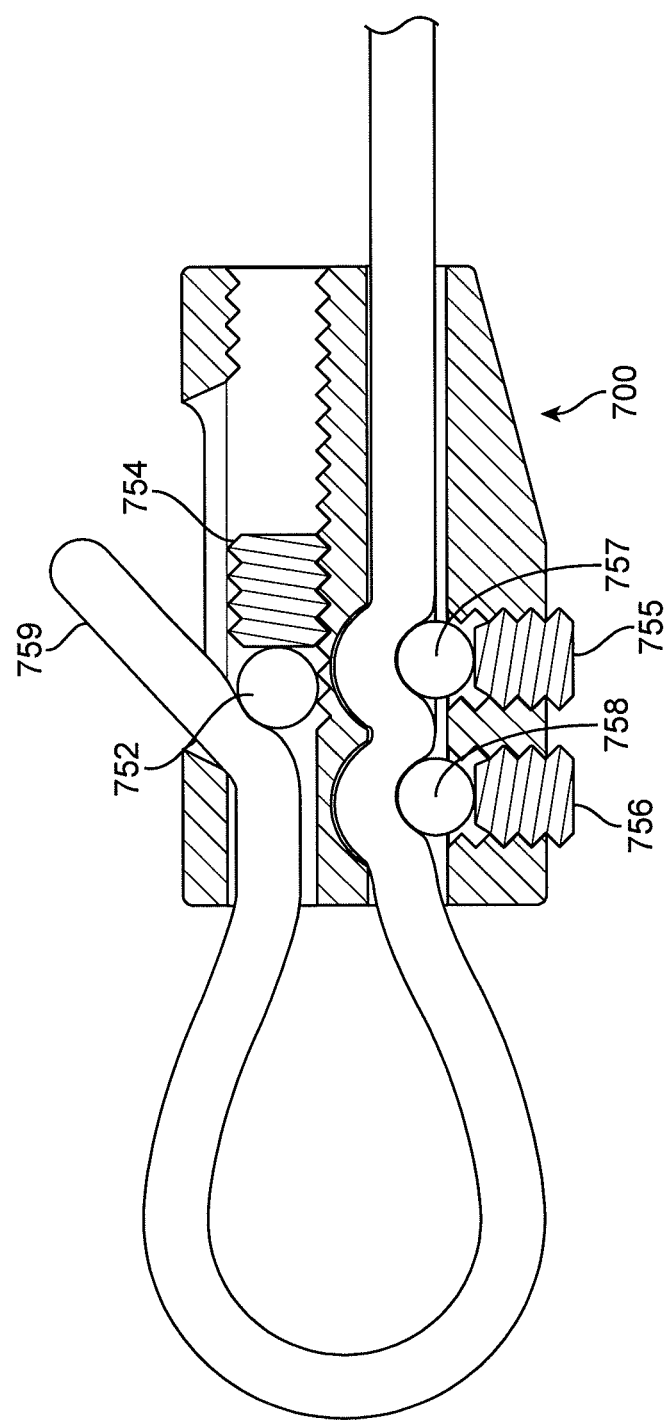

For some applications, the termination of multiple stranded elements or leads may be desirable. It may also be desirable to receive leads via unconventional angles. FIGS. 13-15 illustrate an embodiment of a heavy duty double line battery terminal. In FIGS. 13-14, an exemplary transverse lead battery terminal assembly is provided. As illustrated, battery terminal 600 has a housing 601 configured to receive a first stranded element or lead via receiving bore 601, and a second stranded element or lead via receiving bore 602. The first stranded element or lead is pushed through aperture 603 as locking element 621, illustrated as a wedge, is pushed beneath it by advancing drive shaft 611. The drive shaft 611 is illustrated as a set screw and is advanced within locking bore 605. The second stranded element or lead is pushed through aperture 604 by a similar mechanism via drive shaft 610.

Conventional battery terminals are often tightly fastened onto a post, which makes them difficult to remove. To mitigate this problem, battery terminal 600 may further include removal tool aperture or opening 608, which facilitates a vertical removal of battery terminal 600 via a removal tool. The removal tool can include a battery terminal pulling device, such as the conventional battery terminal pulling device shown in FIG. 15. In FIG. 15, for instance, a screw of removal tool 630 is shown inserted through removal tool opening 608. Once the screw is inserted, a claw mechanism of removal tool 630 can then grip battery terminal 600 between lip 607 and post connector 609. Removal tool 630 can then be lifted to remove battery terminal 600 from the post.

Although a multi-lead configuration is described in FIGS. 13-15 with reference to a battery terminal application, it should be noted that many multi-lead or multi-stranded element configurations unrelated to battery terminals are also desirable. Accordingly, various views of a generic multi-lead locking assemblies in accordance with some embodiments are provided in FIGS. 16-20.

The embodiments illustrated in FIGS. 16-20 can also be used to engage with a cable. As illustrated, locking assembly 700 includes a housing 701 having opening 710, opening 720, opening 730, opening 740, opening 732, opening 742, and aperture 750. Openings 710 and 720 can each be part of a locking bore. Openings 730 and 732 are at opposing ends of a receiving bore. Openings 740 and 742 are at opposing ends of a receiving bore. For this particular embodiment, a first stranded element or wire may be inserted via opening 740. The stranded element or lead can be pushed through aperture 750 and tightened onto locking assembly 700 as a locking element 752 is pushed against it via drive shaft 754. Opening 732 may then be similarly used in conjunction with drive shaft 756 and locking element 758. The openings 710 and 720 can be configured to receive a drive shaft and locking element.

FIGS. 19a-19f illustrates the locking assembly 700 with two openings 710, 720 in communication with the receiving bore between openings 730, 732. The stranded element or cable 759 can be advanced through the opening 730 and out of the internal volume of the assembly 700 through opening 732. The cable 759 bends and can enter the locking assembly 750 through opening 742. The end of the cable 759 exit the housing through aperture 750. The cable 759 can be secured to the locking assembly 700 at multiple points.

The locking element 758 can be advanced within opening 710 by the drive shaft 756 to contact the cable 759. The locking element 757 can be advanced within opening 720 by the drive shaft 755 to contact the cable 759. The locking element 752 can be advanced with the drive shaft 754 to contact the cable 759 adjacent to the aperture 750. The cable 759 is secured to the locking assembly 700 at three different places. The extra contact points can improve the strength of the connection between the locking assembly 700 and the cable 759. The additional contact points can also increase the strength of the loop formed by the cable adjacent to the openings 732 and 742. The loop formed by the cable 759 can be used to connect to another structure.

Figure 20C:
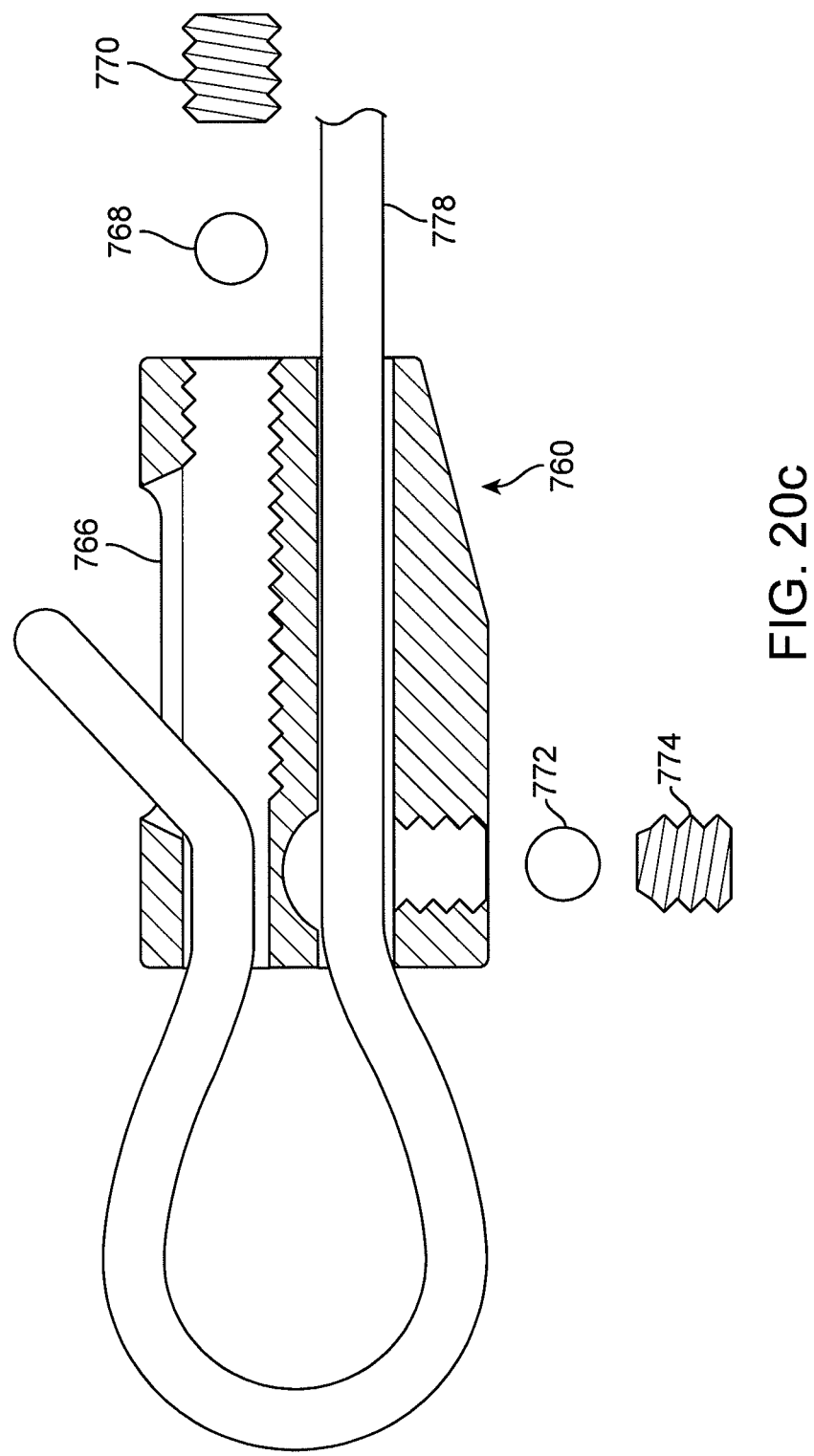
Figure 20D:
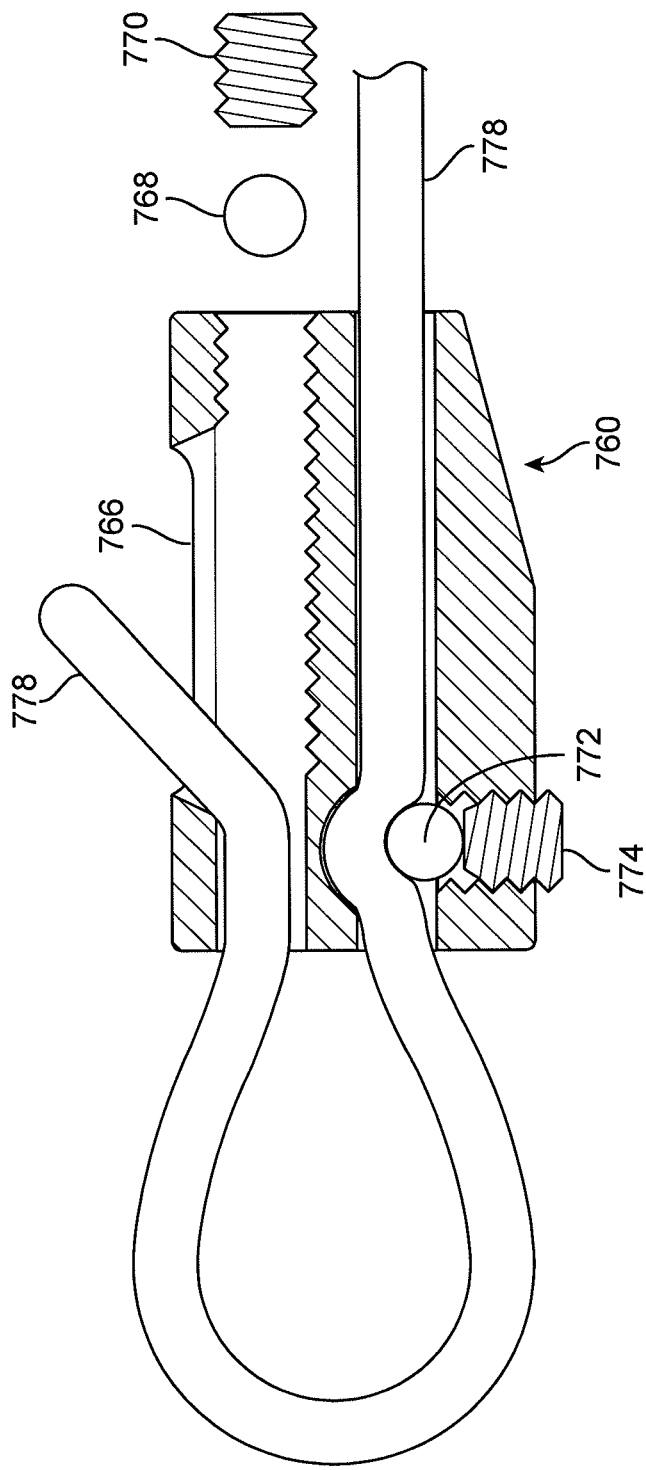
Figure 20E:
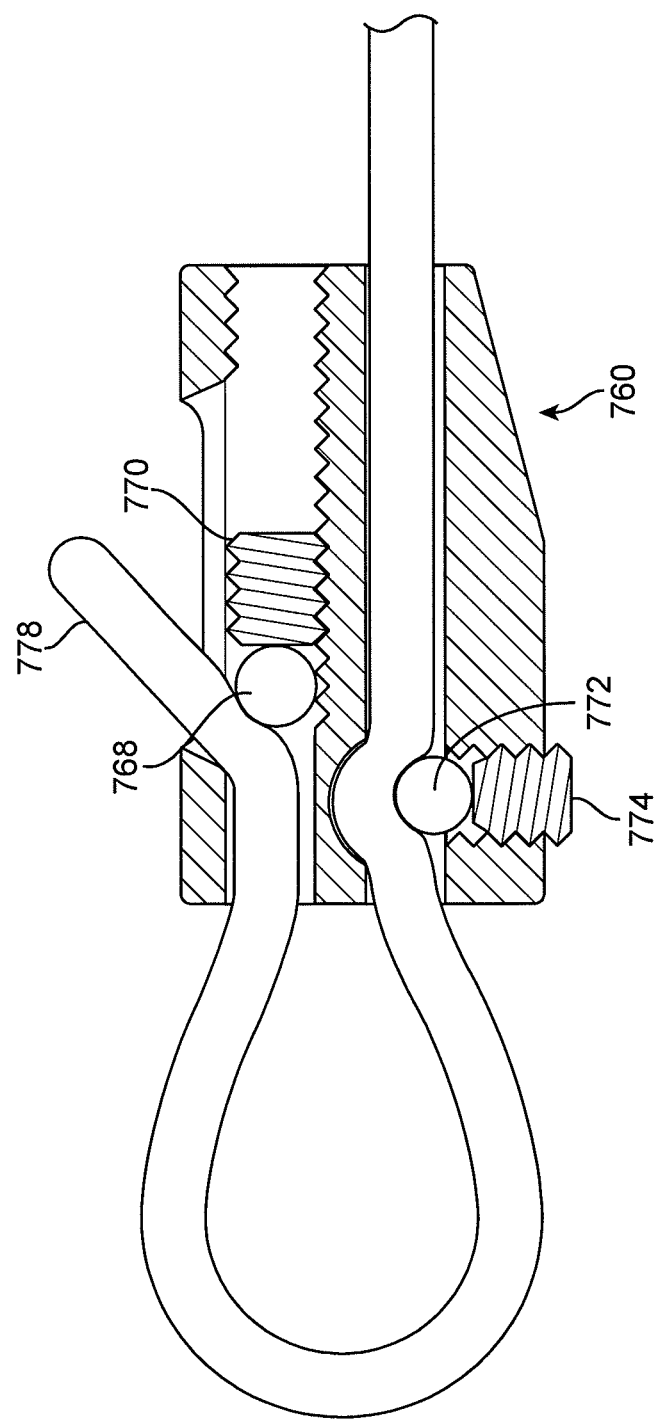

FIGS. 20a-20e illustrate an embodiment of a locking assembly 760 configured to receive a cable. The locking assembly 760 with a housing 765 having opening 761, opening 762, opening 763, opening 764, opening 771, and aperture 766. A cable 778 can be introduced through opening 763 to the locking assembly 760. The openings 763 and 764 are in communication with a receiving bore. The opening 762 is in communication with a receiving bore. Openings 761 and 771 are illustrated in communication with locking bores. The cable 778 can exit through opening 764 and bend to enter opening 762 followed by exiting through aperture 766. After the cable 778 is advanced through the locking assembly 760, drive shaft 774 can push the locking element 768 against the cable 778 to secure the cable 778 to the locking assembly 760. A second drive shaft 774 can secure a second locking element 768 to the cable 778. The cable 778 thus forms a loop alongside the housing as illustrated in FIG. 20e. The locking assembly 760 is similar to the locking assembly 700 but with two contact points between the cable 778 and locking assembly 760. In some embodiments the stranded element, after attachment to the locking assembly, can include a length maintained outside of the housing after engagement with the locking element. The length maintained outside of the housing can include a loop, as illustrated in FIG. 20. The loop can be used for mechanical connections with other devices and tools.

Figure 9A:
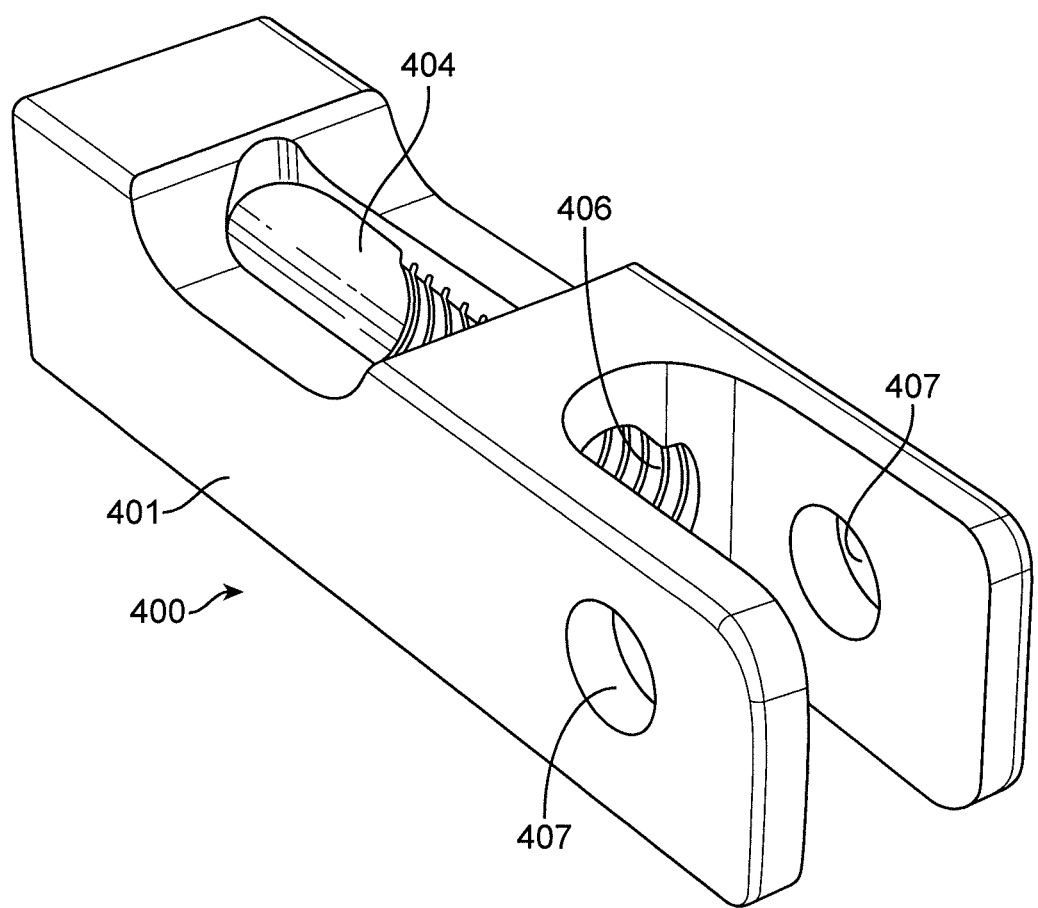
FIGS. 9a-9c illustrate locking assemblies in accordance with some embodiments.
Figure 9B:
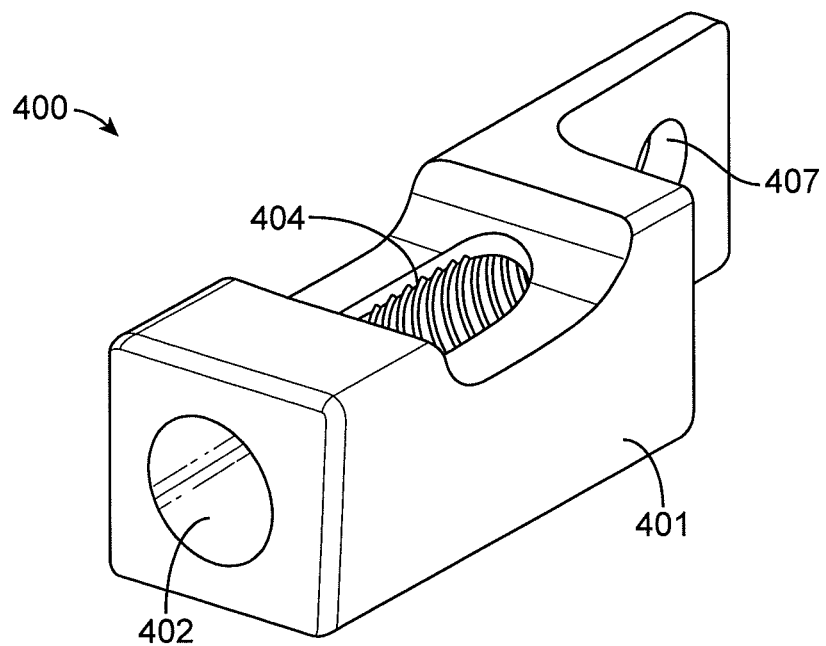
Figure 9C:
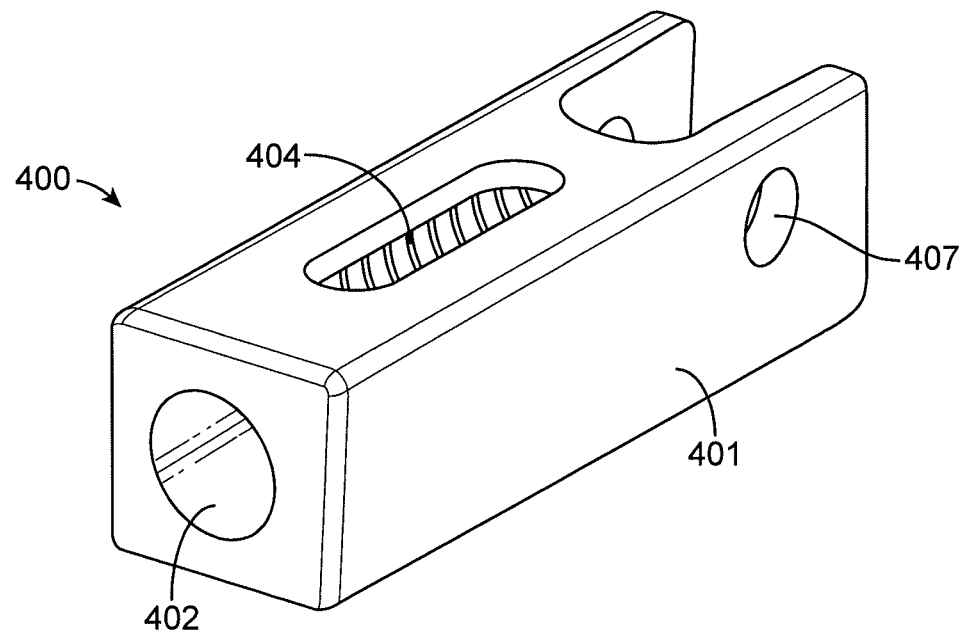
Figure 10:
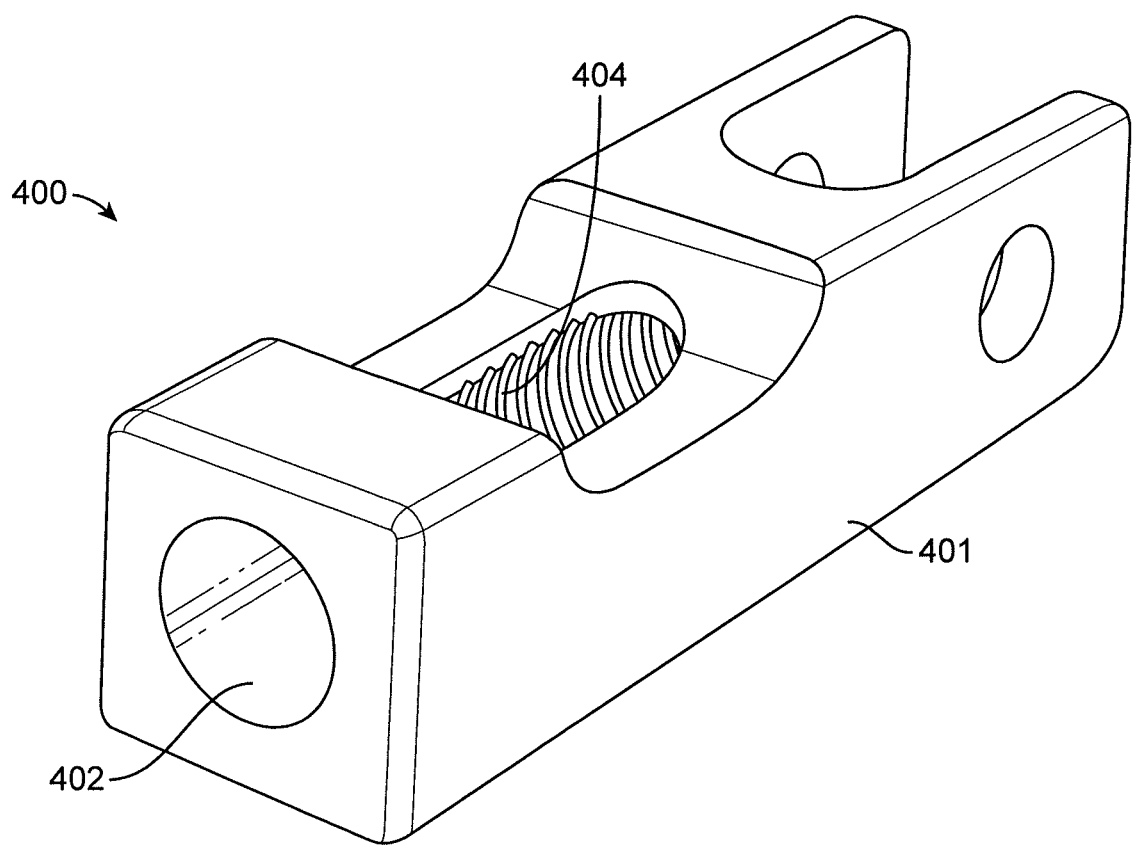
FIG. 10 is a second view of the exemplary locking assemblies illustrated in FIG. 9.

Additional embodiments of locking assemblies are illustrated in FIGS. 9-12. In FIGS. 9-10, for example, locking assembly 400 is provided. The locking assembly 400 includes a housing 401 with a receiving bore 402, aperture 404, and locking bore 406, as shown. FIG. 9a illustrates a locking assembly 400 with a recess along the wall adjacent to the aperture 404 along with two protrusions with openings 407 to connect to other components. FIG. 9b illustrates a locking assembly 400 with a receiving bore 402 and protrusion with an opening 407 for connecting to another component, such as a winch drum. FIG. 9c illustrate a locking assembly 400 with a receiving bore 402 and aperture 404. The wall of the locking assembly 400 in FIG. 9c has additional material adjacent to the aperture 404 that can provide extra strength to the locking assembly 400.

Figure 11:
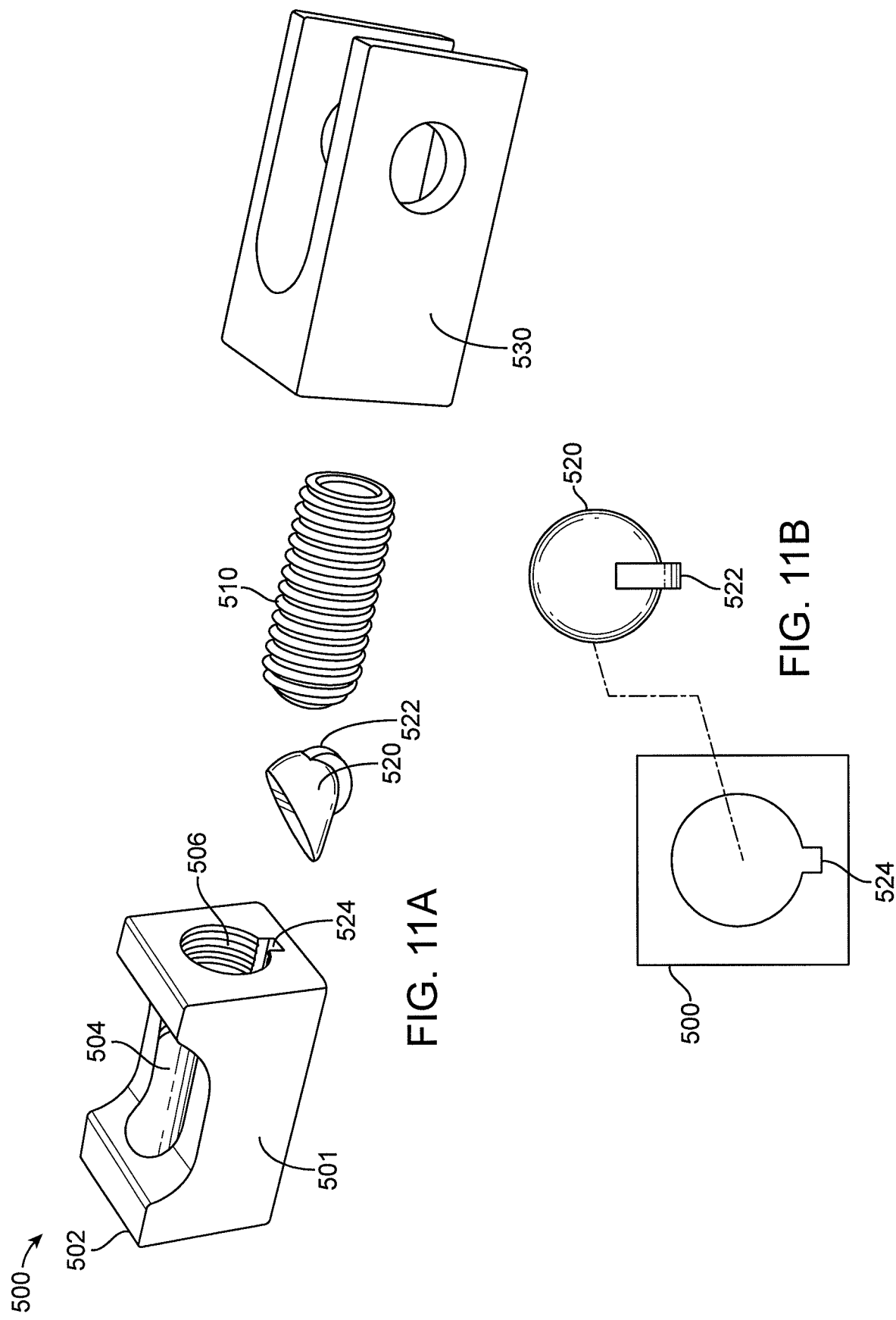
FIGS. 11a-11b illustrate exemplary locking assemblies in accordance with some embodiments.
Figure 12:
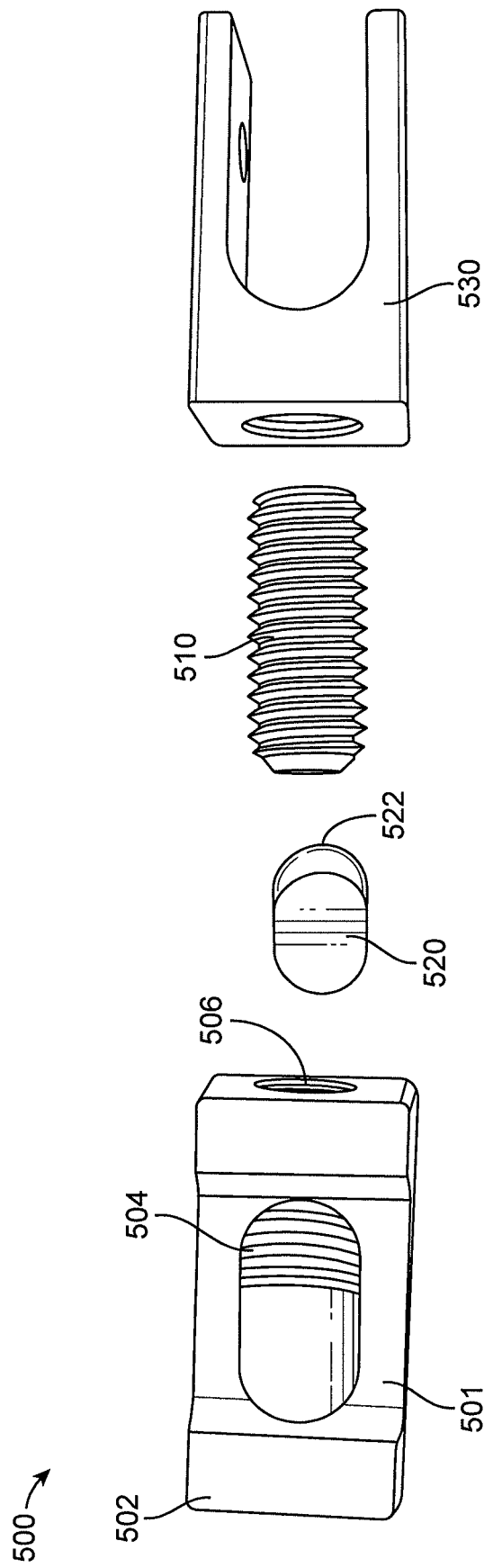
FIG. 12 is a second view of the exemplary locking assemblies illustrated in FIG. 11.

In some embodiments the locking assembly can have a multi-piece configuration. A dual-piece configuration of a locking assembly is illustrated in FIGS. 11-12. The locking assembly 500 can be combined with the attachment component 530 to achieve a structure that is substantially similar to the assembly illustrated in FIGS. 7-8. A perspective view of the locking assembly 500 is provided in FIG. 11a. FIG. 11b is a cross-sectional view of the locking assembly 500. A top view of the assembly 500 and attachment component 530 is provided in FIG. 12. In FIGS. 11a, 11b, and 12 the locking element 520 is illustrated with a wedge type structure instead of a spherical shape. The locking element 520 can be inserted into locking bore 506 and subsequently pushed by drive shaft 510 towards a stranded element (e.g., rope, cable, etc.) inserted from the other end via insertion opening 502.

A wedge shaped locking element 520 may be particularly advantageous with stranded elements that might be difficult to bend through aperture 504 (e.g., with stranded elements that are relatively stiff). For example, unlike a spherical shaped ball bearing, the geometry of a wedge allows it to slide beneath a stranded element, which can push the lead up through aperture 504 as the drive shaft 510 is tightened. Once drive shaft 510 is firmly attached to locking assembly 500, the opposite end of the drive shaft 510 can then be screwed into a threaded portion of the attachment connector 530. The locking element 520 is illustrated with a ridge 522. The locking assembly 500 includes a groove 524 with a complementary shape to receive the ridge 522 of the locking element 520 as shown in FIGS. 11a-11c and 12. The groove 522 of the locking element 520 can prevent rotation of the locking element 520 within the locking bore 506.

Figure 21:
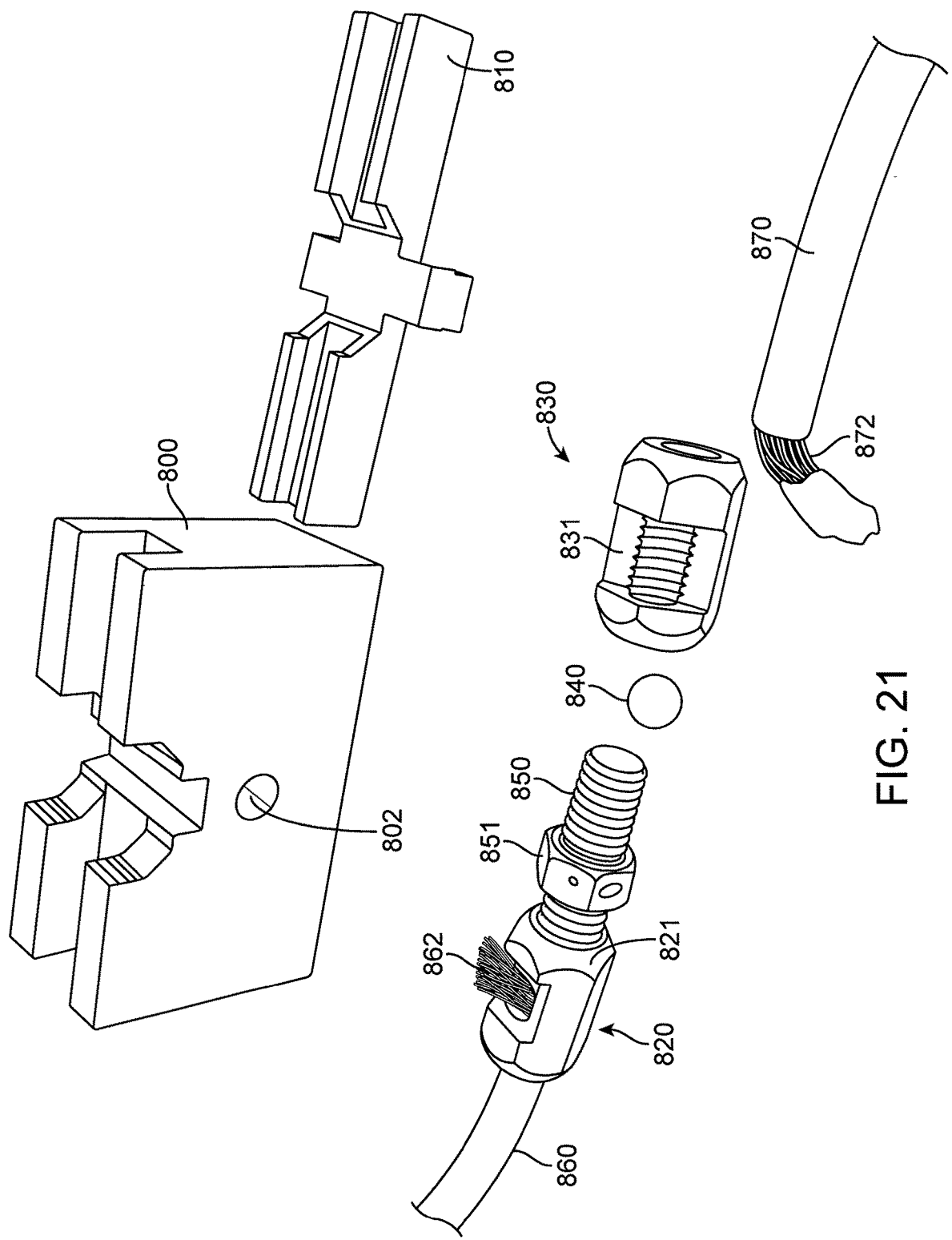
FIG. 21 illustrates locking assemblies in accordance with some embodiments.
Figure 22:
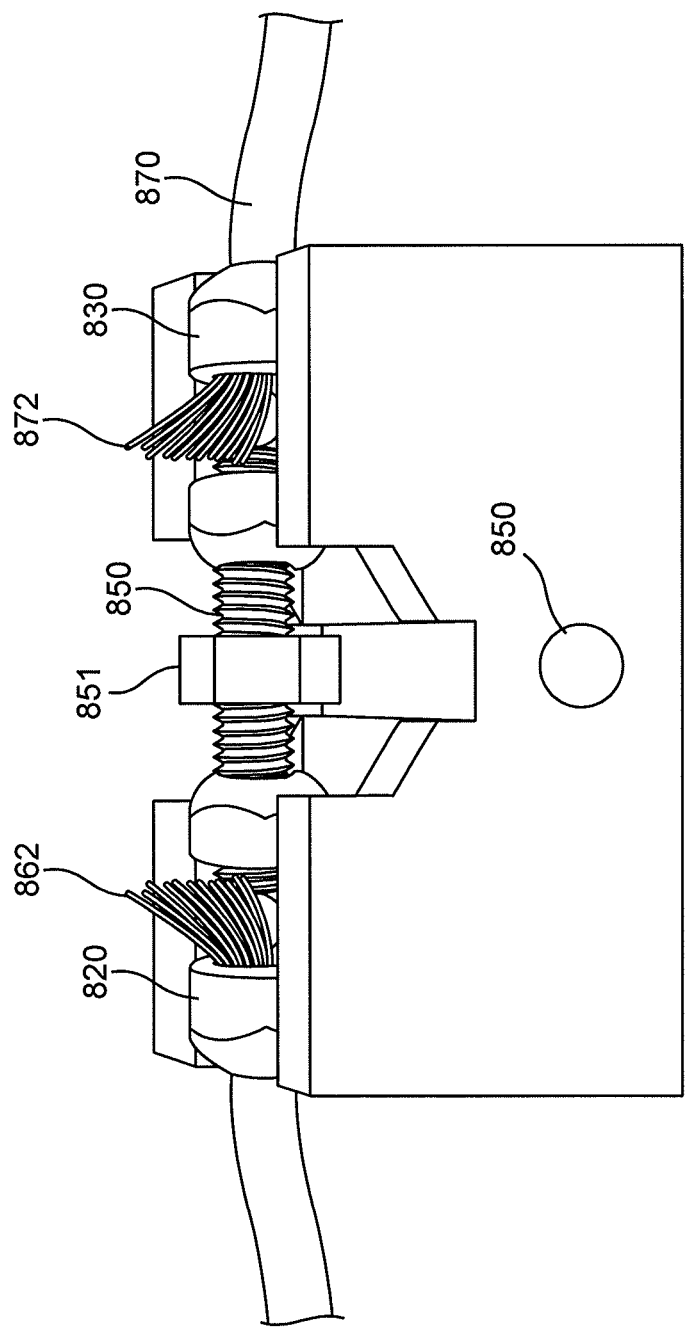
FIG. 22 is a second view of the locking assemblies illustrated in FIG. 21.

In some embodiments the locking assemblies disclosed herein can be configured to facilitate splicing stranded wire elements together. For instance, as illustrated in FIGS. 21-23, a first locking assembly 820 can be coupled to a second locking assembly 830 via drive shaft 850, so as to splice wire 860 together with wire 870. In some embodiments a bench 800 can be utilized to further facilitate this splicing. In some embodiments locking assembly 820 and locking assembly 830 are placed atop of bench 800 on opposite sides so that they are inline with each other. Drive element 850 can then be placed between locking assembly 820 and locking assembly 830 and subsequently inserted into both locking assembly 820 and locking assembly 830 while atop of bench 800. Next, a locking element 840 (e.g., ball bearing) is placed into each of locking assembly 820 and locking assembly 830 to facilitate attachment of wire 860 to locking assembly 820 and attachment of wire 870 to locking assembly 830. Rubber bands or tape can be used to hold the drive shaft 850 in position while splicing the stranded elements 860 and 870. A rubber band can be wrapped around bench 800 from top to bottom on both ends of the drive shaft so that they respectively make contact with either end of drive shaft 850. Next, the insulation on the ends of wire 860 and wire 870 can be stripped to expose wire strands 862 and wire strands 872, respectively. Wire strands 862 and wires strands 872 can then be respectively inserted via the open ends of locking assembly 820 and locking assembly 830. Wire strands 862 and wires strands 872 are then respectively pulled through the apertures or apertures of locking assembly 820 and locking assembly 830, and subsequently tightened via a twisting of drive shaft 850. To facilitate achieving a desired torque, a wrench can be used to rotate a hexagonal nut 851 on drive shaft 850. In some embodiments a metal rod can be inserted into hole 802 for additional leverage. Once drive shaft 850 has been adequately tightened, a strong grip is achieved between wire strands 862 and locking assembly 820 and between wire strands 872 and locking assembly 830. The coupling between locking assembly 820 and locking assembly 830 via drive shaft 850 can provide an electrical connection between stranded element 860 and stranded element 870. Thus, stranded element 860 becomes electrically spliced with stranded element 870. In some embodiments the splicing can be done for mechanical connections.

Figure 23A:
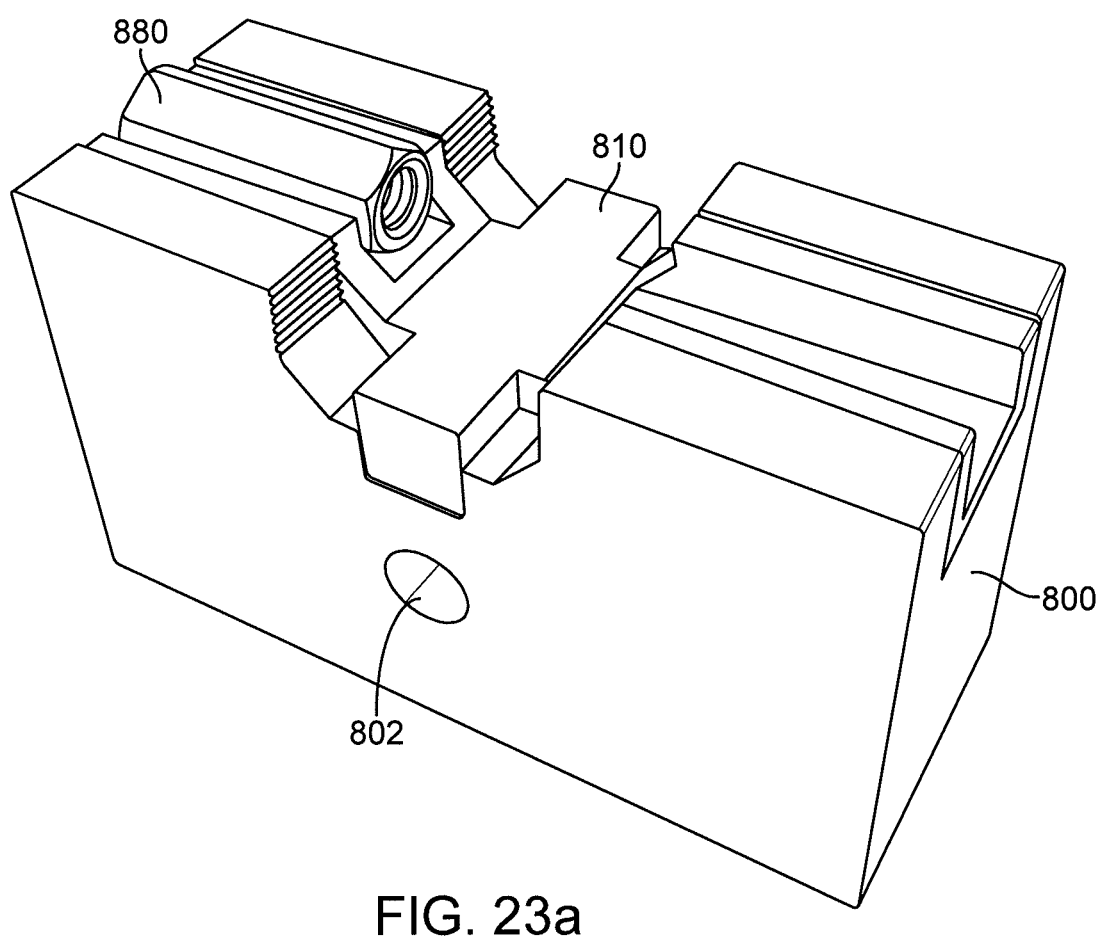
FIGS. 23a-23m illustrate various views of the locking assemblies illustrated in FIG. 21 and additional embodiments of locking assemblies.

In some embodiments it may be desirable to splice leads of various sizes. In some cases a specialized insert (e.g., insert 810) can be used to hold the locking assemblies on the bench 800. For instance, as illustrated in FIG. 23a, insert 810 can be placed atop bench 800 to accommodate thinner locking assemblies (i.e., for thinner stranded elements), such as locking assembly 880. Similar methods can be used to splice together thinner elements with the locking assemblies placed on insert 810, rather than directly atop bench 800.

Figure 23B:
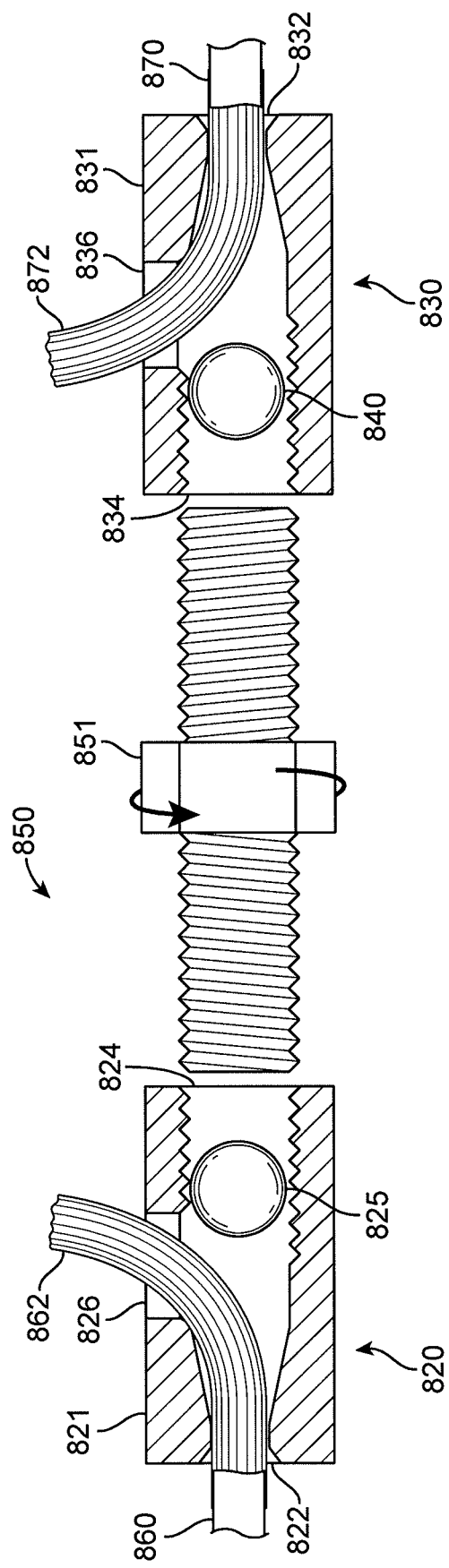
Figure 23C:
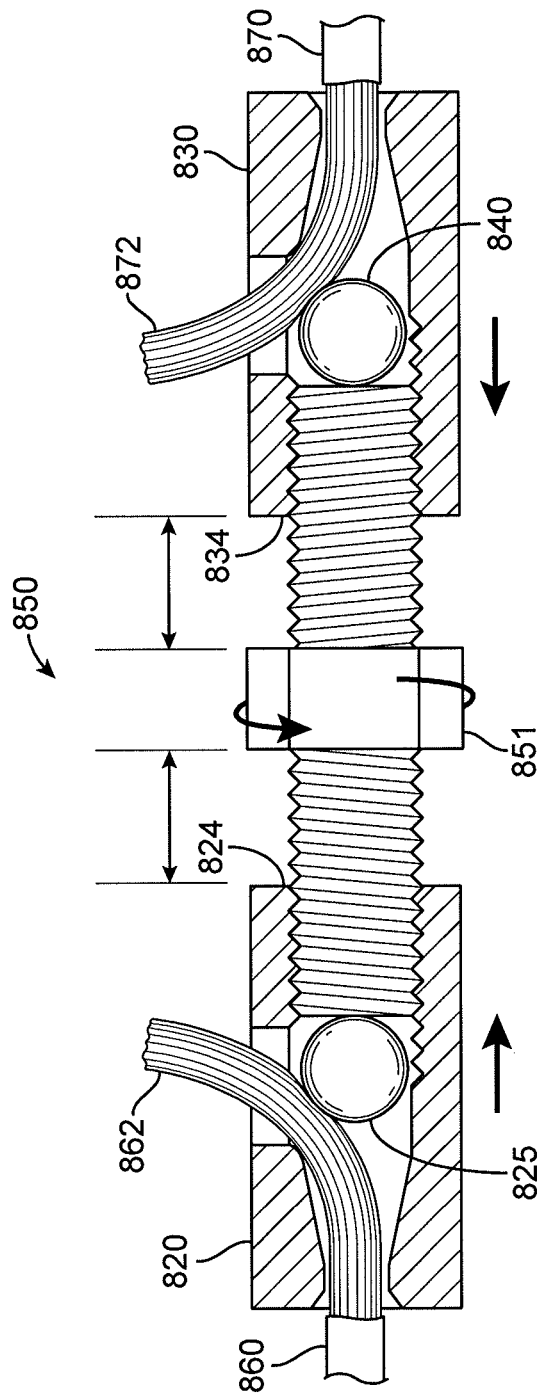
Figure 23D:
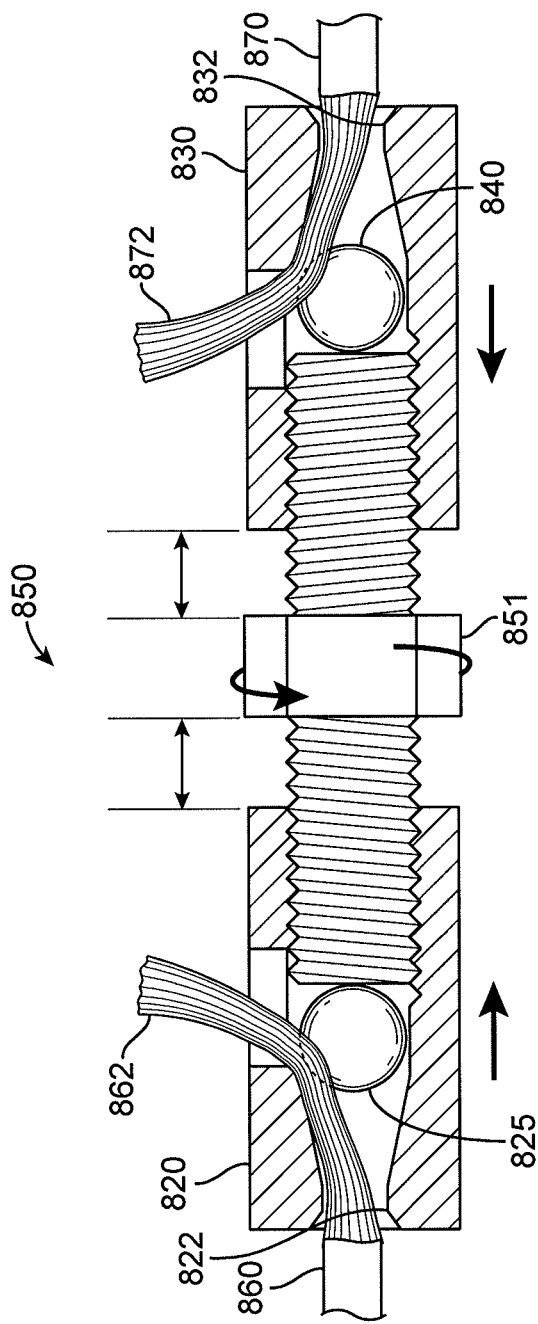

FIGS. 23b-23d illustrate additional views of the locking assemblies 820 and 830 as they are secured to stranded elements 860 and 870. FIG. 23b illustrates the drive shaft 850 with a nut 851 that can be used to turn the drive shaft 850. The locking assembly 820 includes a housing 821 that has the stranded element 860 within the receiving bore 822 of the locking assembly 820 with the locking element 825 in a locking bore 824 of the locking assembly 820. The ends of the wire strands 862 exit the internal volume of the locking assembly 820 through aperture 826. The locking assembly 830 includes a housing 831 that has the stranded element 870 within the receiving bore 832 of the locking assembly 830 with the locking element 840 in a locking bore 834 of the locking assembly 830. The end of the wire strands 872 exit the internal volume of the locking assembly 830 through aperture 836.

FIG. 23c shows the ends of the drive shaft 850 within the locking bores 824, 834 of the locking assemblies 820, 830 and in contact with the locking elements 825, 840. The nut 851 can rotate to turn the drive shaft 850 such that both ends of the locking element 850 advance further into the locking bores 824, 834 of the locking assemblies 820, 830. As illustrated in FIGS. 23c-23d, turning the nut 851 twists the drive shaft 850 and pulls the locking assemblies 820, 830 towards the nut 851 such that the distance between the nut 851 and the locking assemblies 820, 830 decreases. FIG. 23c shows the locking element 825 in contact with the wire strands 862 and the locking element 840 in contact with the wire strands 872. FIG. 23d shows the locking assemblies 820, 830 after further tightening the nut 851 and advancing the ends of the drive shaft 850 ends further into the locking bores 824, 834 of the locking assemblies 820, 830 such that the locking elements 825, 840 are pressed harder against the wire strands 862, 872 and the internal walls of the receiving bores 822, 832 of locking assemblies 820, 830.

Figure 23E:
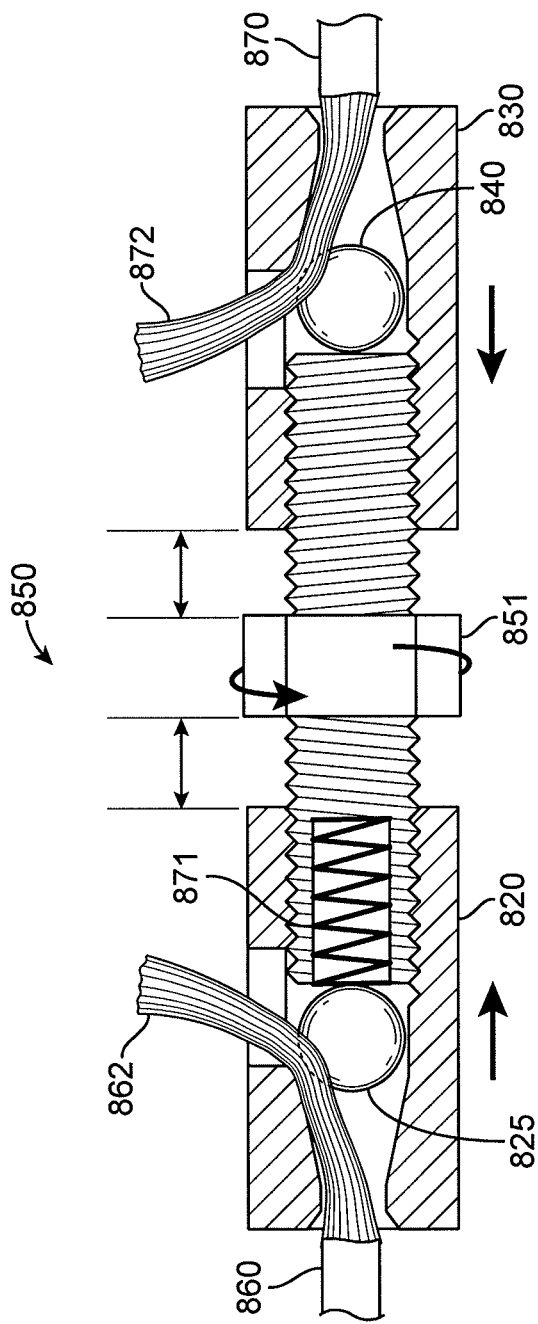

FIG. 23e illustrates a variation of the locking assemblies illustrated in FIGS. 23a-d with the locking assembly configured with a compressible element 871 between the drive shaft and locking element. The configuration illustrated in FIG. 23e can be useful in electrical applications to ensure contact between the stranded element, locking element, compressible element, and drive shaft should the drive shaft slide away or creep away from the stranded element.

Figure 23F:
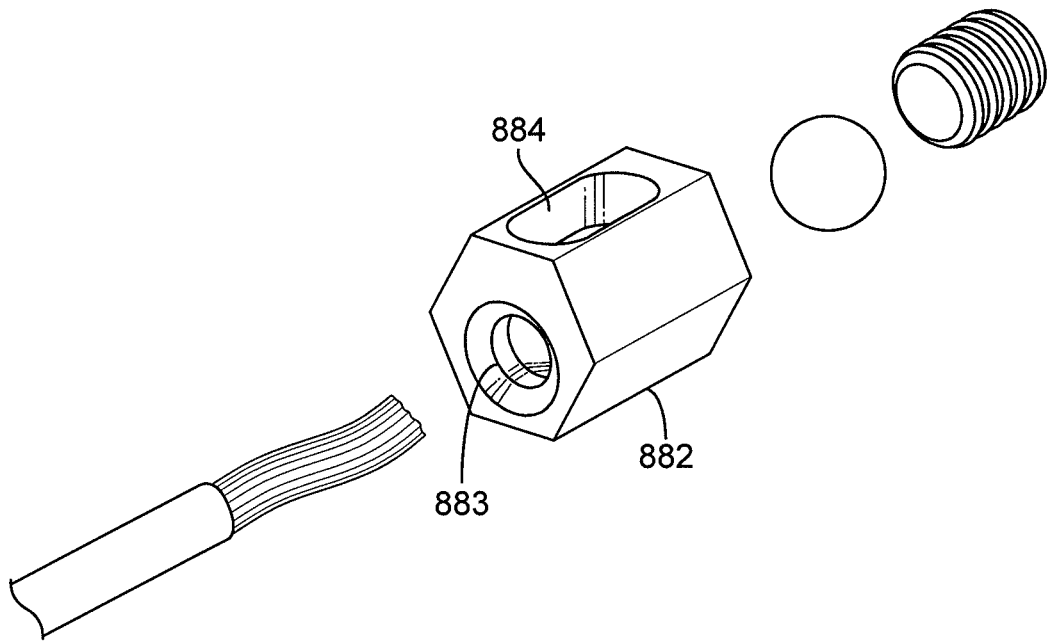
Figure 23G:
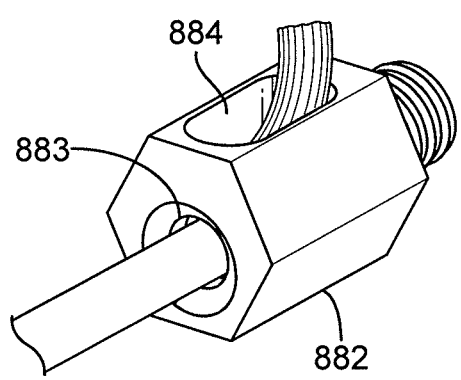
Figure 23H:
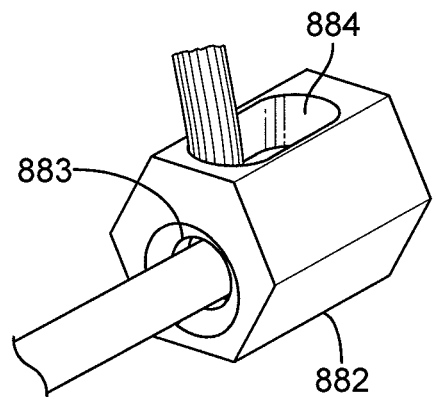
Figure 23I:
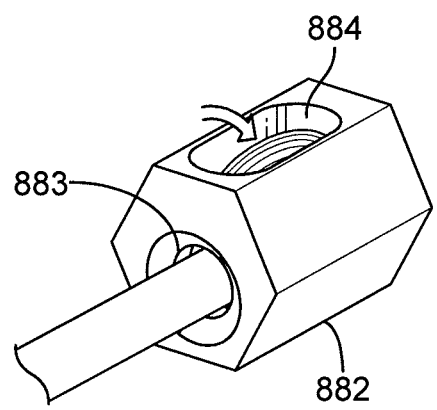
Figure 23J:
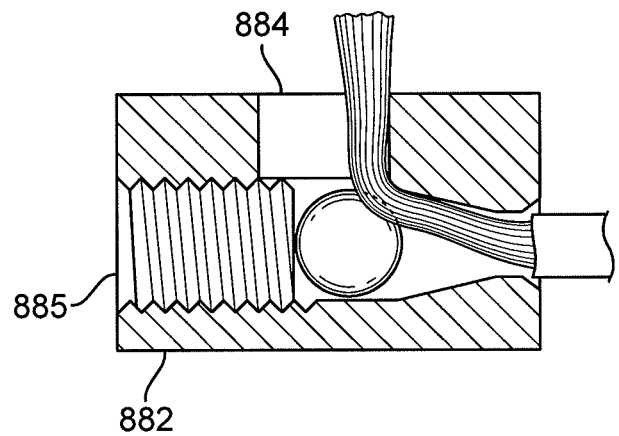
Figure 23K:
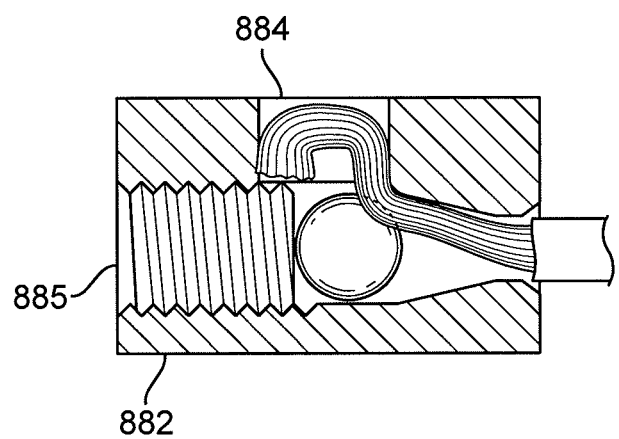

FIGS. 23f-23m illustrate additional embodiments of locking assemblies having an internal bore that is off center or offset from a longitudinal central axis. The internal bore can include the receiving bore and locking bore. FIG. 23f illustrates a locking assembly 882 having a receiving bore 883 and aperture 884. The receiving bore 883 forms part of an axial passage or bore within the locking assembly 882 that is off centered. The receiving bore 883 in FIG. 23f is located closer to a bottom wall of the locking assembly 882 than the top of the locking assembly 882 that has the aperture 884. FIG. 23g shows the stranded element entering the locking assembly 882 through receiving bore 883 and exiting through the aperture 884. The locking element and drive shaft can be used to secure the wire to the locking assembly as shown in FIGS. 23f-i. After advancing the locking element to contact the wire and secure it to the locking assembly 882 the wire ends can be bent back down and wrapped or bent within the aperture 884 of the locking assembly 882. FIGS. 23j-23k illustrate cross sectional views of FIGS. 23h-23i, respectively. FIGS. 23j-23k illustrate the drive shaft and locking element advanced into locking bore 885. The wire ends are bent into the aperture 884. An insulating cover can be wrapped around the locking assemblies to insulate the stranded elements.

Figure 23L:
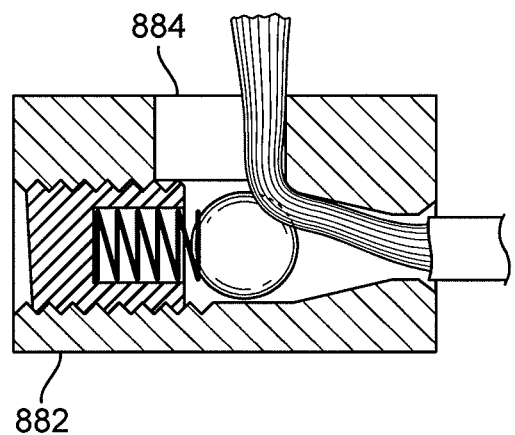
Figure 23M:
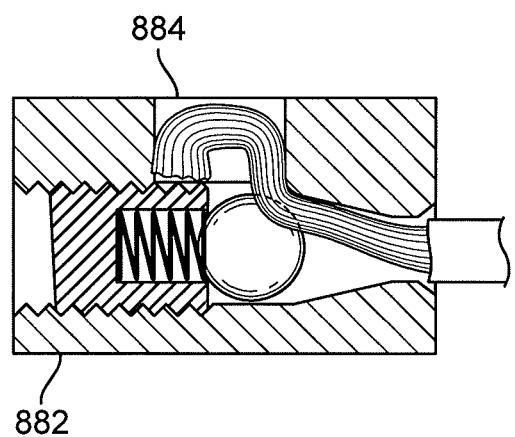

FIGS. 23l-23m illustrate an embodiment of the locking assembly 882 including a spring. The drive shaft provides the primary force to secure the locking element against the stranded element. The spring can hold the locking element in contact with the wire should the drive shaft creep or migrate during use. The spring can be particularly useful for maintaining electrical connections.

Figure 25:
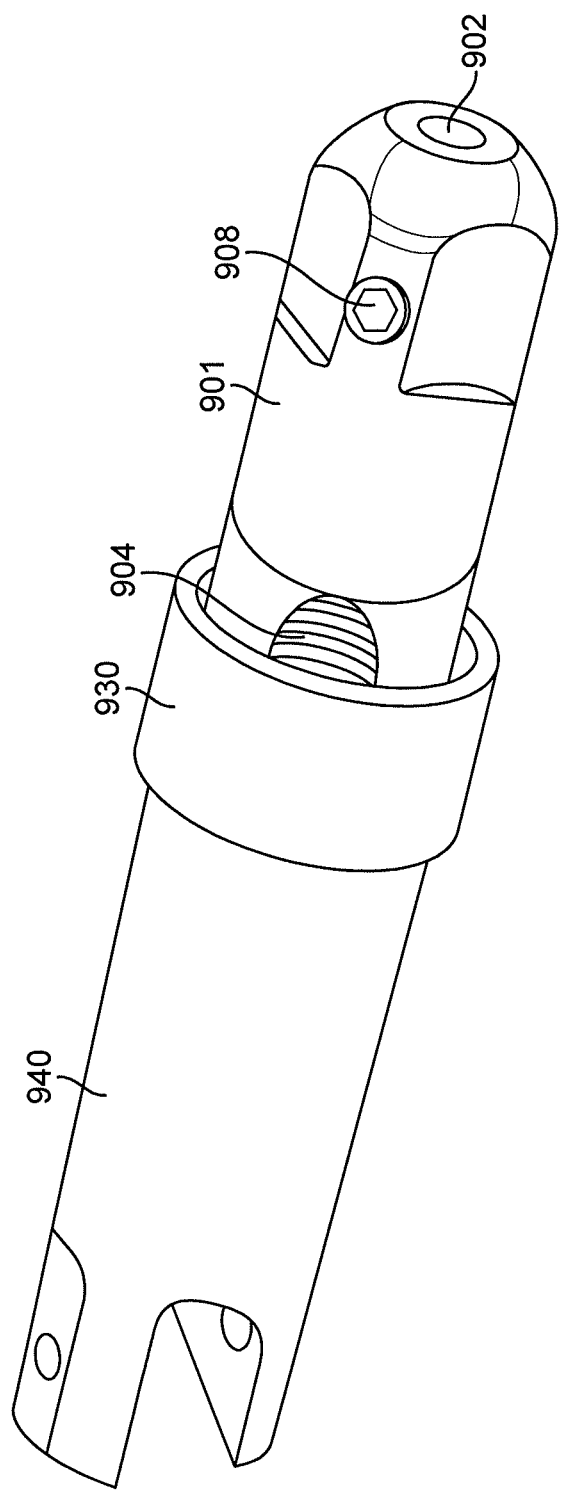
FIG. 25 is an assembled view of the locking assembly illustrated in FIG. 24.
Figure 26A:
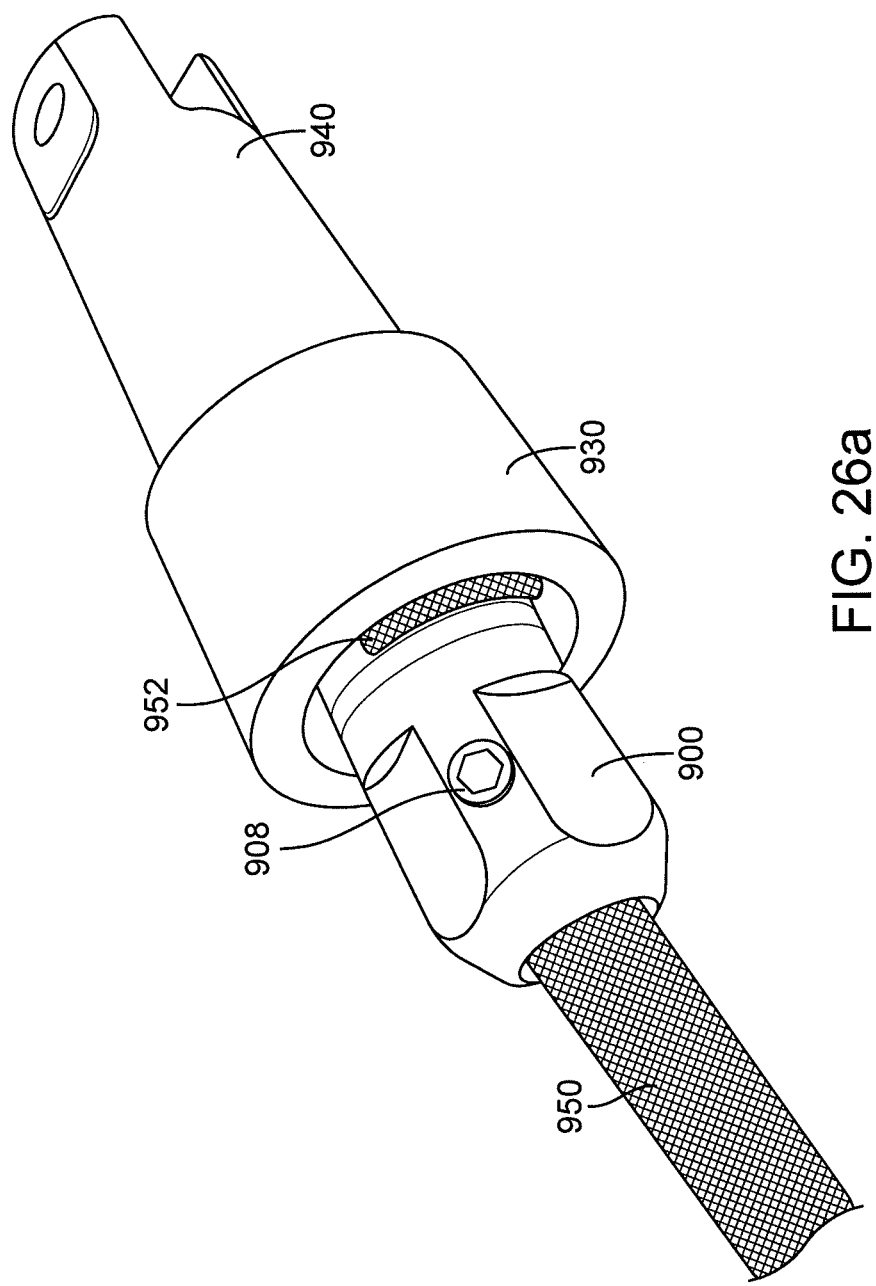

A locking collar and/or locking ring mechanism can be used in some embodiments to provide additional grip strength and to cover the ends of the stranded element adjacent to the housing aperture. In FIGS. 24-26e, a locking assembly having a locking collar and a locking ring mechanism is illustrated in accordance with some embodiments. Specifically, FIG. 24 illustrates an unassembled view of a locking assembly 900 and locking collar 930. FIG. 25 illustrates an assembled view of the locking assembly 900. FIG. 26a illustrates a stranded element coupled to the locking assembly 900. FIGS. 26b-e illustrates cross-sectional views of the locking assembly. A locking assembly 900 can also be coupled to an attachment connector 940. The locking assembly 900 can be substantially similar to previously described locking assemblies with a housing 901 having a receiving bore 902, aperture 904 and locking bore 906. The stranded element 950 can be inserted into locking assembly 900 via receiving bore 902 and pulled through aperture 904. The locking assembly 900 includes a stabilizing bore 908. In some configurations a stranded element can be pushed back out of receiving bore 908 when a locking element 920 is inserted and subsequently tightened. After inserting the stranded element into the receiving bore 902, the stranded element can be held in place via an auxiliary drive shaft tightened via stabilizing bore 908. Once the auxiliary drive shaft is tightened to hold the stranded element 950 in position, the locking element 920 can then be inserted into locking assembly 900 via locking bore 906. The locking element 920 can then be advanced to push against an underside of the stranded element 950 with increasing force as drive shaft 910 is tightened to advance with locking assembly 900 via locking bore 906.

Once the stranded element 950 is sufficiently tightened onto locking assembly 900, a locking collar 930 and attachment connector 940 can mate with the locking assembly 900 as shown. For example, the locking ring 930 and connector 940 can be advanced over threading on the locking assembly 900 as shown. The illustrated locking collar 930 has a smooth inner surface. In some embodiments the locking collar can have an inner threaded portion configured to engage with a threaded portion of the housing. As the locking collar 930 is tightened onto locking assembly 900 (i.e., towards stranded element 950), locking collar 930 slides across aperture 904, which causes locking collar 930 to fold the excess portion of stranded element 950 protruding out from aperture 904 back towards the stranded element 950 entrance into the receiving bore 902. Locking collar 930 thus covers the excess portion of the stranded element 950 protruding through aperture 904. The locking collar 930 can also provide additional gripping power by pulling the excess portion 952 of the stranded element 950 further back, such as by screwing locking collar 930 tighter towards the entrance to receiving bore 902. The attachment connector 940 can be secured to the locking assembly 900 via the threading on the locking assembly.

Figure 26B:
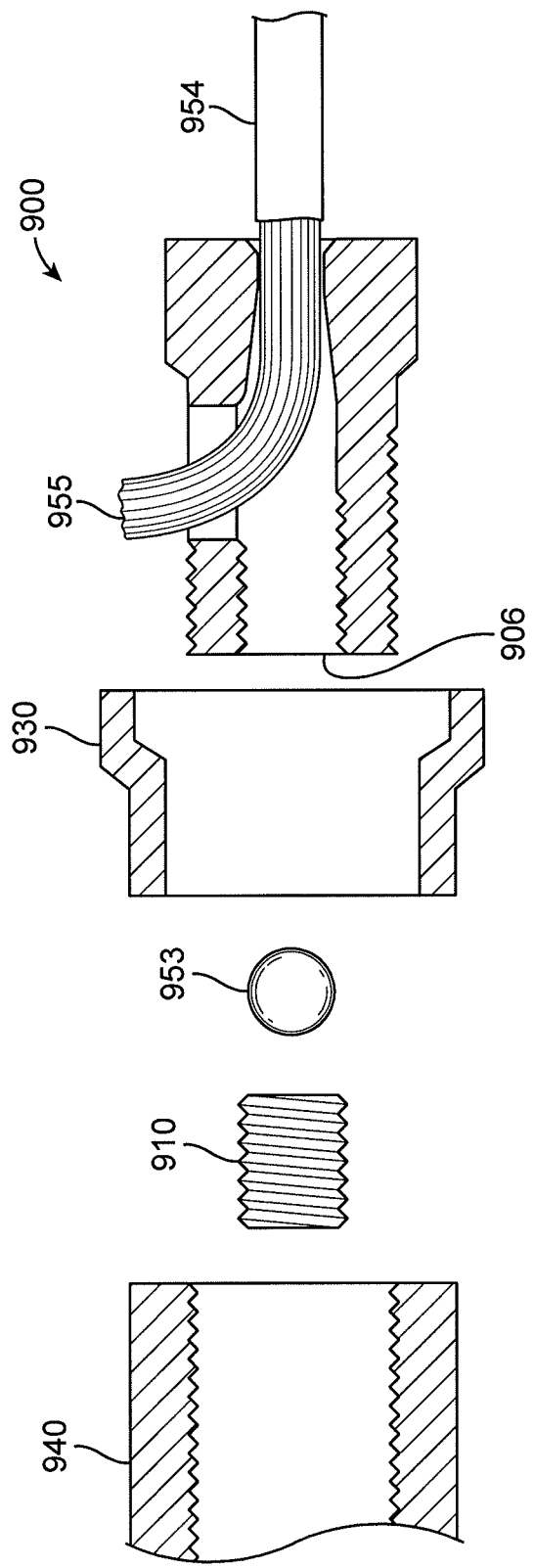
Figure 26C:
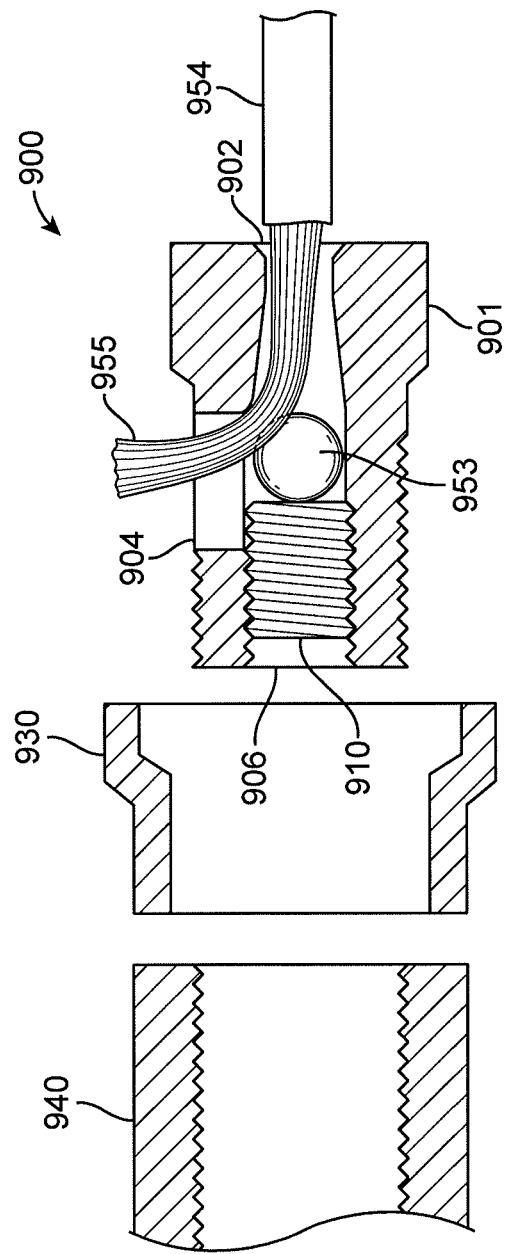
Figure 26D:
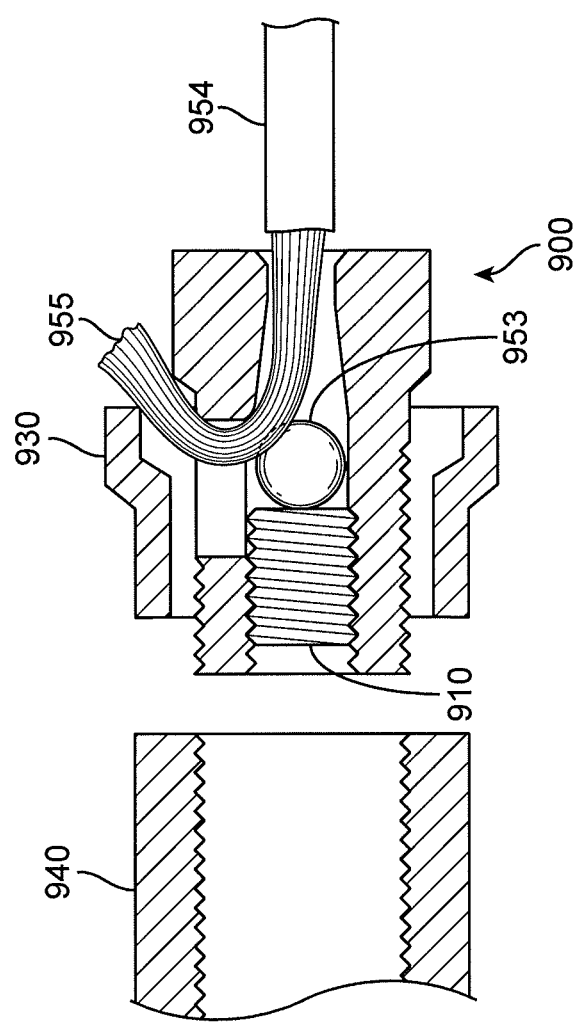
Figure 27A:
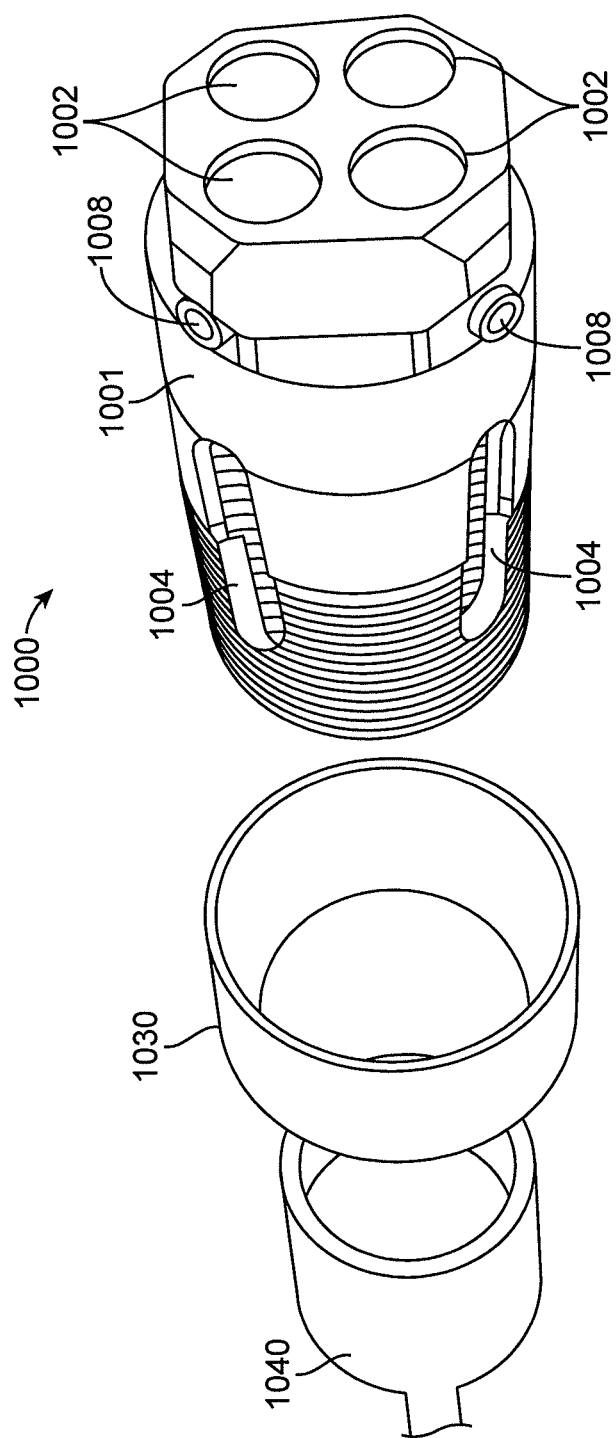
FIGS. 27a-27f illustrate various views of a multi-element locking assembly having a locking ring in accordance with some embodiments.
Figure 27B:
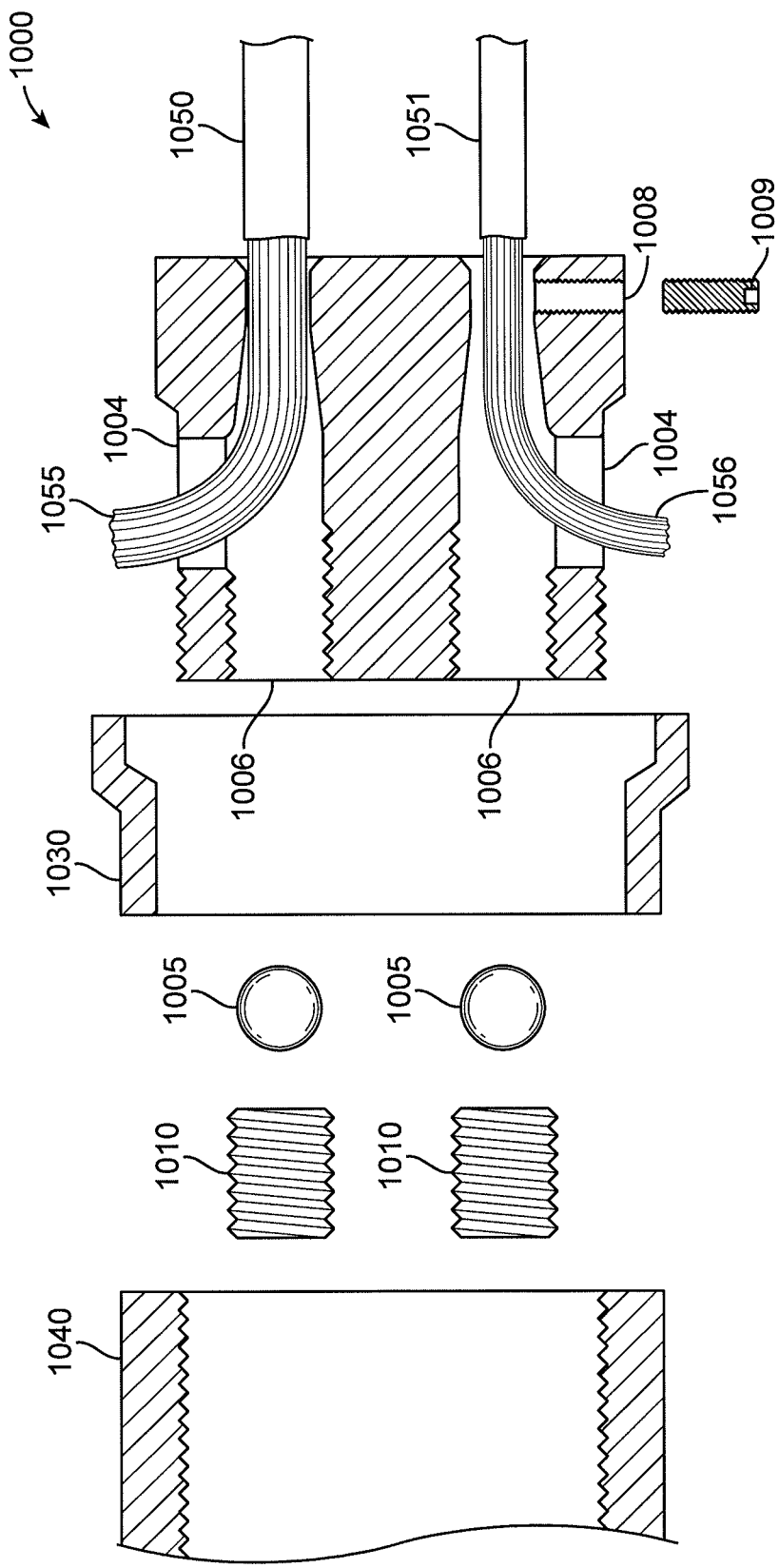
Figure 27C:
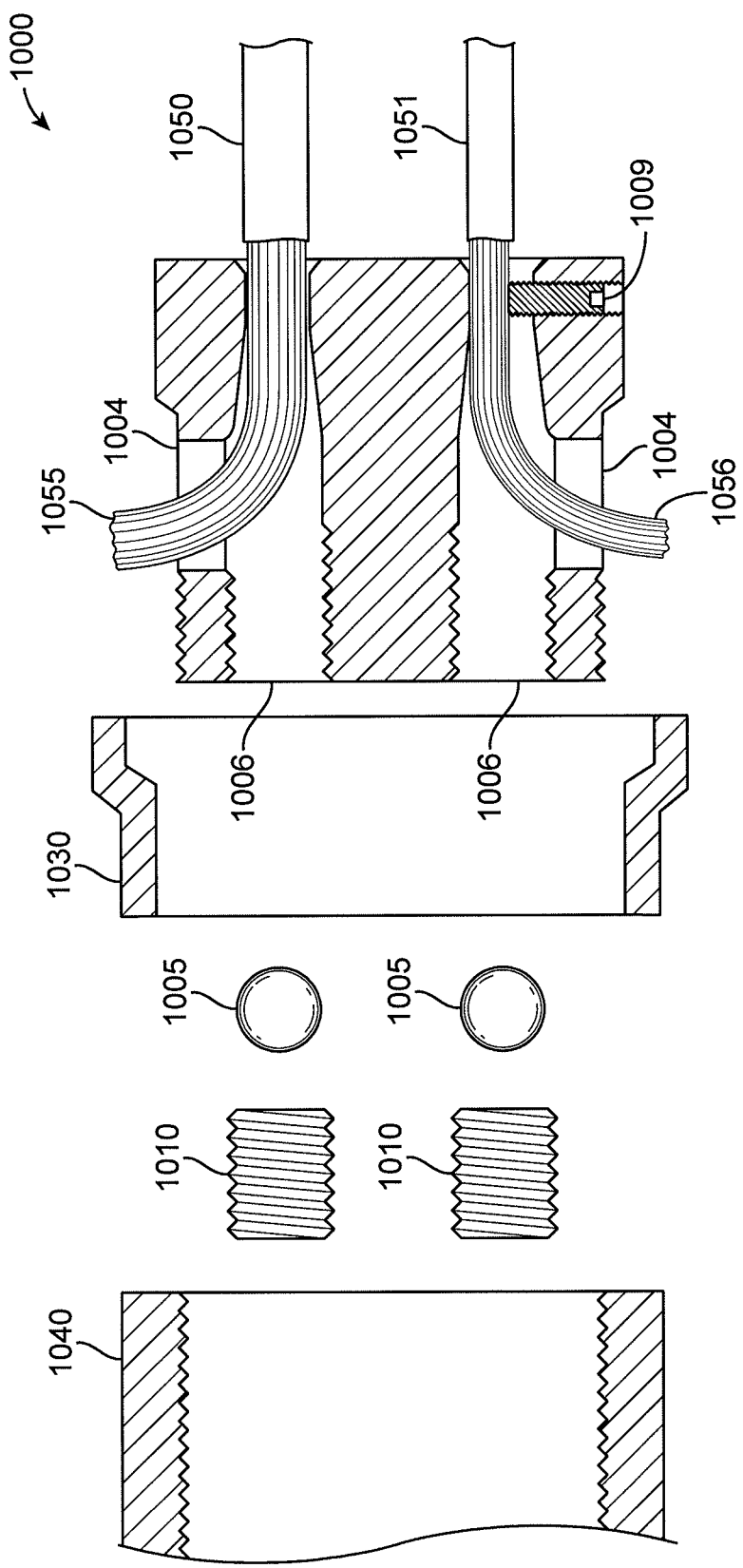
Figure 27D:
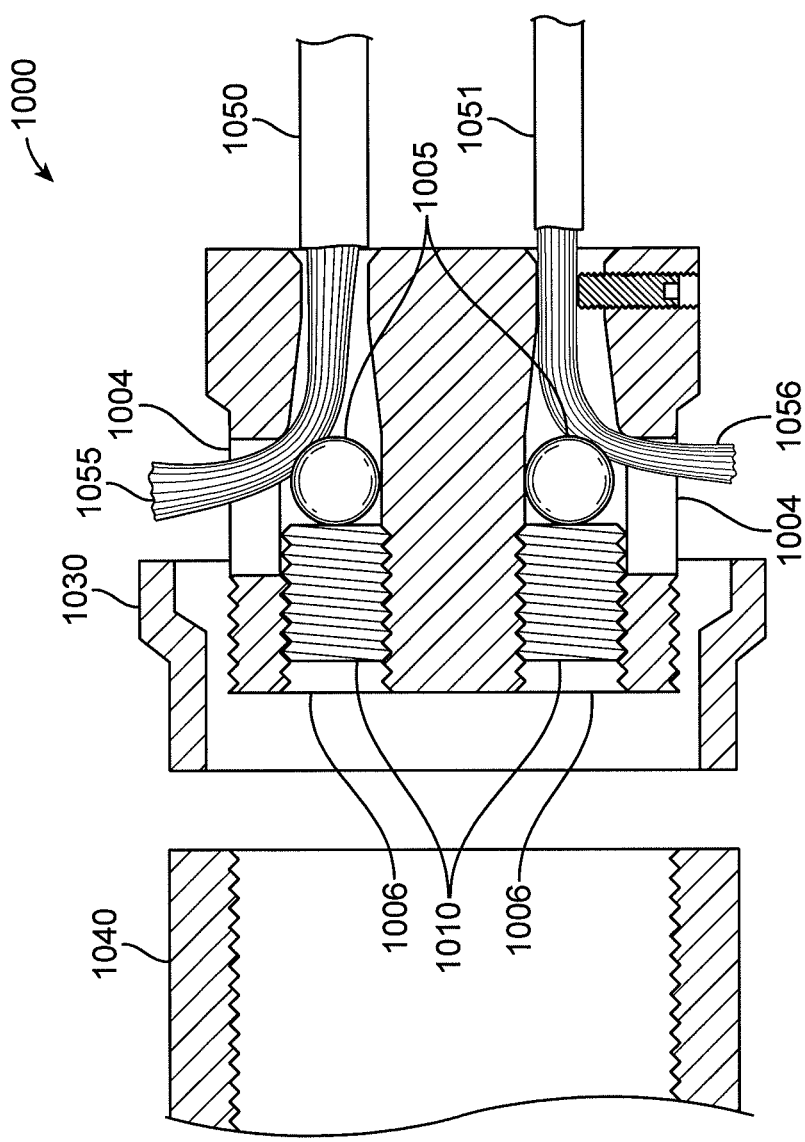
Figure 27E:
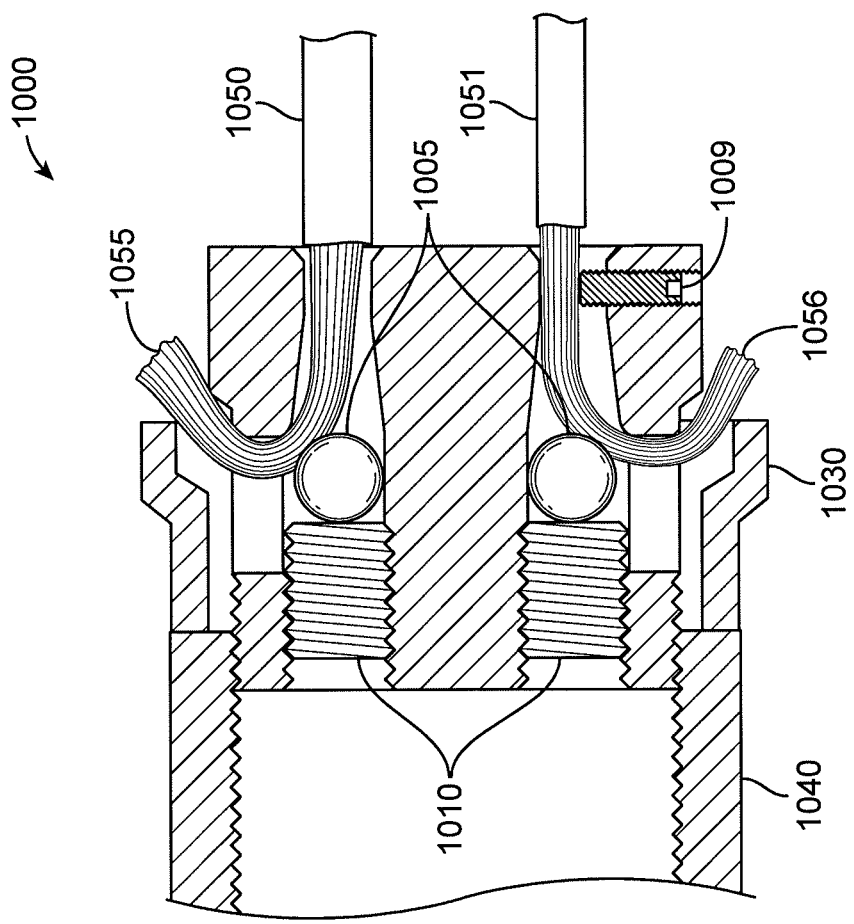
Figure 27F:
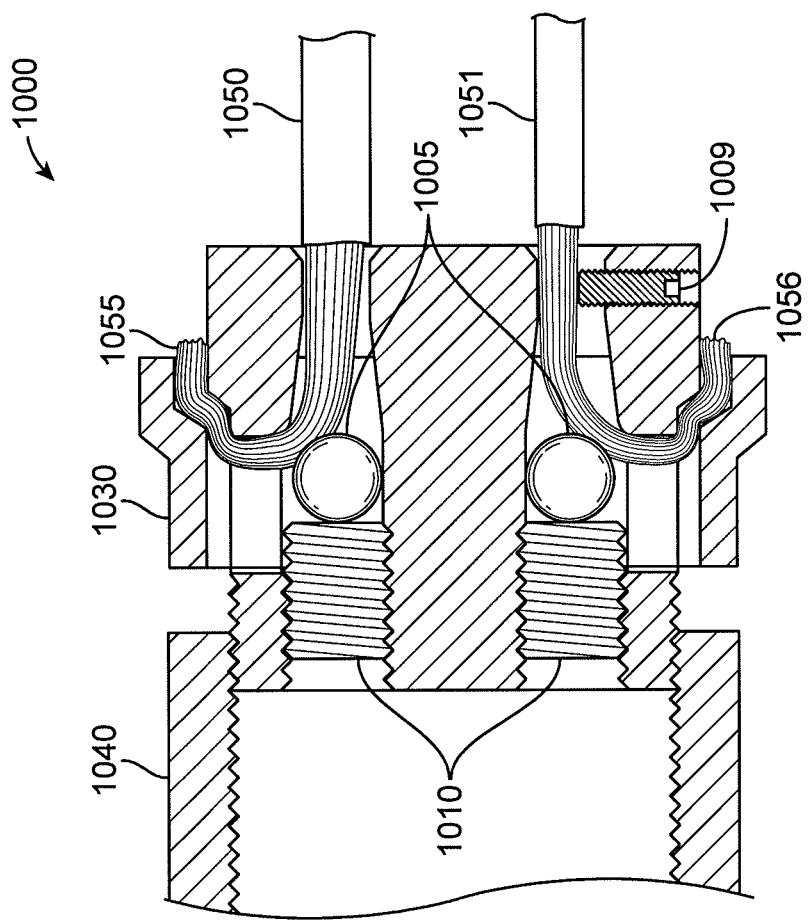

FIGS. 26b-26e illustrate cross-sections of the locking assembly 900 as it is engaged with a stranded element 954. FIG. 26b is a cross-sectional view of the locking assembly 900, drive shaft 910, locking element 953, locking ring 930, attachment connector 940, and stranded element 954 with stranded element ends 955. The stranded element 954 enters the locking assembly 900 through receiving bore 902. The receiving bore 902 adjacent to the opening is initially tapered and then widens towards the internal area of the assembly and the locking bore 906. The stranded element 954 exits through aperture 904. FIG. 26*c* illustrates the drive shaft 910 advanced into the locking assembly 900 through locking bore 906 and pushing the locking element 953 against the wire 954. FIG. 26*d* illustrates the locking ring 930 advanced over the locking assembly 900. The locking ring 930 has a flared portion that can be configured to complement a flared structure on the locking assembly 900. In some embodiments the flared structure of the locking ring 930 is configured to directly contact the complementary flared structure on the locking assembly 900. In some embodiments the flared structure of the locking ring 930 is configured to engage with and secure the stranded element ends 955 in a space between the flared structure of the locking ring 930 and the complementary flared structure of the locking assembly 900.

Figure 44A:
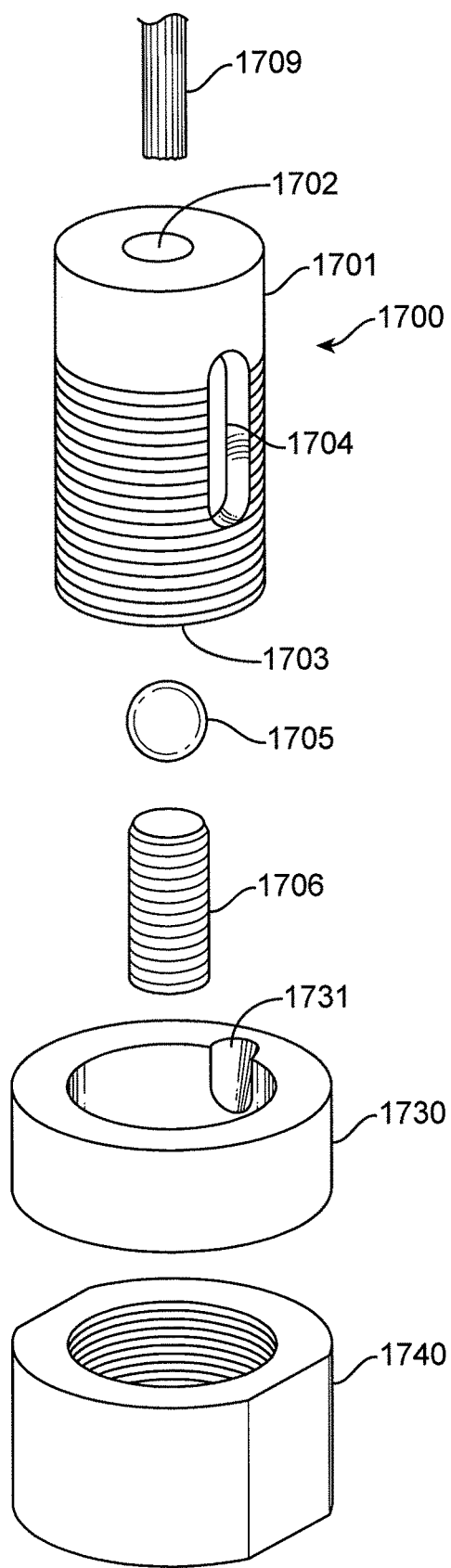
FIGS. 44a-44d illustrate a locking assembly in accordance with some embodiments.

FIG. 26*e* illustrates the locking ring 930 and connector 940 advanced over the locking assembly 900. The locking element 953 is advanced to contact the stranded element 954 with the stranded element 955 exiting the locking assembly 900 through aperture 904. The locking ring 930 is advanced over the locking assembly 900 and contacts the stranded element ends 955 such that the stranded element ends 955 are sandwiched between the locking ring 930 and locking assembly 900 forming a space 956 between the locking ring 930 and locking assembly 900. In some embodiments the stranded element ends 955 can fit within the aperture 904 with the locking ring 930 engaged with the locking assembly 900. FIG. 26B-B illustrates a cross section of a portion of FIG. 26*e*. FIG. 26B-B shows the stranded element 954 in the center of the cross-section of the assembled device surrounded by the locking assembly 900. The wires 954 exit the locking assembly 900 through space 956. The locking ring 930 surrounds the space 956. In some embodiments the locking ring can include a space to receive the stranded element ends 955, as shown in the embodiment illustrated in FIG. 44*a*.

In some embodiments a locking assembly can include multiple receiving bores to receive multiple separate strands of a stranded element. Locking rings can be used with the locking assemblies having multiple receiving bores. In one application the locking assembly and locking ring can be implemented to accommodate multiple stranded elements for applications such as for use in a heavy duty hoist. FIGS. 27*a*-30 illustrate embodiments of locking assemblies having multiple receiving bores. Each of the receiving bores can be configured to receive one or more strands of the stranded element. The locking assemblies can be used with a locking ring. Specifically, various views of an unassembled locking assembly are provided in FIGS. 27*a*-29 in accordance with some embodiments. FIGS. 27*b*-27*f* illustrate cross-sections of the locking assembly 1000 as it is secured to a stranded element. An assembled view of the locking assembly is provided in FIG. 30.

A locking assembly 1000 can be coupled to an attachment connector 1040 and locking ring 1030 in some embodiments. The locking assembly 1000 is configured to receive multiple stranded elements in multiple separate receiving bores 1002. The locking assembly 1000 includes a housing 1001 with multiple receiving bores 1002, multiple apertures 1004, and multiple locking bores 1006. The multiple stranded elements can be accommodated by configuring the locking assembly 1000 to include multiple receiving bores 1002, multiple apertures 1004, and multiple locking bores 1006. Multiple locking elements 1004 and multiple drive shafts 1010 can be advanced in multiple locking bores 1006 to secure each of the multiple stranded elements as illustrated. The locking assembly 1000 can also include multiple stabilizing bores 1008 each configured to accommodate a drive shaft 1009. The stabilizing bores 1008 can be used to secure the stranded elements within each of the receiving bores 1002 prior to advancing the locking elements 1005 and drive shafts 1010.

For the embodiments illustrated in FIGS. 27*a*-30, four stranded elements are inserted into the locking assembly 1000 via receiving bores 1002 and pulled through apertures 1004. Each of the stranded elements can be secured prior to advancing the locking elements by advancing the drive shafts 1009 along each of the stabilizing bores 1008 to hold the stranded elements in place while advancing the locking elements. Each of the stranded elements, e.g. 1050 and 1051 illustrated in the cross-sections vies of FIGS. 27*b*-27*f* are held in place by the drive shafts 1009 while advancing the locking elements 1005 by advancing the drive shafts 1010 along the locking bores 1006. The drive shafts 1010 are advanced along the receiving bores 1006 such that the locking elements 1005 contacts the stranded ends 1055, 1056 of each of the stranded elements 1050, 1051. The drive shafts 1010 are advanced to tighten the locking element 1005 against the stranded element ends 1055, 1056 until the desired contact force is achieved as shown in FIGS. 27*b*-27*f*. The locking ring 1030 and attachment component 1040 can be advanced over the locking assembly after the stranded elements are secured as shown in FIGS. 27*d*-27*f*. The stranded element ends 1055, 1056 can be secured outside of the locking assembly between an outer wall of the locking assembly housing and the locking ring 1030 as illustrated in FIG. 27*f*.

Figure 28:
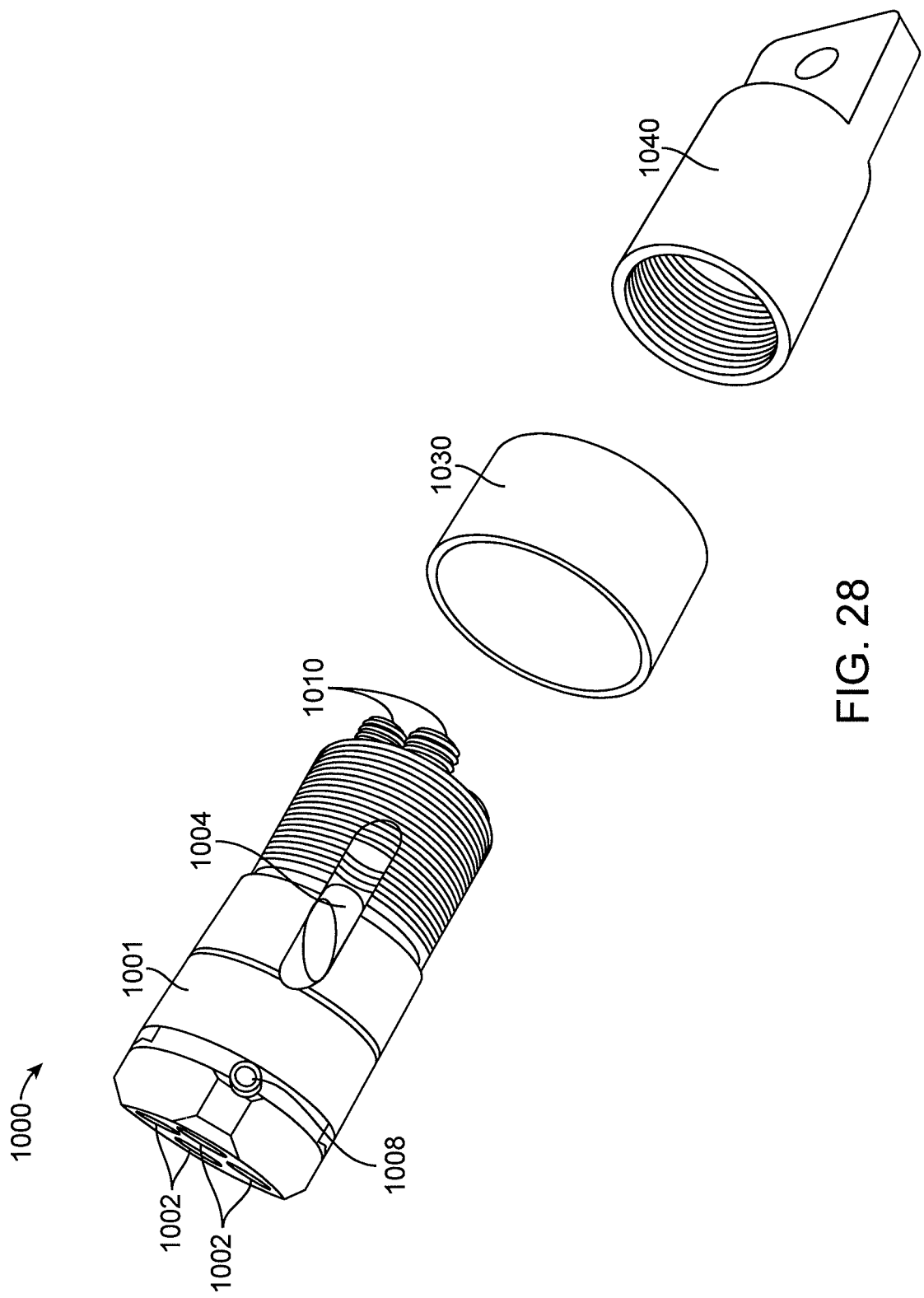
FIG. 28 is a second view of the exemplary multi-element locking assembly illustrated in FIG. 27.
Figure 29:
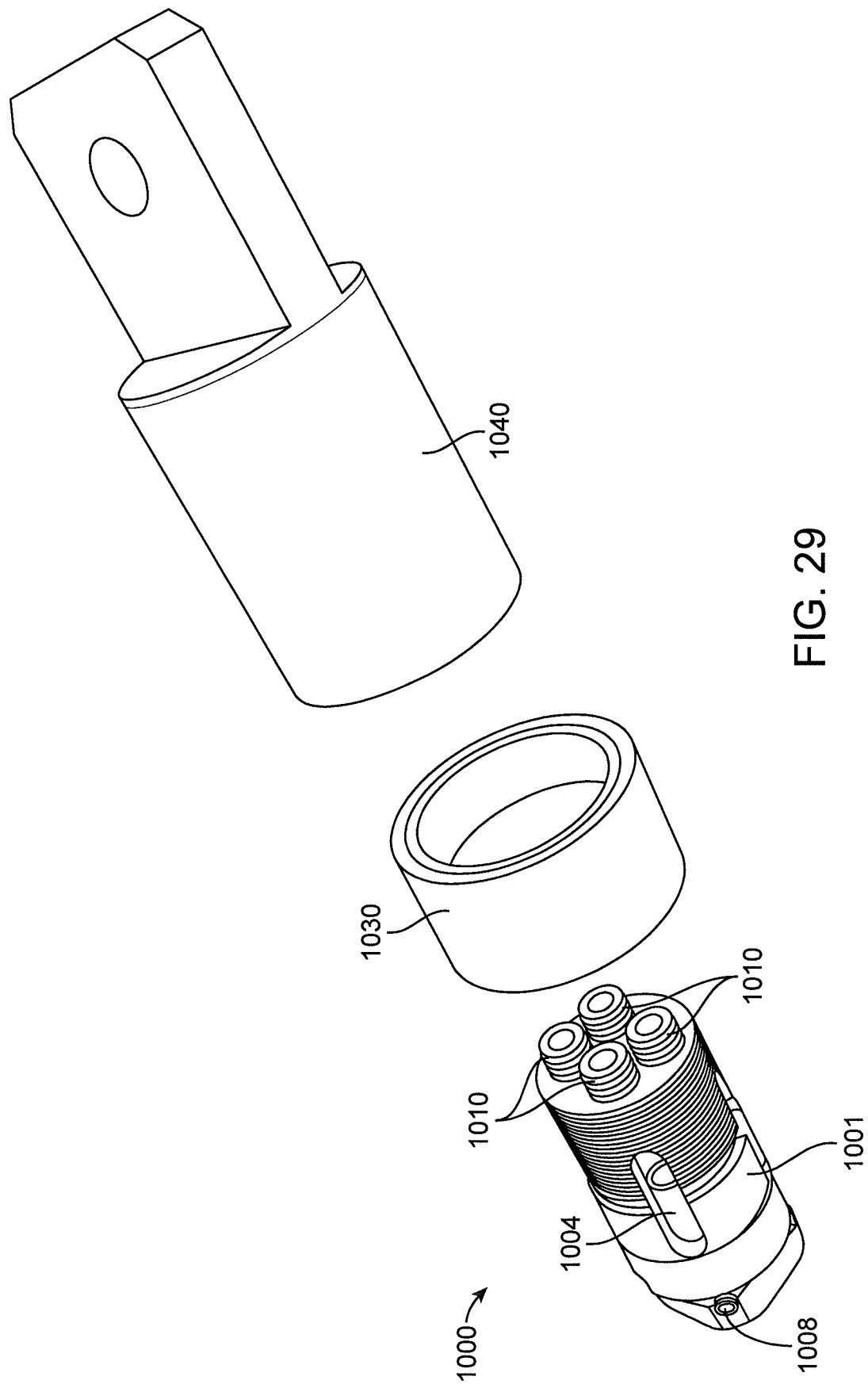
FIG. 29 is a third view of the exemplary multi-element locking assembly illustrated in FIG. 27.
Figure 30:
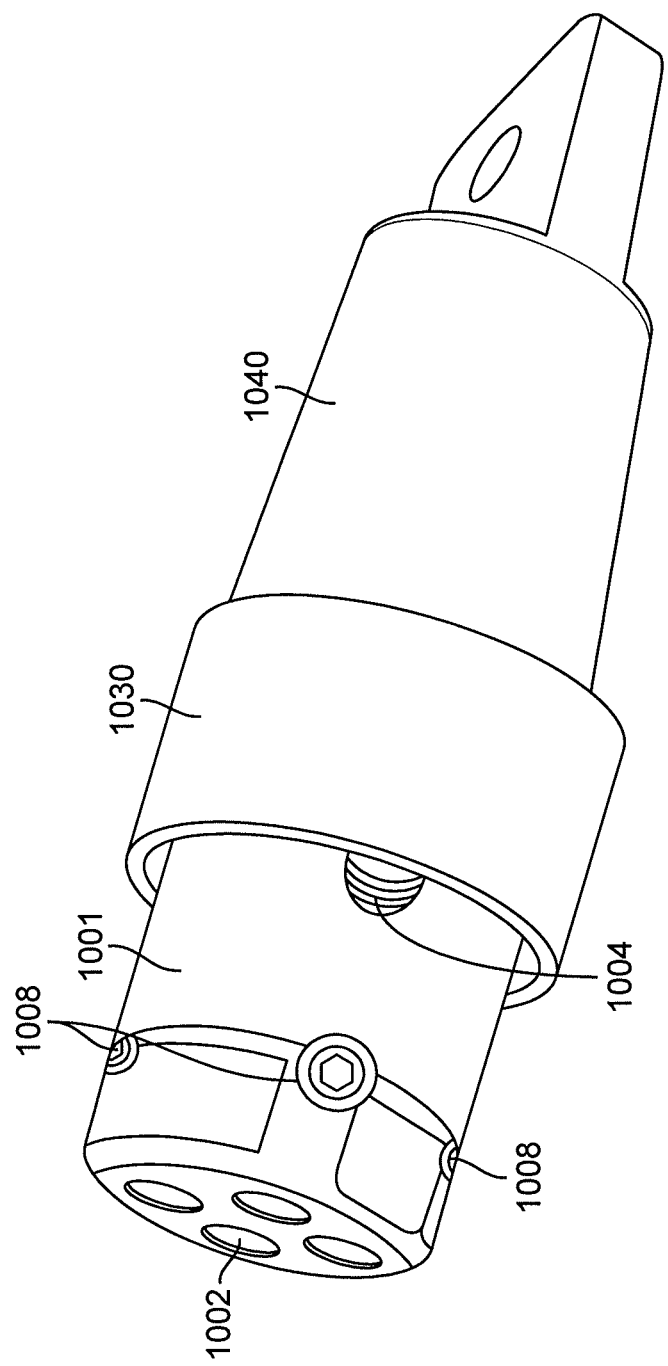
FIG. 30 is an assembled view of the exemplary multi-element locking assembly illustrated in FIG. 27.
Figure 31A:
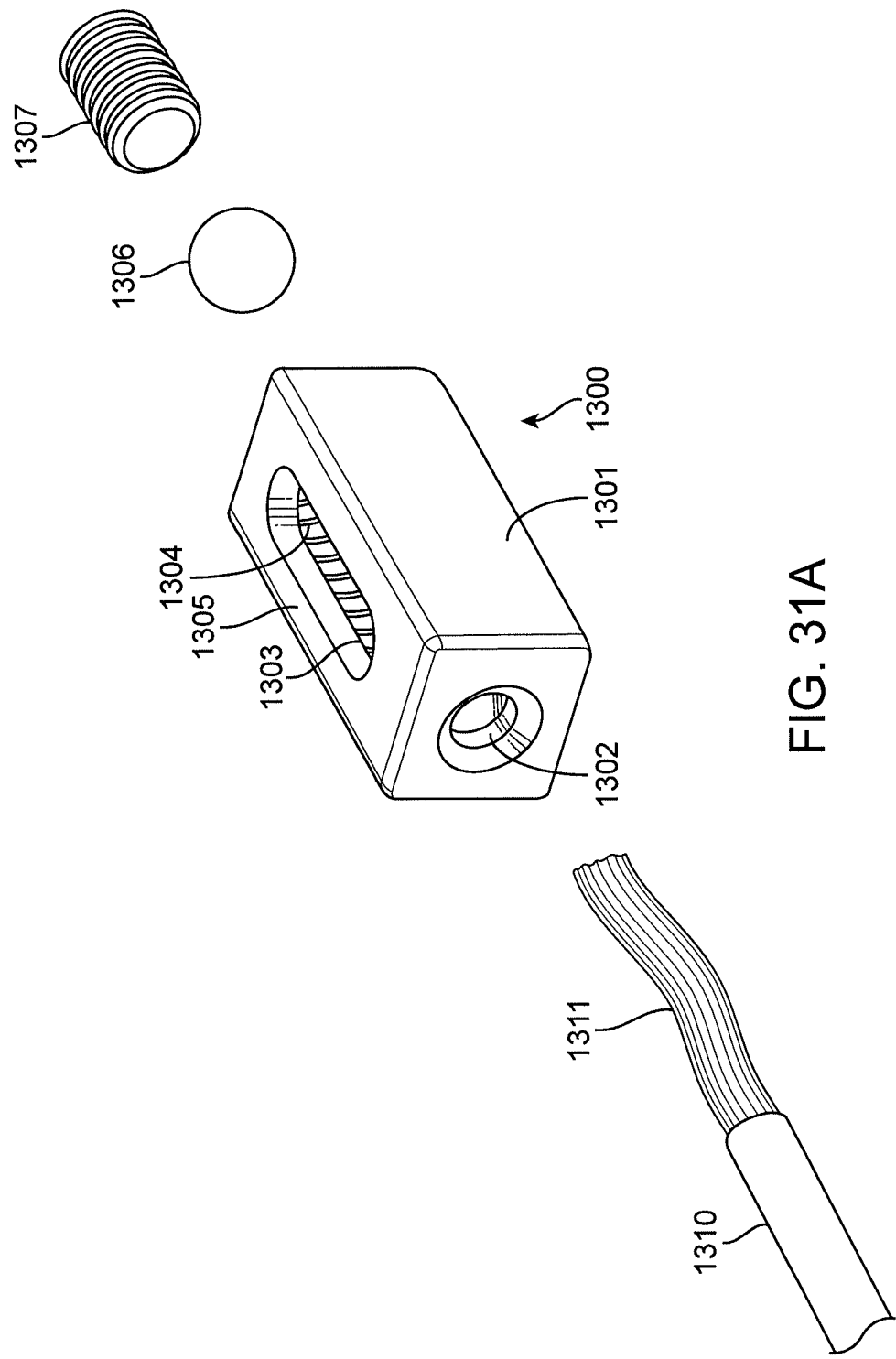
Figure 31E:
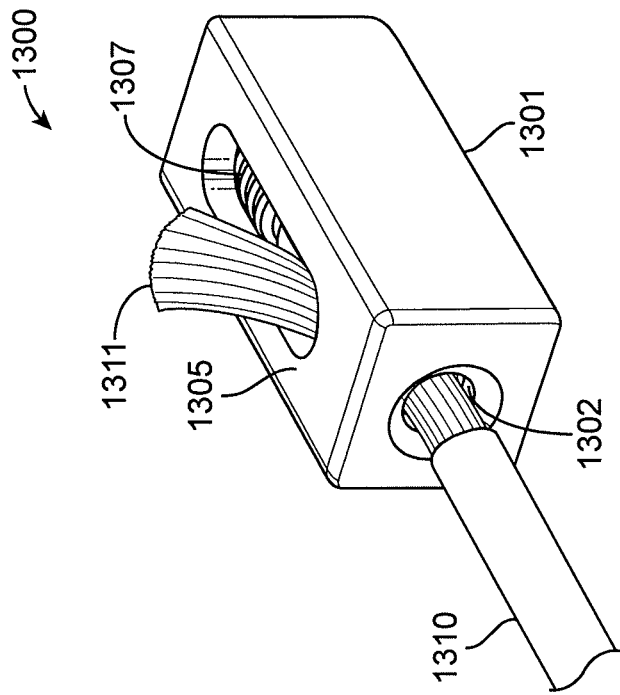
Figure 31D:
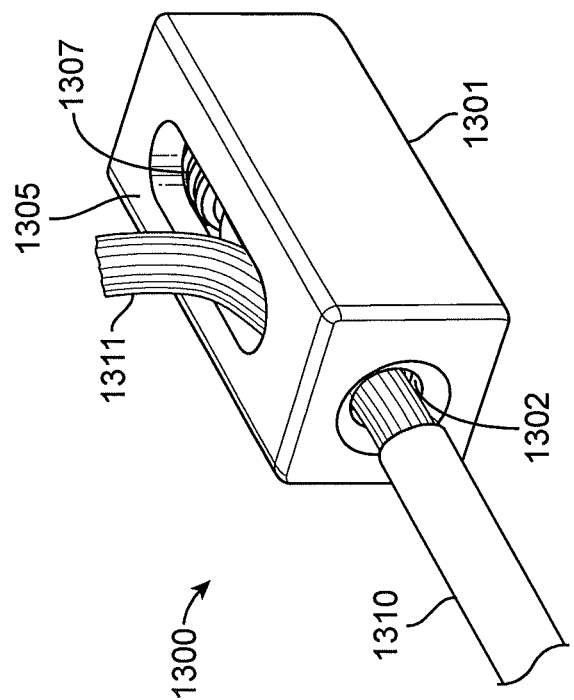

FIGS. 28 and 29 illustrate alternate views of the unassembled locking assembly 1000 with locking ring 1030 and attachment component 1040. FIG. 30 illustrates the locking assembly 1000 engaged with the locking ring 1030 and attachment component 1040 in a configuration that is not engaged with a stranded element.

Once each of the stranded elements are sufficiently tightened onto locking assembly 1000, locking ring 1030 and connector 1040 can mate with locking assembly 1000, as shown in FIG. 30. Similar to component 900, it should be noted that locking assembly 1000 can be configured to include threading, as shown, to facilitate a tightening of locking ring 1030 and connector 1040 onto locking assembly 1000. As locking ring 1030 is tightened onto locking assembly 1000 (i.e., towards the stranded element), locking ring 1030 slides across apertures 1004, which causes locking ring 1030 to fold the excess portion of each stranded element or lead respectively protruding out from apertures 1004 back towards receiving bore 1002. Locking ring 1030 thus covers the excess portion of each lead, and also provides additional gripping power by pulling the excess portion of each lead further back, e.g., by screwing locking ring 1030 tighter towards the entrance to the receiving bore 1002.

Figure 35A:
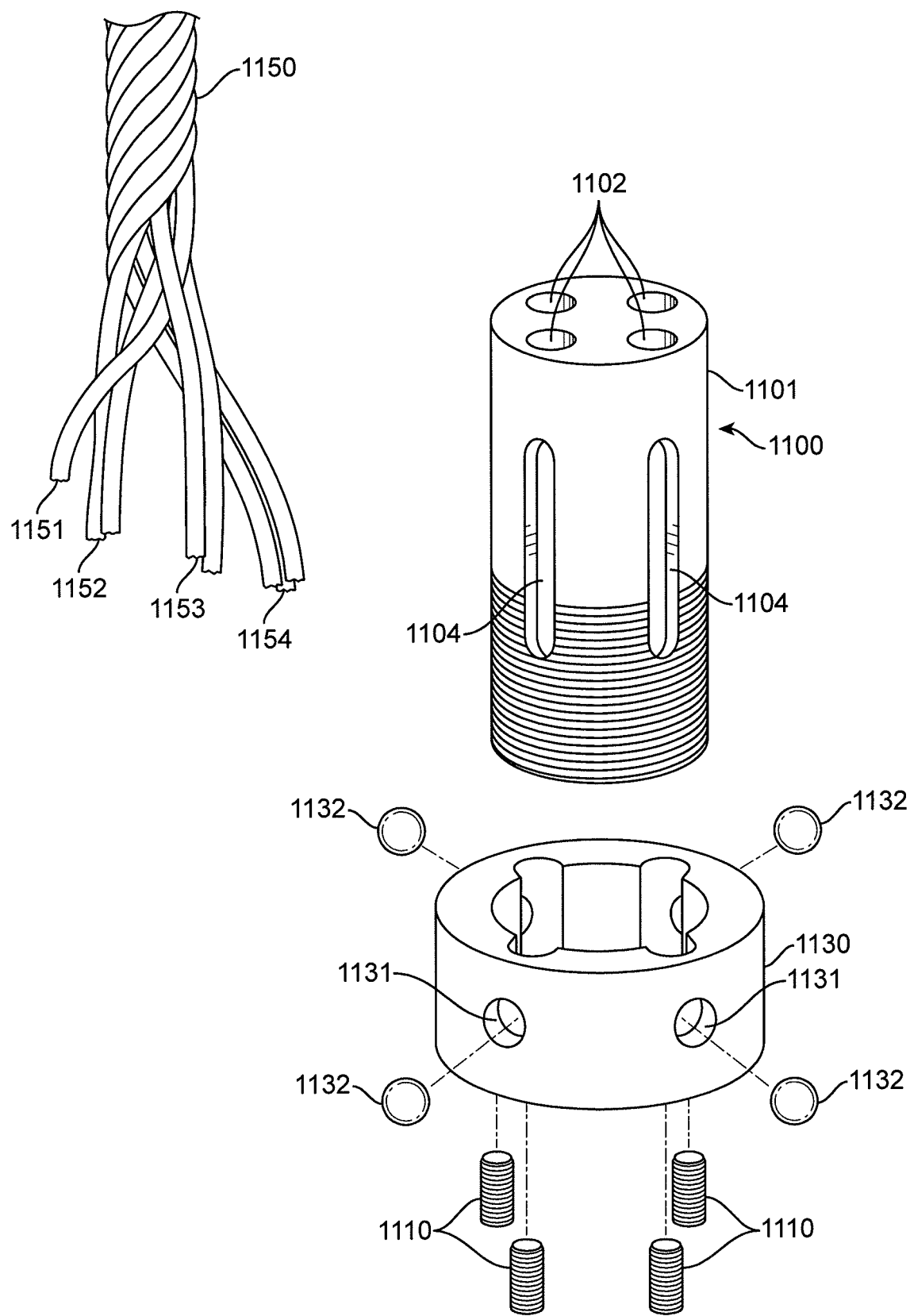
FIGS. 35a-35c illustrate a locking assembly configured to engage with multiple stranded elements in accordance with some embodiments.
Figure 35B:
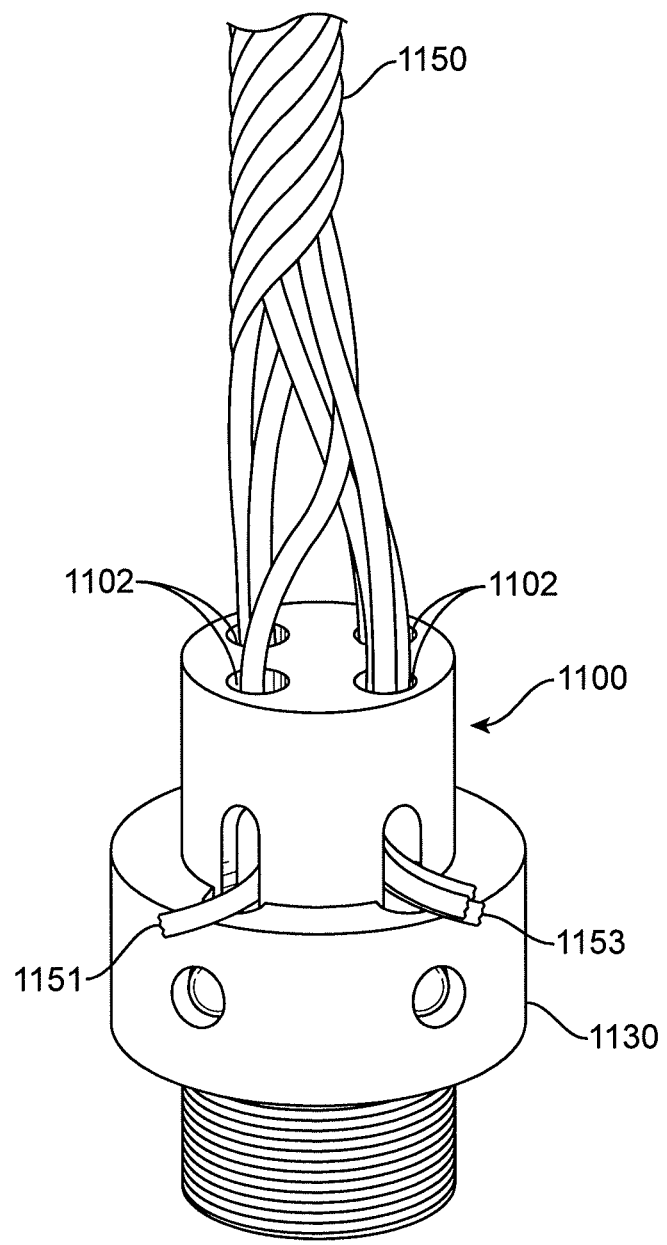
Figure 35C:
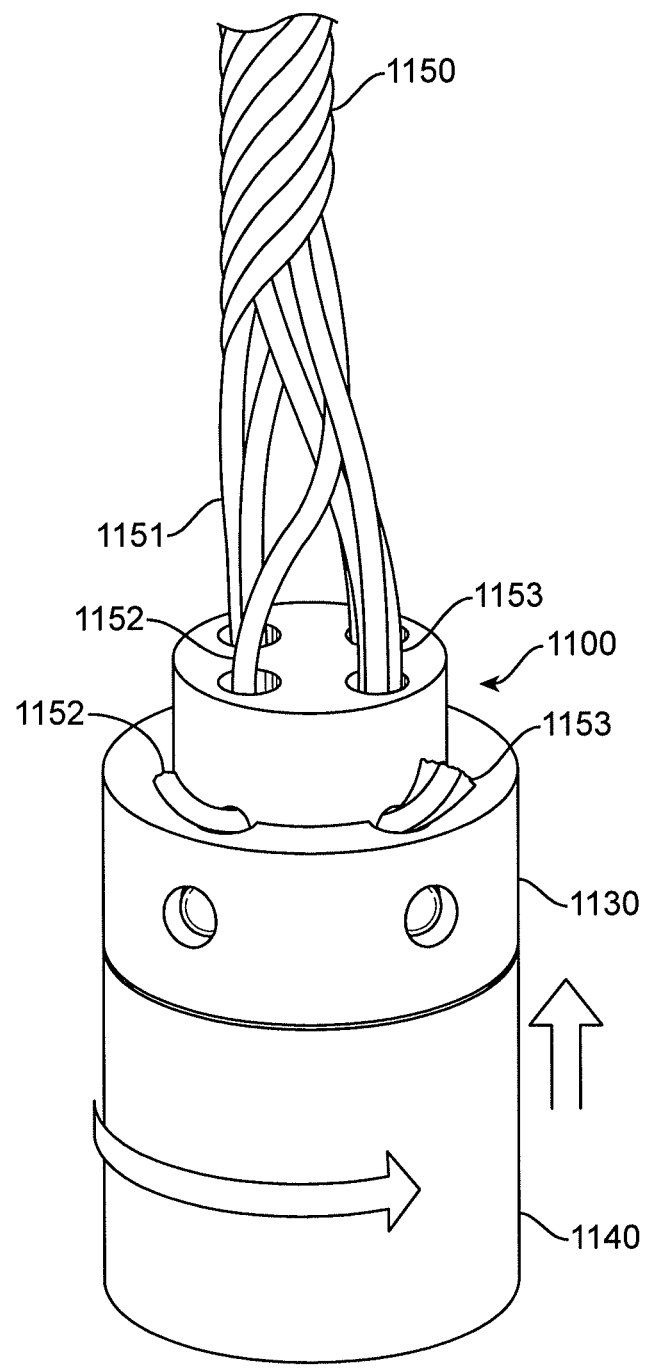

Additional embodiments of locking assemblies are illustrated in FIGS. 35*a*-35*c*, 36, 37, and 38. FIG. 35*a* illustrates a locking assembly 1100 having a housing 1101 with receiving bores 1102 and apertures 1104. A stranded element 1150 can be split into separate wire ends 1151, 1152, 1153, and 1154. A locking ring 1130 is also illustrated in FIG. 35*a*. The locking ring 1130 can include openings 1131 for receiving a locking element 1132. The separate wire strands 1151, 1152, 1153, and 1154 of the stranded element can be advanced into each of the receiving bores 1102 with the ends exiting the receiving bore 1102 and housing of the locking assembly 1100 through aperture 1104. Locking elements 1105 can be advanced into locking bores 1106 to contact the separate wire strands 1151, 1152, 1153, and 1154. The locking elements 1105 are advanced by the drive shafts 1110 in the receiving bore 1106 until the locking elements 1105 contact the stranded elements 1151, 1152, 1153, and 1154 with a sufficient force. The locking ring 1130 can be advanced over the locking assembly 1100 as illustrated in FIG. 35b. An attachment component 1140 can be advanced over the locking assembly after the locking ring 1130 has been advanced over the locking assembly 1100 as shown in FIG. 35c.

Figure 36A:
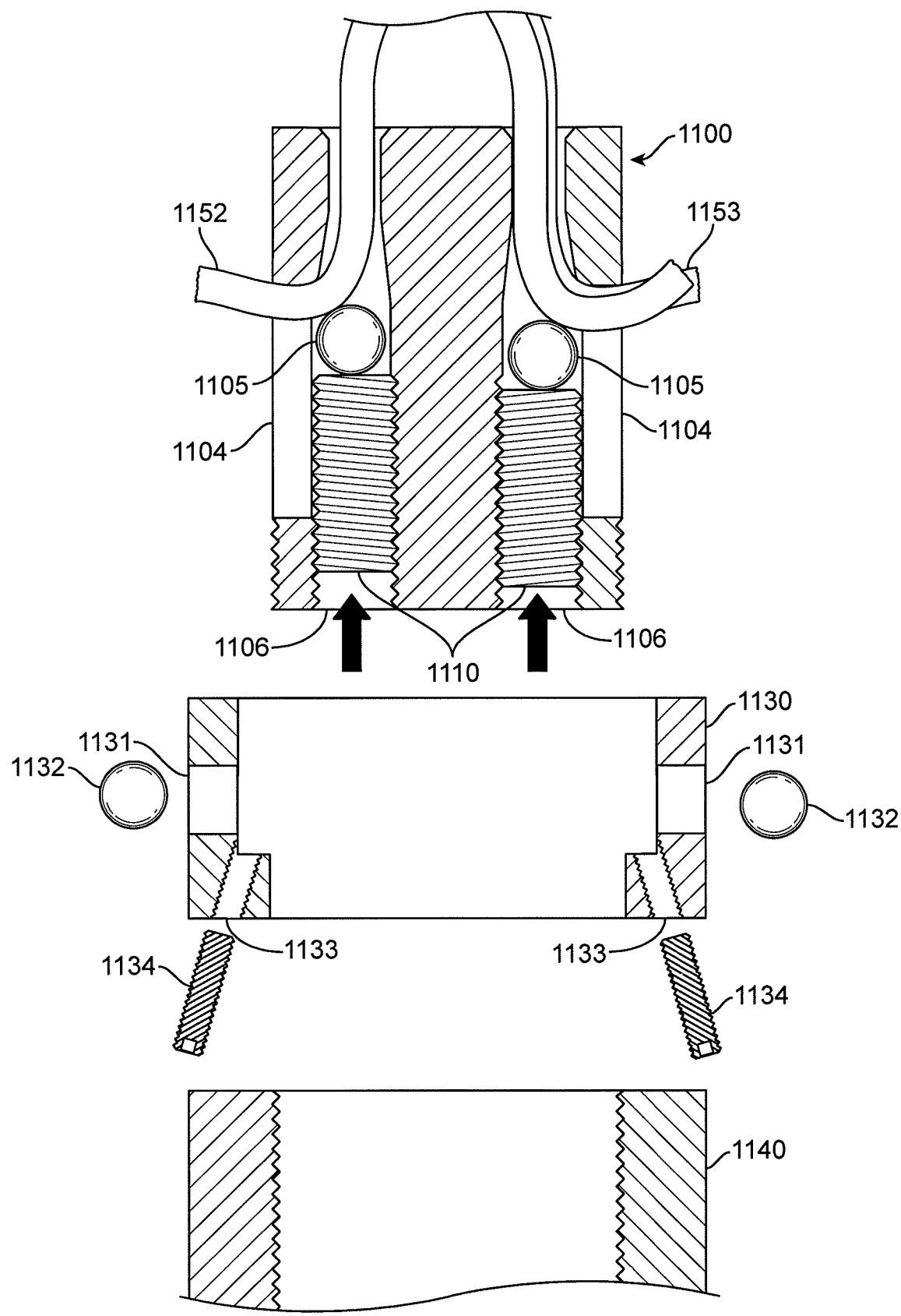
FIGS. 36a-36d illustrate a locking assembly configured to engage with multiple stranded elements in accordance with some embodiments.
Figure 36B:
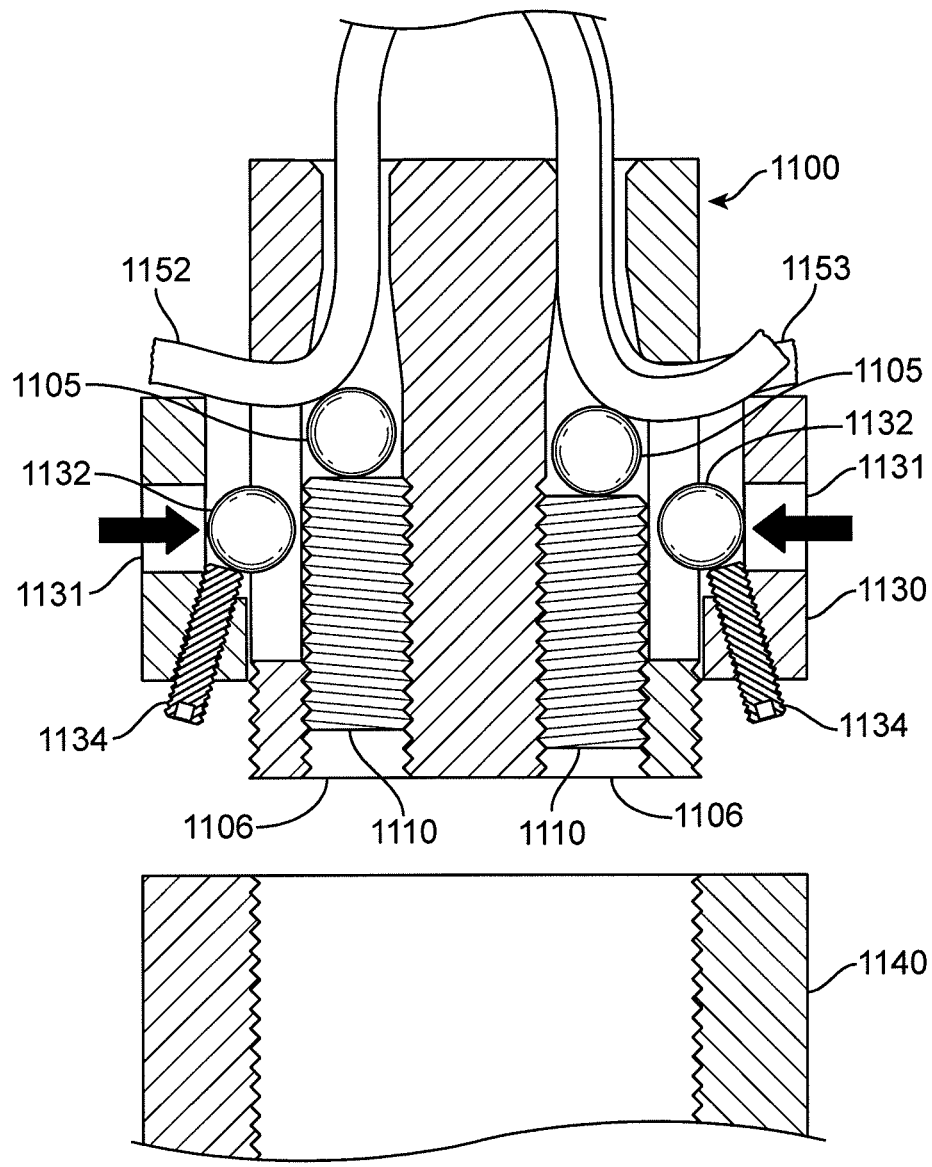
Figure 36C:
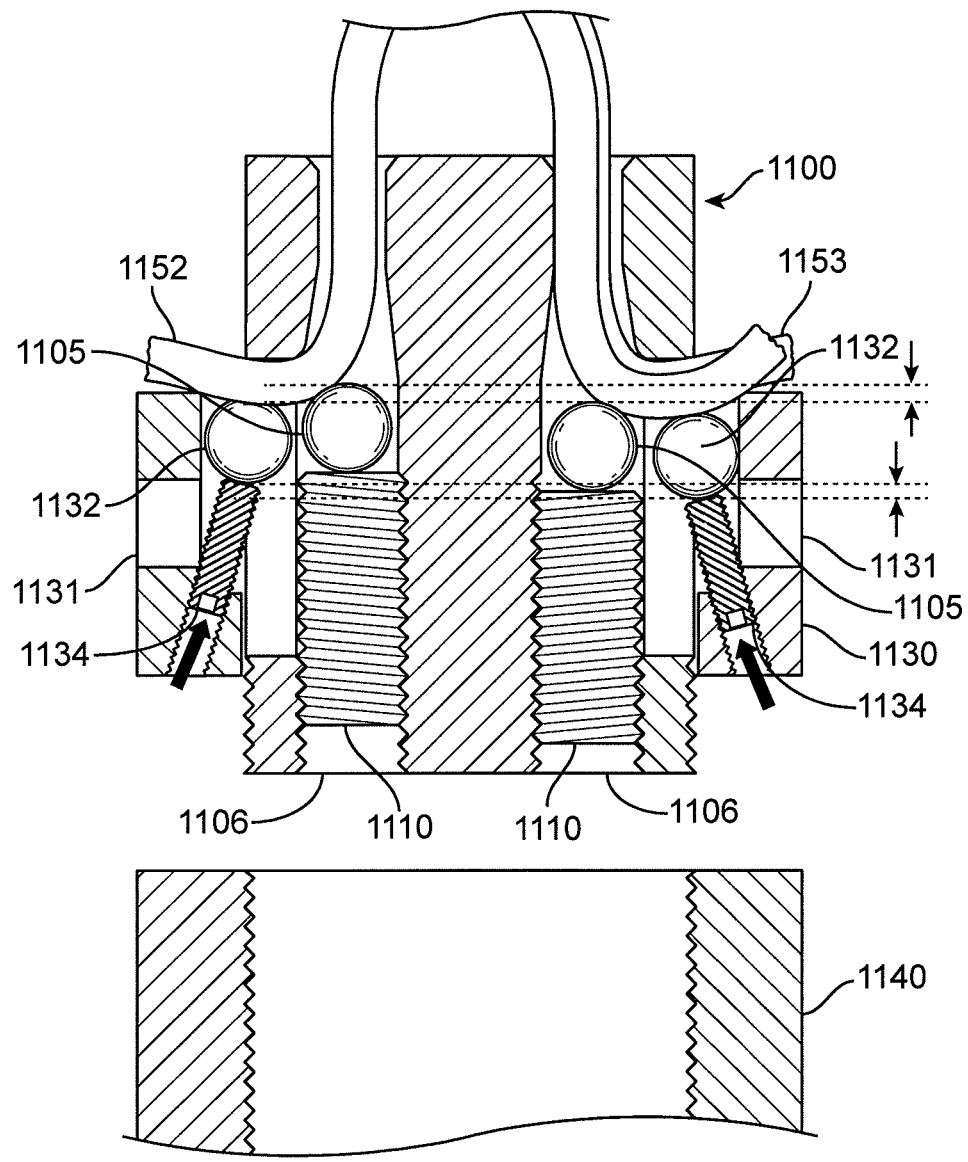
Figure 36D:
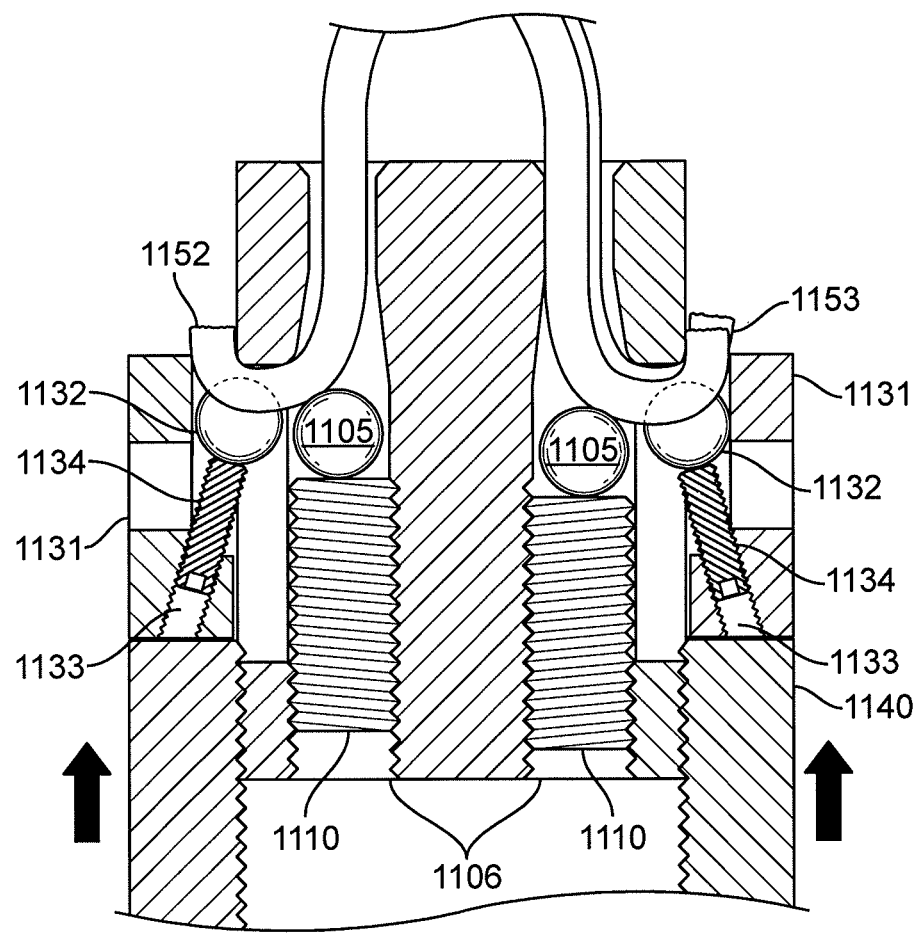
Figure 37A:
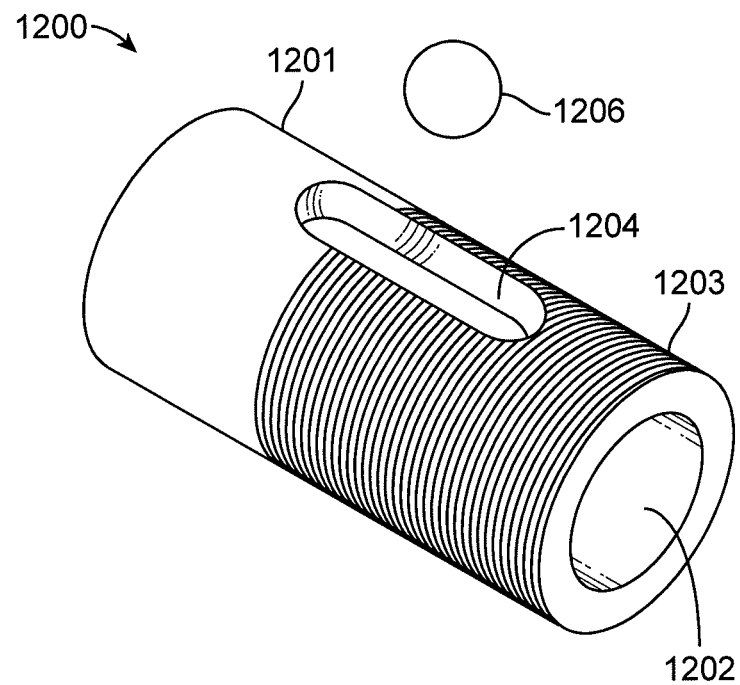
FIGS. 37a-37e illustrate additional embodiments of components for a locking assembly.
Figure 37B:
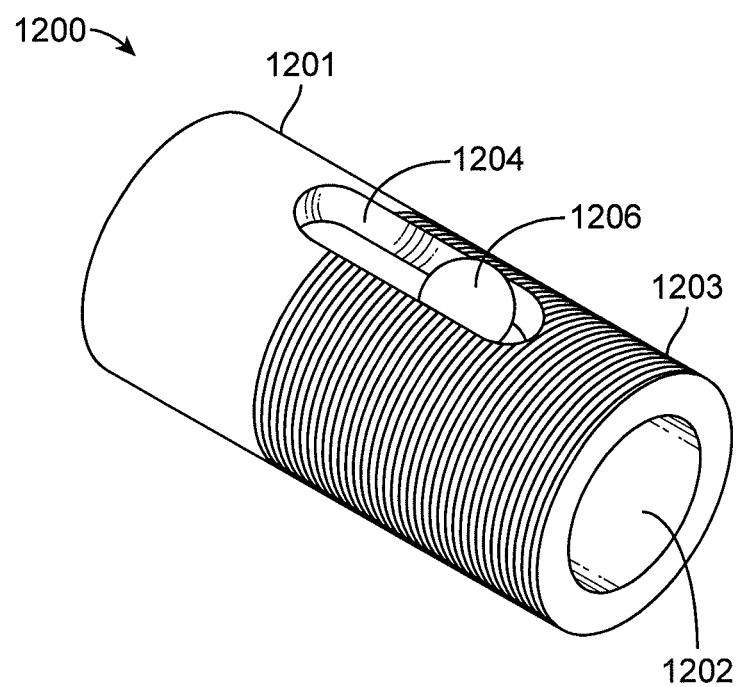
Figure 37C:
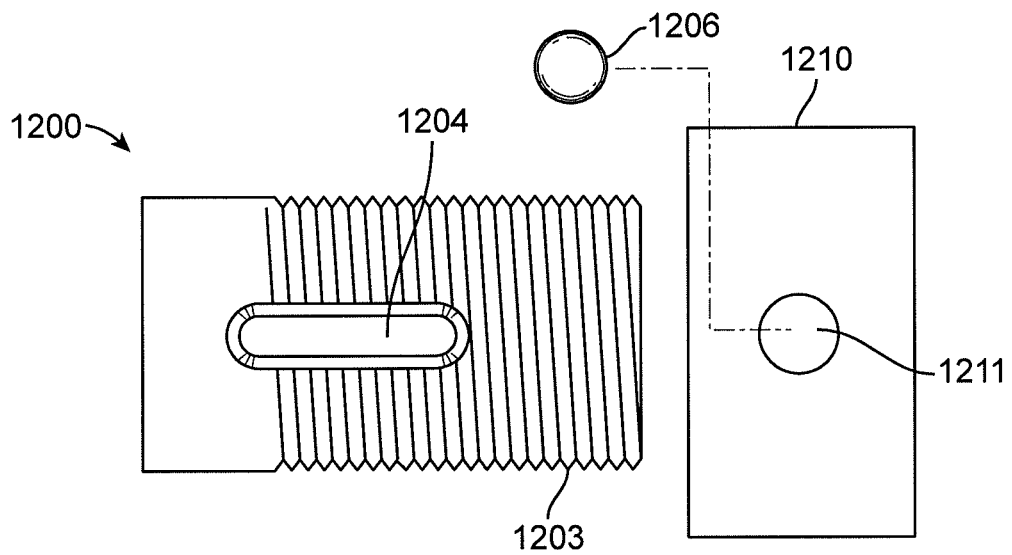
Figure 37D:
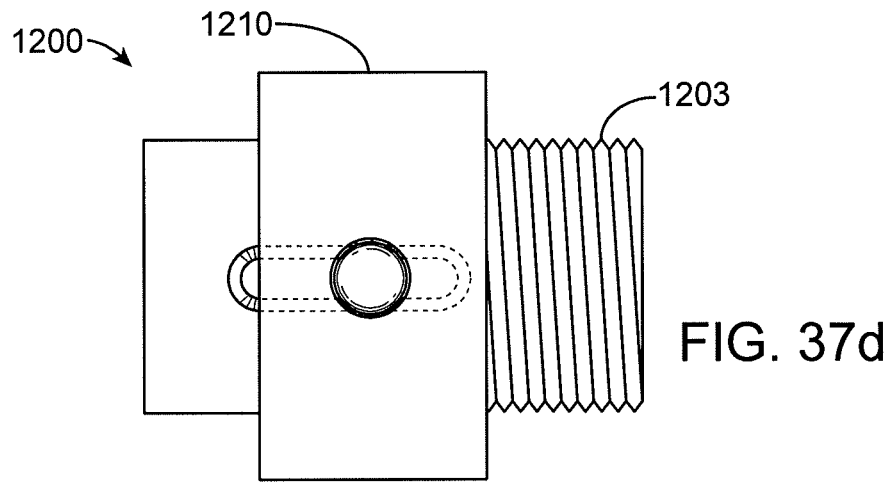
Figure 37E:
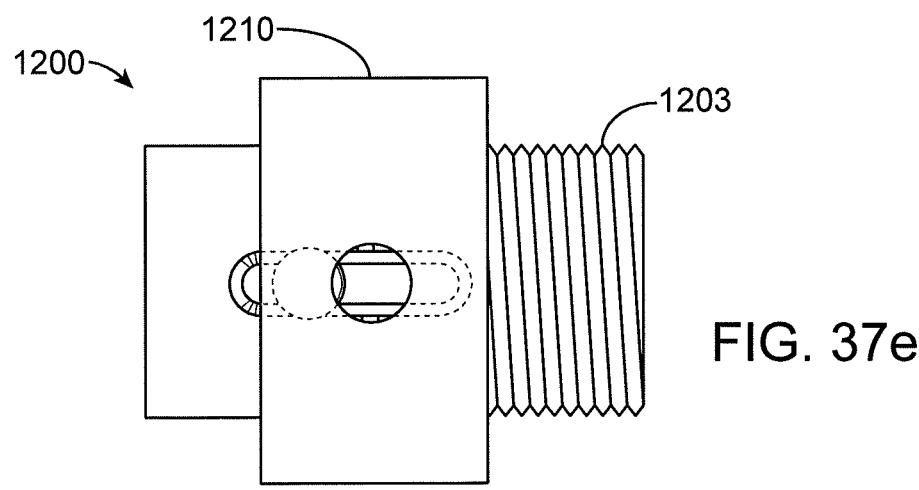

FIGS. 36a-36d illustrate cross-sectional views of the locking assembly 1100 as the locking assembly is attached to the stranded element 1150. FIG. 36a illustrates the locking element 1105 advanced against the stranded element 1150 by advancing the drive shaft 1110 in the locking bore 1106. The wire strands 1152 and 1153 exit the locking assembly housing 1100 through apertures 1104. After the drive shafts 1110 have been sufficiently tightened the locking ring can be advanced over the locking assembly as shown in FIG. 36b. The locking assembly includes openings 1131 through which locking element 1132 can be advanced. Locking bores 1133 can be used to advance drive shafts 1134 into contact with the locking elements 1132. The drive shaft 1134 can be advanced through locking bore 1133 to push the locking element 1132 against the stranded element 1150 as illustrated in FIG. 36b-36c. FIG. 36b illustrates the attachment component 1140 advanced over the locking assembly 1100 after the locking ring 1130 has been advanced into the desired position relative to the locking assembly 1100. The same amount of torque can be applied to the stranded element 1152 by locking element 1105 and to stranded elements 1153 by locking element 1105. As shown in FIG. 36c, the locking element 1105 is advanced further in the locking bore 1106 against the stranded element 1152 than the locking element 1105 advanced against the multiple stranded elements 1153 in the adjacent locking bore 1106. The same amount of torque is applied to the stranded elements 1152 and 1153 but the multiple stranded elements 1153 take up additional space in the bore such that the locking element 1105 does not advance as far within the locking bore. The multiple receiving bore and multiple locking bore configurations can be used to provide the same amount of torque against the stranded elements in each receiving bore regardless of the number of wires or strands within the bore. Multiple receiving and locking bores can also be used to provide different levels of torque against the stranded elements in each of the receiving bores.

The multiple receiving bore embodiments can provide improved gripping strength for multiple stranded elements. The multiple locking element embodiments, such as those illustrated in FIGS. 36a-36c, can be used to achieve stronger engagement with the stranded element.

FIGS. 37a-37e and 38a-38b illustrate additional embodiments of locking assemblies and locking rings that can be used with any of the embodiments disclosed herein. A locking assembly 1200 has a housing 1201 with a threaded portion 1203, a locking bore 1202, and aperture 1204. A locking element 1206 can advance through the locking bore 1202. The aperture 1204 can have a slotted shape for the stranded elements to exit the internal bore of the housing of the locking assembly 1200. A locking ring 1210 can be advanced over the locking assembly 1200 and threaded portion 1203. The locking ring 1210 can include an opening 1211. The opening 1211 can be used to introduce or advance a locking element or drive shaft in some embodiments.

Figure 38A:
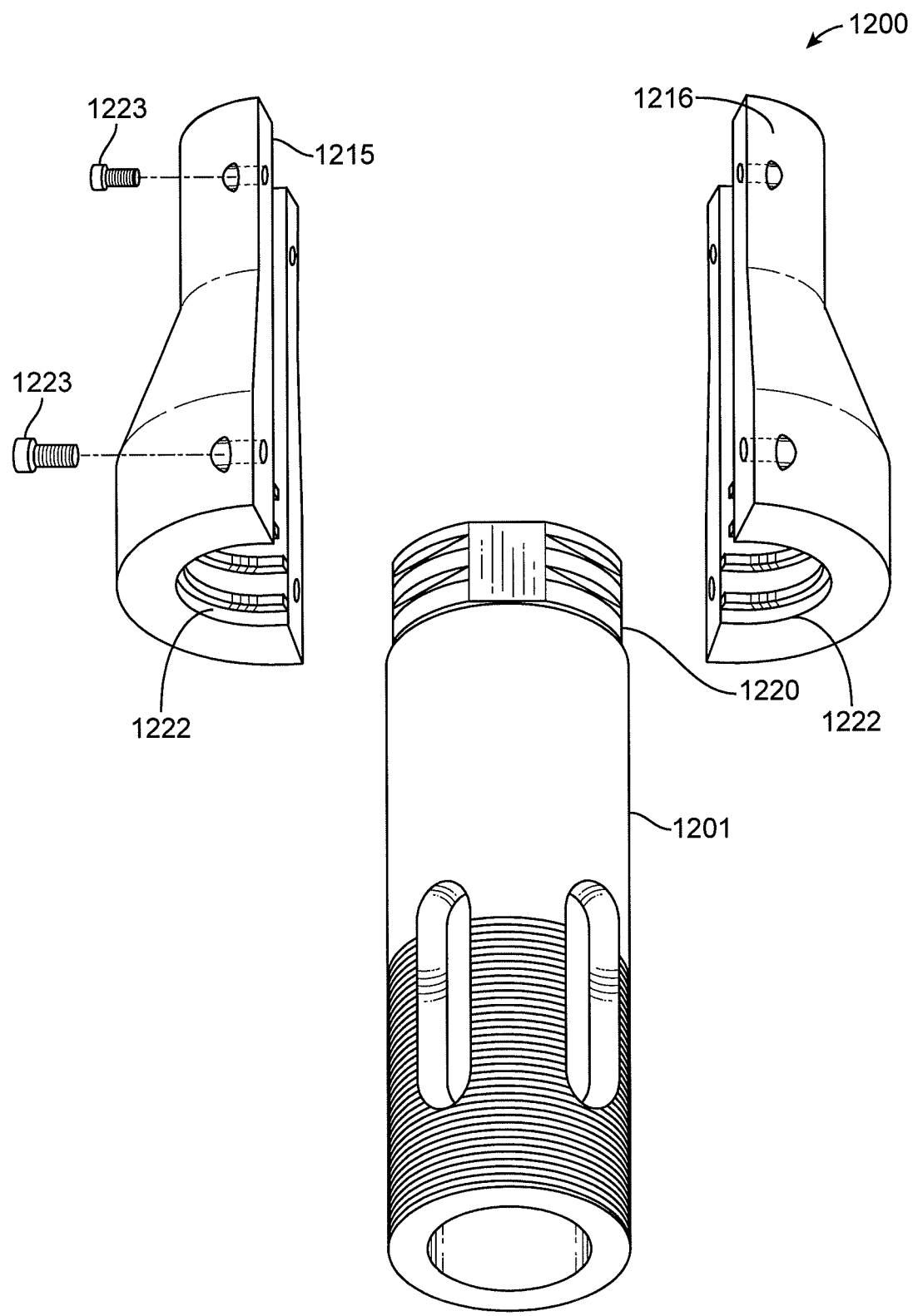
FIGS. 38a-38b illustrate an additional embodiment of a locking assembly.
Figure 38B:
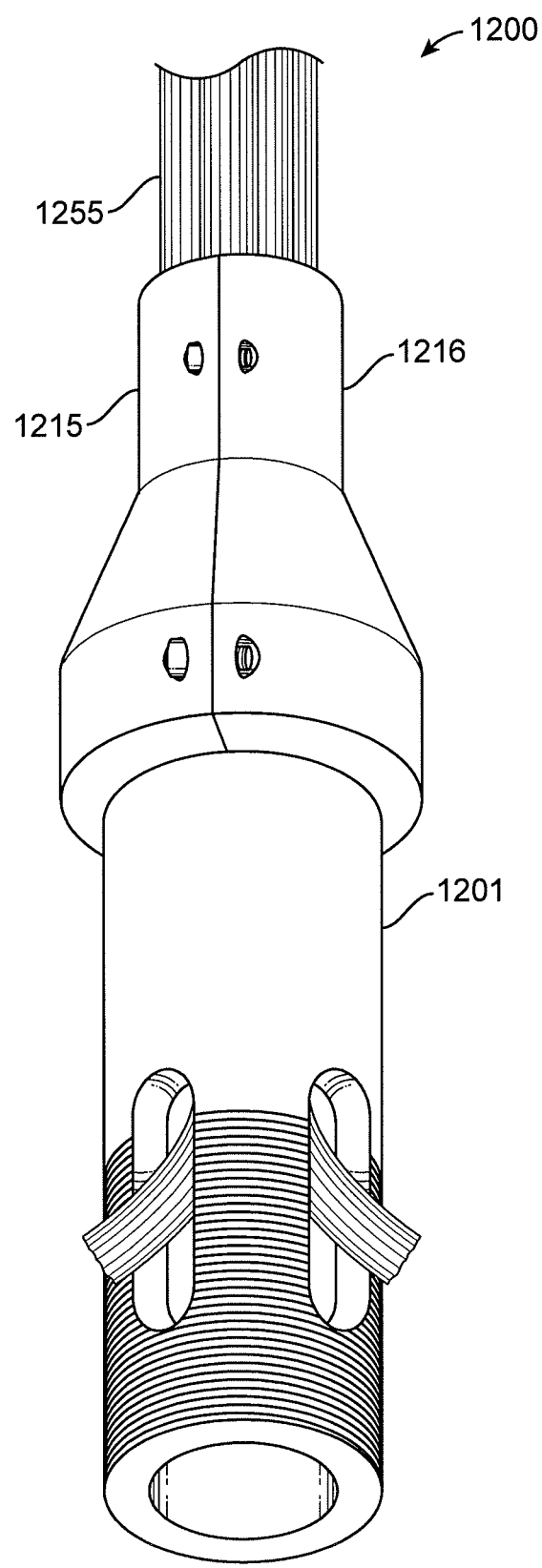

FIGS. 38a-38b illustrate a locking assembly 1200 with a stranded element cover 1215 and 1216 that are configured to engage with the locking assembly 1200. The locking assembly 1200 can have a grooved or raised structure 1220 with the stranded element cover 1215, 1216 having a complementary structure 1222 configured to engage with the grooved or raised structure 1220 of the locking assembly 1200. The stranded element cover can be coupled to each other using a screw 1223 or other mechanical structure. The stranded element cover 1215, 1216 can be used in applications to protect the stranded element from damage or external debris.

FIGS. 31a-31e illustrate embodiments of locking assemblies. The locking assembly 1300 has a housing 1301 with a receiving bore 1302 configured to receive a stranded element 1310 with stranded elements 1311. A locking element 1306 can be advanced within a locking bore 1304 by advancing a drive shaft 1307 to contact the stranded elements 1311. The stranded elements exit the housing 1301 through the aperture 1304. The housing 1301 of the locking assembly has additional material in the area 1305 adjacent the aperture 1303.

Figure 32A:
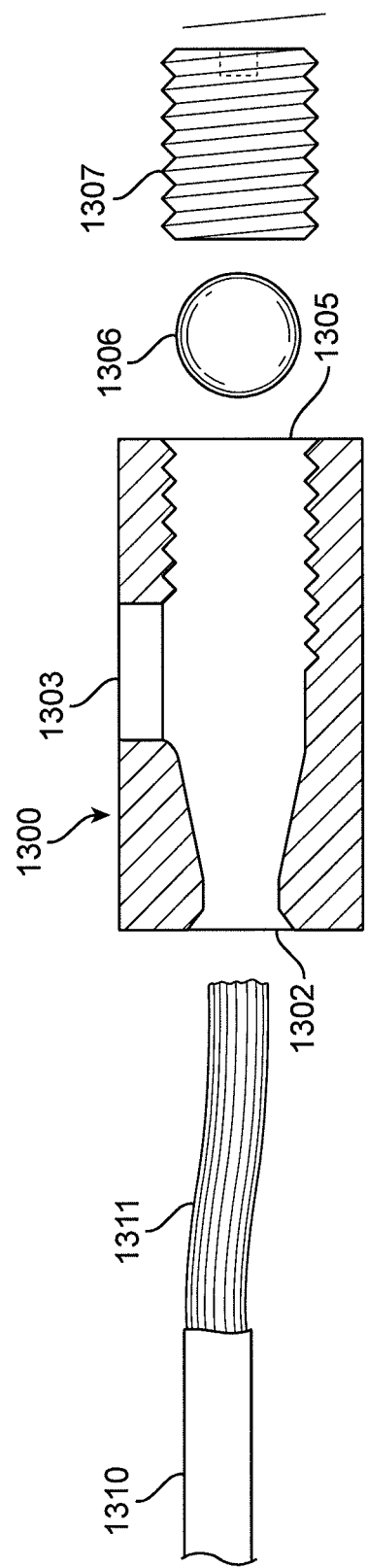

FIGS. 32a-32d illustrate cross-sectional views of the locking assembly 1300 as the locking element 1306 is advanced to contact the stranded elements 1311. FIG. 32A-A illustrates a different cross-sectional view of the locking assembly 1300 engaged with the stranded elements 1311.

Figure 33:
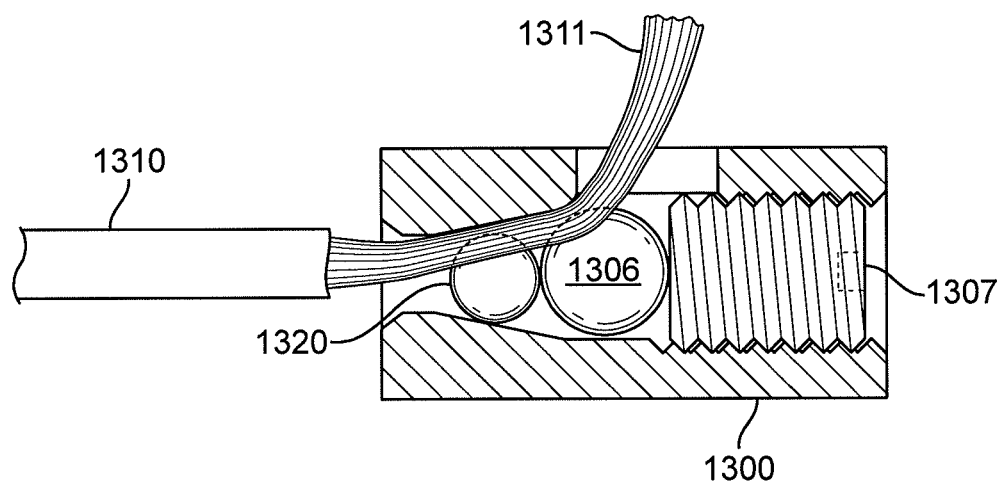
FIG. 33 illustrates a locking assembly in accordance with some embodiments.

FIG. 33 illustrates another embodiment of a locking assembly 1350 that can include a first locking element 1306 and a second locking element 1320 within the housing. The drive shaft 1307 can be advanced to push both of the locking elements 1306, 1320 into engagement with the stranded elements 1311. Multiple locking elements can be used in any of the embodiments disclosed herein. In some embodiments the first locking element and the second locking element have a similar overall exterior shape. In some embodiments the first locking element is a ball having a first diameter and the second locking element is a ball having a second diameter. In some embodiments the first locking element and the second locking element have a different overall exterior shape. In some embodiments, when the multiple strand element is locked to the housing, only the first locking element contacts the multiple strand element. In some embodiments when the multiple strand element is locked to the housing, only the second locking element contacts the multiple strand element. In some embodiments, when the multiple strand element is locked to the housing, both the first locking element and the second locking element contact the multiple strand element.

Figure 34A:
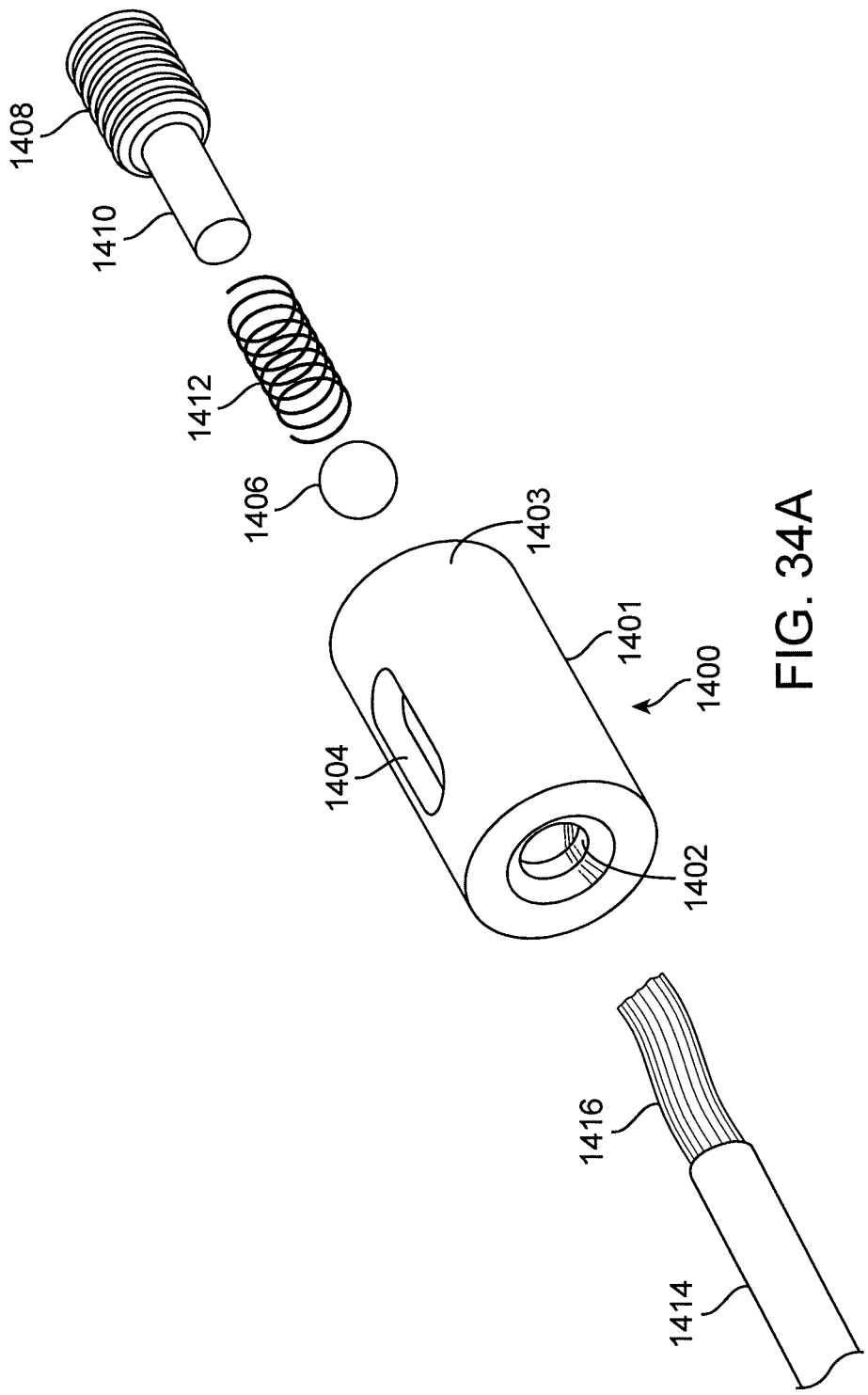
FIG. 34a-34e illustrate a locking assembly in accordance with some embodiments.
Figure 34B:
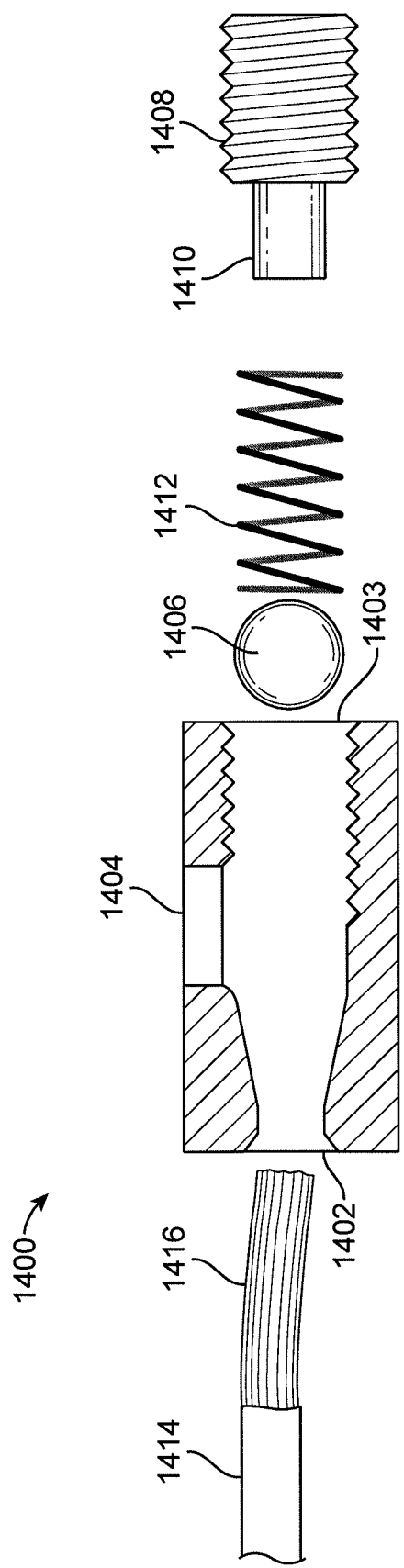
Figure 34C:
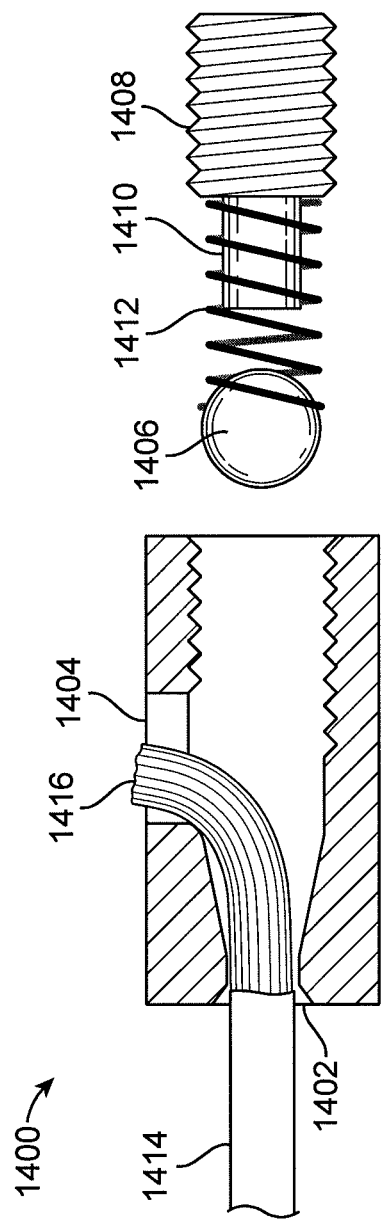
Figure 34D:
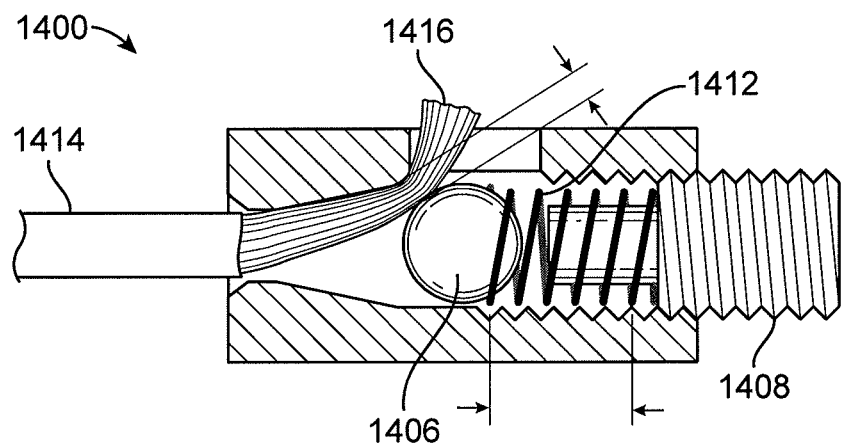
Figure 34E:
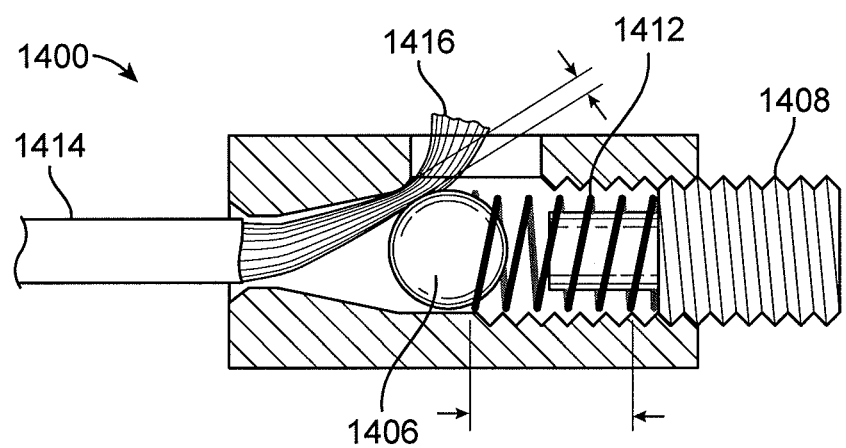

A compressible element can be used to improve contact between the locking element and drive shaft. In some cases the drive shaft can creep or move such that the force applied to the stranded element by the locking element decreases. In some cases the creep can happen between the stranded element and the locking element by temperature variations, such as naturally occurring thermal cycles. The different coefficients of thermal expansion between the stranded element and the locking assembly materials can result in creep in some instances. Another possible cause of creep can be vibration and heavy duty load cycles, for example from a winch. A compressible element can be placed between the locking element and the drive shaft to improve the engagement between the locking element and drive shaft. The drive shaft provides the primary force against the locking element to hold it against the stranded element; however, in the event of creep by the drive shaft a compressible element, such as a spring, can also be used to secure the locking element against the stranded element. The compressible element can improve engagement between the locking assembly and the stranded element in the event of creep by the locking element. A compressible element or compression element can be used in any of the embodiments described herein. FIGS. 34A-34D illustrate locking assemblies 1400 with a compressible element 1412 between the locking element 1406 and the drive shaft 1408. The locking assembly 1400 includes a housing 1401 that has a receiving bore 1402, locking bore 1403, and aperture 1404. A stranded element 1414 with stranded elements 1416 pass through the receiving bore 1402 and can exit the housing 1401 through aperture 1404. A locking element 1406 can be advanced within locking bore 1403 by advancing drive shaft 1408. A compressible element 1412 can be positioned between the locking element 1406 and the drive shaft to engage with both the locking element 1406 and the drive shaft 1408 while advancing the drive shaft 1408. The drive shaft 1408 can include a shaft 1410 to accommodate the compressible element 1412 around the drive shaft 1408. FIGS. 34D-34E illustrate the drive shaft 1408 prior to being advanced into contact with the locking element 1406 with a desired force or torque applied to the stranded elements 1416. In a locking position the drive shaft 1408 would be advanced into contact with the locking element similar to the locking assembly shown in FIG. 23I.

FIGS. 39a-39b illustrate a locking assembly in accordance with some embodiments. The locking assembly 1500 includes a housing 1501 with a receiving bore 1502, locking bore 1503, and aperture 1504. The receiving bore 1502 is configured to receive the stranded element 1509 with the stranded element 1509 exiting the housing of the locking assembly 1500 through aperture 1504. The locking bore 1503 is configured to receive a locking element 1505. A drive shaft 1506 can be used to advance the locking element 1505 within the locking bore 1503. The drive shaft 1506 includes threads that engage with the receiving bore 1503. An optional nut 1507 can be used to receive the drive shaft 1506 in some embodiments. In some embodiments the drive shaft 1506 can be integral with, coupled to, or removably engaged to a pulley 1508 as illustrated.

FIG. 40 illustrates a locking assembly 1500 similar to the locking assembly in FIGS. 39a-39b. FIG. 40 shows a drive shaft 1506 engaged with a line 1512. The line 1512 can be used as a welding conversion bolt in some embodiments.

In any of the embodiments disclosed herein the housing of the locking assembly can include a locking element release opening or port. A tool can be used to release the locking element by entering an internal bore of the housing, such as the locking or receiving bore to move the locking element away from the stranded element. This can facilitate the process of disengaging the locking assembly from the stranded element.

Figure 41A:
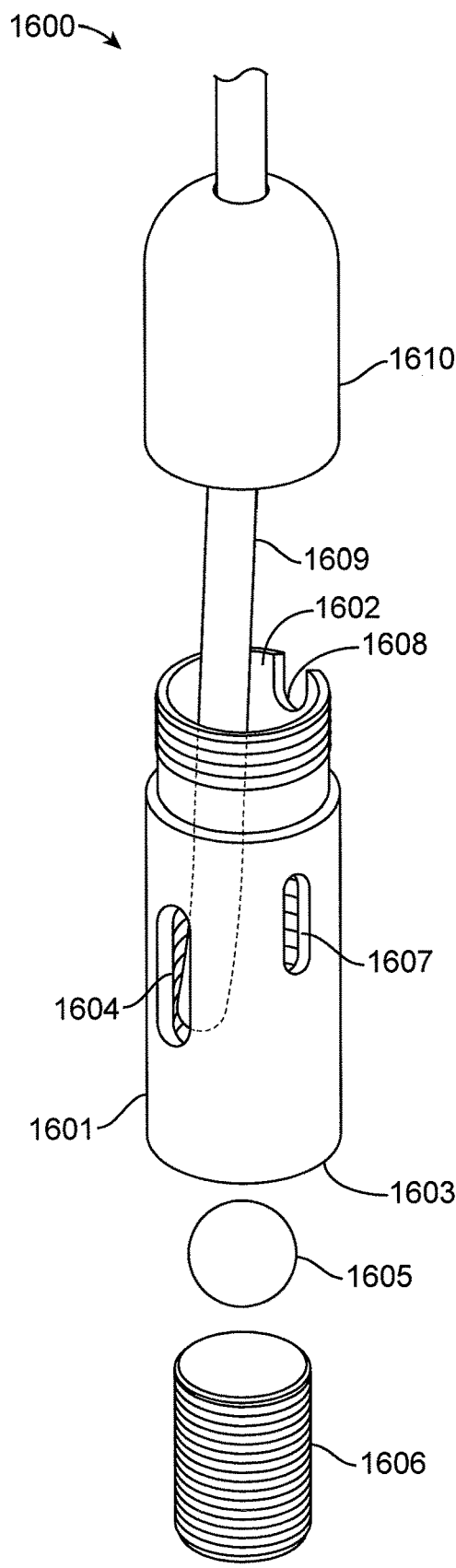
FIGS. 41a-41d illustrate a locking assembly in accordance with some embodiments.
Figure 41B:
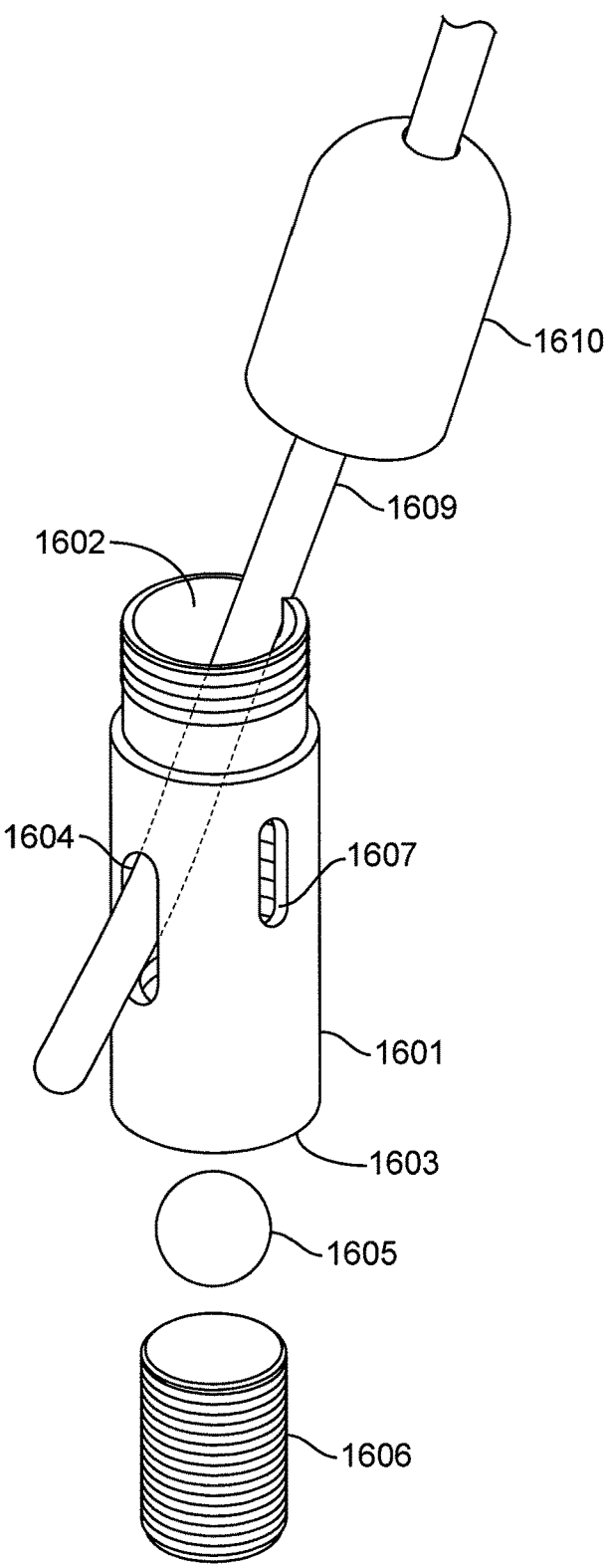
Figures 41C, 41D:
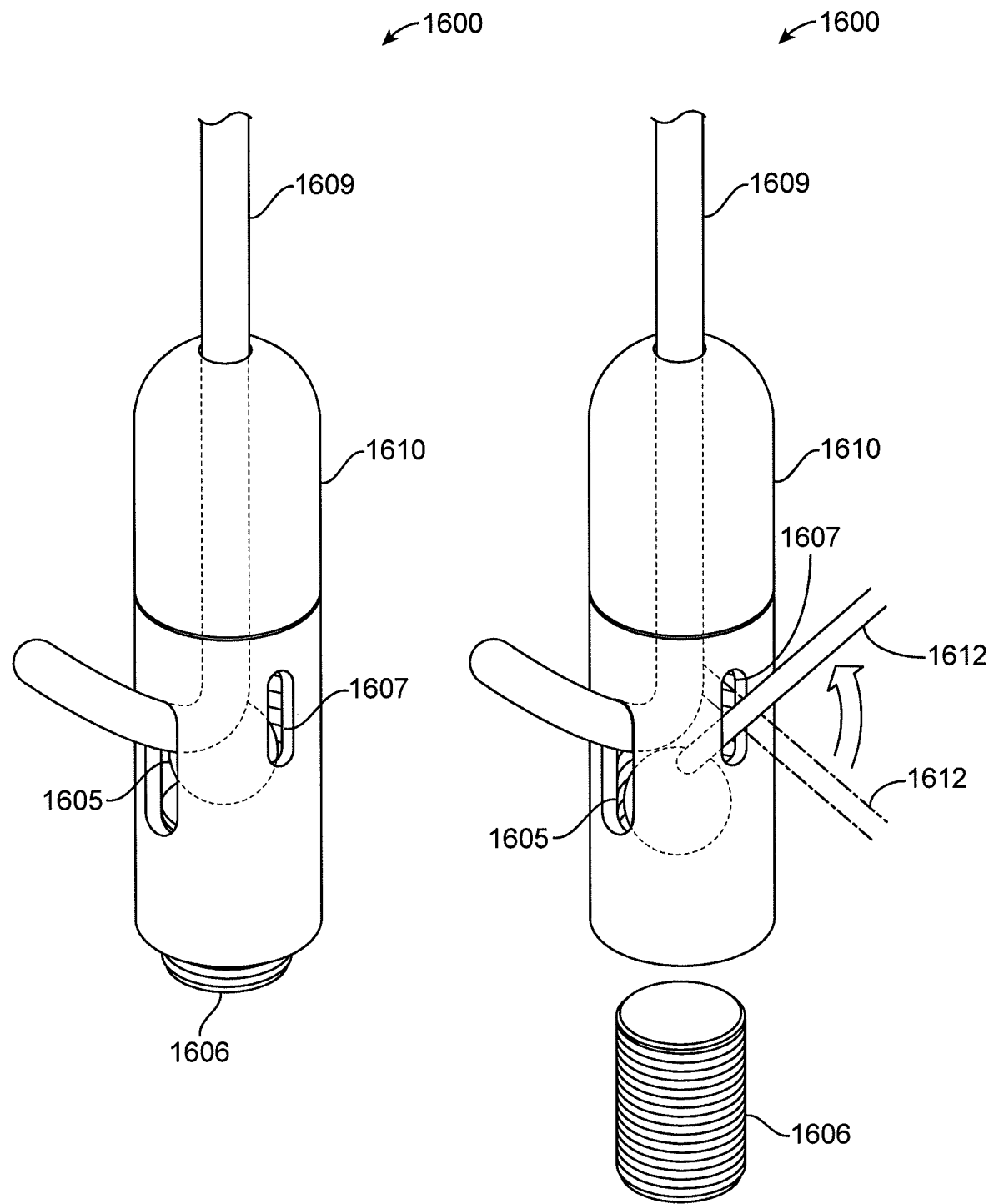

An example of a housing having a locking element release opening is illustrated in FIGS. 41a-41d. The locking assembly 1600 includes a housing 1601 with a receiving bore 1602, locking bore 1603, aperture 1604, locking element release opening 1607, and notch 1608. The receiving bore 1602 is configured to receive the stranded element 1609 with the stranded element 1609 exiting the housing 1601 of the locking assembly 1600 through aperture 1604. The locking bore 1603 is configured to receive a locking element 1605. A drive shaft 1606 can be used to advance the locking element 1605 within the locking bore 1603. The drive shaft 1606 includes threads that engage with the locking bore 1603. The housing includes a notch 1608 that can facilitate advancing the stranded element 1609 through the aperture 1604. The notch 1608 can be particularly useful for stranded elements or thick single elements that are stiff and not easily bent. The locking assembly 1600 can include a threaded or complementary surface configured to engage with a cap 1610 surrounding the stranded element 1609 as shown in FIGS. 41a-41b. A cover or end cap can be used with any of the locking assemblies disclosed herein. FIGS. 41c-41d illustrate the use of a tool 1612 to disengage the locking element 1605 from the stranded element 1609. The tool 1612 is configured with a longitudinal shape with a cross-sectional profile small enough to pass through the locking element release opening 1607. The tool 1612 passes through the locking element release opening 1607 into the receiving bore 1602 and/or the locking bore 1603. The tool 1612 can contact the locking element 1605 to apply a force to the locking element 1605 such that it is disengaged from the stranded element 1609. After the locking element 1605 disengages from the stranded element it can be removed through the locking bore 1603. The locking release opening can be used in any of the embodiments of locking assemblies disclosed herein.

Figure 44B:
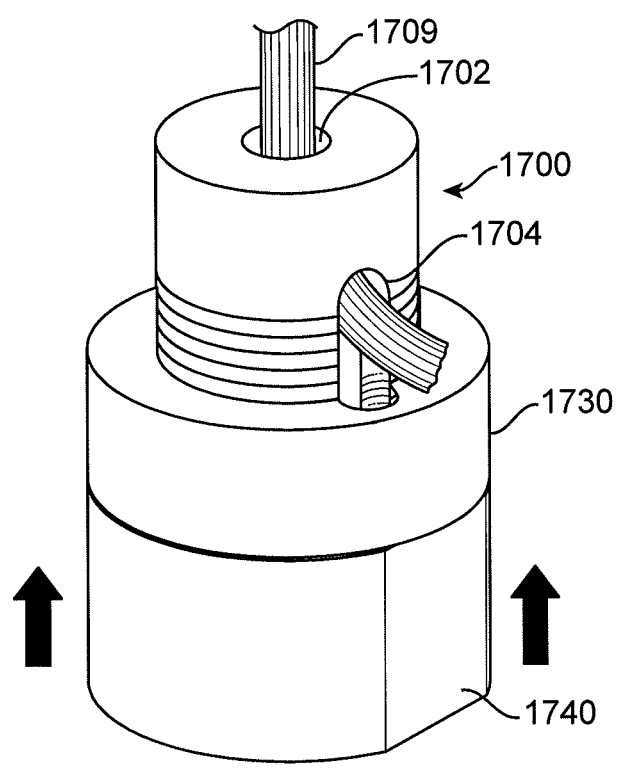
Figure 44C:
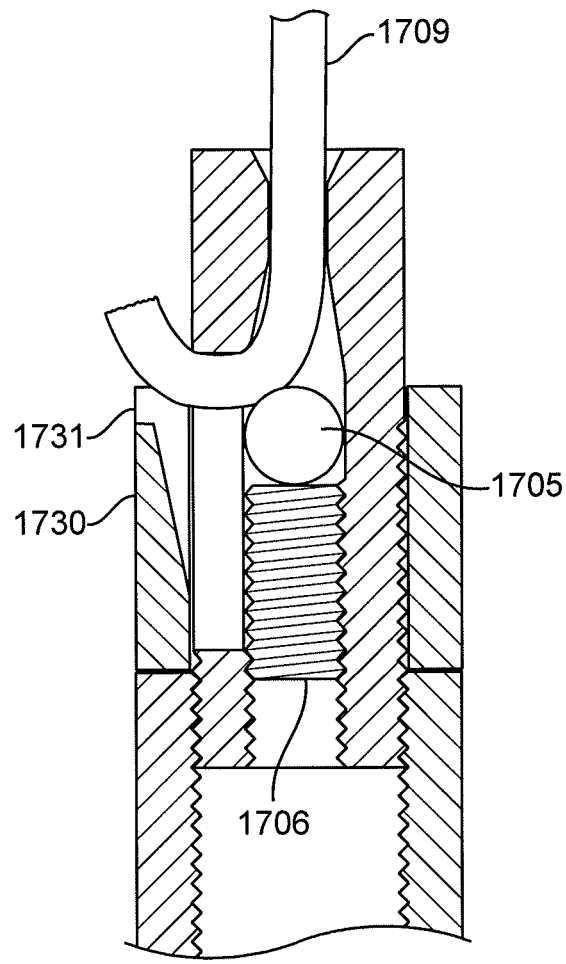
Figure 44D:
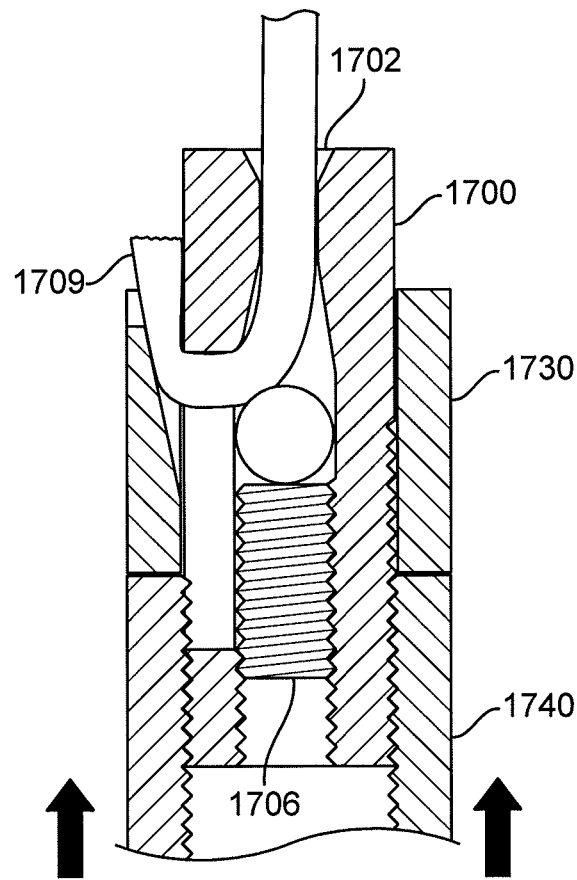

FIGS. 44a-44d illustrate a locking assembly in accordance with some embodiments. The locking assembly 1700 includes a housing 1701 with a receiving bore 1702, locking bore 1703, and aperture 1704. The receiving bore 1702 is configured to receive the stranded element 1709 with the stranded element 1709 exiting the housing 1701 of the locking assembly 1700 through aperture 1704. The locking bore 1703 is configured to receive a locking element 1705. A drive shaft 1706 can be used to advance the locking element 1705 within the locking bore 1703. The drive shaft 1706 includes threads that engage with the receiving bore 1703. A locking ring 1730 can be advanced over the locking assembly 1700 to cover the ends of the stranded element 1709. The locking ring 1730 includes a notch 1731 that can receive a portion of the stranded element 1709. An attachment component 1740 can engage with the locking assembly 1700 and locking ring 1730 as illustrated in FIGS. 44b-44d.

Figures 46A, 46B:
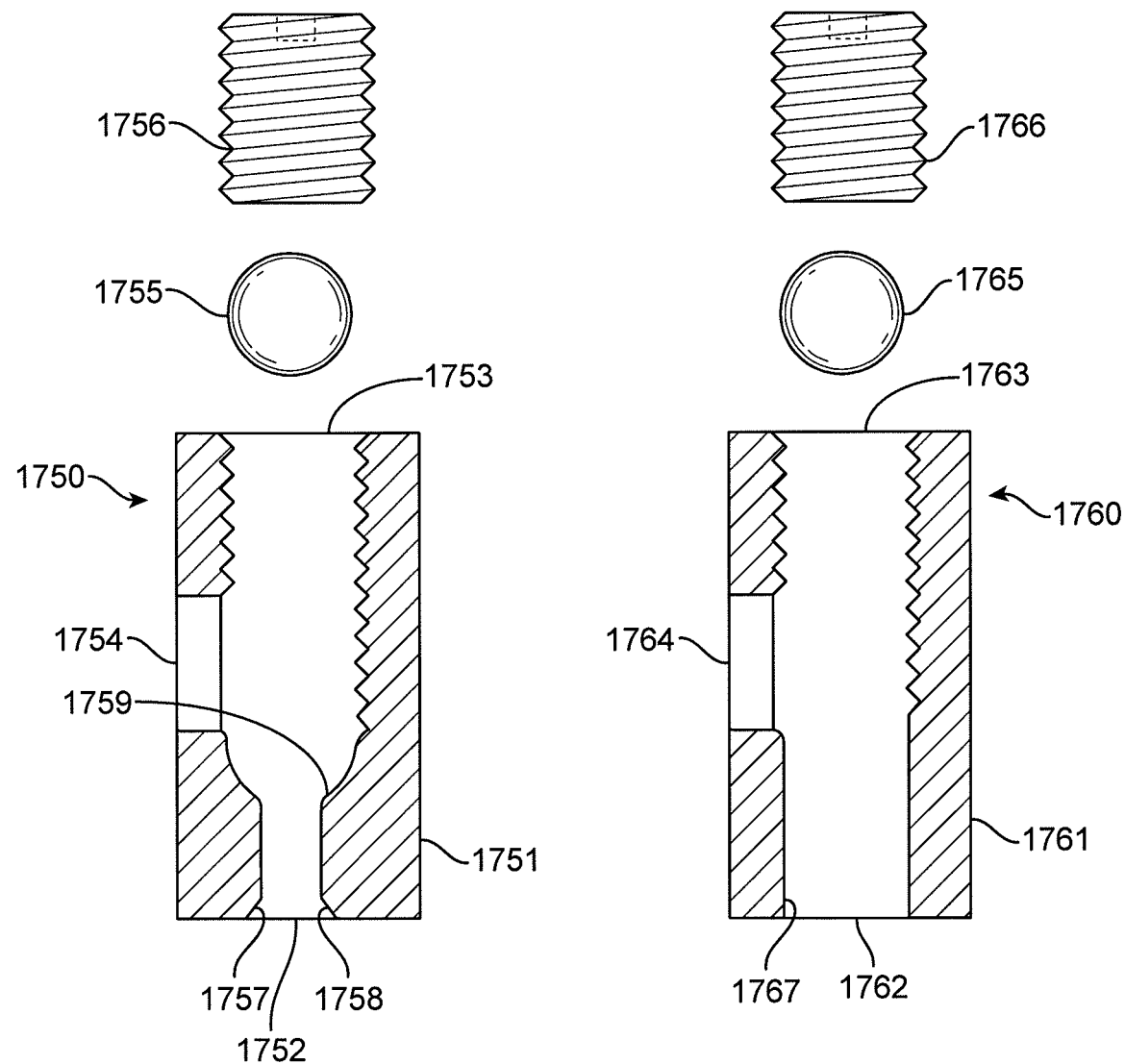
FIGS. 46a-46d illustrate additional embodiments of locking assemblies in accordance with some embodiments.
Figures 46C, 46D:
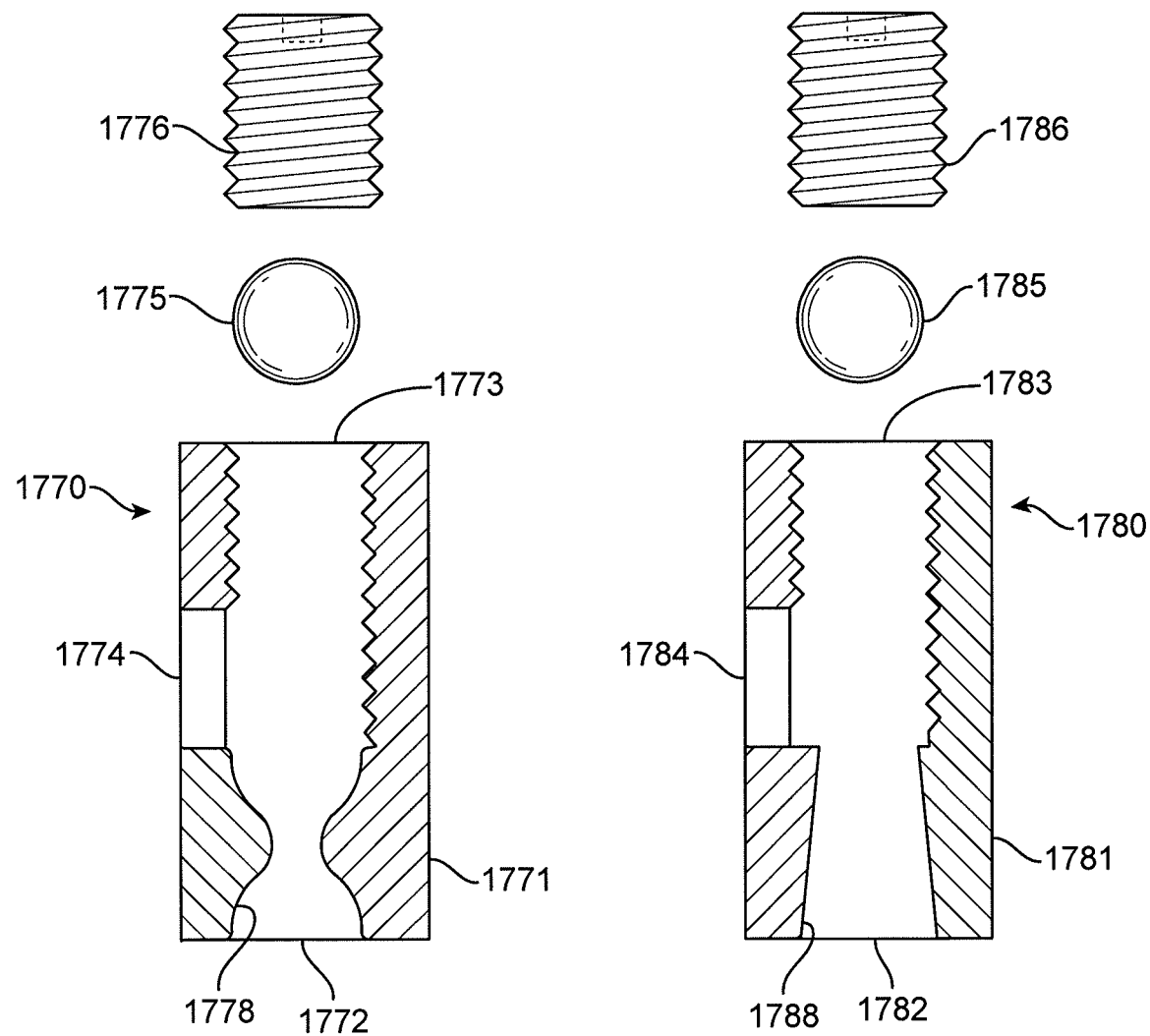

In some embodiments the receiving bore of the locking assembly can be shaped based on the type of stranded element that is to be received within the receiving bore. FIGS. 46a-46d illustrate embodiments of locking assemblies having receiving bores with various shapes. FIG. 46a illustrates a locking assembly 1750 with a housing 1751 having a receiving bore 1752, locking bore 1753, and aperture 1754. A locking element 1755 is configured to be advanced through the locking bore 1753 by advancing a drive shaft 1756. The receiving bore 1752 has a tapered entrance 1757 followed by a flat portion 1758, and a cupped opening 1759. In this embodiment the receiving bore 1752 is shaped to facilitate engagement with the stranded element. The flat portion 1758 has a narrower width or diameter than the opening of the receiving bore. The flat portion 1758 can be sized to snuggly engage with the stranded element. The improved engagement between the flat portion 1758 and the stranded element can improve engagement of the locking element 1755 with the stranded element. FIG. 46b illustrates a locking assembly 1760 with a receiving bore 1762, locking bore 1763, and aperture 1764. A locking element 1765 is configured to be advanced through the locking bore 1763 by advancing a drive shaft 1766. The receiving bore 1762 has a flat profile 1767. FIG. 46c illustrates a locking assembly 1770 with a housing 1771 having a receiving bore 1772, locking bore 1773, and aperture 1774. A locking element 1775 is configured to be advanced through the locking bore 1773 by advancing a drive shaft 1776. The receiving bore 1772 has an interior wall 1778 with an hour-glass profile along a central longitudinal axis of the locking assembly 1770. In this embodiment the receiving bore 1772 is shaped to facilitate engagement with the stranded element. The hour-glass profile of the interior wall 1778 has a narrower width or diameter than the opening of the receiving bore. The flat portion 1758 can be sized to snuggly engage with the stranded element. The improved engagement between the interior portion 1778 and the stranded element can improve engagement of the locking element 1775 with the stranded element. FIG. 46d illustrates a locking assembly 1780 with a housing 1781 having a receiving bore 1782, locking bore 1783, and aperture 1784. A locking element 1785 is configured to be advanced through the locking bore 1783 by advancing a drive shaft 1786. An interior portion 1788 of the receiving bore 1782 has a flat tapered configuration with a decreasing diameter from the entrance to the receiving bore 1782 towards the aperture 1784.

Figure 42A:
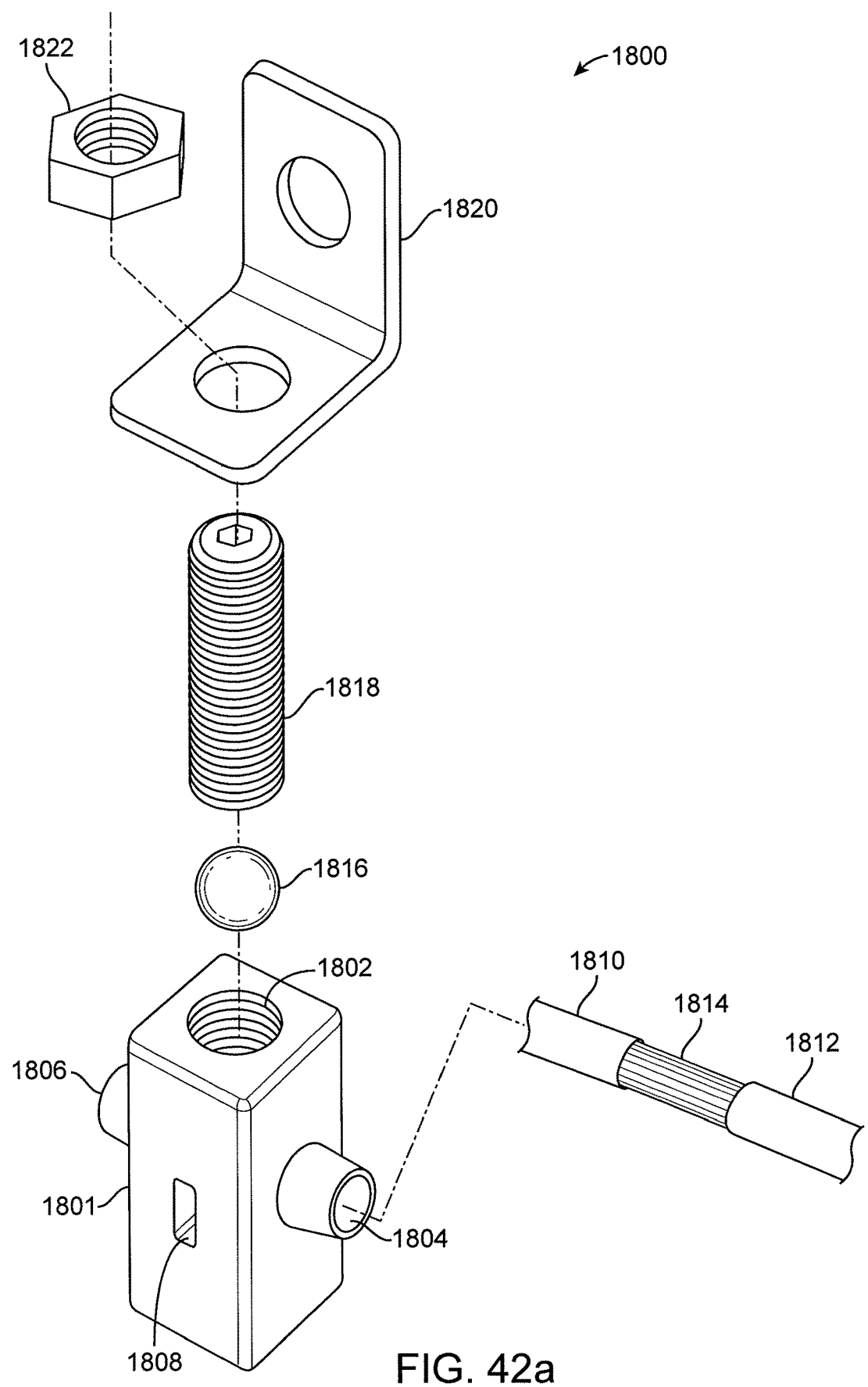
FIGS. 42a-42b illustrate components for a locking assembly in accordance with some embodiments.
Figure 42B:
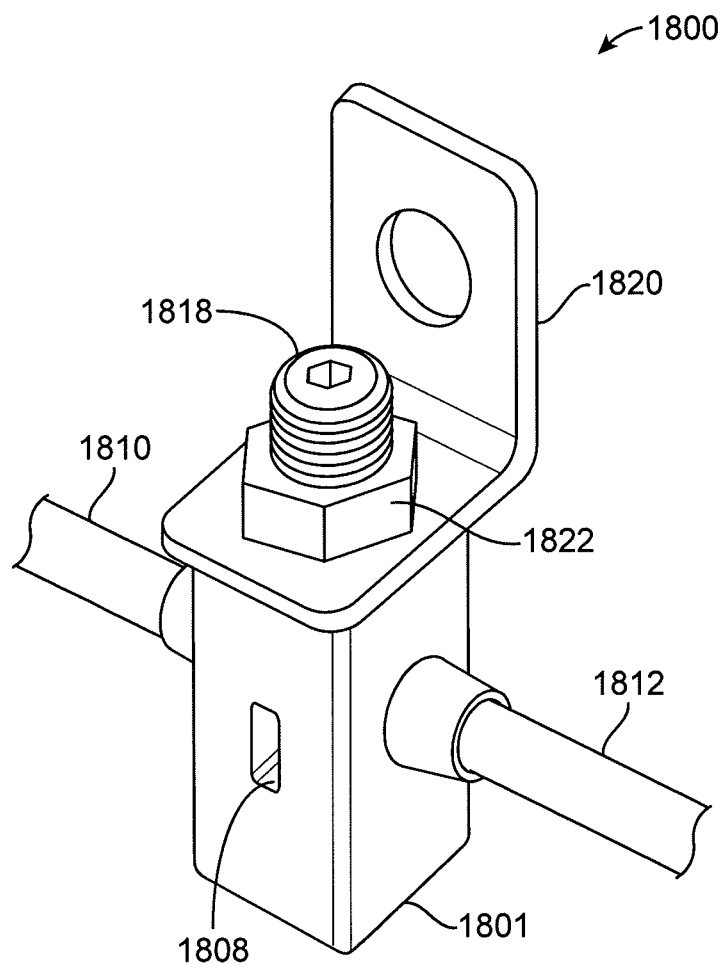

In some embodiments the locking assembly can be used to splice together two or more separate stranded elements. FIGS. 42a-42b and 43a-43c illustrate embodiments of locking assemblies configured to splice together ends of stranded elements. The locking assembly 1800 includes a housing 1801 with a locking bore 1802, a first receiving bore 1804, and a second receiving bore 1806. The illustrated locking assembly 1800 includes an optional locking element release opening 1808. A first stranded element 1810 and a second stranded element 1812 can be spliced using the locking assembly 1800. The ends of the first stranded element 1810 and a second stranded element 1812 can be intermingled together as illustrated by the intermingled ends 1814 in FIG. 42a. A locking element 1816 can be advanced within the locking bore 1802 by advancing the drive shaft 1818. An optional attachment component 1820 can also be engaged with a portion of the drive shaft 1818. FIGS. 42a-42b illustrate a nut 1822 that can secure the attachment component 1820 to the drive shaft 1818. FIG. 42b illustrates the assembled locking assembly secured to the stranded elements 1810, 1812. The illustrated locking assembly 1800 shows the first receiving bore 1804 and second receiving bore 1806 as axially in-line; however, they can meet orthogonally or at other off-axis angles.

Figure 43A:
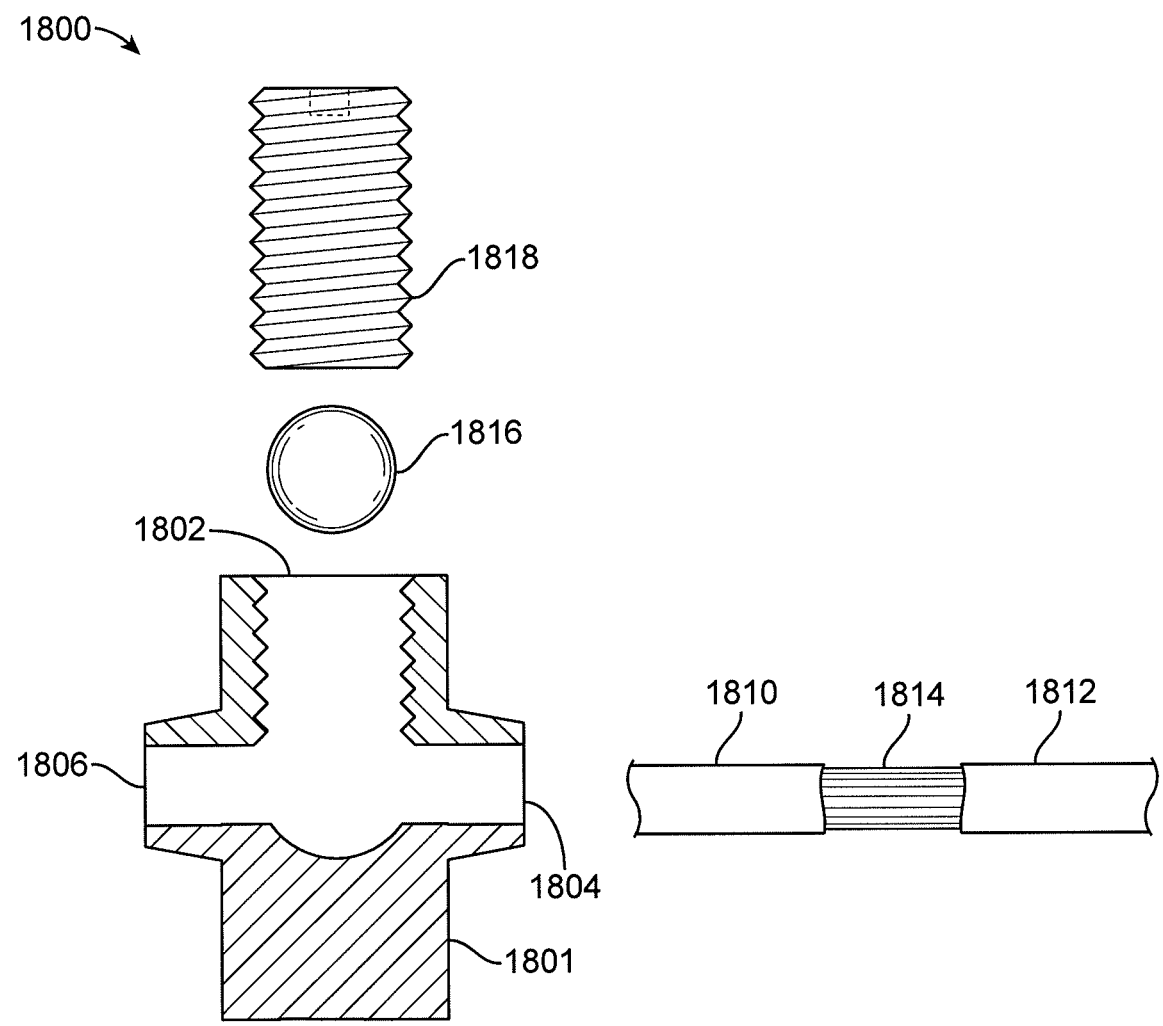
FIGS. 43a-43c illustrate the assembly of the components illustrated in FIGS. 42a-42b in accordance with some embodiments.
Figure 43B:
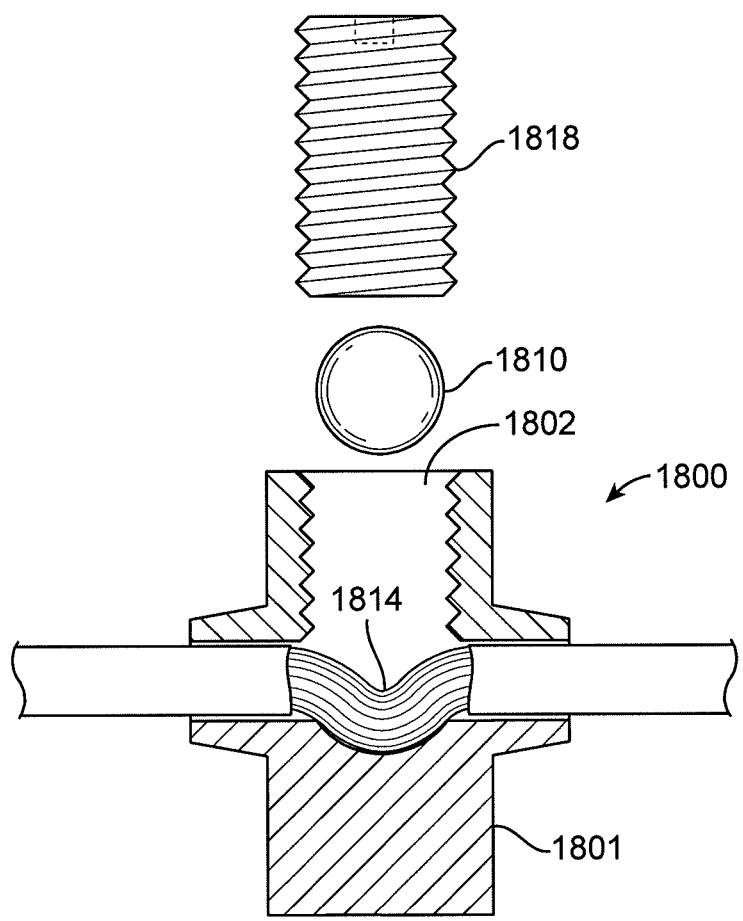
Figure 43C:
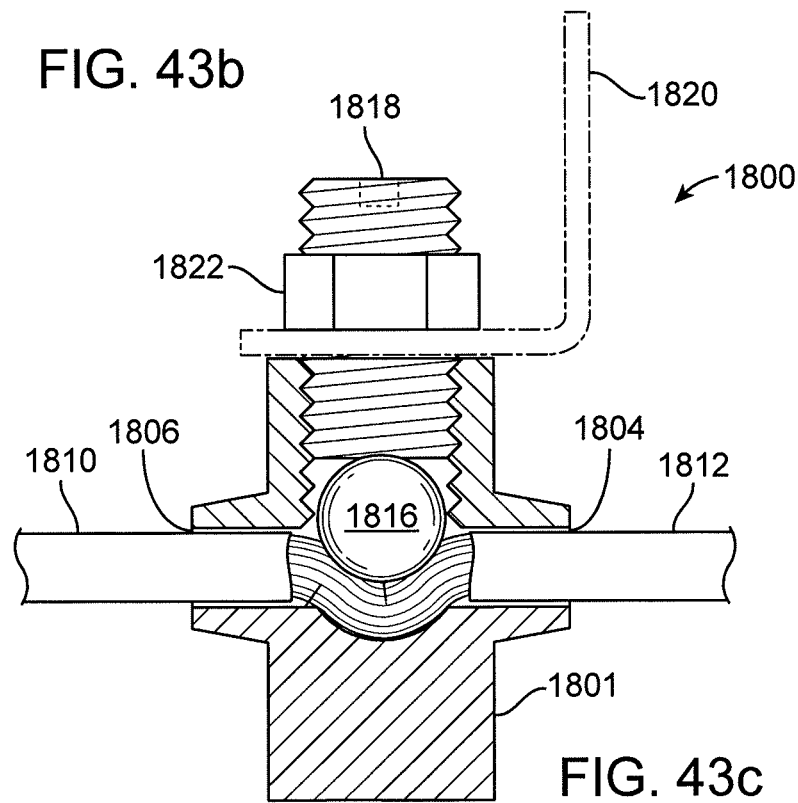

FIGS. 43a-43c illustrate cross-sectional views of the locking assembly 1800 as it is assembled. The first stranded element 1810 and/or the second stranded element 1812 can be passed through the first receiving bore 1804 and second receiving bore 1806 prior to intertwining the stranded element ends. After the first stranded element and/or second stranded element have been passed through the receiving bores 1804, 1806 the stranded ends of the two elements can be intermingled. The intermingled ends 1814 can then be positioned within the locking assembly 1800 adjacent to the intersection of the locking bore 1802 and receiving bores 1804, 1806 as shown in FIG. 43b. The locking element 1816 and drive shaft 1818 are then advanced in the locking bore 1802 to secure the intermingled ends within the locking assembly 1800 as shown in FIG. 43c. The attachment component 1820 and nut 1822 can optionally be attached to the housing assembly 1800 and drive shaft 1818.

In some embodiments the locking assemblies disclosed herein can be used in electrical retrofit applications. FIGS. 45a-45e illustrate an embodiment of a locking assembly 1900 with a housing 1901 having a locking bore 1902 and a receiving bore 1904. The drive shaft 1906 can be configured to receive a compressible element 1910 within an internal space or cavity 1912 of the drive shaft. The compressible element 1910 can engage with the locking element 1908 to apply a force against the ends 1916 of the stranded element 1914. FIGS. 45b-45e illustrates additional views of the locking assembly 1900 as it is engaged with the stranded element 1914. The drive shaft 1906 advances the compressible element 1910 and locking element 1908 against the ends 1916 of the stranded element. The locking element 1908 can apply a sufficient force to maintain electrical contact between the housing of the locking assembly and the ends 1916 of the stranded element 1914.

Figure 45A:
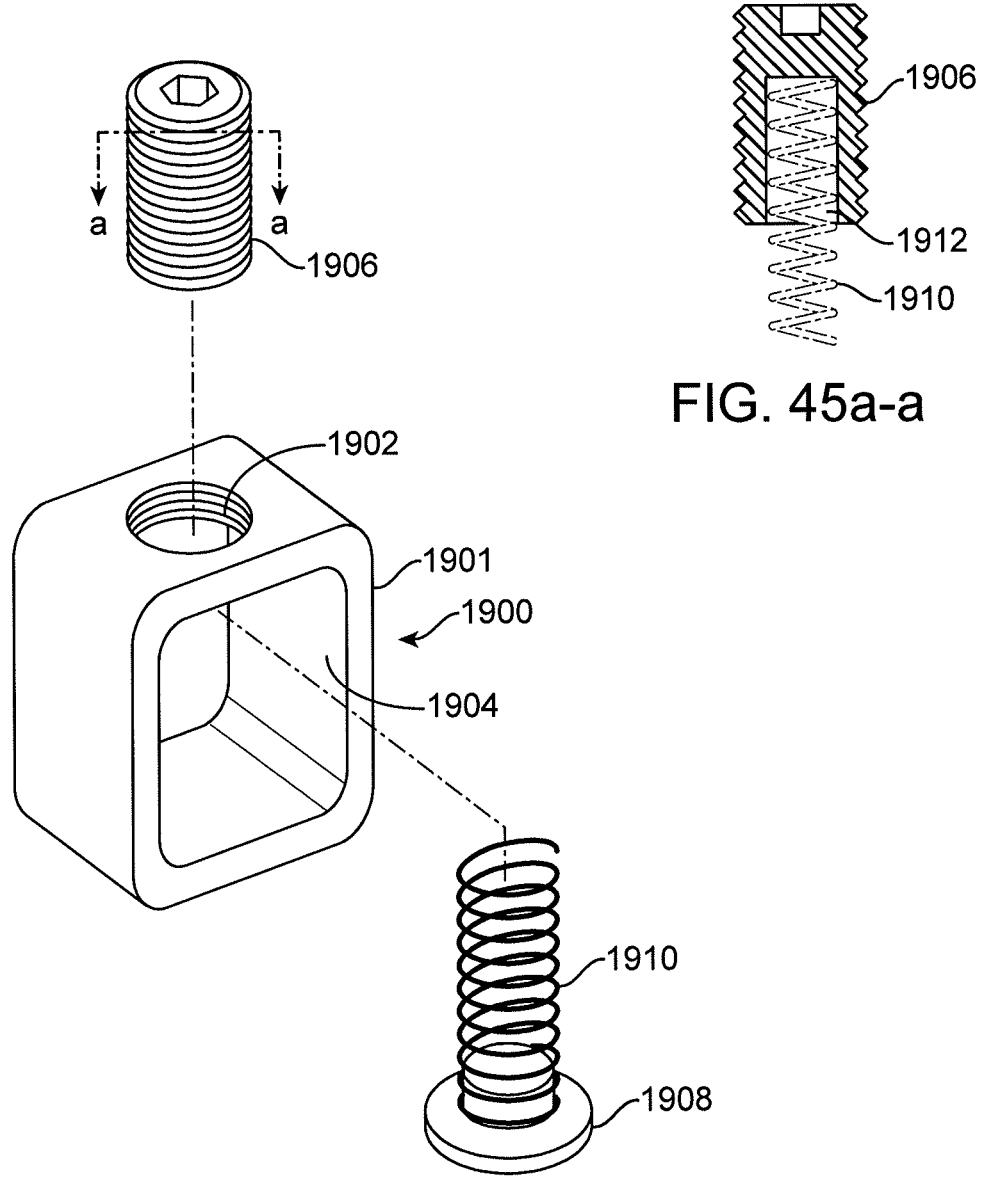
FIGS. 45a-45h illustrate a locking assembly in accordance with some embodiments.
Figure 45B:
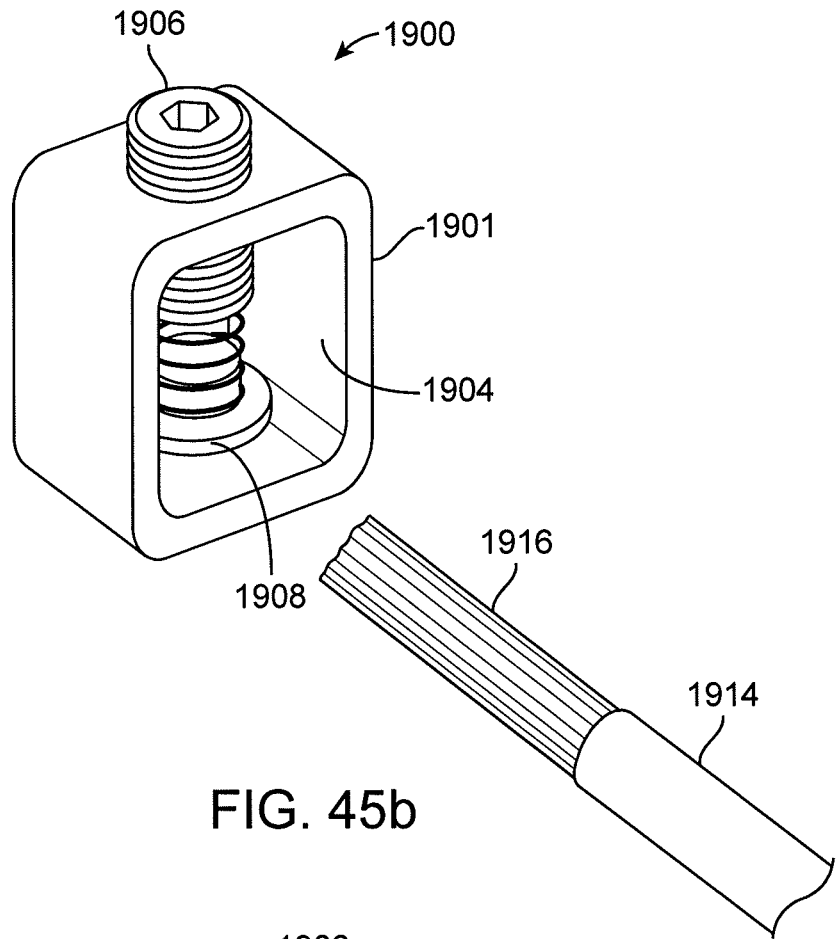
Figure 45C:
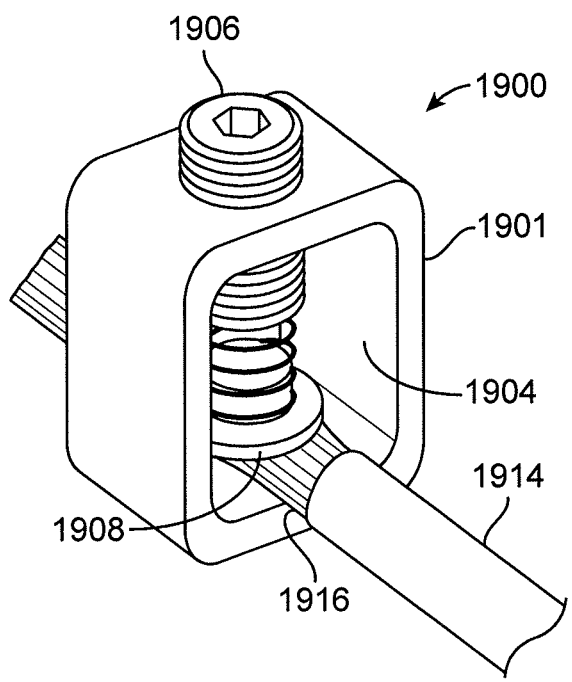
Figure 45D:
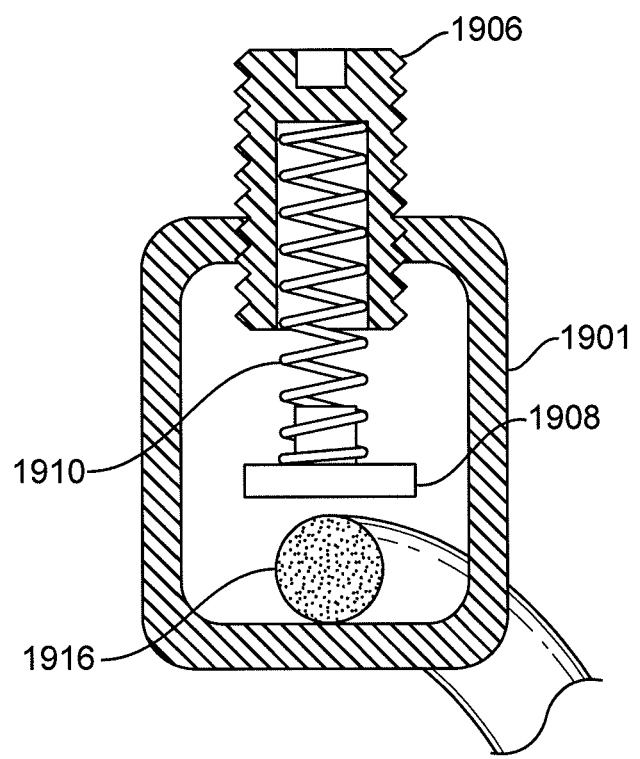
Figure 45E:
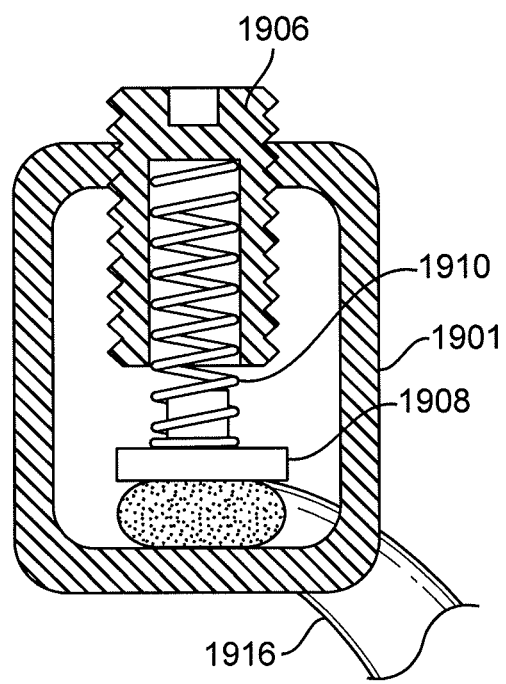
Figure 45F:
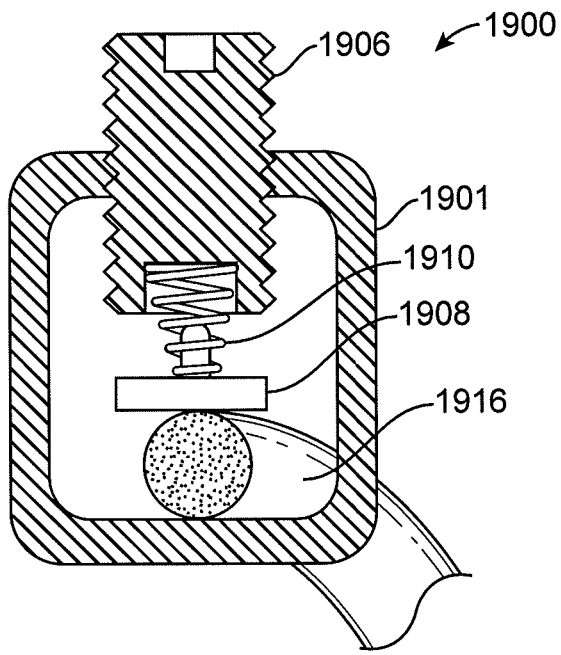
Figure 45G:
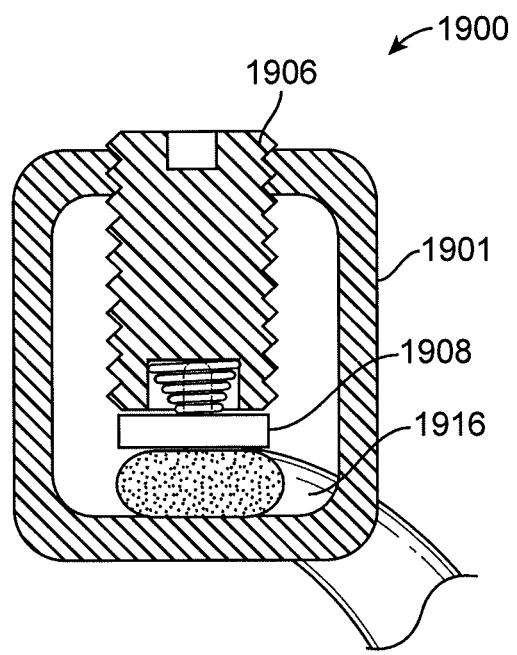

FIGS. 45f-45g illustrate a locking assembly 1900 with a tapered compressible element 1910. The tapered compressible element 1910 can be used with a drive shaft having a smaller internal bore than the drive shafts illustrated in FIGS. 45a-45e.

Figure 45H:
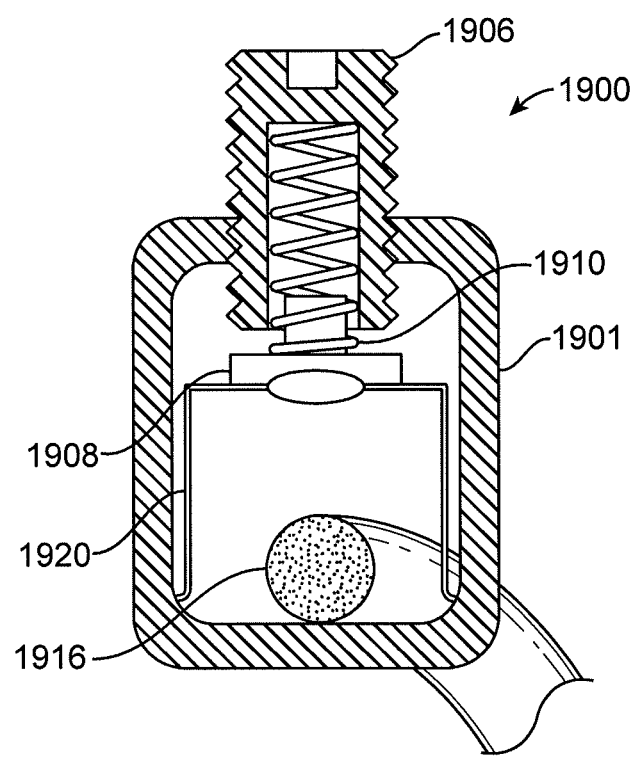

FIG. 45h illustrates a locking assembly 1900 with a spacer 1920. The spacer 1920 can be provided with the locking assembly 1900 such that the locking element 1908 and compressible element 1910 are held in a raised configuration. The spacer 1920 can facilitate placing the stranded element ends 1916 in the housing 1901 without the locking element 1908 in the way. After the stranded element ends 1916 are within the locking assembly 1900 then the spacer 1920 can be removed thereby allowing the locking element 1908, compressible element 1910, and drive shaft 1906 to be advanced towards the stranded element ends 1916.

In some embodiments the locking assemblies can be configured to engage with another locking assembly to make a mechanical and/or electrical connection between the locking assemblies. FIGS. 47a-47e and 48a-48e illustrate various views of locking assemblies that can be connected together.

A first locking assembly 2000 includes a housing 2001 having a first receiving bore 2002, second receiving bore 2004, first aperture 2006, second aperture 2007, first locking bore 2010, second locking bore 2012, and threaded portion 2008. The first locking bore 2010 is configured to receive a first locking element 2014, compressible element 2017, optional pin 2018, and first drive shaft 2019. The second locking bore 2012 is configured to receive a second locking element 2016, compressible element 2020, optional pin 2021, and second drive shaft 2022. The drive shafts 2019 and 2022 illustrate a 12 point socket head. The first receiving bore 2002 is configured to receive a first stranded element 2024 and the second receiving bore 2004 is configured to receive a second stranded element 2026.

A second locking assembly 2030 includes a housing 2031 having a first receiving bore 2038, second receiving bore 2040, first aperture 2036, second aperture 2037, first locking bore 2032, and second locking bore 2034. The first locking bore 2032 is configured to receive a first locking element 2042, compressible element 2045, and first drive shaft 2046. The second locking bore 2034 is configured to receive a second locking element 2044, compressible element 2048, and second drive shaft 2049. The first receiving bore 2038 is configured to receive a first stranded element 2050 and the second receiving bore 2040 is configured to receive a second stranded element 2052.

Figure 47A:
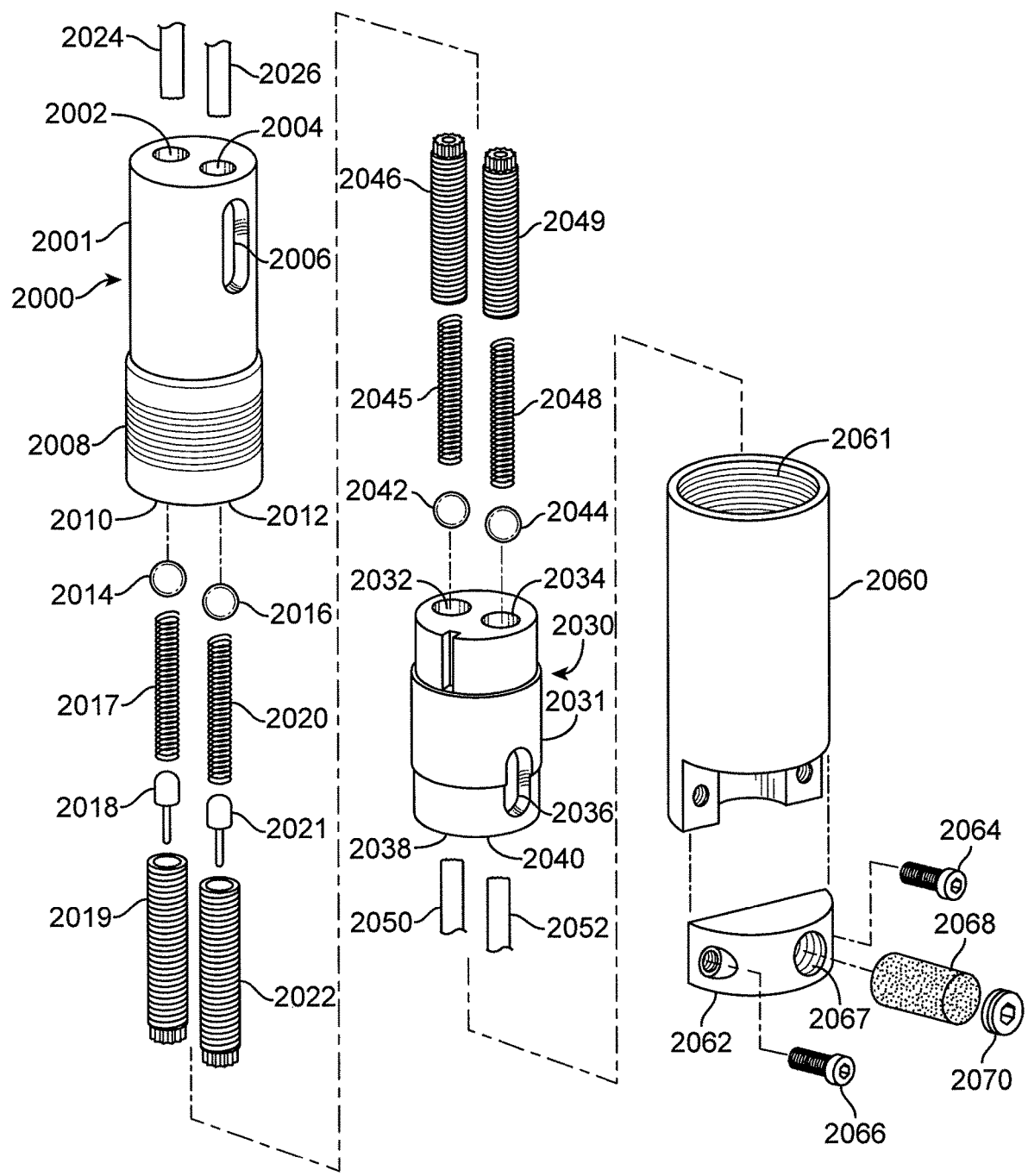
Figure 47B:
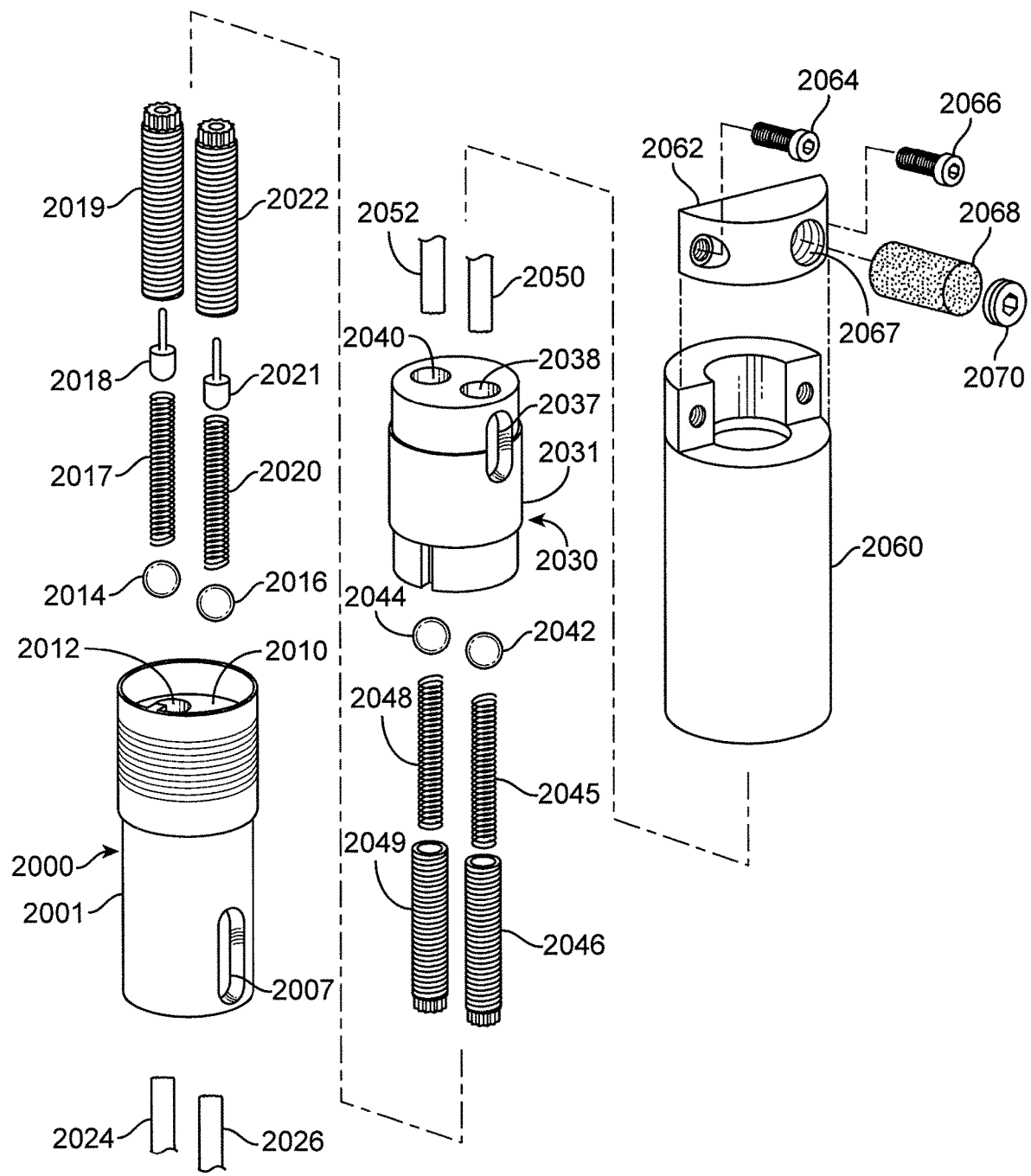
Figure 47C:
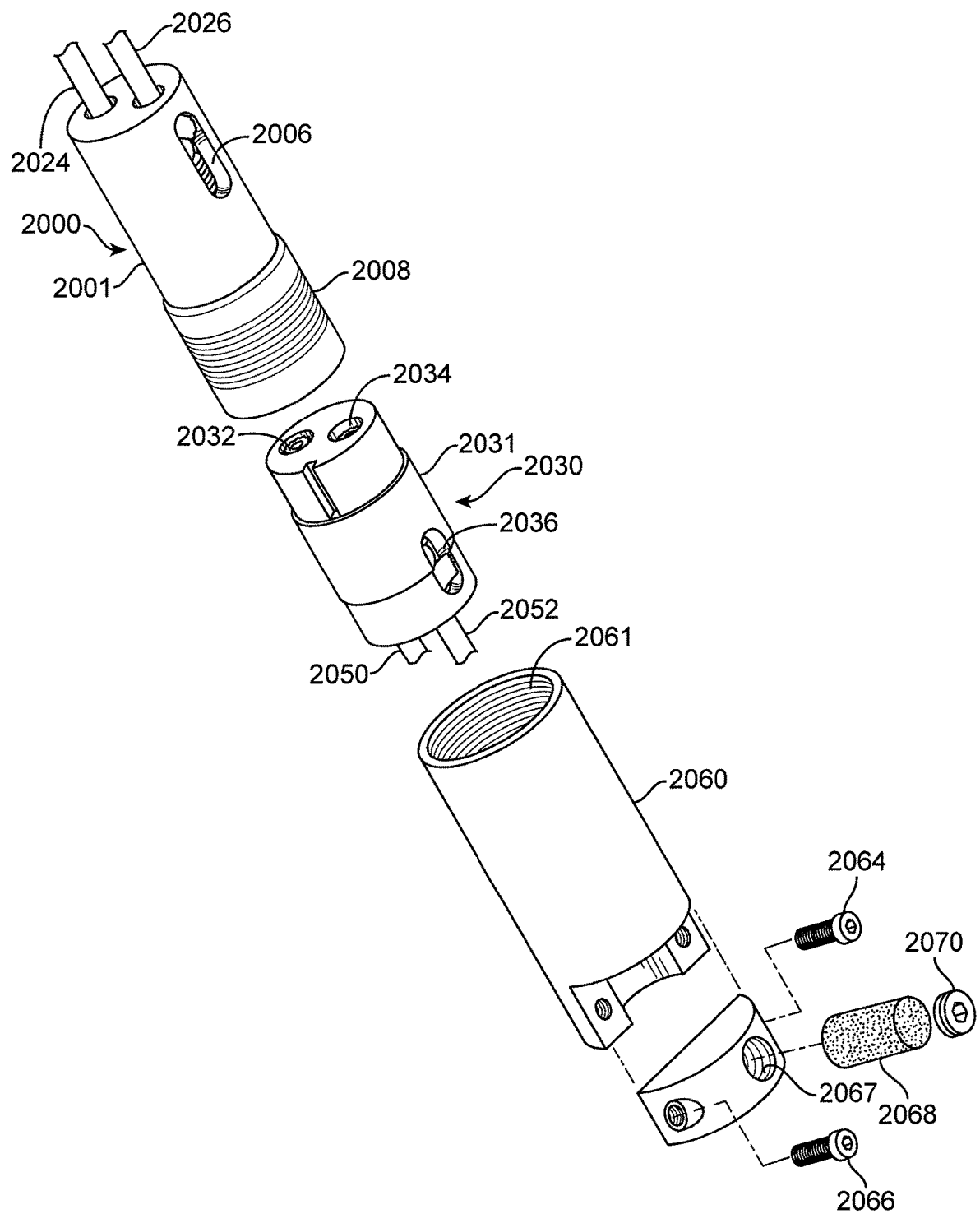
Figure 47D:
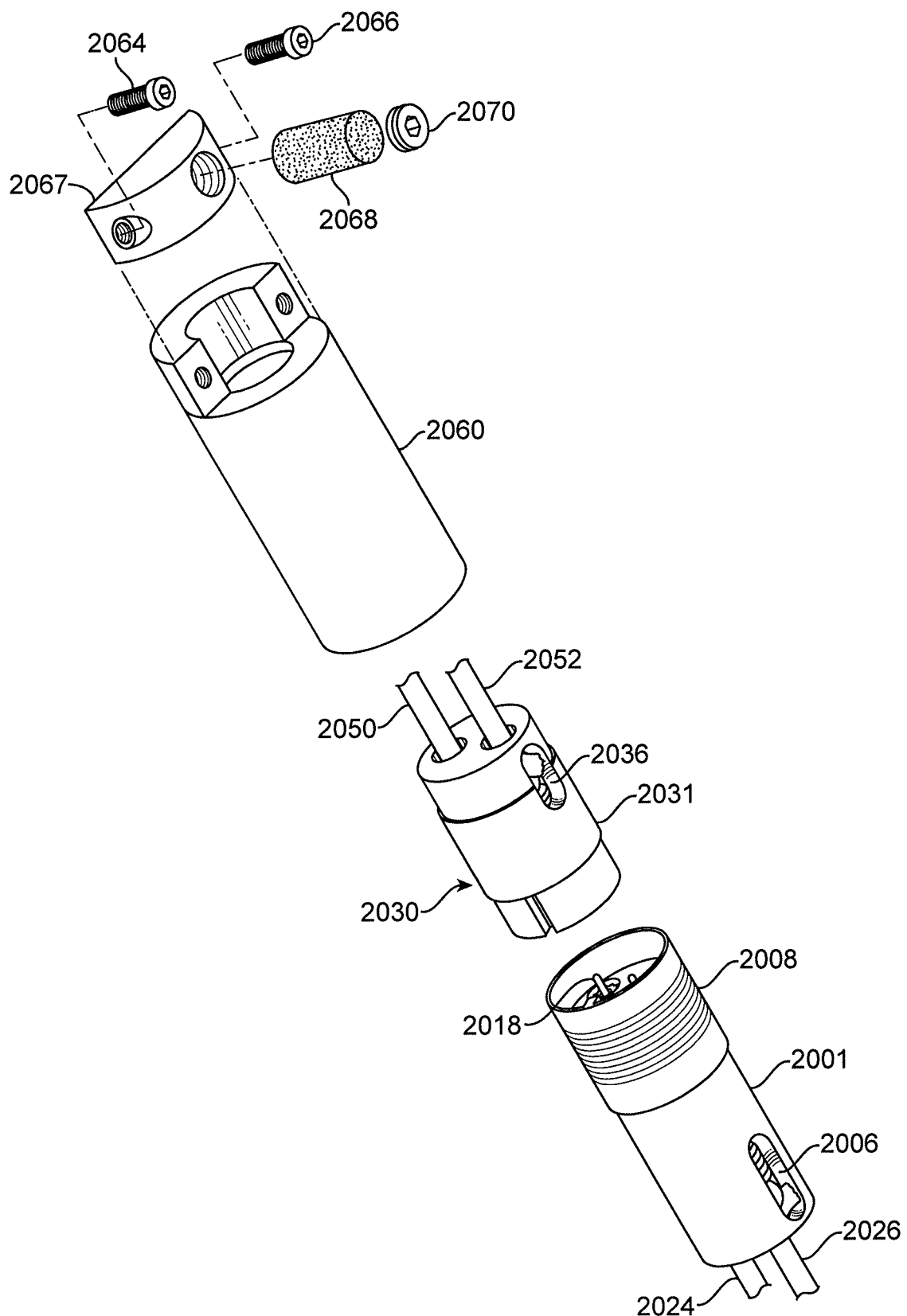

An attachment component 2060 can slide over the second locking assembly 2030 and stranded elements 2050, 2052. The attachment component 2060 can include a threaded portion 2061 to screw onto the threaded portion 2008 of the first locking assembly 2000. The attachment component 2060 can secure the first locking assembly 2000 to the second locking assembly 2030. A cover 2062 can be provided for the attachment component 2060. The cover 2062 can be secured to the attachment component 2060 with screws 2064, 2066. The cover 2060 can include a locking bore 2067 for a locking element 2068 and drive shaft 2070. The locking element 2068 can be used to secure the stranded elements 2050, 2052 to the attachment component 2060. FIGS. 47b-47d illustrate additional views of the locking assemblies.

FIG. 47e illustrates a second attachment component 2072 configured to cover the locking assembly 2000 in accordance with some embodiments. The second attachment component can be attached to the locking assembly by advancing a drive shaft 2076 through opening 2074 into opening 2078. FIG. 47e illustrates a cover 2080 can be provided for the attachment component 2072. The cover 2080 can be secured to the second attachment component 2072 with screws 2082, 2084. The cover 2080 can include a locking bore 2090 for a locking element 2086 and drive shaft 2088. FIG. 47f illustrates the locking assemblies of FIG. 47e in an assembled configuration.

FIGS. 47a-e illustrate cross-sectional views of locking assemblies of FIGS. 47a-47e. The connected locking assemblies 2000 and 2030 provide an electrical connection between stranded elements 2024 and 2050 and between stranded elements 2026 and 2052. The locking elements, pins, compressible elements, and drive shafts can be made out of a conductive material such that an electrical connection between the stranded elements is provided. The locking assembly 2000 can be attached to the stranded elements 2024 and 2026 as illustrated in FIG. 48a. The drive shaft 2019 can be advanced within the locking bore 2010 to push the compressible element 2017 and locking element 2014 against the stranded element 2024. The drive shaft 2022 can be advanced within the locking bore 2012 to push the compressible element 2020 and locking element 2016 against the stranded element 2026. Locking assembly 2030 can be attached to the stranded elements 2050 and 2052 in a similar fashion. The drive shaft 2046 can be advanced to push the locking element 2042 and compressible element 2045 against the stranded element 2050. The drive shaft 2049 can be advanced to push the locking element 2044 and compressible element 2044 against the stranded element 2052.

Figure 48C:
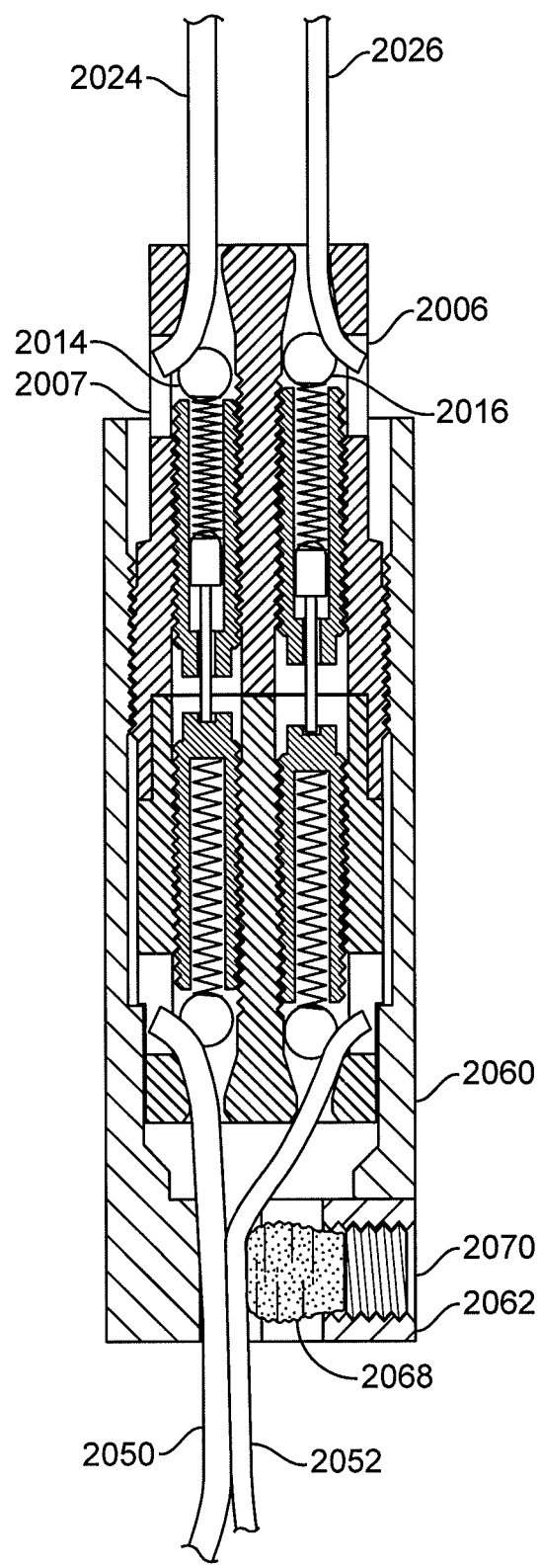
Figure 48D:
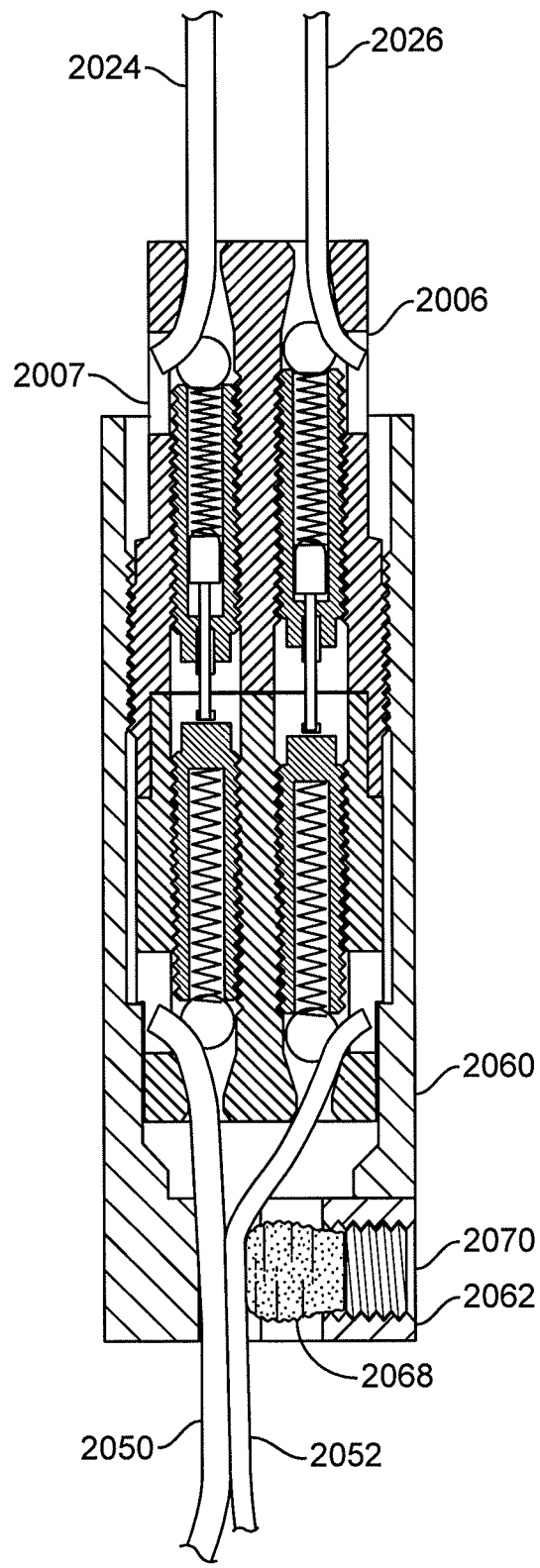

As shown in FIG. 48b the locking assemblies can be engaged via complementary surfaces. Pins 2018 and 2021 can provide electrical contact between the stranded elements. The pin 2018 can contact the compressible element 2017 and drive shaft 2019 with an opposing end contacting and providing electrical contact with drive shaft 2046. The pin 2021 can contact the compressible element 2021 and drive shaft 2022 with an opposing end contacting and providing electrical contact with drive shaft 2049. The attachment component 2060 can slide over and engage with the locking assemblies 2000, 2030 to couple the locking assemblies 2000, 2030 together as illustrated in FIGS. 48c-48d.

Figure 49A:
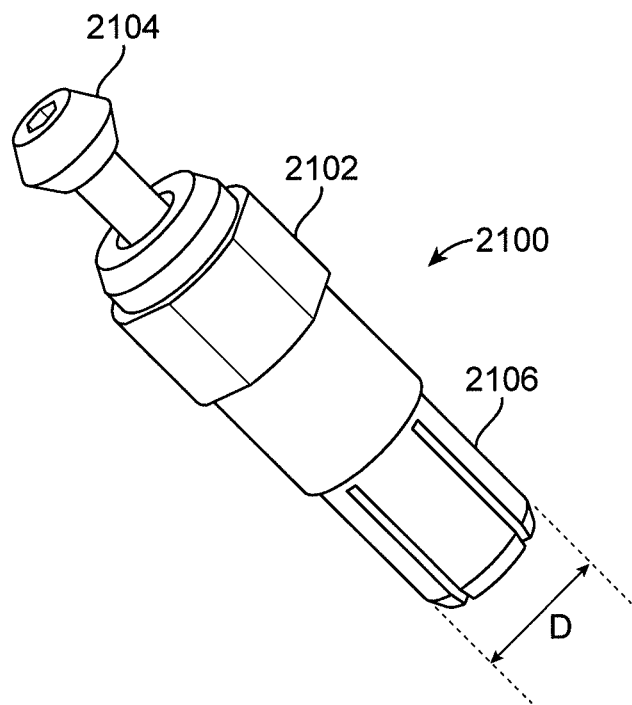
FIGS. 49a-49b illustrate a locking assembly as part of a distributor cap conversion pin in accordance with some embodiments.
Figure 49B:
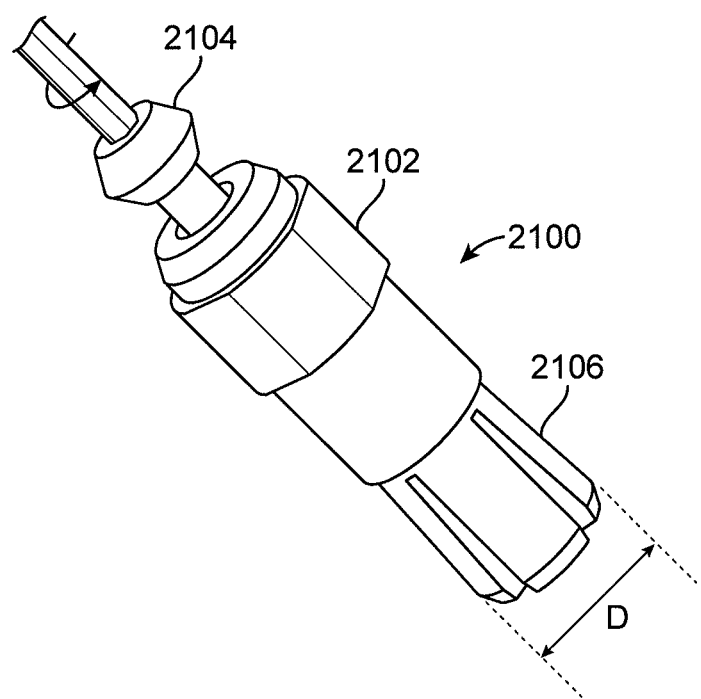
Figure 50A:
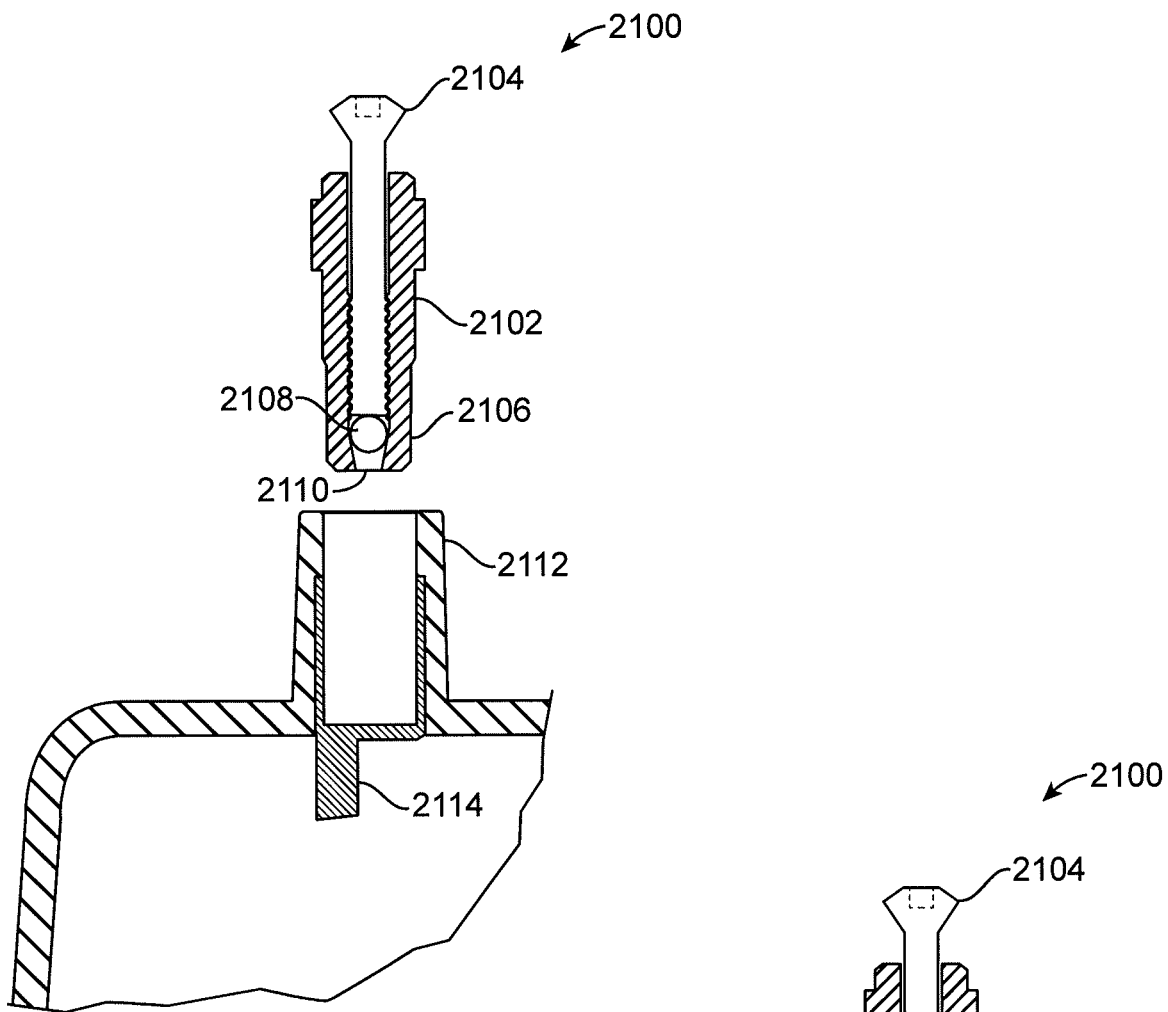
FIGS. 50a-50d illustrate cross-sectional views of the locking assemblies of FIGS. 49a-49b.
Figure 50B:
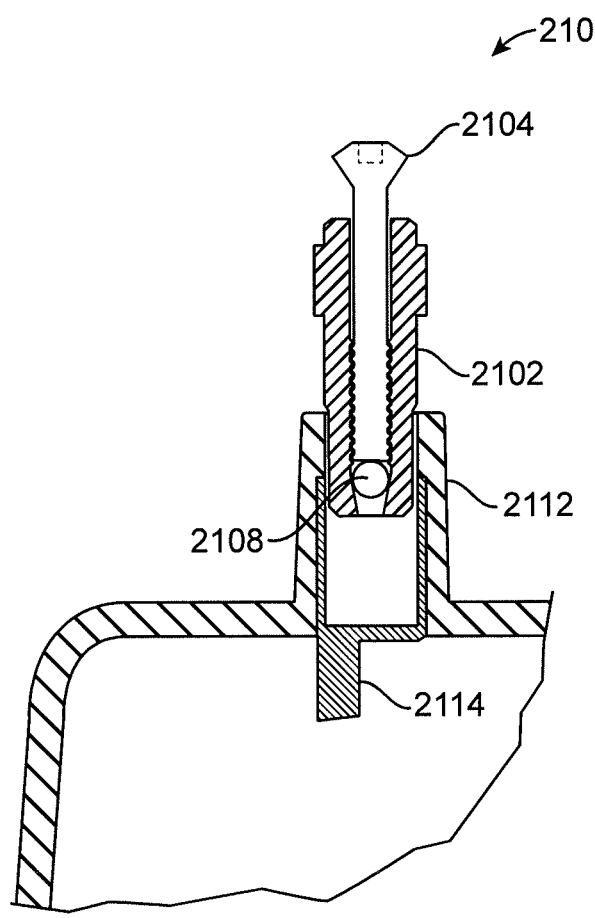
Figure 50C:
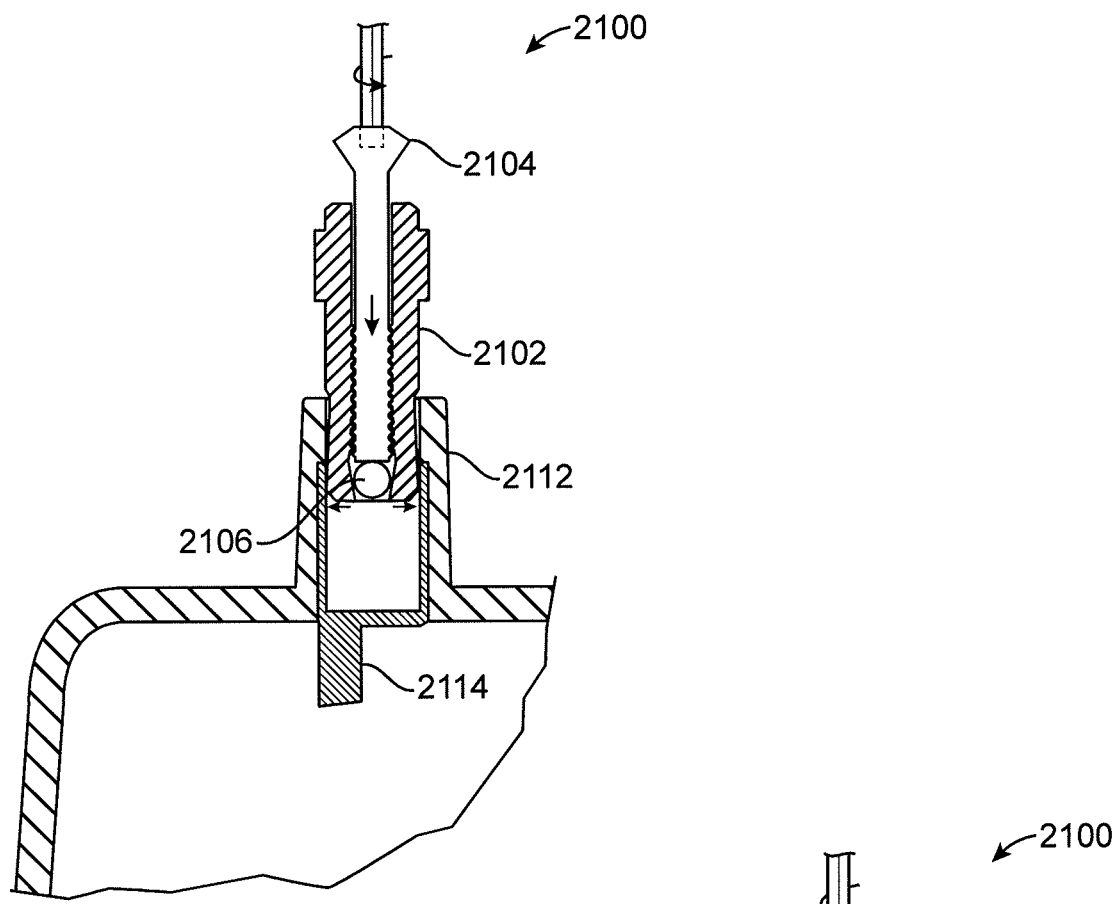
Figure 50D:
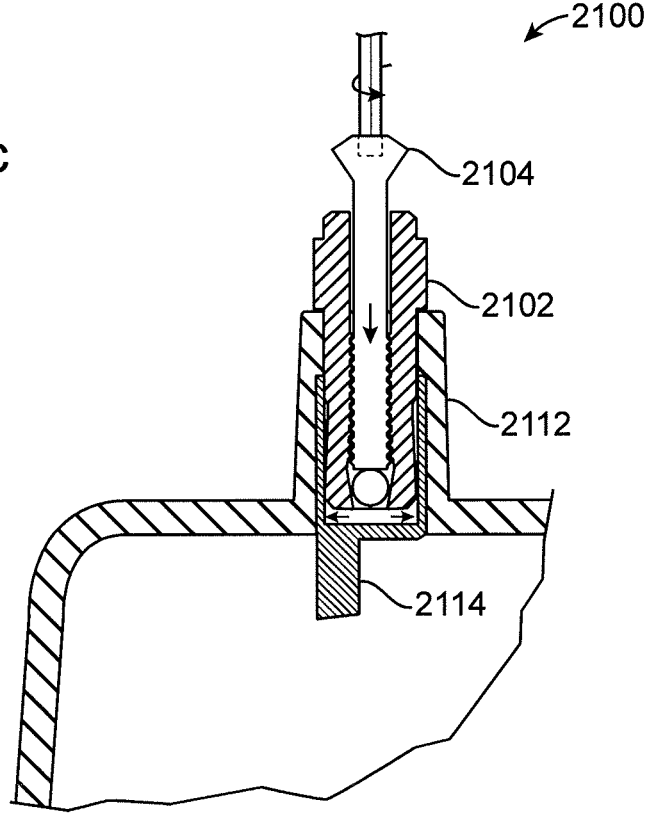
Figure 51A:
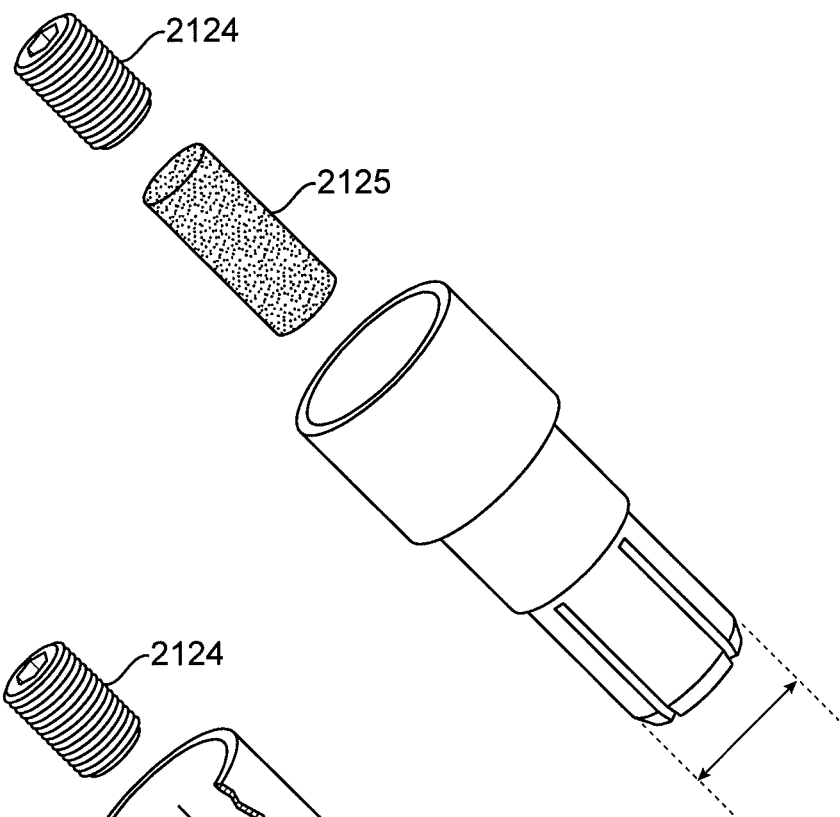
FIGS. 51a-51c illustrate views of a distributor cap body with a locking assembly in accordance with some embodiments.
Figure 51B:
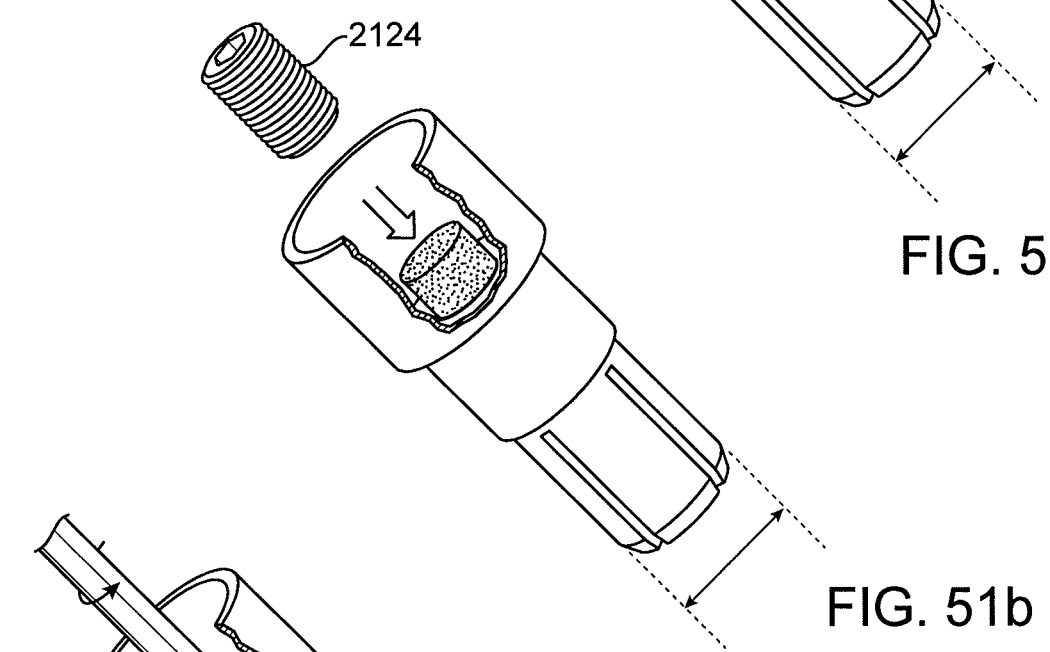
Figure 51C:
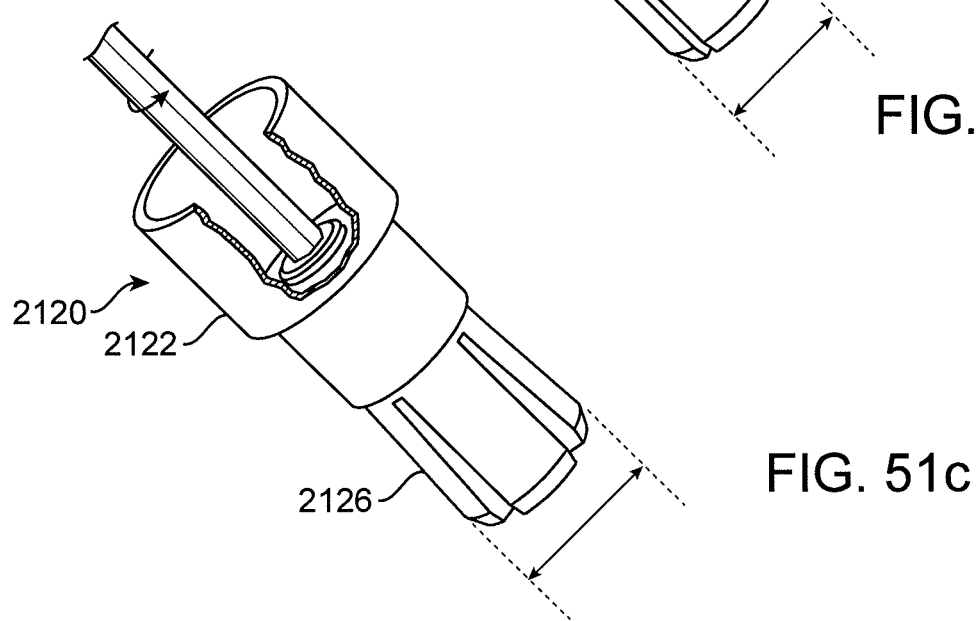
Figure 52A:
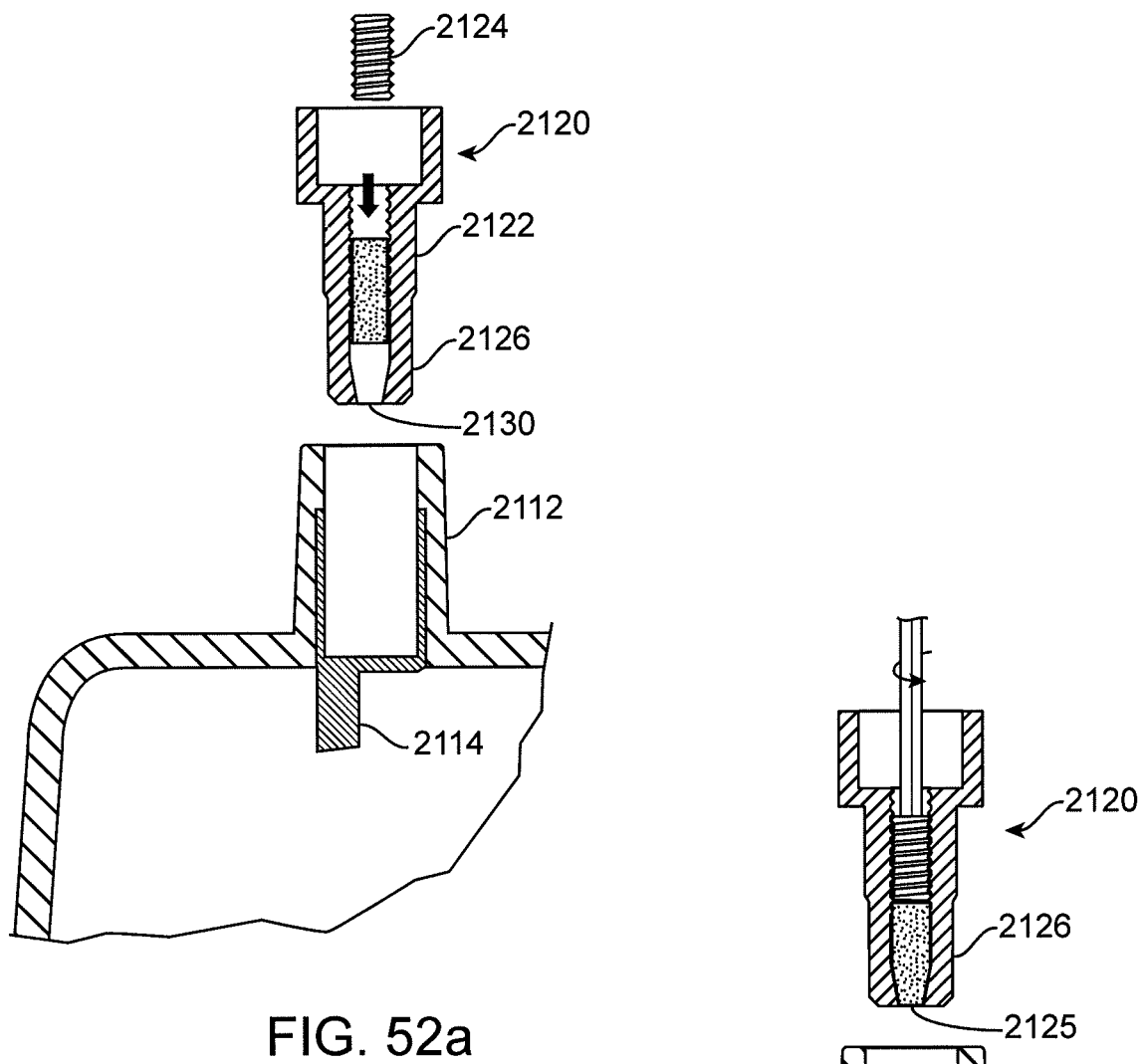
FIGS. 52a-52d illustrate cross-sectional views of the locking assemblies of FIGS. 51a-51c.
Figure 52B:
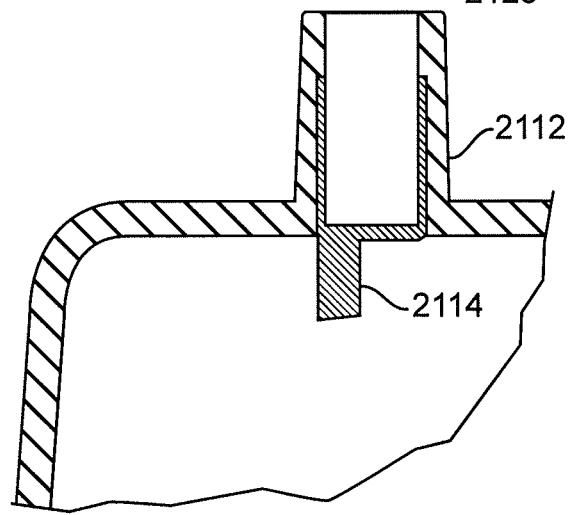
Figure 52C:
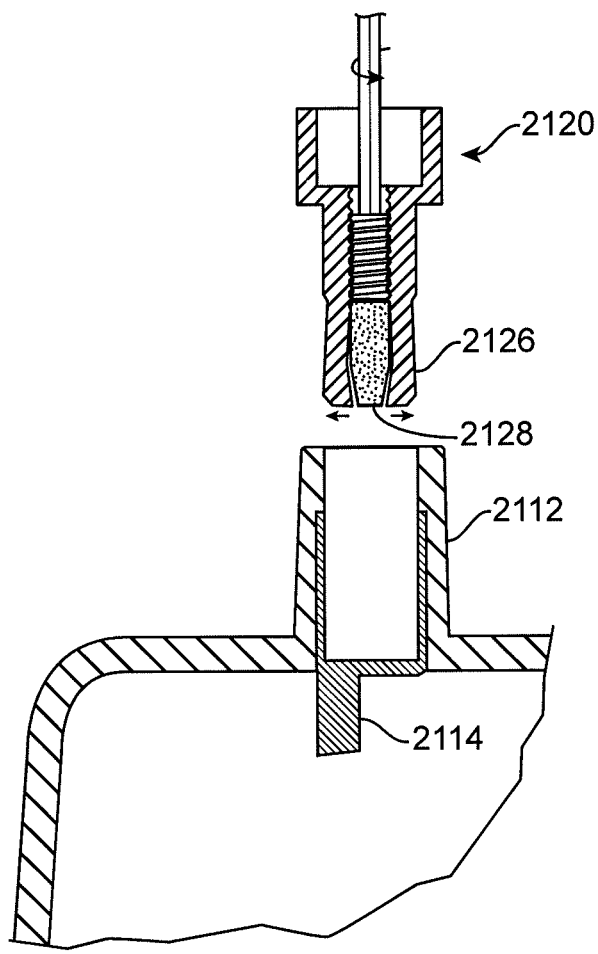
Figure 52D:
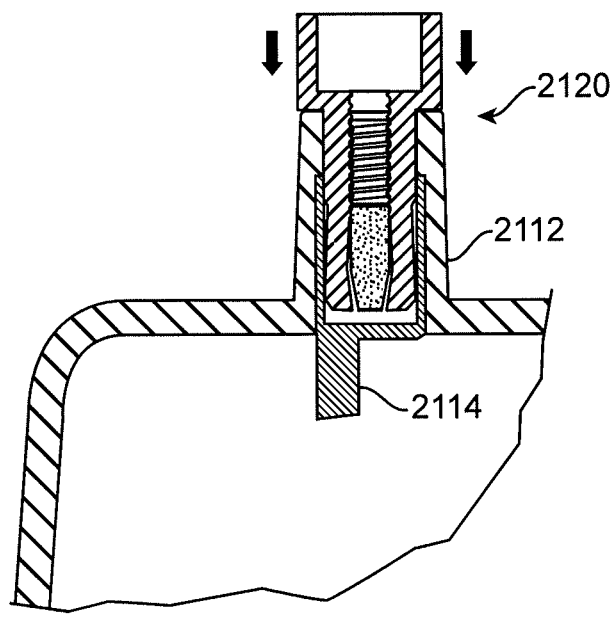

In some embodiments the locking assemblies can be used with a distributor cap assembly. FIGS. 49a-49b, 50a-50d, 51a-51c, and 52a-52d illustrate embodiments of conversion pin assemblies that can be used to convert a female distributor cap to a male pin type connection. The male pin connection can have a similar configuration to a conventional spark plug. FIGS. 49a-49b illustrate a conversion pin assembly 2100. The distributor cap assembly includes a housing 2102 with prongs 2106 and a drive shaft 2104. Advancing the drive shaft 2104 pushes open the prongs 2106 to increase a diameter D of the prongs. The drive shaft 2104 can be advanced within the bore 2110. A locking element 2108 can be advanced by the drive shaft 2104 to push against an interior wall of the bore 2110. The wall of the bore 2110 can have a sloped configuration such that advancing the drive shaft 2104 and locking element 2108 expands the diameter of the prongs 2106 as shown in FIGS. 49-50. The conversion pin assembly 2100 can be advanced into a female receptacle 2112 having a contact 2114. The female receptacle 2112 can be part of a distributor cap having a plurality of female receptacles. The expansion of the prongs 2106 can form mechanical and/or electrical contact with the contact 2114. The conversion pin assemblies can be used with conventional distributor cap having female receptacles. The conversion pin assemblies can convert the female receptacles with male pins.

The conversion pin assemblies can be reused and can produce higher quality connections versus conventional crimp-on type connections. In some embodiments the conversion pin assemblies can be used in high performance automotive applications, such as racing applications.

FIGS. 51a-51c and 52a-52d illustrate an embodiment of a distributor cap terminal assembly 2120. The distributor cap assembly includes a housing 2122 with prongs 2126 and a drive shaft 2124. Advancing the drive shaft 2124 pushes open the prongs 2126 to increase a diameter D of the prongs. The drive shaft 2124 can be advanced within the bore 2130. A locking element 2125 can be advanced by the drive shaft 2124 to push against an interior wall of the bore 2130. The locking element 2125 can be compressed as it advances within the bore 2130. The wall of the bore 2130 can have a sloped configuration such that advancing the drive shaft 2124 and locking element 2125 expands the diameter of the prongs 2126. The distributor cap terminal assembly 2120 can be advanced into a female receptacle 2112 having a contact 2114. The female receptacle 2112 can be part of a distributor cap having a plurality of female receptacles. The expansion of the prongs 2126 can form mechanical and/or electrical contact with the contact 2114. The distributor cap terminal assemblies can be used with conventional distributor cap having female receptacles. The distributor cap terminal assemblies can be reused and can produce higher quality connections versus conventional crimp-on type connections. In some embodiments the conversion pin assemblies can be used in high performance automotive applications, such as racing applications.

FIGS. 53a-53g, 54a-54c, and 55a-55b illustrate embodiments of locking assemblies that can be used with spark plug connections as well as the conversion pin assemblies described herein, such as the conversion pin assemblies illustrated in FIGS. 49a-50d. A pin connector 2200 includes a pin connector housing 2202. The housing 2202 includes a locking bore 2204 configured to receive a locking element 2206, compressible element 2208, and drive shaft 2210. The housing 2202 includes an opening 2212. The pin connector 2200 can be configured to engage with another locking assembly as illustrated. A locking assembly is also provided to engage with a stranded element, such as the illustrated spark plug wire 2237 illustrated in FIG. 53a. The spark plug wire 2237 includes insulation 2238 and stranded element 2240.

The locking assembly 2220 includes a housing 2221 with a receiving bore 2224 configured to receive the stranded element 2240. The housing 2221 can include a threaded portion 2222 to facilitate attachment with another device or structure. The housing 2221 includes a locking bore 2226 and aperture 2228. The aperture 2228 is configured to allow the stranded element 2240 to exit an internal space of the housing 2221. The locking bore 2226 is configured to receive a locking element 2230 and drive shaft 2232. A locking ring 2234 is also provide along with an attachment component 2236. The attachment component 2236 can be used to couple the pin connector 2200 to the locking assembly 2220.

Figure 53A:
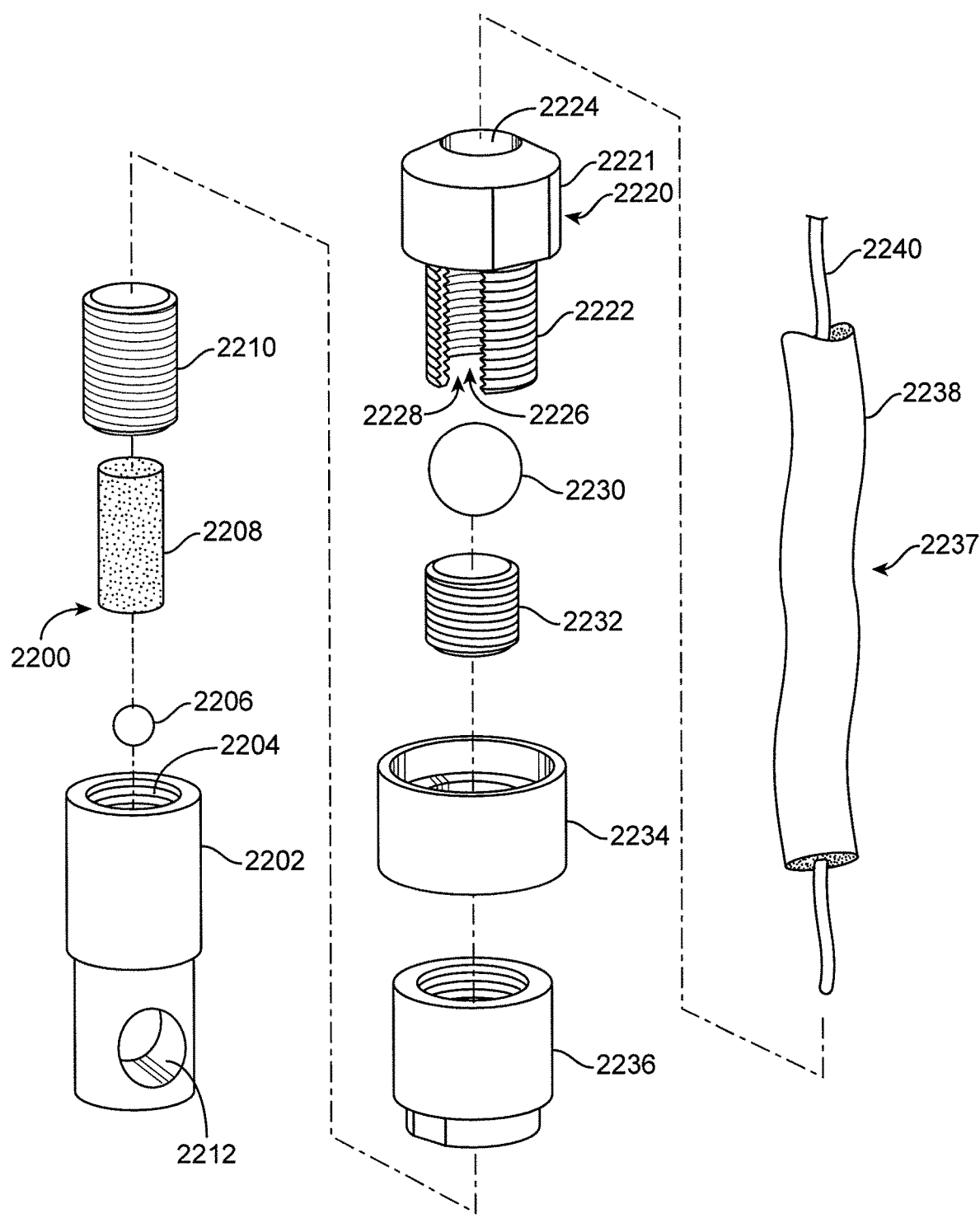
FIGS. 53a-53g illustrate a locking assembly that is part of a spark plug in accordance with some embodiments.
Figures 53B, 53C:
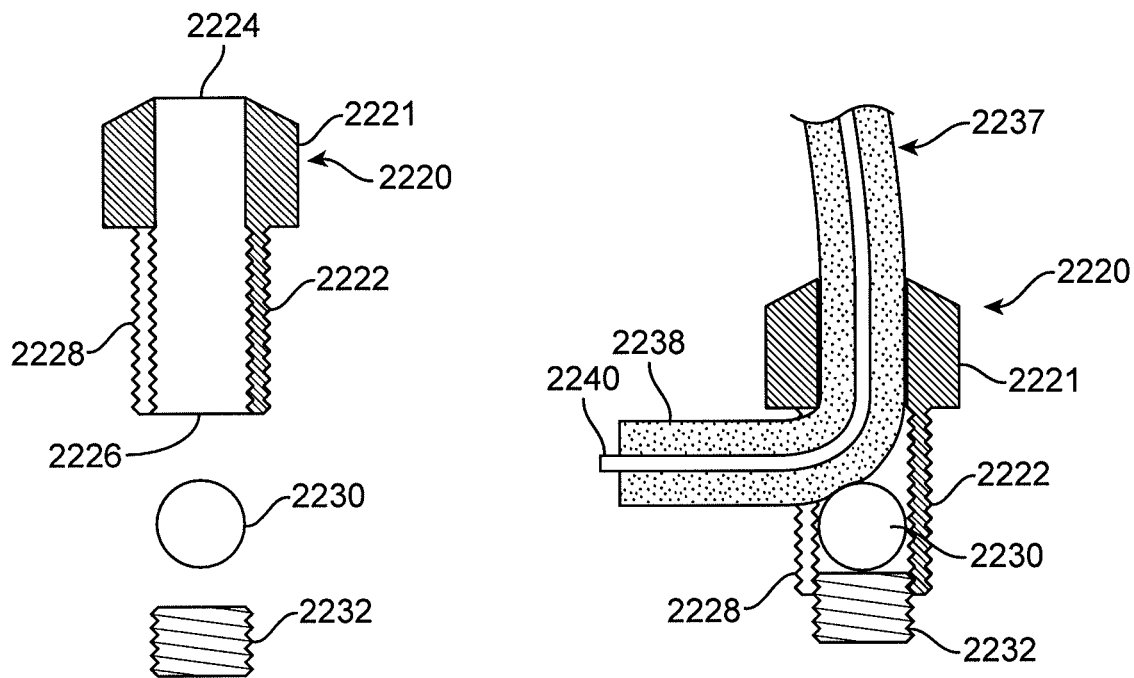
Figure 53D:
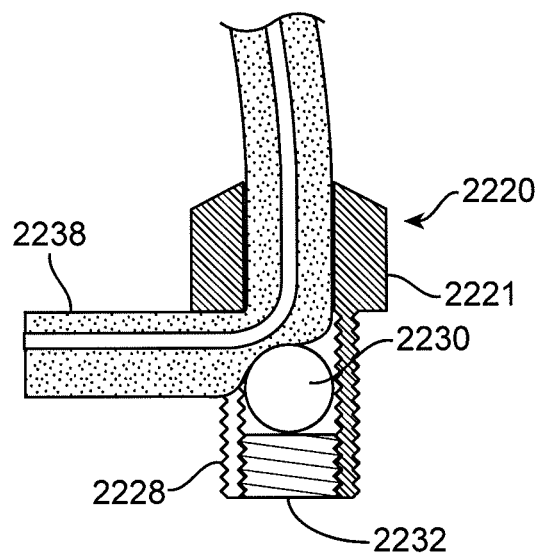
Figure 53E:
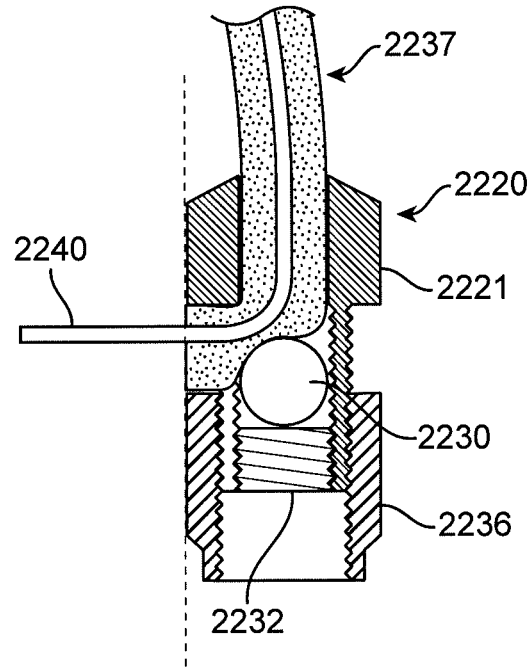
Figure 53F:
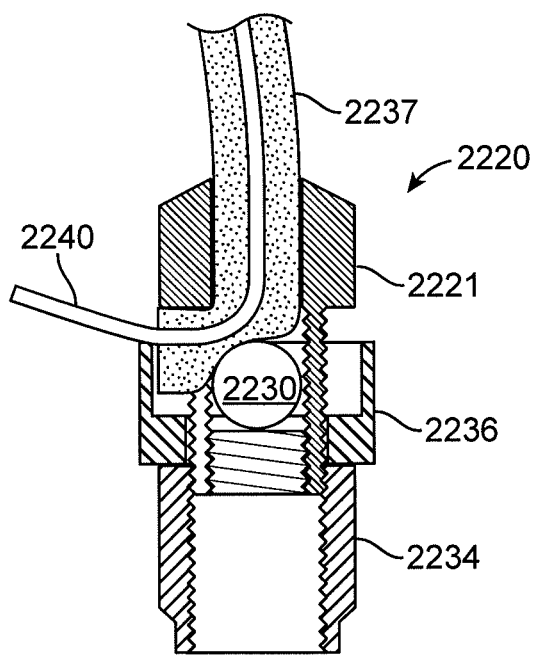
Figure 53G:
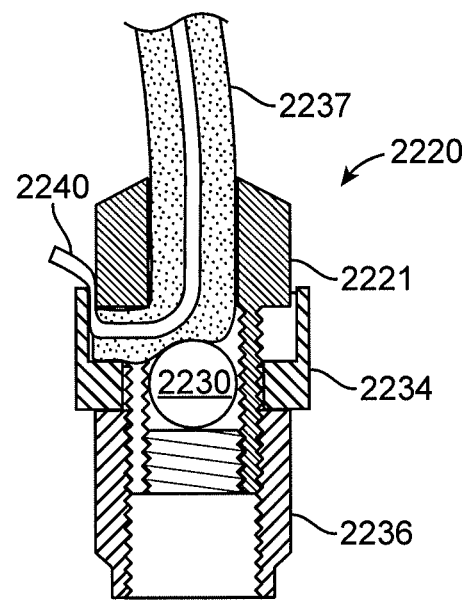

FIG. 53b illustrates the locking assembly in an unassembled state while FIG. 53c illustrates the locking assembly housing 2221 engaged with the spark plug wire 2237. In FIG. 53c the spark plug wire enters the locking assembly housing 2220 through receiving bore 2224 and exits through the aperture 2228. The locking element is advanced within the locking bore 2226 to contact the spark plug wire 2237 by advancing the drive shaft 2232 as shown in FIG. 53c. Insulation 2238 can be removed from the spark plug wire 2237 adjacent to the aperture 2228 to expose the stranded element 2240 as illustrated in FIGS. 53d-53e. The locking ring 2234 and attachment component 2236 can be advanced over the locking assembly 2220 to cover the exposed stranded element 2240 as shown in FIGS. 53f and 53g.

Figures 54A, 54B:
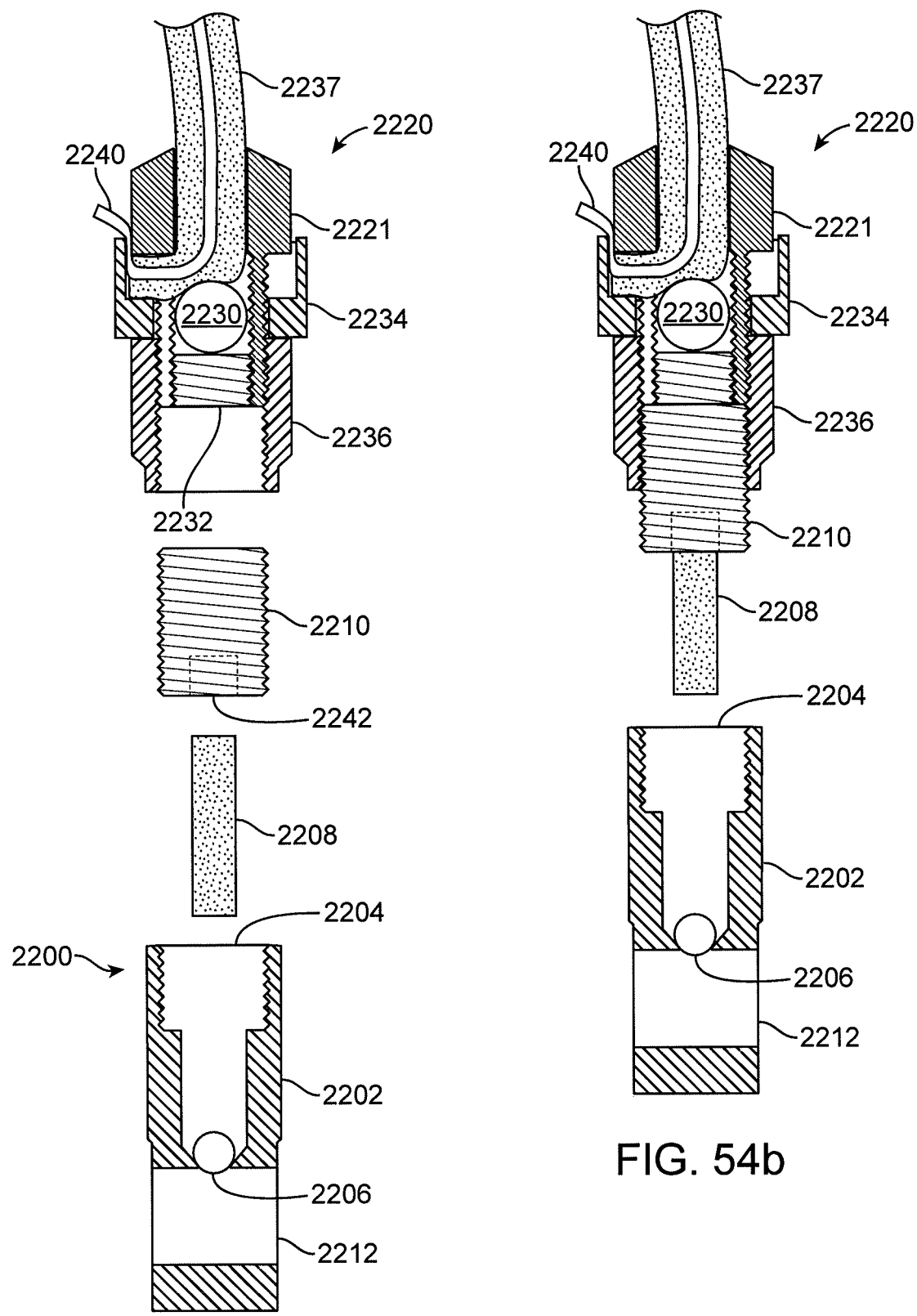
FIGS. 54a-54c illustrate a terminated spark plug wire with the spark plug locking assemblies of FIGS. 53a-53g in accordance with some embodiments.
Figure 54C:
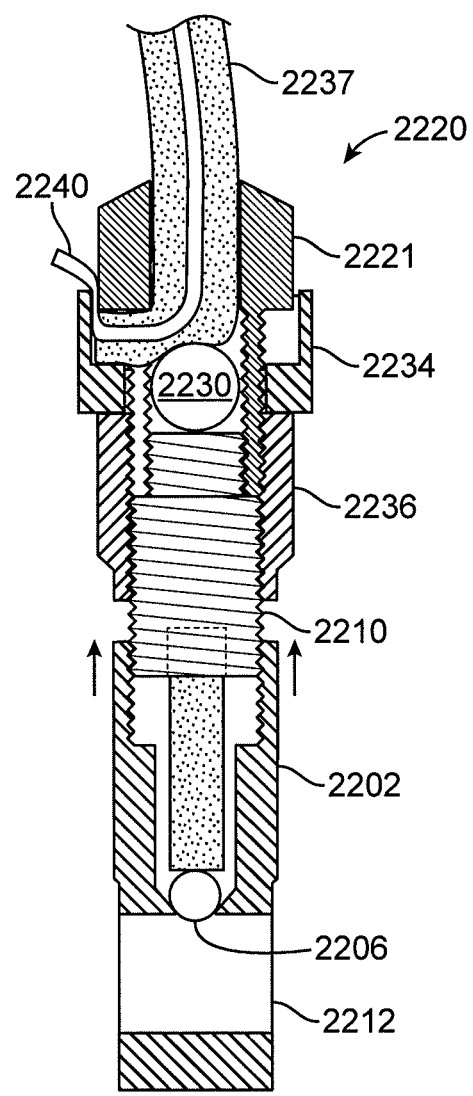

The locking assembly 2220 can be connected to the pin connector 2200 as shown in FIGS. 54a-54c. The drive shaft 2210 can be threaded onto the attachment component 2236. The drive shaft can also include a recess 2242 configured to receive a portion of compressible element 2208. The drive shaft 2210 can be threaded into connection with attachment component 2236 and advanced within locking bore 2204 to advance the compressible element 2208 into contact with the locking element 2206. This illustrated spark plug system can be used with a 90 degree pin connector.

Figures 55A, 55B:
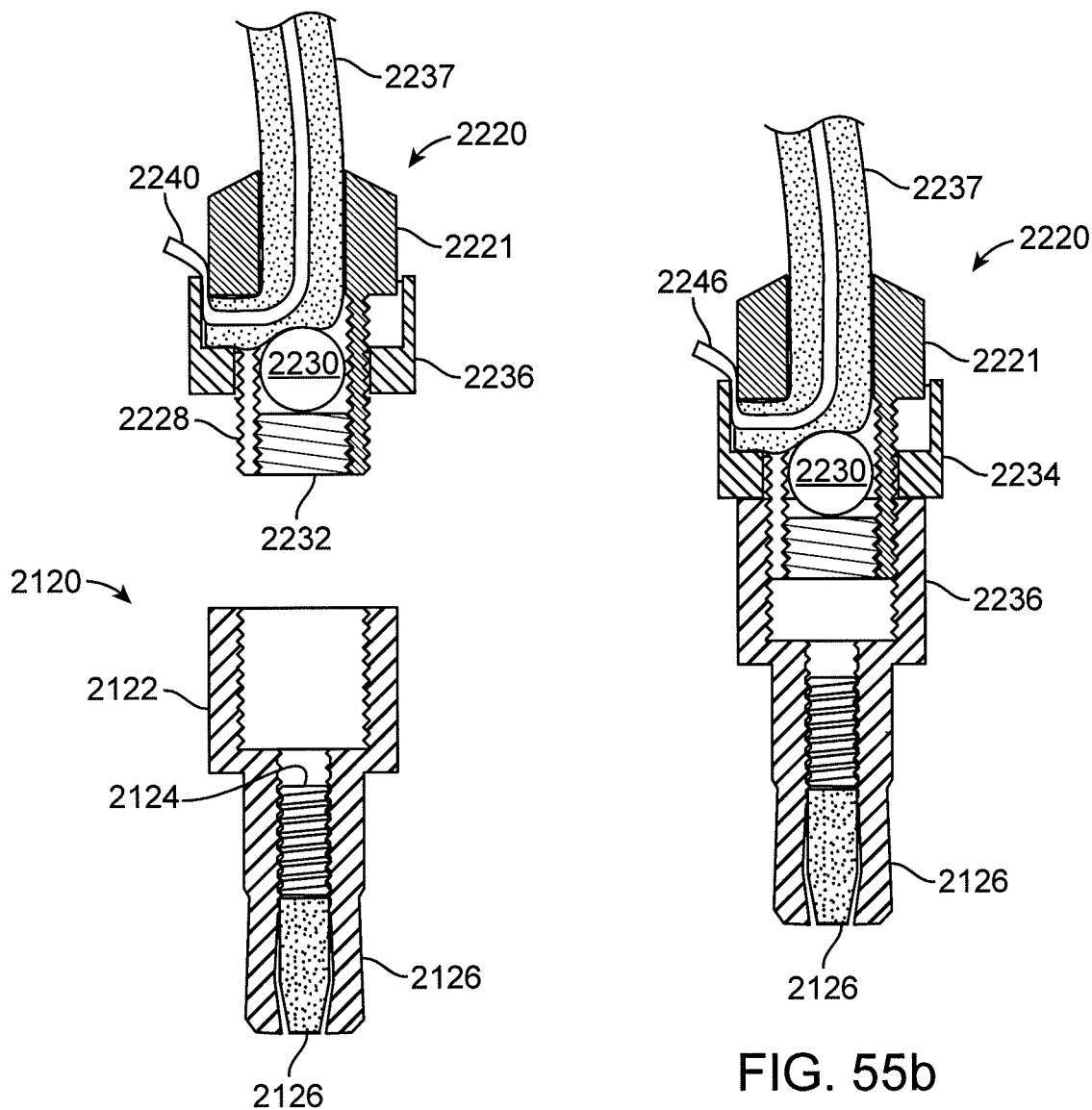
FIGS. 55a-55b illustrate locking assemblies with a spark plug in accordance with some embodiments.

FIGS. 55a-55b illustrate the use of the locking assembly 2220 with a spark plug pin connector such as the assembly 2120 illustrated in FIGS. 51a-51c and 52a-52d.

FIGS. 56a-56h illustrate embodiments of locking elements that can be used with the locking assemblies disclosed herein. In some embodiments the locking elements disclosed herein substantially retain their overall shape when forced against the stranded element.

FIGS. 56a-56b illustrate a deformable locking element 2300. FIG. 53a illustrates the deformable locking element 2300 prior to engagement with a stranded element. FIG. 53b illustrates the deformable locking element 2300 after engagement with the stranded element 2302 within the locking bore 2304. The deformable locking element 2300 has a non-spherical shape as it deforms based on contact with the stranded elements 2302. The deformable element can improve the distribution of force and improve contact between the stranded element and the locking element by increasing surface area contacting the stranded element. Examples of deformable materials include aluminum, brass, copper, and softer steel.

FIG. 56c illustrates a locking element 2310 with a textured surface 2312. The textured surface can be formed on all of the outer surface of the locking element 2310 or on less than the entire surface of the locking element 2310. Examples of textured surfaces 2312 include grooved, roughened, raised, etc. The textured surface can be applied to modify the physical properties of the locking element, such as the friction between the locking element and the other elements of the locking assembly, such as the stranded elements, drive shaft, aperture, locking bore, and receiving bore.

FIG. 56d illustrates a locking element 2314 including an interior portion 2315 and a coating 2317. The coating can be applied to achieve a desired surface property or texture on the locking element. Examples of coatings include copper, tin, nickel, gold, palladium, white bronze, chromium, and silver.

FIGS. 56e-56f illustrate locking elements with modified surface portions. FIG. 56e illustrates a locking element 2320 with a modified surface portion 2322 on substantially the entire exterior surface of the locking element 2320. FIG. 56f illustrates a locking element 2325 with discrete modified surface portions 2327. The discrete modified surface portions 2327 can be arranged in a pattern to modify the surface property or texture of the locking element 2325. The locking element surface can be treated to form the modified surface portion. Examples of treatments to modify the surface of the locking element include: etching, chemical etching, chemical treatments, mechanical polishing, chemical polishing, bead blasting, sanding, grinding, etc. Rough textures can also be formed in the locking elements by machining the locking elements. Another example of texturizing the surface of the locking element is using a roughened mold to form the locking element.

In some embodiments the roughed surface of the locking element can be textured based on the properties of the surfaces of the locking bore, receiving bore, and aperture. In some embodiments the receiving bore, locking bore, and aperture can also have any of the surface treatments used to roughen the locking element.

FIG. 56g illustrates a locking element 2330 with a raised portion 2332. The raised portion 2332 can be sized to fit a complementary female structure within the locking bore of the locking assembly. FIG. 56h illustrates a locking element 2335 with a recessed portion 2337. The recessed portion 2337 can be sized to fit a complementary male structure within the locking bore of the locking assembly.

FIG. 57a illustrates an embodiment of a drive shaft 2400 with a recessed hexagonal feature 2402 that can be used to turn the drive shaft 2400 within the receiving bore. FIG. 57b illustrates an embodiment of a drive shaft 2400 with a raised hexagonal feature 2404 that can be used to turn the drive shaft 2400 within the receiving bore. Hexagonal features 2402 and 2404 are illustrated in FIGS. 57a-57b but other geometric shapes can be used such as triangular, square, rectangular, pentagonal, heptagonal, octagonal, nonagonal, decagonal, etc. In some embodiments the drive shaft is configured to be driven by any standard ratchet size. For example the drive shafts can also be a 12 point socket head as illustrated in FIGS. 47a-47b. Other drive shafts can include a four point, five point, six point, seven point, eight point, nine point, ten point, eleven point, or twelve point socket head.

FIGS. 57c-57g illustrate cross-sectional views of drive shafts 2400 having features configured to turn the drive shafts 2400 within a receiving bore. FIG. 57c illustrates a drive shaft 2400 with a feature 2406 suitable for turning with a flat shape driver, such as a flat head screwdriver. FIG. 57d illustrates a drive shaft 2400 with a feature 2408 suitable for turning with a Philips head screwdriver. FIG. 57e illustrates a drive shaft 2400 with a feature 210 having a hexagonal shape. FIG. 57f illustrates a drive shaft 2400 with a feature 2412 having a square shape. FIG. 57g illustrates a drive shaft 2400 with a feature 2414 having a "+" shape that can be driven with a cross-shaped or "+" shaped driver tool. The features illustrated in FIGS. 57c-57g are illustrated as recessed within the drive shaft 2400; however, any of the shapes and structures could be raised. A turning, ratcheting, or indexing action can be used to advance the drive shafts within the receiving bore.

FIG. 57h illustrates a drive shaft 2420 with a smooth outer surface 2422 instead of a threaded exterior surface. The drive shaft 2420 can employ a friction fit to advance the locking element and hold it in place within the locking assembly 2424. The locking assembly 2424 can include a locking bore with a smooth interior surface. The friction fit drive shaft 2420 can be used with any of the locking assemblies disclosed herein. The friction fit drive shaft 2420 can be advanced within the receiving bore by pushing the drive shaft 2420. In some embodiments the friction fit devices can be used with assemblies having a locking element window release (e.g. 1607) and a drive shaft with a compressible element, such as a spring. The drive shafts having a smooth outer surface can be particularly useful for products for low voltage applications like automotive applications.

FIGS. 58a-58d illustrate embodiments of locking assembly housings having different cross-sectional shapes. FIG. 58a illustrates a locking assembly 2500 with a housing 2502, receiving bore 2504, and aperture 2506. The housing 2502 has a square cross-sectional shape. FIG. 58b illustrates a locking assembly 2510 with a housing 2512, receiving bore 2514, and aperture 2516. The housing 2512 has a circular cross-sectional shape. FIG. 58c illustrates a locking assembly 2520 with a housing 2522, receiving bore 2524, and aperture 2526. The housing 2522 has a pentagonal cross-sectional shape. FIG. 58d illustrates a locking assembly 2530 with a housing 2532, receiving bore 2534, and aperture 2536. The housing 2532 has a hexagonal cross-sectional shape. Other cross-sectional shapes are also possible depending on the application and desired shape. For example, the housing could have a spherical shape. Any of the embodiments described herein can have housings with any of the shapes illustrated in FIGS. 58a-58d.

The locking assemblies disclosed herein can include a housing surface with a desired surface texture. In some embodiments, such as the embodiment illustrated in FIG. 58a, the housing 2502 can have a smooth surface. FIG. 59a illustrates a locking assembly 2600 with a housing 2602 having roughened or textured surfaces 2604, receiving bore 2606, and aperture 2608. FIG. 59b illustrates a locking assembly 2610 with a housing 2612 having grooves 2614, receiving bore 2616, and aperture 2618. The textured surfaces can be used to improve grip between the housing and a covering material, such as a sleeve, shrink tube, insulator, insulating tape, polymer tube, or heat shrink material. Any of the embodiments of locking assemblies described herein can include any of the housing surface modifications illustrated in FIGS. 59a-59b and 60a-60b.

In some embodiments a covering material, such as a sleeve, shrink tube, insulator, insulating tape, polymer tube, or heat shrink material can be applied to the locking assembly. FIGS. 60a-60b illustrate embodiments of locking assemblies with coverings. FIG. 60a illustrates a locking assembly 2600 with a textured surface 2604 and receiving bore 2606. The locking assembly 2600 (illustrated without the stranded element) has a sleeve 2620 covering the aperture 2608. FIG. 60b illustrates the locking assembly 2600 with an insulating tape 2622 wrapped around the aperture 2608 and housing 2604.

Figure 61C:
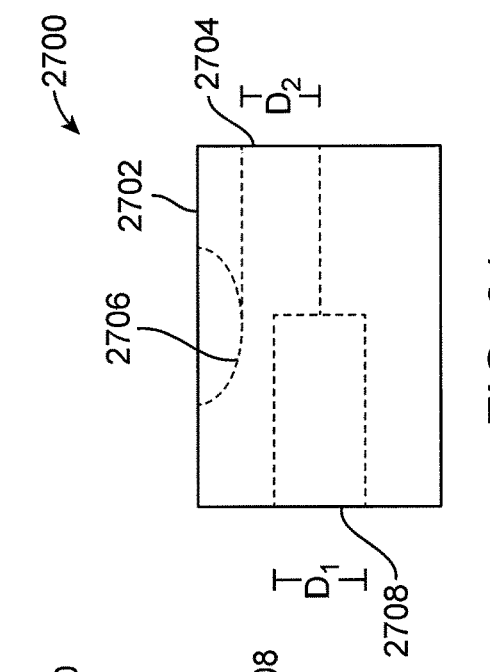
FIGS. 61a-61e illustrate additional embodiments of locking assemblies.
Figure 61B:
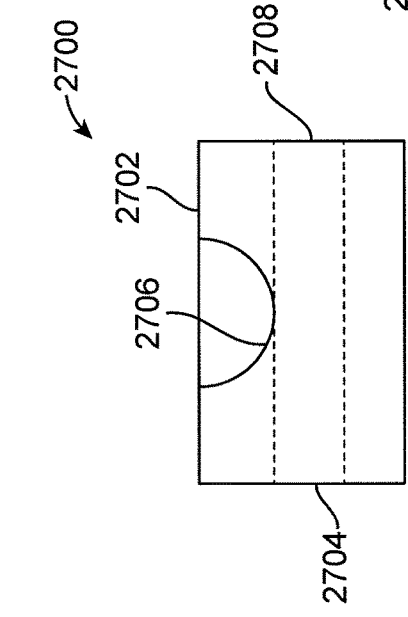
Figure 61A:
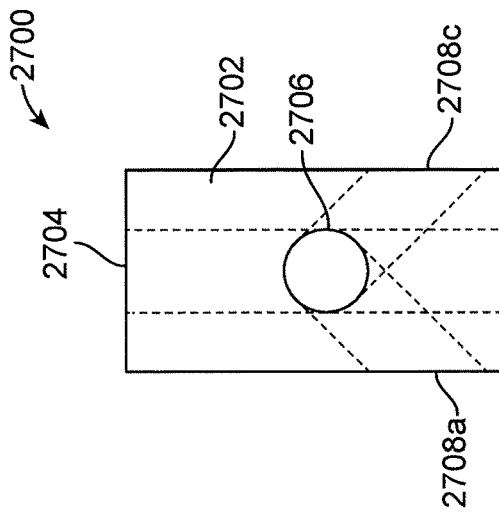

FIGS. 61a-61e illustrate additional embodiments of locking assemblies. FIG. 61a illustrates a top view of a locking assembly 2700 having a housing 2702, receiving bore 2704 and aperture 2706. Three different locking bores are illustrated 2708a, 2708b, and 2708c. Locking bore 2708b shares a common central longitudinal axis with the housing 2702 and receiving bore 2704. In contrast, locking bores 2708a and 2708c form an angle at the intersection between the receiving bore 2704 and locking bores 2708a, 2708c.

FIG. 61b illustrates a side-view of the locking assembly 2700 with the receiving bore 2704 and locking bore 2708 aligned in the same vertical axis. FIG. 61c illustrates a side view of a locking assembly 2700 with a housing 2702, receiving bore 2704, aperture 2706, and locking bore 2708. The receiving bore 2704 has a higher vertical alignment and position than the locking bore 2708. In some embodiments the locking bore 2708 can have a higher vertical alignment and position than the receiving bore 2704.

Figure 61E:
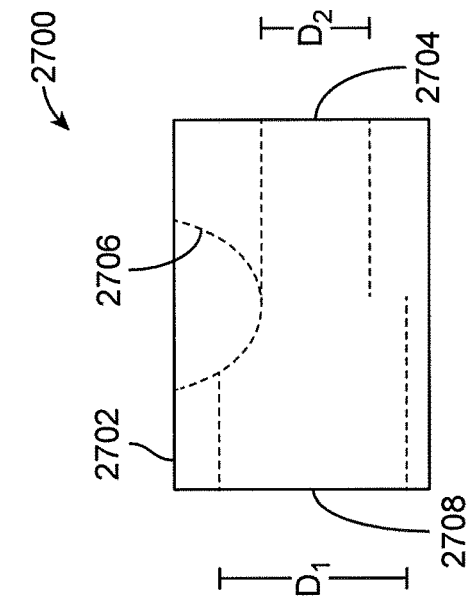
Figure 61D:
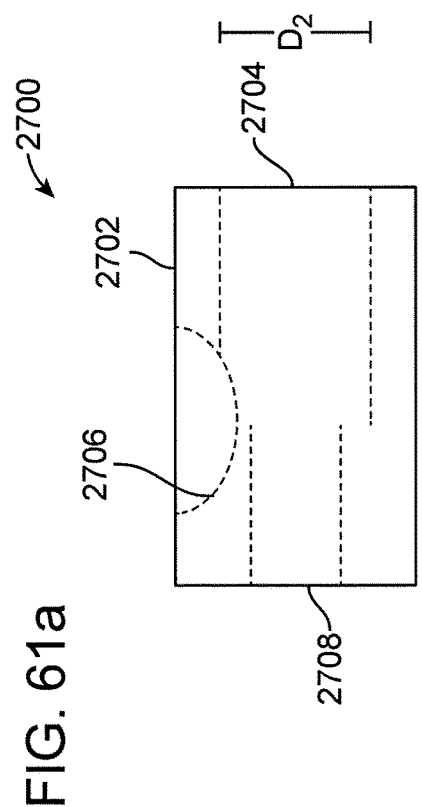

FIGS. 61d-61e illustrate side views of embodiments of locking assemblies with bores having different diameters and widths. FIG. 61d illustrates a locking assembly 2700 with a housing 2702 having a receiving bore 2704 having a larger width/diameter than the locking bore 2708. FIG. 61e illustrates a locking assembly 2700 with a housing 2702 having a receiving bore 2704 having a smaller width/diameter than the locking bore 2708.

Any of the embodiments of locking assemblies can have locking bores and receiving bores that are not horizontally aligned as illustrated in FIGS. 61a-61e. Any of the embodiments of locking assemblies can have locking bores and receiving bores that are not vertically aligned as illustrated in FIGS. 61a-61e. Any of the embodiments of locking assemblies can have locking bores and receiving bores that are not axially aligned as illustrated in FIGS. 61a-61e. Any of the embodiments of locking assemblies can have locking bores and receiving bores that are a combination of not horizontally, vertically, and axially aligned.

FIGS. 62a-62b illustrate top views of locking assemblies with different aperture shapes in accordance with some embodiments. FIG. 62a illustrates a locking assembly 2800 with a housing 2802, receiving bore 2804, locking bore 2806, and aperture 2808. The aperture has an ovular shape when viewing the housing from a top view. The aperture 2808 has a width that is less than the width of the receiving bore 2804 and the width of the locking bore 2806. The aperture 2808 is sized such that it is smaller than a dimension of the locking element to prevent the locking element from exiting the locking bore 2806 through the aperture 2808.

FIG. 62b illustrates a locking assembly 2800 with a housing 2802, receiving bore 2804, locking bore 2806, and aperture 2808. The aperture has a circular shape when viewing the housing from a top view. The aperture 2808 has a width that is less than the width of the receiving bore 2804 and the width of the locking bore 2806. The aperture 2808 is sized such that it is smaller than a dimension of the locking element to prevent the locking element from exiting the locking bore 2806 through the aperture 2808.

FIG. 62c illustrates a locking assembly 2800 with a housing 2802, receiving bore 2804, locking bore 2806, and aperture 2808. The aperture has a square shape when viewing the housing from a top view. The aperture 2808 has a width that is less than the width of the receiving bore 2804 and the width of the locking bore 2806. The aperture 2808 is sized such that it is smaller than a dimension of the locking element to prevent the locking element from exiting the locking bore 2806 through the aperture 2808.

Any of the aperture shapes illustrated in FIG. 62a-62c can be used in any of the locking assemblies disclosed herein. Other apertures shapes are also possible for use with any of the locking assemblies disclosed herein. For example, rectangular and triangular shapes can be used in some embodiments.

FIGS. 63a-63b illustrate an isometric and side profile view of a locking assembly in accordance with some embodiments. FIG. 63a illustrates an isometric view of a locking assembly 2900 having a housing 2902 with an aperture 2908. The housing 2902 includes a space or cutout

2910 adjacent to the aperture. FIG. 63*b* illustrates a profile or side view of the locking assembly 2900 and housing 2902. The housing space or cutout 2910 has a U-shaped profile formed by the housing space wall 2912 when the locking assembly 2900 is viewed from the side. The housing space or cutout 2910 can be sized and shaped to receive the ends of the stranded element. The housing space or cutout 2910 is deep enough such that the aperture 2908 is in communication with the receiving bore 2904 and/or locking bore 2906.

Other shapes are possible for the housing space or cutout. FIGS. 64*a*-64*g* illustrate side profile views of locking assemblies having various housing space cutout shapes in accordance with some embodiments. FIG. 64*a* illustrates a profile or side view of the locking assembly 2900 and housing 2902. The housing space or cutout 2910 has a rectangular shaped profile formed by the housing space walls 2912, 2914 when the locking assembly 2900 is viewed from the side. The housing space or cutout 2910 is deep enough such that the aperture 2908 is in communication with the receiving bore 2904 and/or locking bore 2906.

FIG. 64*b* illustrates a profile or side view of the locking assembly 2900 and housing 2902. When viewed from the side, the housing space or cutout 2910 has a slanted end at housing space wall 2912 and an end forming a 90 degree angle with the housing formed by the housing space wall 2914. The housing space or cutout 2910 is deep enough such that the aperture 2908 is in communication with the receiving bore 2904 and/or locking bore 2906. FIG. 64*c* is similar to FIG. 64*b* but with the slanted end at housing space wall 2914 on the locking bore 2906 side and the end forming a 90 degree angle with the housing formed on housing space wall 2912 at the receiving bore 2904 side.

FIG. 64*d* illustrates a profile or side view of the locking assembly 2900 and housing 2902. When viewed from the side, the housing space or cutout 2910 has slanted ends at housing space walls 2912 and 2914. The housing space or cutout 2910 is deep enough such that the aperture 2908 is in communication with the receiving bore 2904 and/or locking bore 2906.

FIG. 64*e* illustrates a profile or side view of the locking assembly 2900 and housing 2902. When viewed from the side, the housing space or cutout 2910 has sloped ends at housing space walls 2912 and 2914. The housing space or cutout 2910 is deep enough such that the aperture 2908 is in communication with the receiving bore 2904 and/or locking bore 2906.

FIG. 64*f* illustrates a profile or side view of the locking assembly 2900 and housing 2902. When viewed from the side, the housing space or cutout 2910 has "C" shaped ends at housing space wall 2912 and 2914. The housing space or cutout 2910 is deep enough such that the aperture 2908 is in communication with the receiving bore 2904 and/or locking bore 2906.

FIG. 64*g* illustrates a profile or side view of the locking assembly 2900 and housing 2902. When viewed from the side, the housing space or cutout 2910 has a slanted ends at housing space wall 2912 and 2914 that meet to form a "V" shape. The housing space or cutout 2910 is deep enough such that the aperture 2908 is in communication with the receiving bore 2904 and/or locking bore 2906.

The housing shape profiles illustrated in FIGS. 63*a*-63*b* and 64*a*-64*g* can be used with any of the locking assembly embodiments disclosed herein. The housing space or cutout profiles do not have to be symmetrical. In some embodiments any of the housing profile sides can be mixed and matched in the locking assemblies disclosed herein.

In some embodiments the aperture has a generally curvilinear shape when viewed in profile. In some embodiments the aperture has a bottom portion, a locking side portion and a receiving side portion having a locking side angle between the bottom portion and the locking portion and a receiving side portion between the bottom portion and the receiving side portion.

In some embodiments the receiving bore and/or locking bore can have a cross-sectional shape that is not circular. For example, other bore shapes can include a square cross-sectional profile, an oval shaped cross-sectional profile, and other non-round geometric cross-sectional shapes. The locking elements and drive shafts can be sized and shaped to move and lock within the non-circular bores. The non-circular cross-sectional shapes can be used for any of the bores in any of the embodiments of locking assemblies disclosed herein.

FIGS. 65*a*-65*e* illustrate additional embodiments of locking assemblies with different drive shaft configurations. The drive shafts illustrated in FIGS. 65*a*-65*e* can be used in any of the locking assembly embodiments disclosed herein.

Figures 65A, 65B:
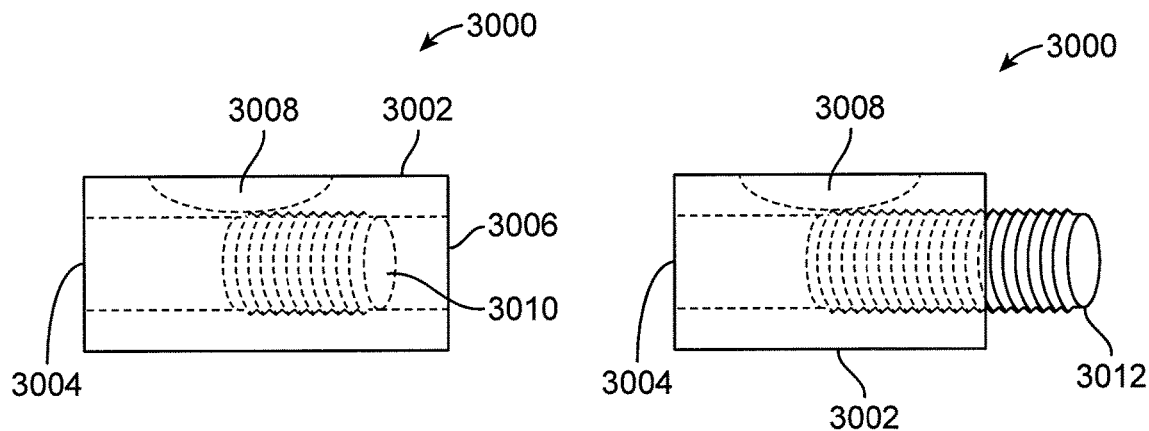
FIGS. 65a-65e illustrate additional embodiments of locking assemblies with different drive shaft configurations.

FIG. 65*a* illustrates a profile or side view of the locking assembly 3000 and housing 3002 with a receiving bore 3004, locking bore 3006, aperture 3008, and drive shaft 3010. The locking assembly illustrated in FIG. 65*a* is designed such that the drive shaft 3010 is entirely within the receiving bore 3006 when the locking assembly is attached to a stranded element.

FIG. 65*b* illustrates a profile or side view of the locking assembly 3000 and housing 3002 with a receiving bore 3004, locking bore 3006, aperture 3008, and drive shaft 3012. The locking assembly illustrated in FIG. 65*b* is designed such that the drive shaft 3012 protrudes outside of the receiving bore 3006 when the locking assembly is attached to a stranded element. In some embodiments the portion of the drive shaft extending from the housing further includes one or more of threads, vertical grooves, horizontal grooves, slots, raised elements, recessed portions, or attachment components.

Figures 65C, 65D:
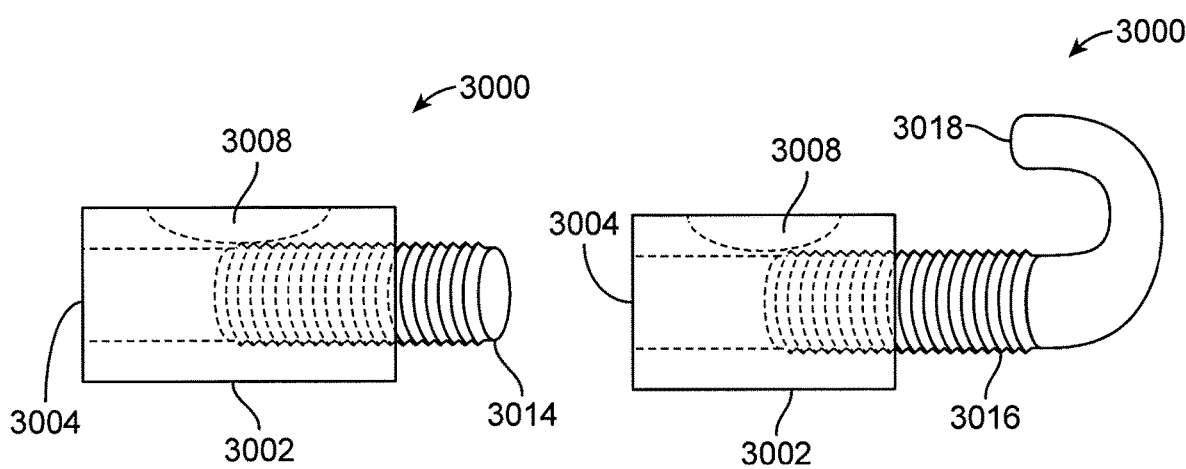

FIG. 65*c* illustrates a profile or side view of the locking assembly 3000 and housing 3002 with a receiving bore 3004, locking bore 3006, aperture 3008, and drive shaft 3014. The locking assembly illustrated in FIG. 65*c* is designed such that the drive shaft 3014 protrudes outside of the receiving bore 3006 when the locking assembly is attached to a stranded element. The drive shaft 3014 is configured to connect to another locking assembly, attachment component, or other device.

Figure 65E:
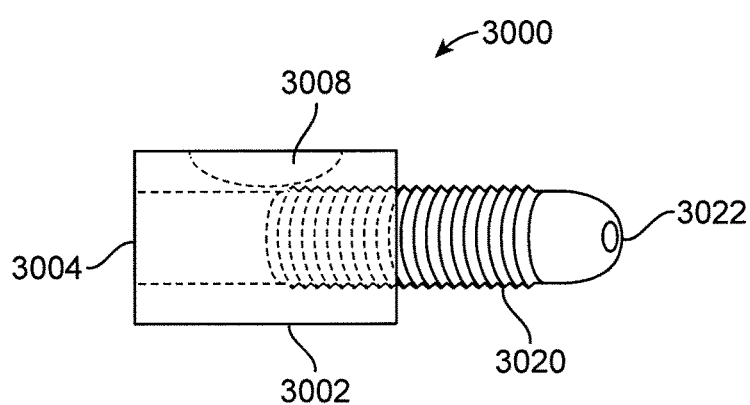

FIGS. 65*d*-65*e* illustrate locking assemblies with drive shafts having a built in attachment component. FIG. 65*d* illustrates a profile or side view of the locking assembly 3000 and housing 3002 with a receiving bore 3004, locking bore 3006, aperture 3008, and drive shaft 3016. The drive shaft 3016 includes an attachment component 3018 that is integral with the drive shaft 3016. The attachment component 3018 is illustrated as a hook and can be used to turn the drive shaft and/or hook to another component.

FIG. 65*e* illustrates a profile or side view of the locking assembly 3000 and housing 3002 with a receiving bore 3004, locking bore 3006, aperture 3008, and drive shaft 3020. The drive shaft 3020 includes an attachment component 3022 that is integral with the drive shaft 3016. The attachment component 3022 is illustrated as a structure having an eyelet.

Figure 66A:
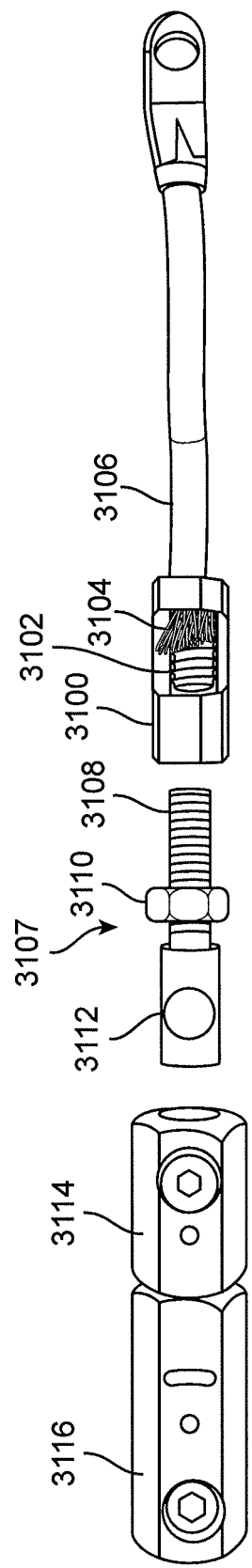
FIG. 66a-66c illustrate additional embodiments of locking assemblies that can be connected to additional devices, such as the illustrated quick welding connections.
Figure 66B:
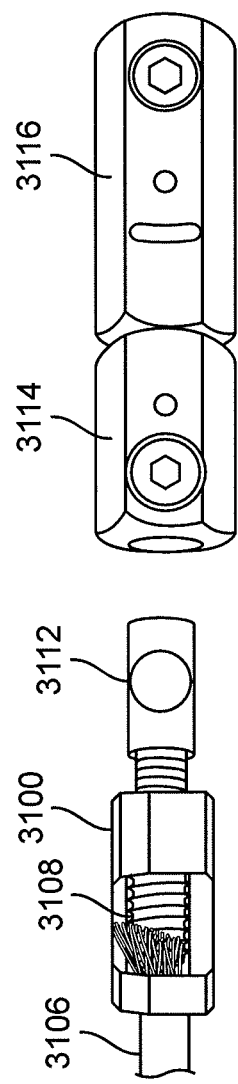
Figure 66C:
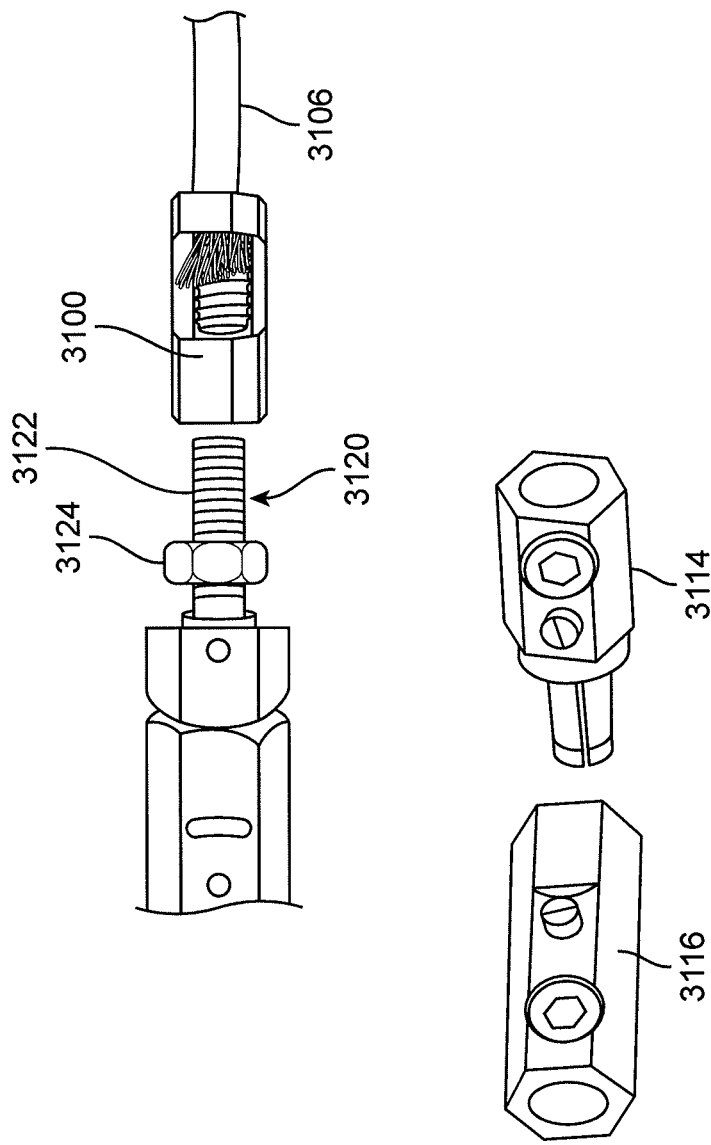

FIG. 66*a*-66*c* illustrate additional embodiments of locking assemblies that can be connected to additional devices, such as the illustrated quick welding connections. FIG. 66*a* illustrates the locking assembly in an unassembled configuration and FIG. 66b illustrates the locking assembly connected to the welding line. The locking assembly has a housing 3100 with an aperture 3102 configured to receive ends of the stranded element 3104 for the welding line 3106. The drive shaft 3107 includes a threaded end 3108, lock nut 3110, and an end opposing the threaded end with a male connector 3112 designed to engage with a welding quick connector 3114. The illustrated welding quick connector 3114 can engage with a second welding quick connector 3116.

FIG. 66c illustrates additional embodiments of the locking assembly. The drive shaft 3120 includes threads 3122 and a nut 3124. The drive shaft 3120 can be made out of brass for the welding applications. The drive shaft 3120 can include a connector designed to interlock with the welding quick connector 3114 or can be integrally formed with the welding quick connector 3114. The welding quick connector 3114 can be configured to engage with the welding quick connector 3116 or another quick connect structure.

FIGS. 67a-67b illustrate cross-sectional views of various turnbuckle designs that can be used with any of the locking assemblies disclosed herein. FIG. 67a illustrates a turnbuckle 3200 that can be used to engage with a first drive shaft 3202 and second drive shaft 3204 to connect a first locking assembly 3206 and a second locking assembly 3208. The turnbuckle 3200 can be used to connect a first locking assembly 3206 connected to a first stranded element 3210 with a second locking assembly 3208 connected to a second stranded element 3212. The first locking assembly 3208 has a locking element engaged with a stranded element 3210 and a first drive shaft 3202 advanced against the locking element. FIG. 67a illustrates an optional locking collar 3214 and locking ring 3216 that can be advanced over the outside of the locking assembly 3206. The locking collar 3214 can be used to cover the exposed ends of the stranded element 3210 adjacent to the aperture of the locking assembly housing. The illustrated drive shafts 3202, 3204 have an elongated threaded configuration with flat wrench portions 3218, 3220 that are configured to engage with a wrench to facilitate turning of the drive shafts 3202, 3204. The drive shafts 3202, 3204 can advanced to push the locking element against the stranded element. The other end of the drive shafts 3224, 3226 can be threaded into a receiving bore of the turnbuckle 3200. One or more nuts 3222 can be engaged with the drive shaft 3202 to hold the components in place.

The turnbuckle 3200 can also be connected to a second locking assembly 3208 connected to a second stranded element 3212. The second locking assembly 3208 has a locking element engaged with a second stranded element 3212 and a second drive shaft 3204 advanced against the locking element. The second locking assembly 3208 can be engaged with an optional locking collar 3228 and locking ring 3230 that can be advanced over the outside of the second locking assembly 3208. The other end 3226 of the drive shaft 3204 can be threaded into a receiving bore of the turnbuckle 3200. One more nuts 3222 can be engaged with the drive shaft to hold the components in place. The second drive shaft can have the same threading as the first drive shaft or the opposite threading of the first drive shaft. For example, the first drive shaft could be left hand threaded and the second drive shaft could be right hand threaded (e.g. counterclockwise threads and clockwise threads), or vice versa. The interior threads of the turnbuckle 3200 can be complementary to the threading patterns on the first drive shaft 3202 and second drive shaft 3204. The interior threads can be the same or opposite for the turnbuckle 3200. One receiving end of the turnbuckle 3200 could have left hand threading and the other end of the turnbuckle 3200 could have right hand threading. The view in FIG. 67a is a cross-sectional view of the interior of the turnbuckle 3200 that shows the interior of the device. The turnbuckle 3200 has solid exterior walls such that the interior threads of the turnbuckle would not be seen.

FIG. 67b illustrates the turnbuckle 3200 receiving the drive shaft 3226 attached to locking assembly 3208 and stranded element 3212. The other end of the turnbuckle 3200 receives a threaded element 3232 connected to an attachment component 3234 for the general purpose needs of a turnbuckle. Examples of other types of terminations that can be used for the attachment component include a winch drum connection illustrated in FIG. 9b and cable or wire rope terminations illustrated in FIGS. 24-41 and 43-44. FIG. 67b illustrates the locking assembly 3208 connected to the stranded element 3212 without the use of the optional locking collar and locking ring.

FIG. 67c illustrates another embodiment of a turnbuckle 3250 partially connected to a locking assembly. The turnbuckle 3250 has open portions on the body to provide a view of a portion of the drive shafts 3252, 3254 within the turnbuckle 3250.

Figure 68A:
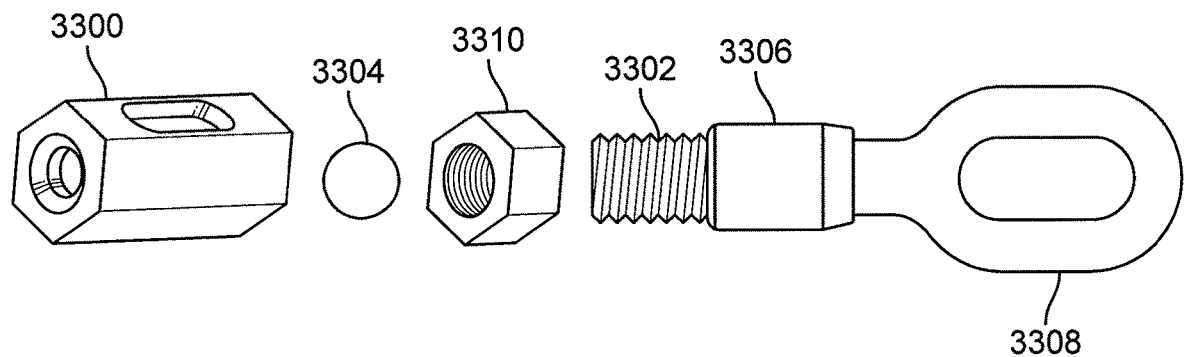
FIGS. 68a-68d illustrate embodiments of locking assemblies and attachment components in partially assembled configurations.

FIGS. 68a-68e illustrate embodiments of locking assemblies and attachment components in partially assembled configurations. FIG. 68a illustrates an embodiment of a locking assembly 3300 similar to FIGS. 39-40 but with a different attachment component. The locking assembly 3300 includes a locking element 3304 and drive shaft 3302. The drive shaft 3302 is connected to an attachment component 3308. The attachment component 3308 has an opening that can be attached to another device. The attachment component 3308 is threaded within an optional connector 3306. The attachment component 3308 can be integrally formed with the drive shaft 3302 or can be connected to the drive shaft with another component as shown in FIG. 68a.

Figure 68B:
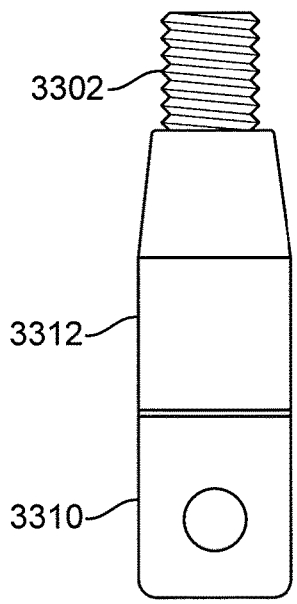
Figure 68C:
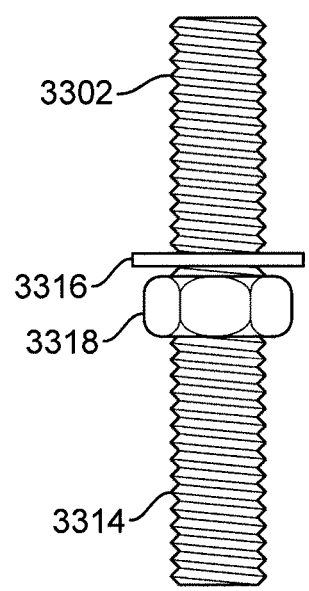
Figure 68D:
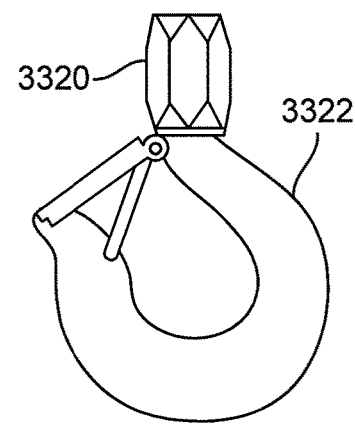

FIG. 68b-68e illustrate additional embodiments of attachment components that can be used in any of the embodiments disclosed herein. FIG. 68b shows a drive shaft 3302 with an attachment component 3310 and optional connector 3312. FIG. 68c illustrates a drive shaft 3302 having an end 3314 opposing the locking element end that can be configured to connect to a desired component. A stop 3316 and locking nut 3318 can be included on the drive shaft 3302. FIG. 68d illustrates a hook shaped attachment component 3322 with a component 3320 that can be connected to a drive shaft.

Figure 69A:
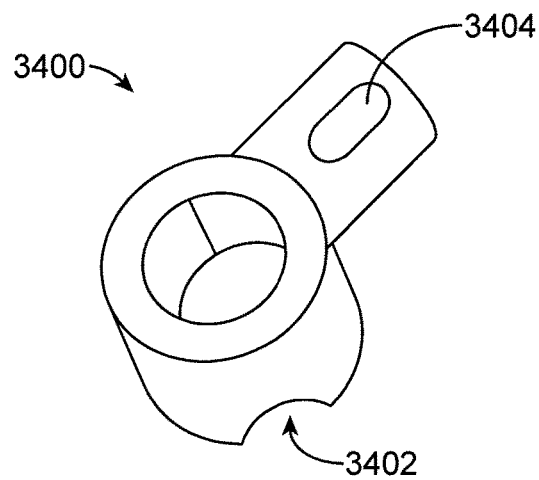
FIGS. 69a-69d illustrate embodiments of locking assemblies that can be configured to be part of a battery terminal connection.
Figure 69B:
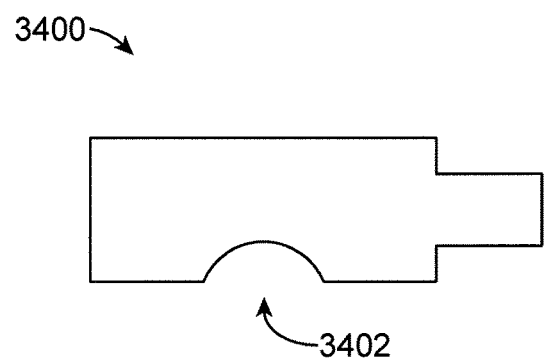

FIGS. 69a-69b illustrate various views of a locking assembly 3400 configured to be a battery terminal connection. The exterior of the battery terminal housing includes a cutout 3402. The locking assembly 3400 includes an aperture 3404. A removal tool can be used to engage the battery terminal locking assembly 3400 at the cutout 3402 to remove the locking assembly 3400 from the battery post.

Figure 69C:
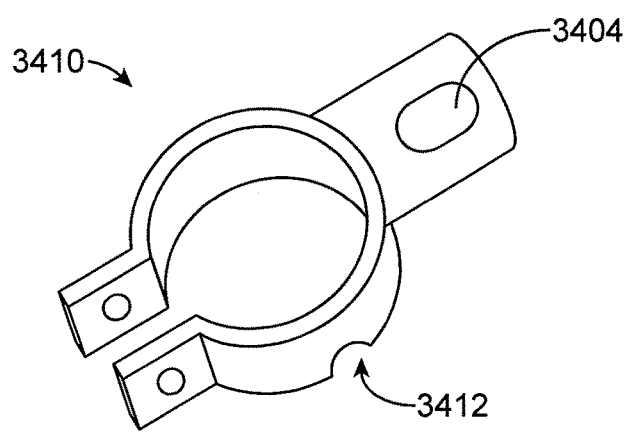
Figure 69D:
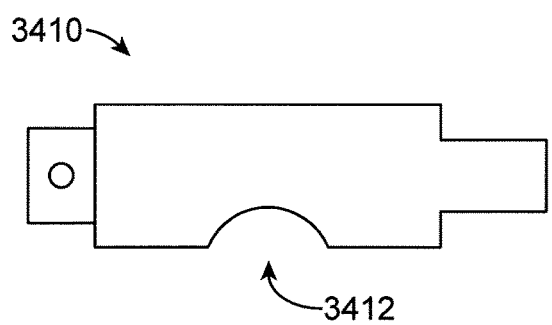

FIGS. 69c-69d illustrate various views of a locking assembly 3410 configured to be a battery terminal connection. The exterior of the battery terminal housing includes a cutout 3412 and aperture 3404. A removal tool can be used to engage the battery terminal locking assembly 3410 at the cutout 3402 to remove the locking assembly 3410 from the battery post.

Figure 70A:
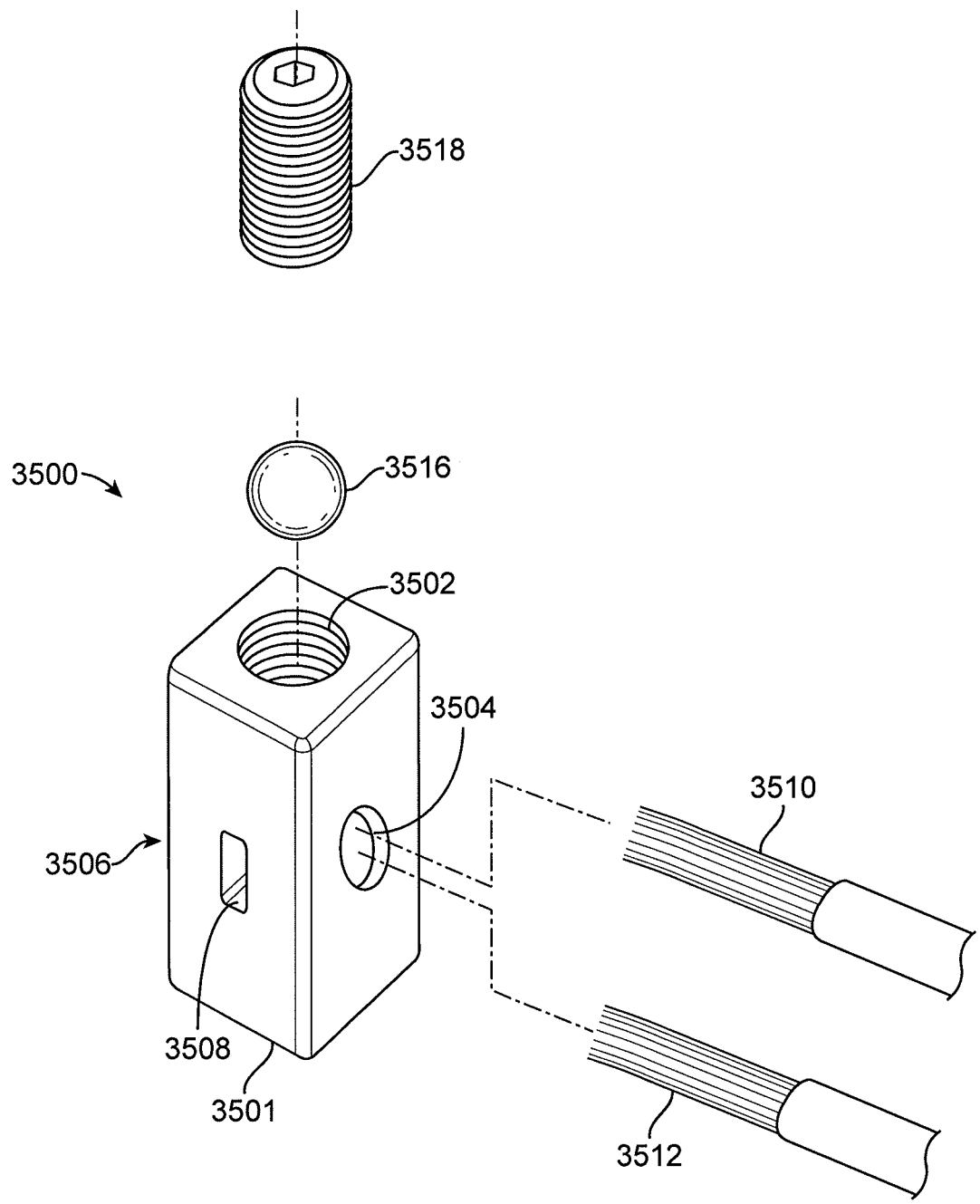
FIGS. 70a-70c, 71, and 72a-72d illustrate various embodiments of locking assemblies that can provide electrical contact between two or more separate multiple stranded elements.
Figure 70B:
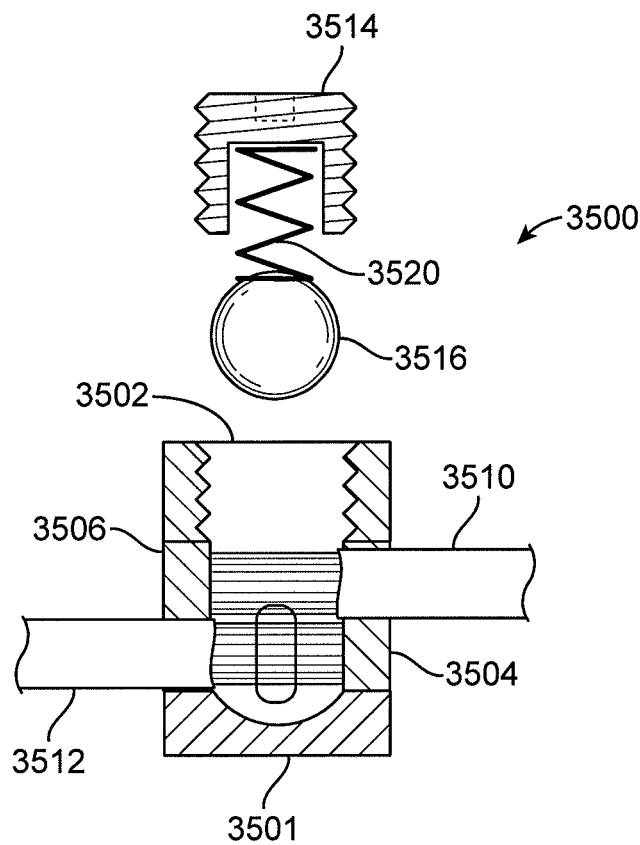
Figure 70C:
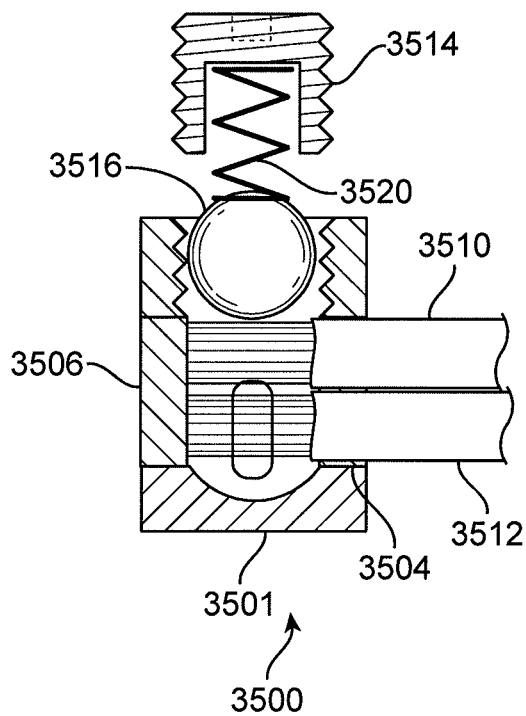
Figure 71:
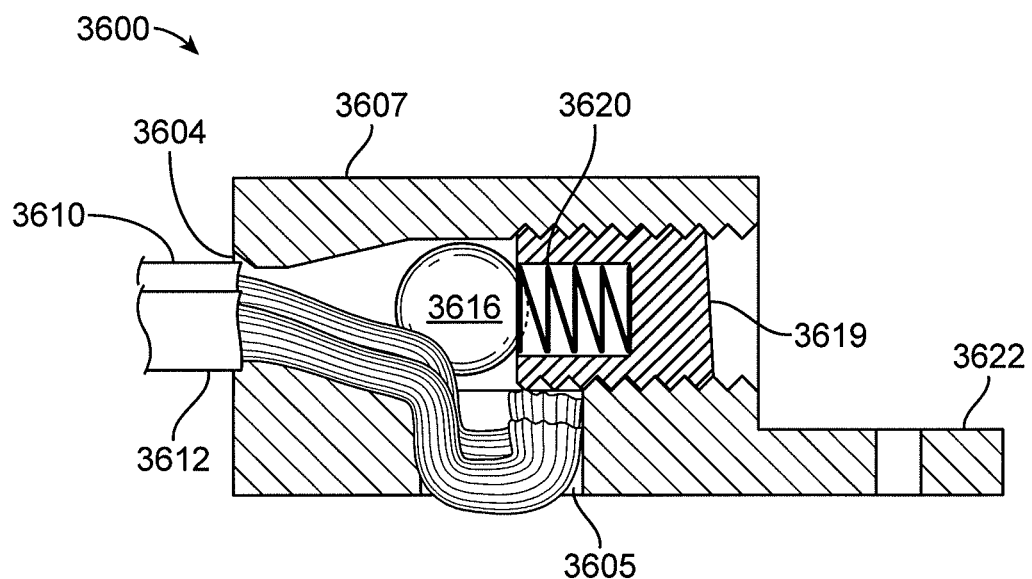

FIGS. 70-72 illustrate various embodiments of locking assemblies that can provide electrical contact between two or more separate multiple stranded elements. In some embodiments the locking assemblies can be provided for any application where electrical contact is desired between two or more separate stranded elements. In some embodiments the locking assemblies described herein can be used to replace conventional common twist-on wire connectors. In some embodiments the locking assembly can be used to replace conventional solder or crimp style connectors, such as those used in automotive applications. The locking assemblies herein provide improved electrical contact between the two or more separate multiple stranded elements along with improved grip strength between the elements, which decreases the likelihood of losing electrical contact between the stranded elements.

FIGS. 70a-70c illustrate embodiments of locking assemblies configured to provide electrical contact between two or more separate stranded elements. The locking assembly 3500 includes a housing 3501 with a locking bore 3502, a first receiving bore 3504, and a second receiving bore 3506. The illustrated locking assembly 3500 includes an optional locking element release opening 3508. A first stranded element 3510 and a second stranded element 3512 can be spliced using the locking assembly 3500. The first stranded element 3510 and second stranded element 3512 can be introduced through the same receiving bore as illustrated in FIG. 70a or through separate receiving bores as illustrated in FIG. 70b. A locking element 3516 can be advanced within the locking bore 3502 by advancing the drive shaft 3518. The drive shaft 3518 can be used with any of the compressible elements described herein (see FIGS. 70b-70d). The use of a compressible element can improve engagement between the locking element and stranded elements (along with electrical contact between the stranded elements) should the drive shaft creep away from the stranded elements. The illustrated locking assembly 3500 shows the first receiving bore 3504 and second receiving bore 3506 as axially in-line; however, they can meet orthogonally or at other off-axis angles.

FIGS. 70b-70c illustrate additional embodiments of a locking assembly 3500 configured to provide electrical contact between two or more separate stranded elements. The locking assembly 3500 is similar to the locking assembly from FIG. 70a with the drive shaft 3519 configured for use with a compressible element 3520. FIG. 70b illustrates the stranded elements 3510, 3512 introduced the housing 3501 through separate receiving bores 3504, 3506, respectively. FIG. 70c illustrates the locking assembly 3500 with the stranded elements 3510, 3512 introduced through the same receiving bore 3504.

FIG. 71 illustrates a locking assembly 3600 that includes a housing 3601 with a locking bore 3602, a receiving bore 3604, and an aperture 3605. A first stranded element 3610 and a second stranded element 3612 can be spliced using the locking assembly 3600. The first stranded element 3610 and second stranded element 3612 can be introduced through the receiving bore 3604 as illustrated in FIG. 71. A locking element 3616 can be advanced within the locking bore 3602 by advancing the drive shaft 3619 and compressible element 3620 such that the ends of the stranded elements 3610, 3612 are within the aperture 3605. The locking assembly 3600 can include an attachment component 3622 illustrated as a hold for a fastening structure.

Figure 72A:
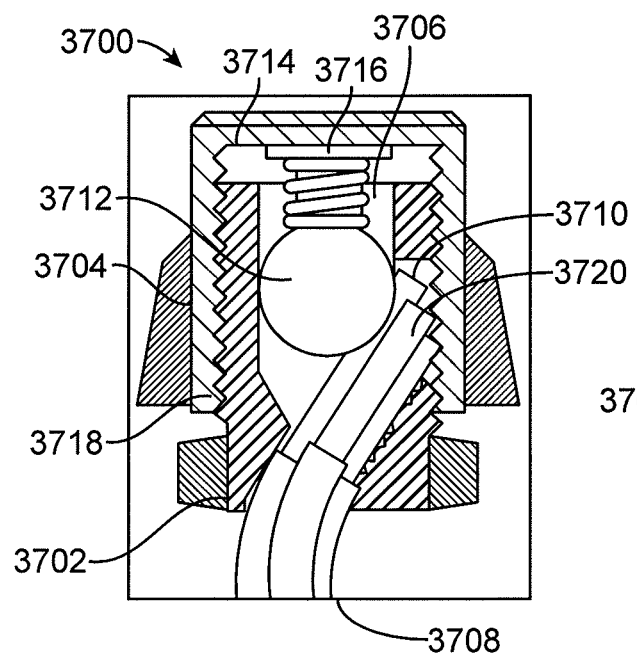

FIG. 72a illustrates a locking assembly 3700 including a housing 3702 with a cover 3704. The housing 3702 includes a locking bore 3706, a receiving bore 3708, and an aperture 3710. The locking assembly also includes a locking element 3712 with a compressible element 3714, and a drive shaft 3716. The drive shaft 3716 is illustrated as integral with the cover 3704 in a single piece construction. In some embodiments the drive shaft and cover can be separate. The locking element 3712 can be made out of soft conductive material, such as aluminum to promote electrical contact between the separate stranded elements. The compressible element 3714 can also be made out of a conductive material. The cover, housing, and drive shaft can be made out of insulating materials such as plastic. The cover 3704 can include threads 3718 that can engage with a complementary structure on the housing 3702. Multiple separate stranded elements 3720 can be introduced through the receiving bore 3708 and pushed into contact with each other by the locking element 3712 such that the ends of the separate stranded elements 3720 are within or adjacent to the aperture 3710.

Figure 72B:
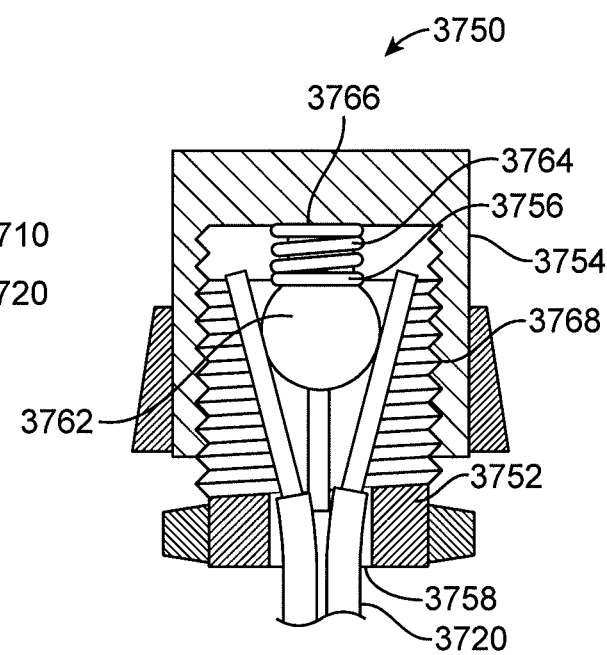

FIG. 72b illustrates an embodiment of a locking assembly that is similar to the locking assembly 3700 but with the ends of the stranded elements through the housing adjacent to the locking bore. FIG. 72B illustrates a locking assembly 3750 including a housing 3752 with a cover 3754. The housing 3752 includes a locking bore 3756 and a receiving bore 3758. The locking assembly 3750 also includes a locking element 3762 with a compressible element 3764, and a drive shaft 3766. The drive shaft 3766 is illustrated as integral with the cover 3754 in a single piece construction. In some embodiments the drive shaft and cover can be separate. The locking element 3762 can be made out of soft conductive material, such as aluminum to promote electrical contact between the separate stranded elements. The compressible element 3714 can also be made out of a conductive material. The cover, housing, and drive shaft can be made out of insulating materials such as plastic. The cover 3754 can include threads 3768 that can engage with a complementary structure on the housing 3752. Multiple separate stranded elements 3770 can be introduced through the receiving bore 3758 and pushed into contact with each other by the locking element 3762 such that the ends of the separate stranded elements 3770 are within or adjacent to the locking bore 3756.

Figure 72C:
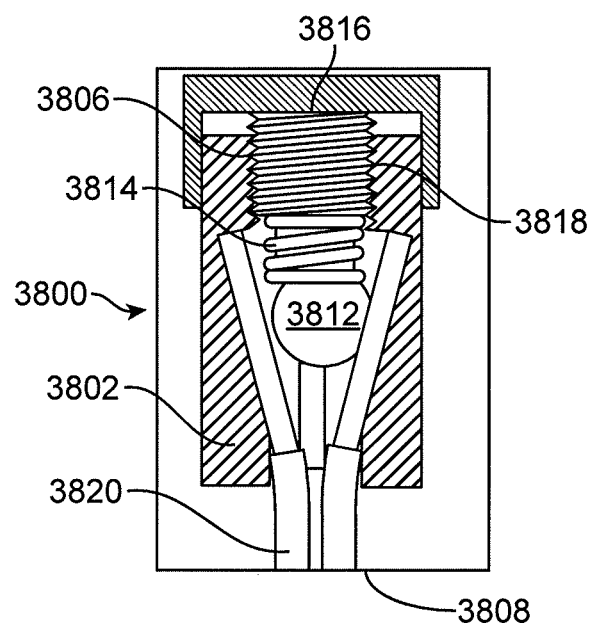
Figure 72D:
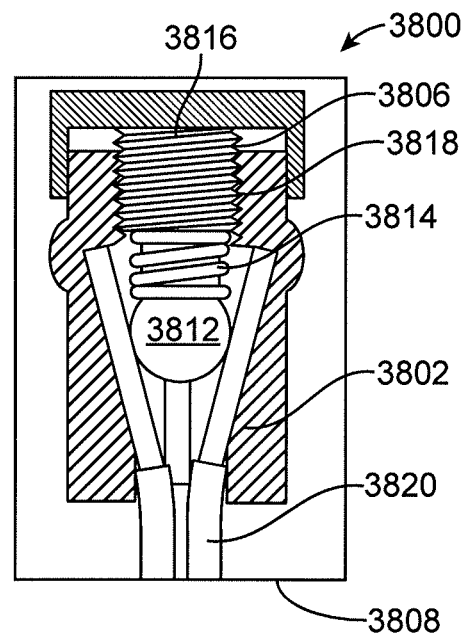

FIG. 72c illustrates an embodiment of a locking assembly that is similar to the locking assembly 3750 but with the threaded drive shaft engaging with a threaded portion of the receiving bore instead of an exterior surface of the housing. FIG. 72c illustrates a locking assembly 3800 including a housing 3802 with a locking bore 3806 and a receiving bore 3808. The locking assembly 3800 also includes a locking element 3812 with a compressible element 3814 and a drive shaft 3816. The locking element 3812 can be made out of soft conductive material, such as aluminum to promote electrical contact between the separate stranded elements. The compressible element 3714 can also be made out of a conductive material. The housing and drive shaft can be made out of insulating materials such as plastic. The drive shaft 3816 can include threads 3818 that can engage with a complementary structure on the receiving bore 3808. Multiple separate stranded elements 3820 can be introduced through the receiving bore 3808 and pushed into contact with each other by the locking element 3812 such that the ends of the separate stranded elements 3820 are within or adjacent to the locking bore 3806. The housing can include a hollowed out portion to accommodate the volume of the stranded elements 3820. FIG. 72d is similar to the locking assembly 3800 but with a raised portion on the exterior surface of housing 3802 to provide additional strength to the housing. FIGS. 72b-72d illustrate locking assemblies with a cover integral to the drive shaft; however, the use of a cover is optional in these embodiments as the stranded elements are within an internal space of the locking assembly receiving bore/locking bore.

FIGS. 73a-73c illustrate additional embodiments of locking assemblies. FIG. 73a illustrates a locking assembly 3900 with a housing 3902, threaded exterior portion 3904, and a raised portion 3906. The locking assembly 3900 has a receiving bore, locking bore, and aperture 3908. The locking assembly engages with a stranded element in a similar fashion to the other locking assemblies disclosed herein. The stranded element 3909 has multiple strands 3910 that enter the locking assembly 3900 interior through the receiving bore. A locking element 3912 and optional compressible element 3914 are advanced within the locking bore by the drive shaft 3916 to secure the multiple strands 3910 within the locking assembly 3900 such that a portion of the multiple strands 3910 are adjacent to the aperture 3908. An attachment component 3918 can be engaged with the locking assembly using the threaded exterior portion 3904. The attachment component 3918 can rotate onto the locking assembly 3900 over the threaded exterior portion 3904. The attachment component 3918 can advance over the locking assembly 3900 until it contacts the raised portion 3906. The raised portion 3906 can act as a stop to prevent further advancement by the attachment component 3918. The attachment component 3918 can include a portion 3920 configured to engage with another attachment component or structure.

FIG. 73b illustrates a locking assembly 3950 similar to the locking assembly 3900 but with a complementary attachment component 3968. FIG. 73b illustrates a locking assembly 3950 with a housing 3952, threaded exterior portion 3954, and a raised portion 3956. The locking assembly 3950 has a receiving bore, locking bore, and aperture 3958. The locking assembly 3950 engages with a stranded element in a similar fashion to the other locking assemblies disclosed herein. The stranded element 3959 has multiple strands 3960 that enter the locking assembly 3950 interior through the receiving bore. A locking element 3962 and optional compressible element 3964 are advanced within the locking bore by the drive shaft 3966 to secure the multiple strands 3960 within the locking assembly 3950 such that a portion of the multiple strands 3960 are adjacent to the aperture 3958. An attachment component 3968 can be engaged with the locking assembly using the threaded exterior portion 3954. The attachment component 3968 can rotate onto the locking assembly 3950 over the threaded exterior portion 3954. The attachment component 3968 can advance over the locking assembly 3950 until it contacts the raised portion 3956. The raised portion 3956 can act as a stop to prevent further advancement by the attachment component 3968.

The attachment component 3968 can connect to the attachment component 3918 using the portion 3920 or other connecting structure as shown in FIG. 73c. For example a bolt, screw, or other mechanical structure can be used to secure the attachment component to 3918 to 3968. The attachment components 3918, 3968 can also be used to cover the stranded element ends 3910, 3960 adjacent to the apertures 3908, 3958, respectively.

Figure 74A:
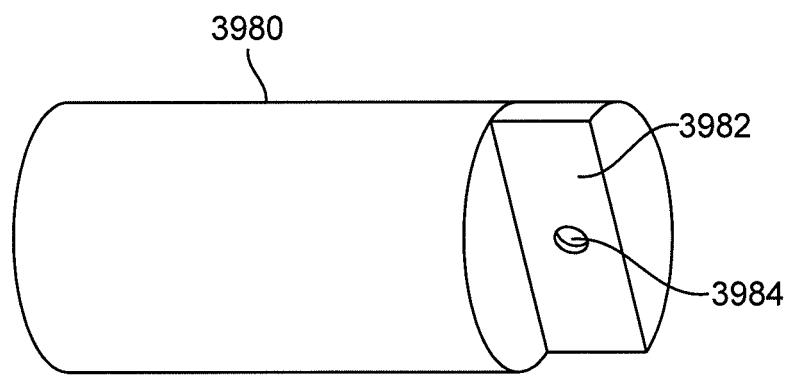
FIGS. 74a-74c illustrate various embodiments of locking assembly attachment components.
Figure 74B:
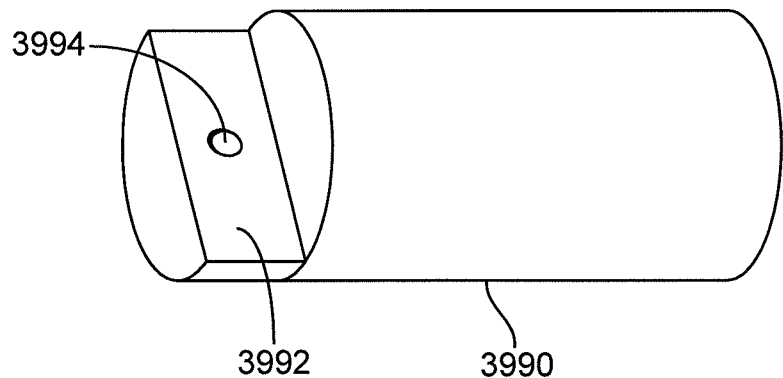
Figure 74C:
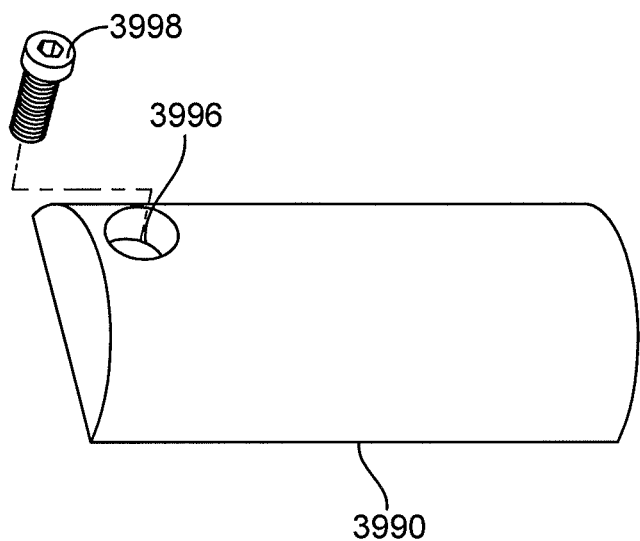

Additional attachment component designs are illustrated in FIGS. 74a-c. The attachment components illustrated in FIG. 74a-c can be used in place of the attachment components 3918 and 3968 in some embodiments to connect two locking assemblies together. FIGS. 74a and 74b illustrate attachment components with complementary surfaces and structures. FIG. 74a illustrates an attachment component 3980 with a complementary surface 3982 with an opening 3984. FIG. 74b illustrates an attachment component 3990 with a complementary surface 3992 and an opening 3994. FIG. 74c illustrates a top view of the attachment component 3990 including an opening 3996 sized to receive a connector 3998, such as a bolt or screw. The attachment components 3980 and 3990 can contact each other at the complementary surfaces 3982 and 3992, such that the threaded openings 3984 and 3994 line up. The threaded connector 3998 can be advanced in the opening 3996 such that the threaded connector contacts the opening 3984 and opening 3994 to secure the attachment components 3980 and 3990 together. Either or both of the openings 3984 and 3994 can be threaded to receive the connector. In the illustrated figure the opening 3984 is threaded and the opening 3994 is smooth, such that the bolt is received in the smooth opening 3994 and contacts threads in the opening 3984. The bolt advances along the threads in opening 3984 until the attachment components 3980 and 3990 are secured together. When engaged together, the attachment components 3980 and 3990 have smooth outer surfaces. The attachment components 3980 and 3990 can be used in any of the embodiments disclosed herein.

The locking assemblies illustrated in FIGS. 73a-73c can be used to make an electrical connection between the stranded elements 3909 and 3959 similar to the embodiments depicted in FIGS. 21, 22, and 23a-23e. The locking assembly components can be made out of conductive materials. After connecting the two locking assembly components an insulating cover can used to cover the locking assemblies and attachment components. The locking assembly configurations illustrated in FIGS. 73a-73c can be well suited for making connections between stranded elements in tight spaces.

Any of the locking assemblies disclosed herein can be used to provide electrical contact between two or more separate stranded elements. In some embodiments the locking assemblies can provide electrical contact between three or more separate stranded elements. In some embodiments the locking assemblies can provide electrical contact between four or more separate stranded elements. In some embodiments the locking assemblies can provide electrical contact between five or more separate stranded elements.

In some embodiments the locking bore is threaded along substantially the entirety of the locking bore. In some embodiments the locking bore is threaded along a partial length of the locking bore to prevent the drive shaft from further advancement within the locking bore. In some embodiments the locking bore can include a stop to stop the drive shaft and/or locking element from further advancing within the locking bore.

In some embodiments the interior of the receiving bore can be substantially smooth. In some embodiments the interior of the receiving bore can include textured portions that can be used to improve grip with the stranded elements. In some embodiments the interior surface of the receiving bore can textured.

In some embodiments the locking assemblies include a breakaway element. The breakaway element can be positioned within the locking bore to secure the position of the locking element relative to the locking bore. In some embodiments the breakaway element can be coupled to the locking element to maintain the position of the locking element within the locking bore in the absence of the drive shaft. The breakaway element material and shape can be selected to give way, thus permitting movement of the locking element within the locking bore when manual force is applied to the drive shaft. In some embodiments the breakaway element and material is selected to give way permitting movement of the locking element within the locking bore only when a force above a pre-set value is applied to the locking element.

In some embodiments methods are provided that include attaching an electrical lead to the housing of the locking assembly. The electrical lead can be part of a welding device. The methods can further include welding with the welding device. In some embodiments the electrical lead is part of a fuse box connection and the methods further include connecting the fuse box connection to a portion of the fuse box. In some embodiments the electrical lead is part of a battery terminal and the methods further include connecting the lead to a portion of a battery, battery terminal, or battery post. In some embodiments the housing includes a portion formed into or coupled to a utility transmission line. The methods can further include connecting the housing to a utility line or to an electrical lead in communication with the utility line. In some embodiments a portion of the housing of the locking assembly can be formed into or coupled to an electrical welding lead. Methods can further include welding.

In some embodiments methods are provided that include attaching a mechanical lead to the housing of the locking assembly. The methods can further include attaching the mechanical lead to the housing. The mechanical lead can be connected to a winch with the methods further including operating the winch. The mechanical lead can be connected to an object with methods further including lifting the object using the mechanical lead and housing. In some embodiments a portion of the housing is formed into or coupled to a heavy duty cable. In some embodiments the drive shaft includes a portion adapted and configured for engagement with a tool. Methods can further include operating the tool after engaging the drive shaft with the locking assembly. In some embodiments a portion of the multiple strand element is coupled to the locking assemblies disclosed herein and also is coupled to a winch, a motor or a crank. Methods can include operating the winch, motor, or crank after connecting the locking assembly to the multiple strand element.

In some embodiments the stranded elements used with the locking assemblies disclosed herein can have any standard American or British gauge size. Single stranded elements or multiple stranded elements can be used with the devices described herein having any combination of the standard America or British gauge sizes. The locking assembly can be sized to accommodate any of the gauges listed herein. For example the smallest diameter of the receiving bore can be sized to accommodate the size of the stranded element and number of stranded elements within the receiving bore.

Examples American standard gauge sizes that can be used in any of the embodiments disclosed herein include (with the diameter in inches in parenthesis): 0000 (0.46"), 000 (0.4096"), 00 (0.3648"), 0 (0.3249"), 1 (0.2893"), 2 (0.2576"), 3 (0.2294"), 4 (0.2043"), 5 (0.1819"), 6 (0.1620"), 7(0.1443"), 8 (0.1285"), 9 (0.1144"), 10 (0.1019"), 11 (0.0907"), 12 (0.0808"), 13 (0.0720"), 14 (0.0641"), 15 (0.0571"), 16 (0.0508"), 17 (0.0453"), 18 (0.0403"), 19 (0.0359"), 20 (0320"), 21 (0.0285"), 22 (0.0253"), 23 (0.0226"), 24 (0.0201"), 25 (0.0179"), 26 (0.0159"), 27 (0.0142"), 28 (0.0126"), 29 (0.0113"), 30 (0.0100"), 31 (0.0893"), 32 (0.00795"), 33 (0.00708"), 34 (0.00630"), 35 (0.00561"), 36 (0.00500"), 37 (0.00445"), 38 (0.00397"), 39 (0.00353"), and 40 (0.00314").

Examples American standard gauge sizes that can be used in any of the embodiments disclosed herein include (with the diameter in inches in parenthesis): 7/0 (0.500"), 6/0 (0.464"), 5/0 (0.432"), 4/0 (0.400"), 3/0 (0.372"), 2/0 (0.348"), 0 (0.324"), 1 (0.300"), 2 (0.276"), 3 (0.252"), 4 (0.232"), 5 (0.212"), 6 (0.192"), 7 (0.176"), 8 (0.160"), 9 (0.144"), 10 (0.128), 11 (0.116"), 12 (0.104"), 13 (0.092"), 14 (0.080"), 15 (0.072"), 16 (0.064"), 17 (0.056"), 18 (0.048"), 19 (0.40"), 20 (0.036"), 21 (0.032"), 22 (0.028"), 23 (0.024"), 24 (0.022"), 25 (0.020"), 26 (0.018"), 27 (0.0164"), 28 (0.0148"), 29 (0.0136"), 30 (0.0124"), 31 (0.0116"), 32 (0.0108"), 33 (0.0100"), 34 (0.0092"), 35 (0.0084"), 36 (0.0076"), 37 (0.0068"), 38 (0.0060"), 39 (0.0052"), 40 (0.0048"), 41 (0.0044"), 42 (0.004"), 43 (0.0036"), 44 (0.0032"), 45 (0.0028"), 46 (0.0024"), 47 (0.0020"), 48 (0.0016"), 49 (0.0012"), and 50 (0.0010").

In some embodiments the stranded element can have a varying length. In some embodiments the stranded element has a length of about 1 inch to about 20 inches.

Any of the components of the locking assembly can be made out a rigid material. Examples of materials include metals, plastics, etc. Examples of metals include steel, alloys, hardened steel, etc. Examples of steels that can be used include carbon steel, alloy steels, and stainless steels. Carbon steel include low carbon (up to 0.3% carbon), medium carbon (0.3-0.6% carbon), and high carbon (more than 0.6%). Alloy steels include alloys with one or more of manganese, silicon, nickel, titanium, copper, chromium, and aluminum. Stainless steels include steels with 10-20% chromium. For example, harder or hardened steel can be used for heavier duty applications like connecting a steel cable. Softer metals can also be used, such as aluminum, brass, copper, and softer steels. Softer metals can be used for light duty applications or for deformable materials.

Plastic materials can be used in some applications, for example in electrical applications as insulators. For electrical connections the housing of the locking assembly can be made out of plastic while the locking element and/or drive shaft are made out of conductive materials.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components coupled to other components rather than included within parent components (hierarchical). Additionally, it is noted that one or more components may be combined into a single component providing aggregate functionality or divided into several separate sub-components, and any one or more other layers may be provided to couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While the various embodiments have been described in connection with the preferred embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be affected across a plurality of devices. Therefore, the present invention should not be limited to any single embodiment.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A locking assembly, comprising:
   a housing having a receiving portion, a locking portion and an exit portion disposed between the receiving portion and the locking portion;
   a receiving bore within the receiving portion of the housing, the receiving bore adapted to accommodate a multiple strand element;
   a locking bore within the locking portion of the housing, the locking bore adapted to accommodate a locking element;
   an aperture formed in the housing exit portion in communication with the receiving bore or the locking bore;
   a locking element within the locking bore; and
   a drive shaft adapted to advance the locking element along the locking bore and into direct contact with the multiple strand element.

2. The locking assembly of claim 1 wherein the multiple stand element is a multiple strand wire cable, a multiple strand wire rope, a multiple strand electrical cable, a multiple strand fiber rope, a multiple metal strand strap, or a multiple strand fiber strap.

3. The locking assembly of claim 1 wherein the housing is adapted and configured as a battery terminal.

4. The locking assembly of claim 1 wherein the drive shaft is adapted to advance the locking element along the locking bore by rotation within the locking bore.

5. The locking assembly of claim 1 wherein after the locking element has engaged with the multiple strand element a portion of the multiple strand element extends beyond the housing exit portion.

6. The locking assembly of claim 1 wherein after the locking element has engaged with the multiple strand element a portion of the multiple strand element extends beyond the housing exit portion and lays against a housing outer surface.

7. The locking assembly of claim 1 wherein after the locking element has engaged with the multiple strand element a portion of the multiple strand element adjacent to the locking element is formed to remain within the aperture.

8. The locking assembly of claim 1 wherein the receiving bore central longitudinal axis is vertically offset and generally parallel to the locking bore central longitudinal axis and the aperture is only in communication with the locking bore.

9. The locking assembly of claim 1 wherein the aperture is sized to prevent passage of the locking element outside of the housing when the locking element is positioned in the aperture.

10. The locking assembly of claim 1 wherein the receiving bore within one side of the housing receiving portion and the locking bore within one side of the locking portion are on opposite sides of the housing.

11. The locking assembly of claim 1 wherein the receiving bore or the locking bore have a section of decreasing diameter between the portion of the bore nearest a housing surface and the aperture or wherein the receiving bore or the locking bore has a section of decreasing diameter between the portion of the bore nearest a housing surface and the aperture and a section of increasing diameter between the portion of the bore nearest a housing surface and the aperture, or wherein the receiving bore or the locking bore has an hourglass shape along the central longitudinal axis.

12. The locking assembly of claim 1 wherein the locking element is a ball or a wedge.

13. The locking assembly of claim 1 wherein the locking element is formed from one or more of steel, soft steel, hard steel, aluminum, brass, or copper and/or wherein a portion of the locking element deforms when forced against the multiple stand element.

14. The locking assembly of claim 1 wherein the housing is formed from metal, plastic, steel, treated steel, steel alloys, stainless steel, or carbon steel.

15. The locking assembly of claim 1 further comprising: a sleeve over a portion of the housing sized to cover at least a portion of the aperture and a portion of the multiple strand element disposed within or extending beyond the aperture or a sleeve over a portion of the housing sized to completely cover the aperture and the portion of the multiple strand element disposed within or extending beyond the aperture.

16. The locking assembly of claim 1 further comprising: a locking ring over a portion of the housing sized to cover at least a portion of the aperture and a portion of the multiple strand element disposed within or extending beyond the aperture, or a locking ring over a portion of the housing sized to completely cover the aperture and the portion of the multiple strand element disposed within or extending beyond the aperture or a locking ring over a portion of the housing sized to completely cover the aperture and the portion of the multiple strand element disposed within or extending beyond the aperture and a portion of the multiple strand element extending from the receiving bore.

17. The locking assembly of claim 16 wherein the locking ring is adapted and configured for threaded engagement with an outer surface of the housing or wherein the locking ring is adapted and configured for sliding engagement with the housing.

18. The locking assembly of claim 1 further comprising a portion of the housing formed into or coupled to a battery terminal connector or a portion of the housing formed into or coupled to a welding terminal connector, serial battery terminals, a quick connect or disconnect device, distributor cap, an end to end splice, or a turnbuckle.

19. The locking assembly of claim 1, further comprising a compression element within the locking bore between the drive shaft and the locking element.

20. The locking assembly of claim 19 the drive shaft further comprising a cavity or a reduced diameter section to at least partially house a portion of the compression element.

21. The locking assembly of claim 20 wherein the compression element is a spring.

* * * * *